US009916295B1

(12) United States Patent
Crawford

(10) Patent No.: US 9,916,295 B1
(45) Date of Patent: Mar. 13, 2018

(54) SYNCHRONOUS CONTEXT ALIGNMENTS

(71) Applicant: Richard Henry Dana Crawford, Denver, CO (US)

(72) Inventor: Richard Henry Dana Crawford, Denver, CO (US)

( * ) Notice: Subject to any disclaimer, the term of this patent is extended or adjusted under 35 U.S.C. 154(b) by 765 days.

(21) Appl. No.: 13/842,249

(22) Filed: Mar. 15, 2013

(51) Int. Cl.

| | |
|---|---|
| ***G10L 13/08*** | (2013.01) |
| ***G11B 27/034*** | (2006.01) |
| ***G10L 15/22*** | (2006.01) |
| ***G06F 17/24*** | (2006.01) |

(52) U.S. Cl.
CPC .................................... *G06F 17/24* (2013.01)

(58) Field of Classification Search
CPC ....... G10L 13/08; G10L 15/22; G10L 17/005; G11B 27/034; G06F 17/289; G06F 17/2872; G06F 17/2785; G06F 17/2247; G06F 17/211; G06F 17/24
USPC ...... 704/2, 4, 7, 9, 260, 270, 257, 273, 278; 715/234, 244, 256, 239, 716, 203
See application file for complete search history.

(56) References Cited

U.S. PATENT DOCUMENTS 511,409 A * 12/1893 Cole .............................. 49/425
4,884,972 A * 12/1989 Gasper .......................... 434/185
5,862,325 A * 1/1999 Reed et al. ................... 709/201
7,031,923 B1 * 4/2006 Chaudhari et al. ........... 704/273
RE39,090 E * 5/2006 Beauregard et al.
7,069,508 B1 * 6/2006 Bever et al. .................. 715/234
7,209,571 B2 * 4/2007 Davis et al. .................. 382/100
7,580,838 B2 * 8/2009 Divay et al. .................. 704/257
7,668,718 B2 * 2/2010 Kahn et al. ................... 704/270
7,672,830 B2 * 3/2010 Goutte ................ G06F 17/2827 704/2
7,743,324 B1 * 6/2010 Bever et al. .................. 715/244
7,770,111 B2 * 8/2010 Burago et al. ................ 715/256
7,991,613 B2 * 8/2011 Blair ............................ 704/235
8,478,316 B2 * 7/2013 Gould et al. .................. 455/466
8,583,418 B2 * 11/2013 Silverman et al. ............... 704/9
8,675,854 B2 * 3/2014 Michaud et al. ........ 379/202.01
8,712,776 B2 * 4/2014 Bellegarda et al. .......... 704/260
8,719,024 B1 * 5/2014 Moreno et al. ............... 704/257
8,806,320 B1 * 8/2014 Abdo ................ G06F 17/30017 715/203
9,262,410 B2 * 2/2016 Sakamoto ............... G10L 15/22
2002/0007266 A1 * 1/2002 Poznanski ............. G06F 17/274 704/9

(Continued)

*Primary Examiner* — Anne Thomas-Homescu

(57) ABSTRACT

A method and apparatus to align contexts with text. Multiple versions within separate forms of context are controlled; all contexts are controlled in independent alignment with parts in text. Plain text syllables are synchronized with audio vocalization playback with timings applied in context. Precise synchronization is controlled within a multi-touch tap process. Same-language restatements, translations, linguistic alignment "ties" and tags are controlled in contexts. Depictions and vocalizations of text and parts in text are controlled within contexts and sorted within tiered carousels. Toggle controls quickly access separate contexts. Independent alignments between multiple contexts and parts in text are controlled and dynamically adjusted in real-time. Text and contexts in multiple writing systems, styles and sizes are aligned and edited within WYSIWYG textarea. Context alignment controls are applied within a collaborative social framework.

11 Claims, 57 Drawing Sheets

(56) References Cited

U.S. PATENT DOCUMENTS

2002/0143533 A1* 10/2002 Lucas ..................... G06F 3/167 704/235
2004/0034522 A1* 2/2004 Liebermann et al. ............ 704/2
2005/0228663 A1* 10/2005 Boman ................... G10L 15/26 704/235
2006/0015339 A1* 1/2006 Charlesworth et al. ...... 704/251
2006/0149558 A1* 7/2006 Kahn .................... G10L 15/063 704/278
2007/0112837 A1* 5/2007 Houh ................ G06F 17/30247
2008/0221893 A1* 9/2008 Kaiser ........................... 704/257
2009/0037179 A1* 2/2009 Liu ....................... G10L 13/033 704/260
2010/0030550 A1* 2/2010 Travieso et al. .................. 704/7
2010/0169764 A1* 7/2010 Travieso et al. .............. 715/239
2011/0069230 A1* 3/2011 Polumbus ......... G06F 17/30746 348/468
2011/0246173 A1* 10/2011 Li ....................... G06F 17/2827 704/2
2012/0072204 A1* 3/2012 Nasri et al. ....................... 704/9
2012/0191457 A1* 7/2012 Minnis .................... G10L 13/10 704/260
2012/0278061 A1* 11/2012 Weinstein ............. G10L 15/005 704/2
2013/0031479 A1* 1/2013 Flowers ........................ 715/716
2013/0238724 A1* 9/2013 Cunningham .......... H04L 51/24 709/206
2013/0262121 A1* 10/2013 Kayama .................. G10L 13/04 704/267
2014/0019114 A1* 1/2014 Travieso et al. .................. 704/2
2014/0053223 A1* 2/2014 Vorobyov ............... G10L 13/00 725/110
2014/0058719 A1* 2/2014 Travieso et al. .................. 704/2
2014/0070965 A1* 3/2014 Letsu-Dake ........... G01C 23/00 340/971
2014/0089799 A1* 3/2014 Evans ........................... 715/716
2014/0149103 A1* 5/2014 Child ...................... G06F 3/018 704/8
2014/0189554 A1* 7/2014 Lee ...................... G06F 1/1626 715/765

* cited by examiner

SYNCHRONOUS CONTEXT ALIGNMENTS

CROSS-REFERENCE TO RELATED PATENT APPLICATION

This application claims the benefit of U.S. Non-Provisional patent application Ser. No. 12/925,732 filed on Oct. 28, 2010, entitled ALIGNING CHUNK TRANSLATIONS FOR LANGUAGE LEARNERS, U.S. Provisional Patent Application No. 61/668,015 filed on Jul. 4, 2012, entitled ALIGNING BITEXT CHUNKS, and U.S. Non-Provisional patent application Ser. No. 13/565,791 filed on Aug. 2, 2012 entitled SYNCHRONOUS TEXTS, which are hereby incorporated herein in their entirety by this reference.

FIELD OF THE INVENTION

The present invention relates to education; particularly relating to tools and techniques to learn language.

BACKGROUND OF THE INVENTION

Language learning is based in experience; sounds, sights, touch and other such sensations and feelings are real; true experiences with meaningful words leaves no room for doubt; repeated experiences with spoken and written language in context are believed and learned; through trial and error, social interactions, real learning happens.

Experience of vocal, visual, tactile and social language causes a learner to know, believe, trust and learn new usage in words; new words are learned when used in meaningful contexts.

Text supplements are known to add meaningful context to text: karaoke or "follow the bouncing ball" tools animate text while vocalization is heard; translation aligning tools provide some comprehensible context in association with chunks of foreign text.

Known methods to synchronize text with vocals are imperfect; audio/visual presentation of formatted text is passively observed; text animation is limited to color changes or bouncing balls; unformatted plain text is not yet able appear synchronously animated; methods to synchronize syllabic text with vocals are cumbersome; learners fail to actively engage with vocalization and text; limited means are provided to share the experience with others.

Known methods to align meaningful context with text are imperfect; chunk delineation and pairing is bound by inflexible data structures; limited editing control results in static, imperfect translations; variation of contexts, each independently aligned with various chunks of text are not easily accessed; various forms of visual, structural and timings contexts are not easily accessed.

Aligning directly editable texts is a trivial problem within plain text monospace font environments; multiple solutions exist in prior art, as shown on the Internet at "rosettacode 'dot' org/wiki/Align_columns"; what is not known is any method to control separately sized and styled texts in alignment, while applying international character sets, and also proportional fonts, within WYSIWYG editing environments; without any experience in the matter, one may dismiss the problem aligning international texts in proportional fonts within directly editable textarea as trivial; in fact, prior to the present invent, there is no known solution; simple ratio control may appear to control the problem in theory; in reality, widely varying computing environments do not yet control predictable and accurate alignment of texts within editable textarea; in reality, if such texts are successfully aligned and then resized, the alignment typically breaks; what is needed is a method to control alignment and realignment of texts written in any writing system while optionally rendering contents in any proportional fonts or style.

What is needed is alignment control between text and supplemental texts, where either is applied in any style, font face, or character set; where multiple supplemental texts are each controlled in independent alignment with same text; where different forms and versions of supplemental texts are applied with same text; where forms such as timings are aligned with syllables in text, and synchronized with vocalization sounds, and where precisely synchronizing vocal sounds with plain text is controlled in multi-touch and multi-sensory experience; where multiple depictions of meanings in same text are experienced and sorted; where multiple vocalizations of same text are easily accessed, compared and experience; where linguistic alignments and tags are easily aligned and selectively realigned with parts of speech; where restatements and translations are easily compared with same text; where forms and versions of supplemental text are controlled in independent alignment with same text, and efficiently accessed, experienced, re-aligned, improved, and controlled; and where the controls are applied in social interaction, where the experiences are shared.

SUMMARY OF THE INVENTION

Contexts aligning with parts of text provide synchronous experiences; synchronous, both in literal timings context to animate text parts, also synchronous as in occurring simultaneously with related meaning; within any text, synchronously aligned contexts are experienced:

Vocalizations in text are heard: vocalization context for any text is made of audio output heard in the ear; words encoded in the text are audibly vocalized in audio output; audio output may be recorded, spoken or generated live; vocalizations sounds in text are experienced.

Vocalizations in text are seen: synchronization of vocals with plain text is experienced by ears and eyes; vocal sounds are heard while syllabic text segments are seen synchronously in CAPS; vocalizations are seen in text while synchronously heard in audio; a form of synchronous "vocalized text" is experienced.

Vocalizations in text are touched: tactile input synchronizes vocal audio and text segments; "tap tap" input from multiple fingers drives highlighted CAPS thru segments; tap optionally writes timings to sync text segments with audio; tap process optionally reads timings to playback audio, segment by segment; tap process optionally regulates speed and pause control in TTS production; in each case, vocalized text is thus experienced by touch, sight and sound.

Phonetic transcription is seen in context independently aligned with vocalized text; as example, International Phonetic Alphabet (IPA) encodes almost all human language sounds in one common writing system; text in native language switches back and forth to IPA; synchronously vocalized text is experienced in at least two writing forms.

Pictures are seen in context independently aligned with vocalized text: facial expressions and pronunciation models are optionally viewed while synchronously vocalized text is played; pictures are also controlled in separate depiction form in context independently aligned with text; pictures are sorted to illustrate specific text strings; variable select assortments of pictures are linked to specific usages of constant text strings; in sortable picture sets, text parts are experienced pictorially; vocalized text is optionally seen in pictures.

Structures are controlled in context independently aligned with vocalized text; tags are independently aligned with text to define patterns or structures in parts of text; structures may be traditional grammar structures; alternative interrogative structure may be tested; any structural system may be aligned in tag form with text; distinct structures are optionally color-coded or seen as CAPS within plain text; vocalized text is analyzed, patterns are recognized.

Ties between text and context are controlled; within an aligned pair of text and context chunks, words and parts within words are mapped in a "linguistic alignment" or "tie" control; playback of vocalized text is optionally synchronized via ties with parts in aligned translations, and within paired chunks.

Restatement context is controlled in independent alignment with text; rephrasings with similar meanings align with parts of text; multiple versions of translations in other language(s) are each controlled as independent contexts in independent alignment with text; multiple written rephrasings of text parts are accessed; variable ways to write similar meanings are experienced.

Multiple vocalizations controlled in independent alignment with text are compared; separate voices and/or enunciations are experienced; constant strings are heard pronounced in variable expression; vocal expressions are recorded, live, or generated in TTS (Text-To-Speech); unique vocalizations are optionally represented visually, sorted and shared as preferred.

Imitation of vocalized text is induced; imitation, via vocal chords, makes sounds in text experienced; imitative vocalizing while experiencing other any number of independently aligned contexts fully integrates a visual, aural, tactile, pictorial, analytic, comparative and meaningful vocalization experience in text.

Social vocalizations are controlled in independent alignment with text: variable vocalizations are sorted and shared; social approval vets proficient vocalization of text; rejection and acceptance are experienced in independent alignment with text.

Contexts in multiple forms and versions are independently aligned with text; the aligned contexts are easily updated, in real time, so correct interpretations are synchronously shared; dynamic synchronous context alignments are easy edited.

Synchronous contexts exist at the same time within text; contexts are switched and toggled via user interface "UI", so attention may focus on one context without distraction; each context aligned with text is easily edited.

Alignment positions within text may vary where context varies; forms and versions of context align independently with text: different contexts align with text at different positions; delineation, index and alignment positions are controlled dynamically in real-time.

Edit in text/context is controlled in WYSIWYG interface; "what you see is what you get" or "WYSIWYG" allows direct editing; delineation of chunks/segments in text/context is controlled; alignment of paired segments and paired chunks are controlled; a user experiences easily repositioned and editable contexts.

Edit UI provides read/write framework: users are not limited to reading contexts between text lines, users can easily write new contexts and fix existing contexts; synchronously aligned contexts are directly editable, and thus involve a learner on the experiential level.

Editable contexts align synchronously with text; alignment index is controlled by segment, or by chunk: "segments" within text delineate vocal sounds, such as syllables; "chunks" within text delineate meanings, such as words or phrases. chunks and segments in text and context are paired, aligned, varied, controlled and easily experienced.

Accordingly, the objective of the present invention is to align text with contexts that add meaning to text; to control multiple in forms, types and versions in context; to control sequential order of appearance of aligned contexts; to align each context independently with same text; to apply any writing system, font size or style while controlling aligned contexts; to easily edit aligned contexts and text in textarea; to re-align and juxtapose contexts with any segment, word or chunk in text; to align multiple versions of restatement and translation contexts with text; to align ties between parts in context and parts in text; to align tags, including question tags in context with text; to synchronize text with vocalization, optionally plain text form; to experience text in sight, sound and touch via tap synchronization process; to experience text in multiple pictures via picture sorting controls; to experience text in multiple vocalizations, each aligned with contexts; to share the experiences with others who align contexts with text.

BRIEF SUMMARY OF THE DRAWINGS

FIG. 60 shows pointer hover over fifth context segment; seventh text segment is seen and heard in vocal text.

FIG. 9J shows one version within translation form of context aligned with second line of same text seen in FIG. 9A.

FIG. 9K shows multiple context versions included with single context version seen in FIG. 9J.

FIG. 9L shows FIG. 9K contexts edited and reorganized; a version exclusion control is applied.

FIG. 9M shows versions toggle control applied with versions controlled in FIG. 9L.

FIG. 9N shows third version in context from FIG. 9N sorted up to first version in context while hide versions control is applied.

FIG. 9O show toggle control of form applied to view depiction context aligned with text.

FIG. 9P shows versions in context of depiction context seen in FIG. 9O.

FIG. 9Q shows client version of depiction context applied in picture sorter.

FIG. 9R shows network version of picture context applied in picture sorter.

FIG. 9S shows real-time head tracking applied with toggle controls to change languages and pictures: computer seen from high angle.

FIG. 9T shows head tracking applied with toggle control of translation language and depiction context: computer seen from left angle.

FIG. 9U shows head tracking applied with toggle control of translation language and depiction context: computer seen from right angle.

Figure 9A:
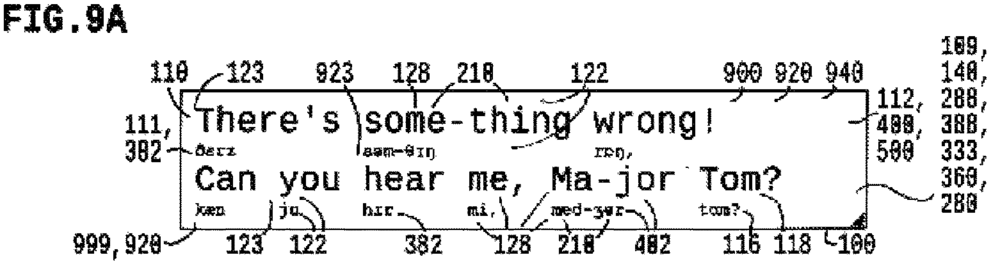
FIG. 9A shows context in IPA transcription form aligned with an example text to illustrate toggle and versions controls.
Figure 9B:
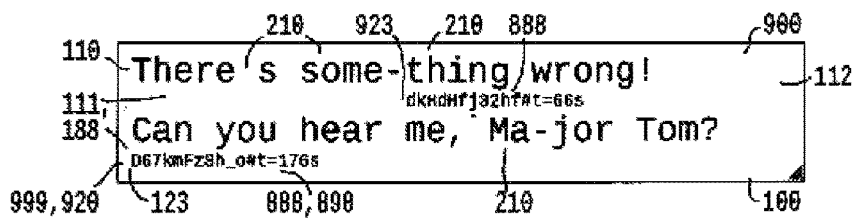
FIG. 9B shows separate vocalization context aligned with same text.
Figure 9C:
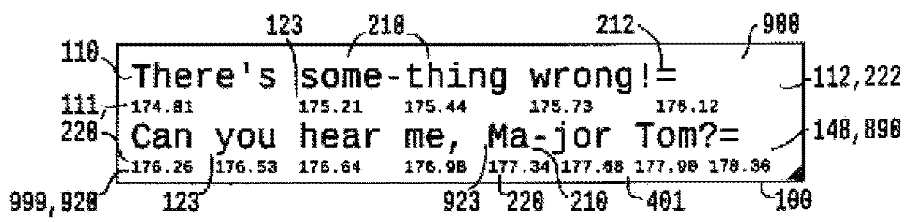
FIG. 9C shows aligned timing context applied with vocalization links seen in FIG. 9B.
Figure 9D:
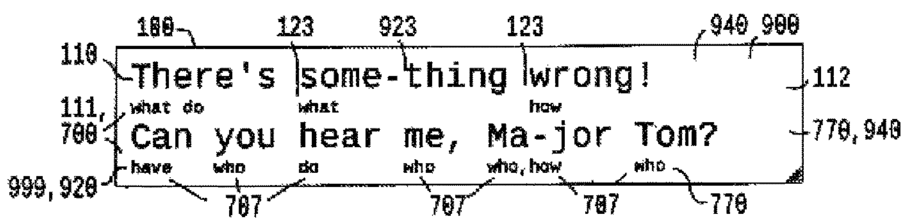
FIG. 9D shows ASQ tags aligned with same FIG. 9A text.
Figure 9E:
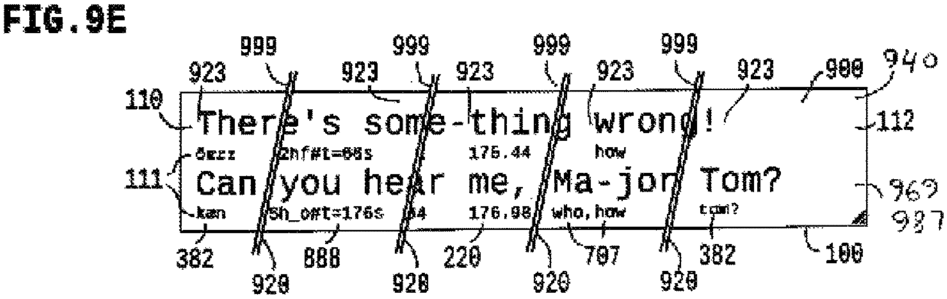
FIG. 9E represents toggle applied to change forms of context between same text example.¬
Figure 9F:
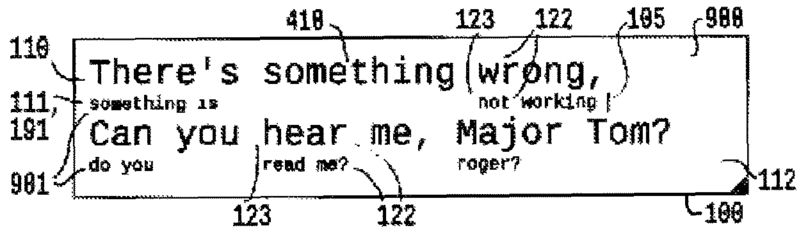
FIG. 9F shows a same-language restatement context aligned with same FIG. 9A text.
Figure 9G:
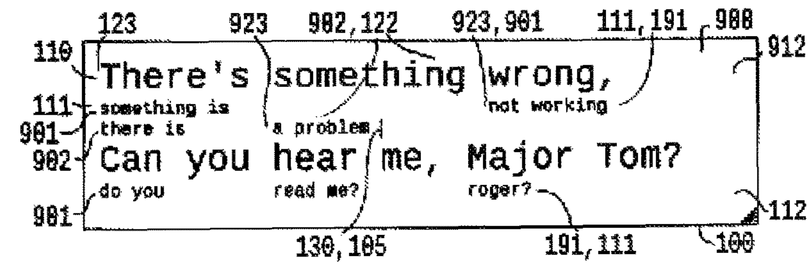
FIG. 9G shows a second line of context added in independent alignment with first line of text.
Figure 9H:
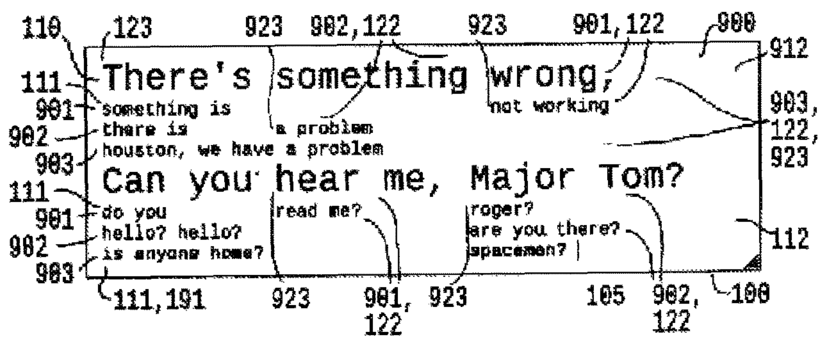
FIG. 9H shows multiple context lines independently aligned with the text.
Figure 9I:
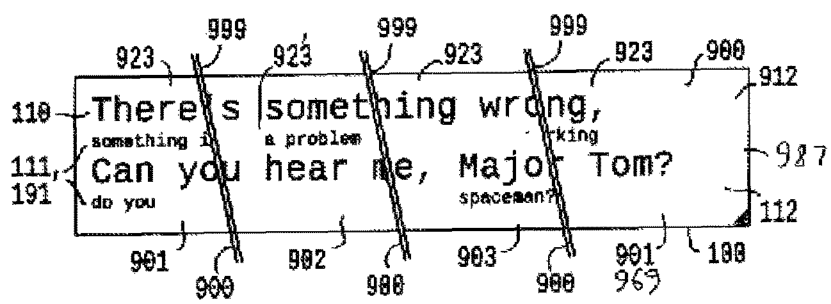
FIG. 9I represents toggle control applied to multiple restatement contexts aligned with text.
Figure 9J:
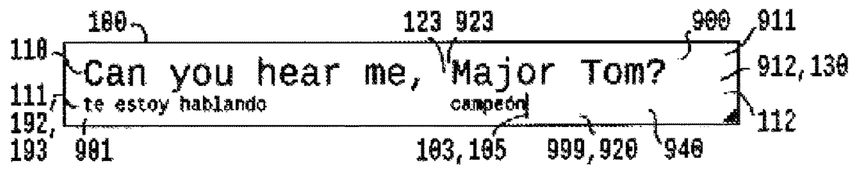
Figure 9K:
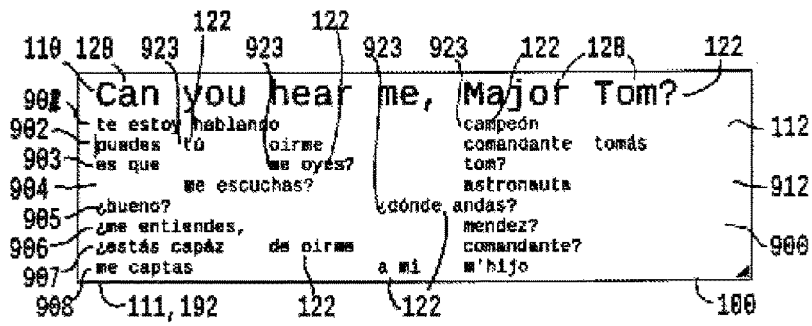
Figure 9L:
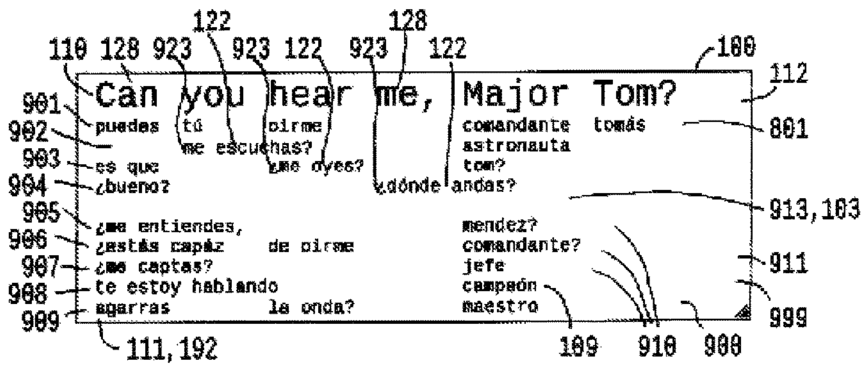
Figure 9M:
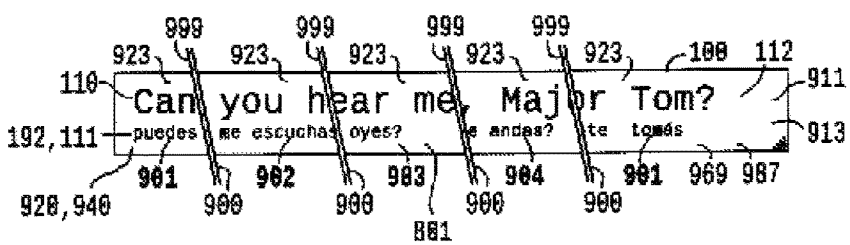
Figure 9N:
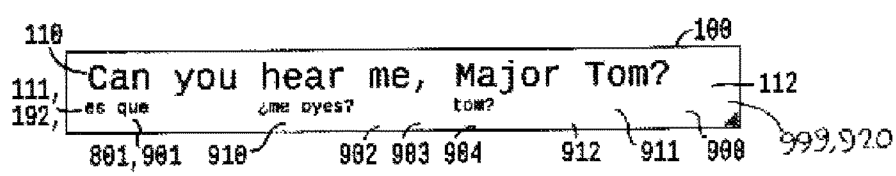
Figure 9O:
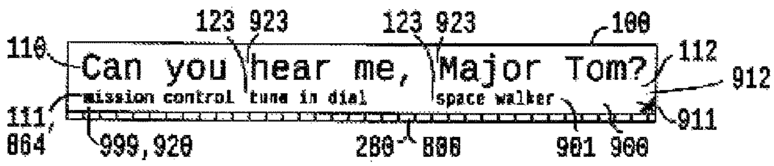
Figure 9P:
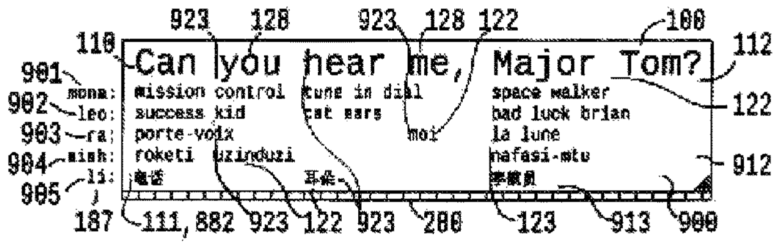
Figure 9Q:
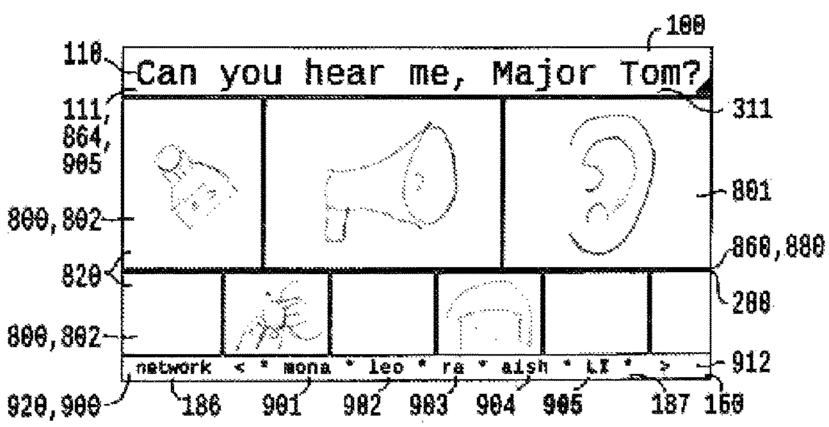
Figure 9R:
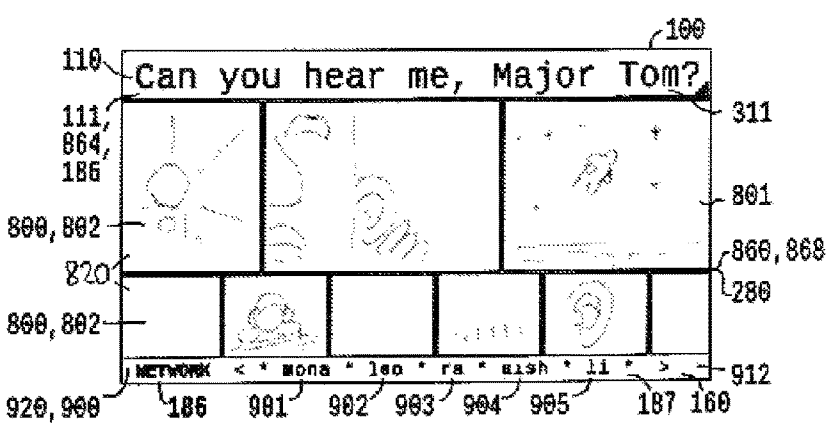
Figure 9S:
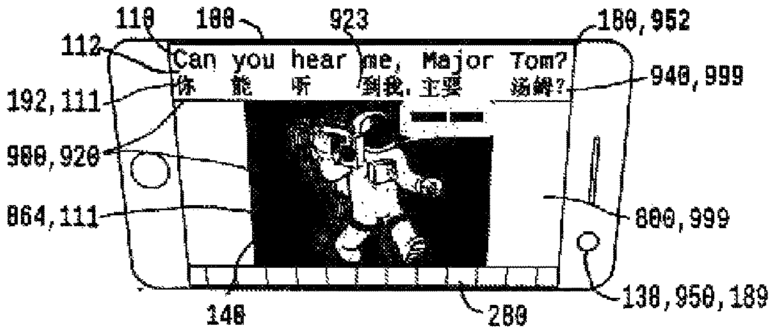
Figure 9T:
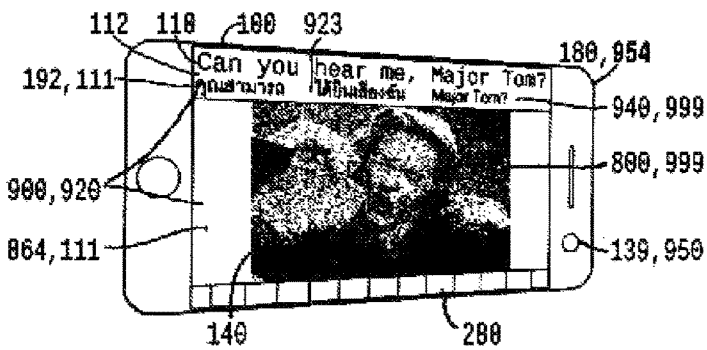
Figure 9U:
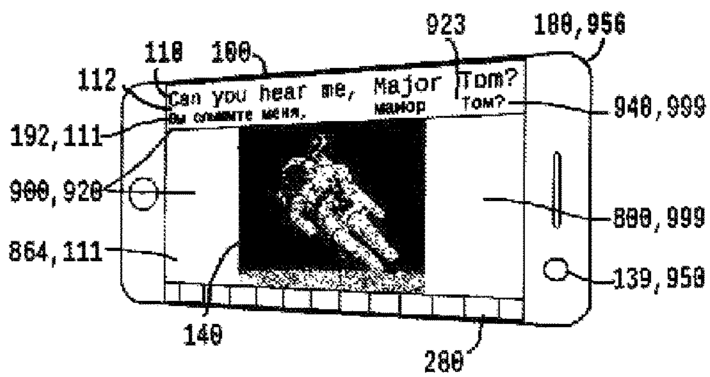
Figure 9V:
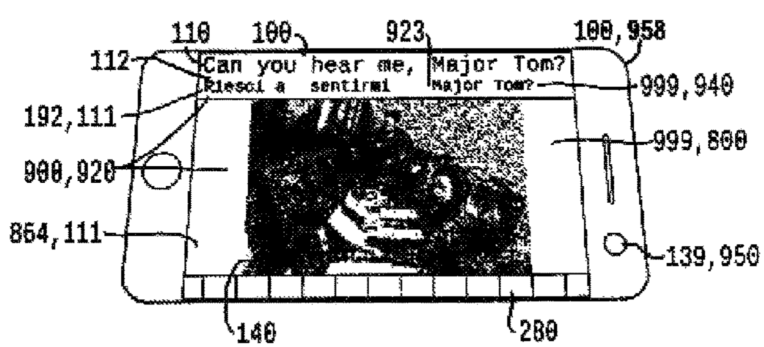

FIG. 9V shows head tracking applied with toggle control of translation language and depiction context: computer seen from low angle.

Figure 9W:
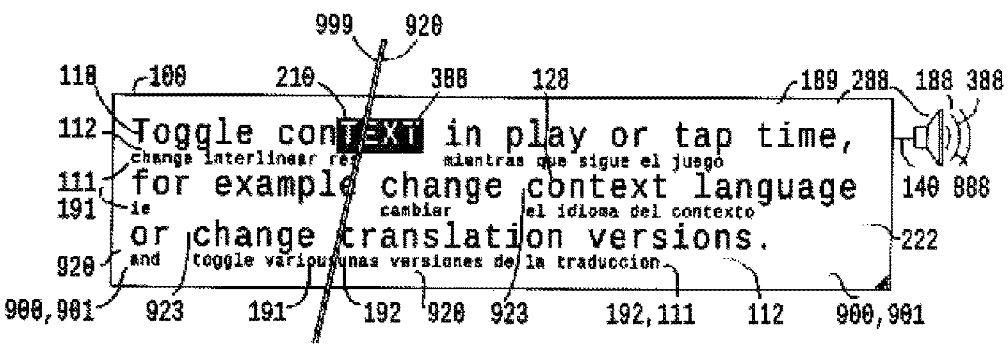

FIG. 9W shows vocal text play while translation language type is toggled.

Figure 9X:
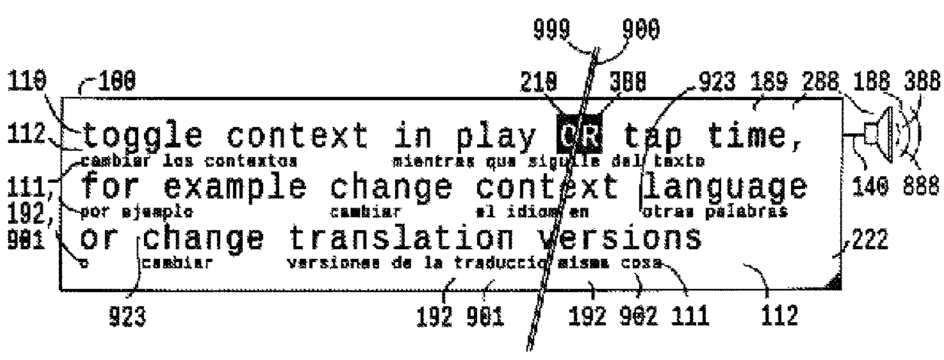

FIG. 9X shows vocal text play while translation language version is toggled.

Figure 10A:
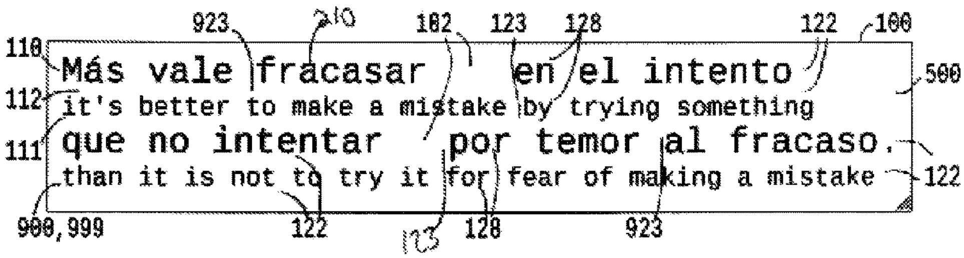

FIG. 10A shows wide context chunks aligned with a text example; spaces appear between text words.

Figure 10B:
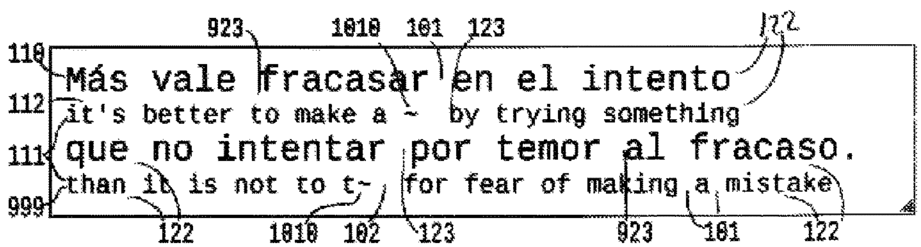

FIG. 10B shows truncation control applied to remove spaces between text words.

Figure 10C:
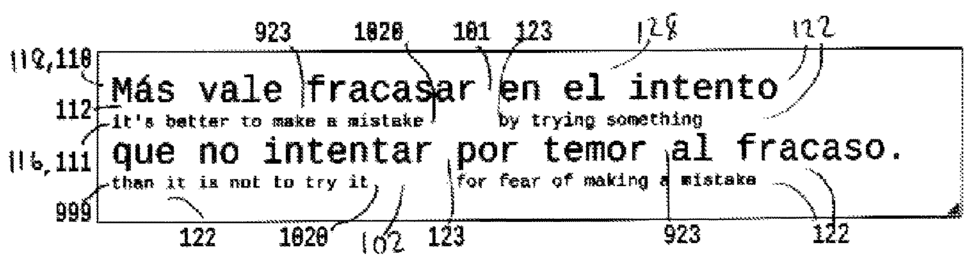

FIG. 10C shows context sized control to remove spaces between text words.

Figure 11A:
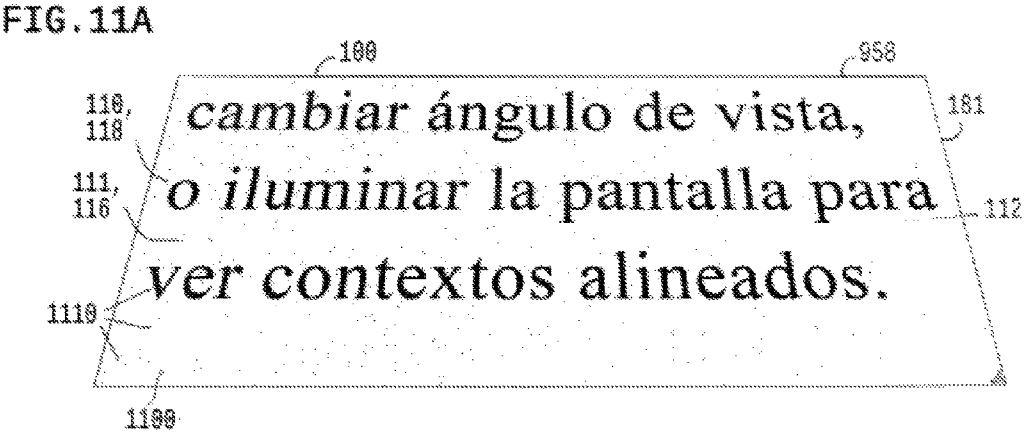

FIG. 11A shows a text within display viewed from angle where context is invisible.

Figure 11B:
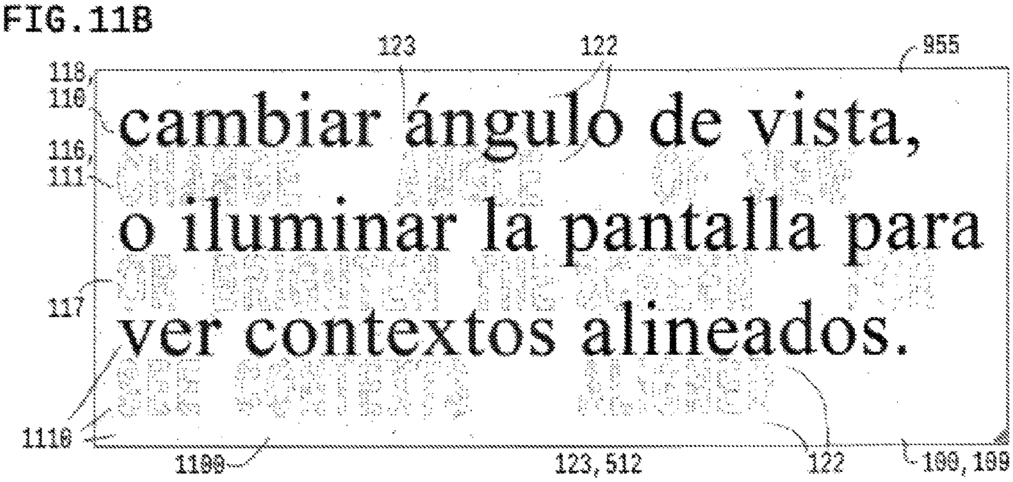

FIG. 11B shows same text and display viewed from angle where context is slightly visible.

Figure 11C:
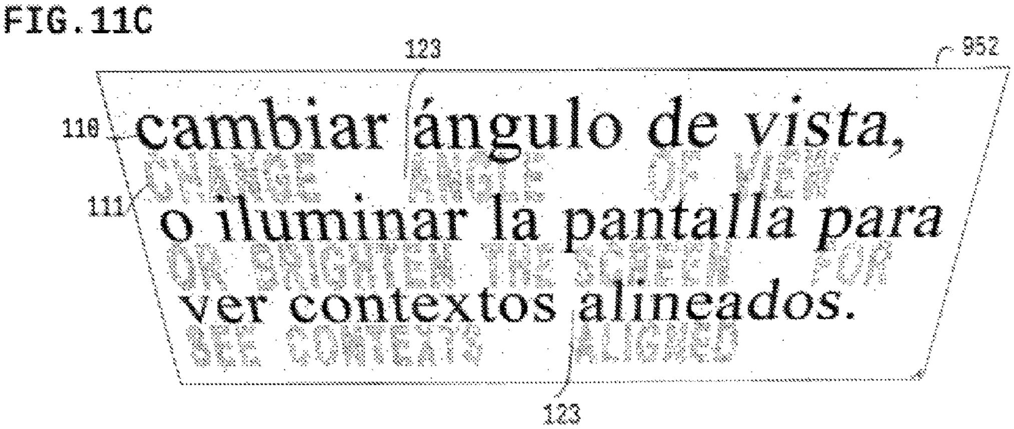

FIG. 11C shows same text and display viewed from angle where context is more visible.

Figure 11D:
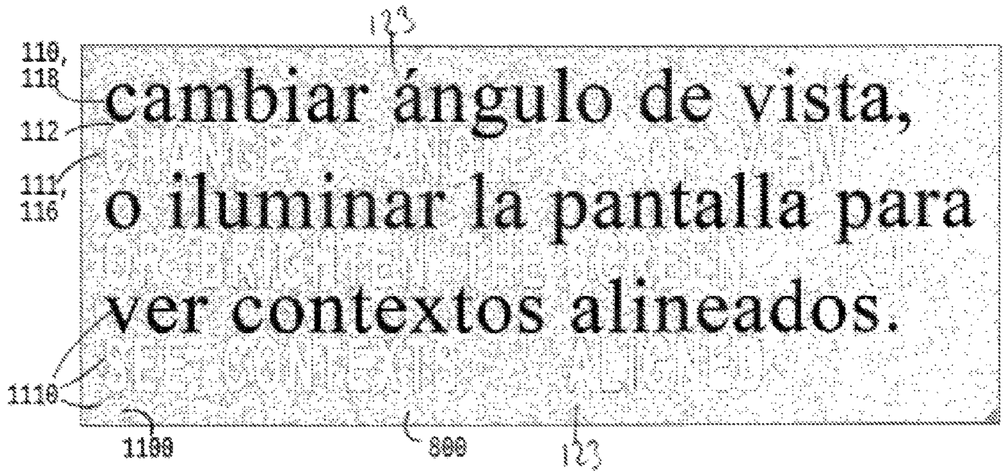

FIG. 11D shows low contrast narrow context aligned with high contrast text in light background.

Figure 11E:

FIG. 11E shows low contrast narrow context aligned with high contrast text on dark background.

Figure 11F:
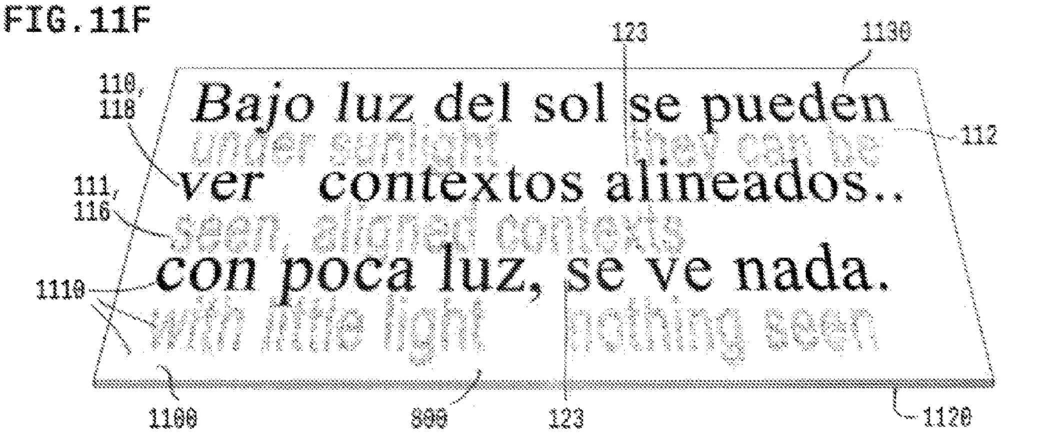

FIG. 11F represents same text printed on paper viewed in bright light view angle.

Figure 11G:
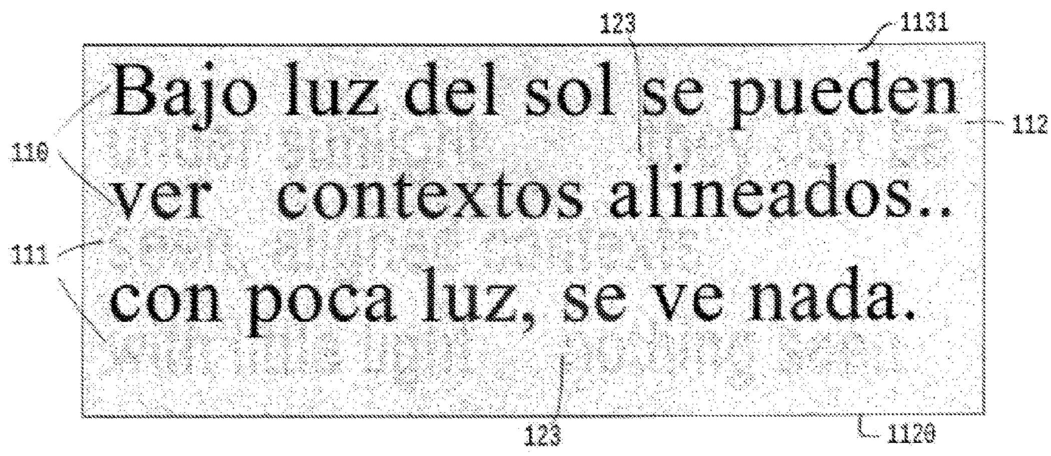

FIG. 11G represents same text printed on same paper viewed in average light view angle.

Figure 11H:
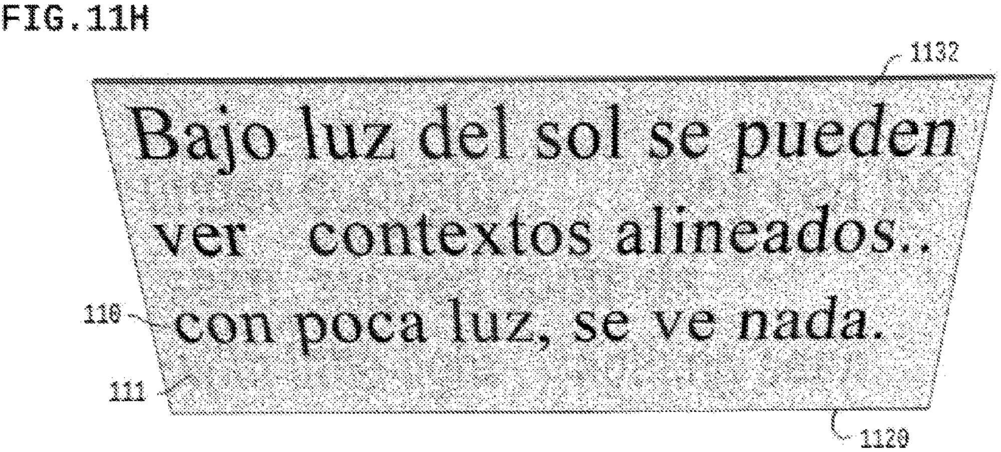

FIG. 11H represents same text printed on same paper viewed in low light view angle.

Figure 12A:
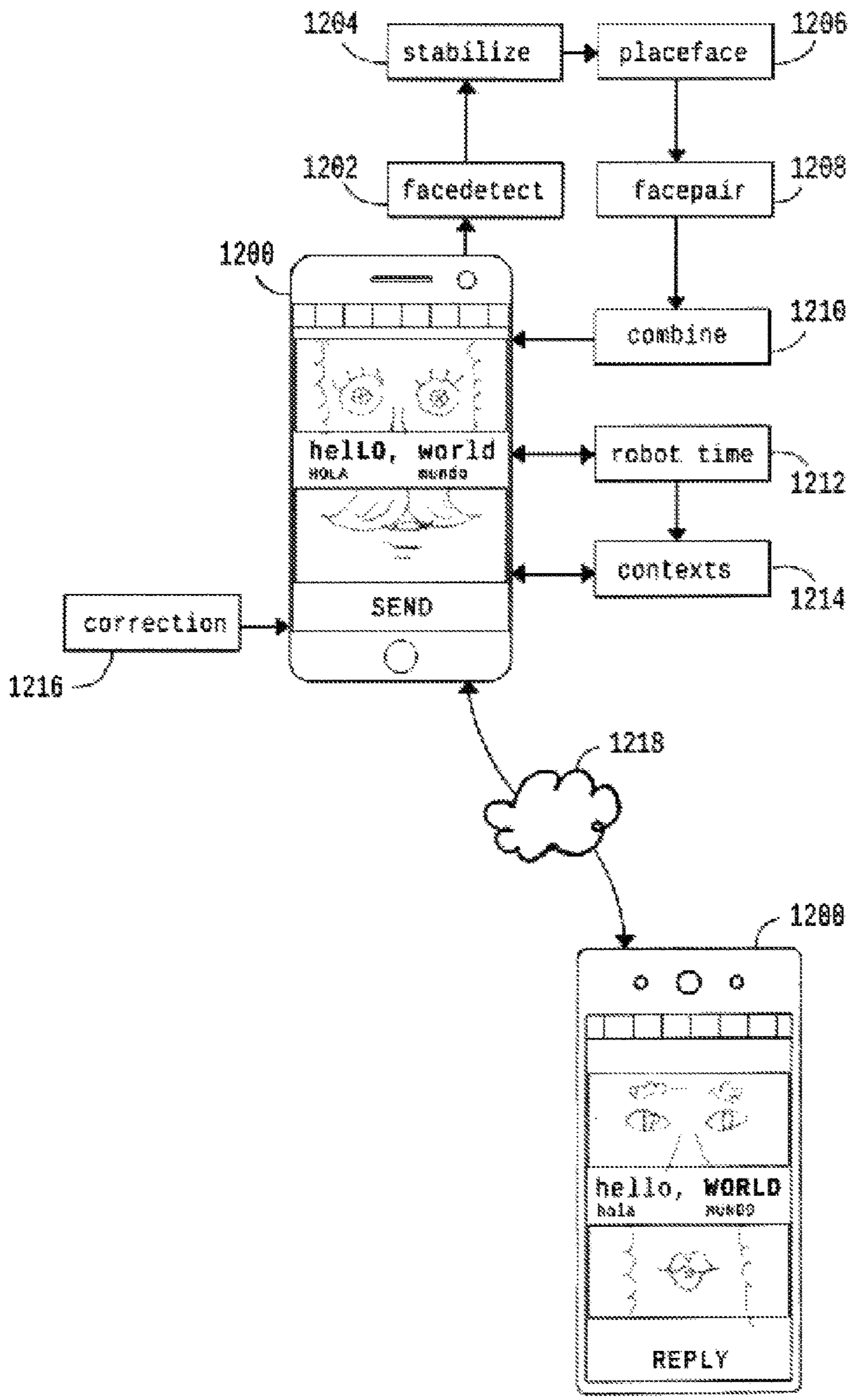

FIG. 12A shows flowchart of vocalized text chat and face combination system incorporated into a "Language Identity Face Exchange" or LIFE system.

Figure 12B:
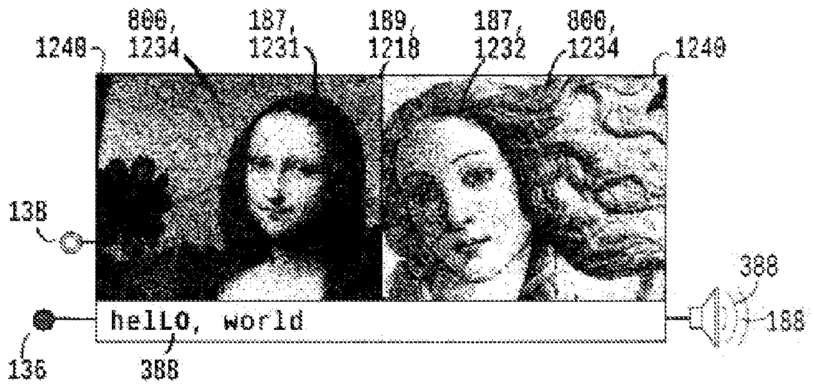

FIG. 12B shows conventional split screen video web conference between first and second face.

Figure 12C:
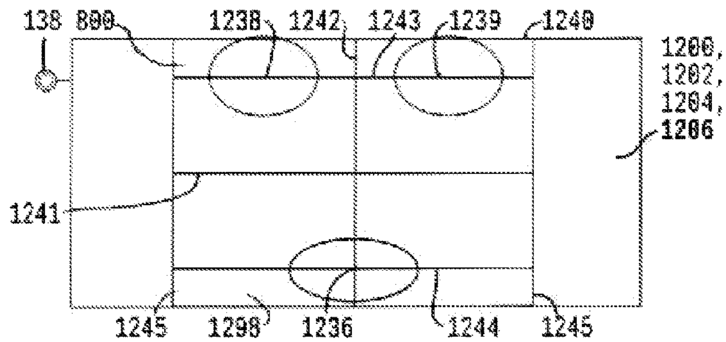

FIG. 12C shows face placement control set coordinates for face placement.

Figure 12D:
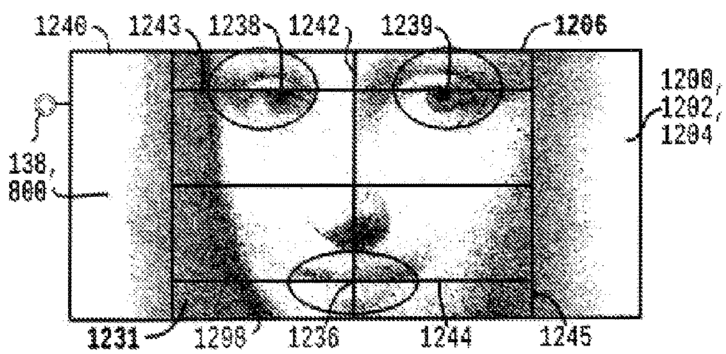

FIG. 12D shows face placement applied to "face one" from FIG. 12B.

Figure 12E:
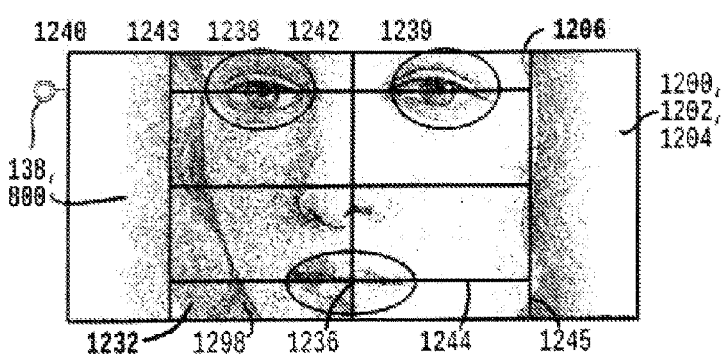

FIG. 12E shows face placement applied to "face two" from FIG. 12B.

Figure 12F:
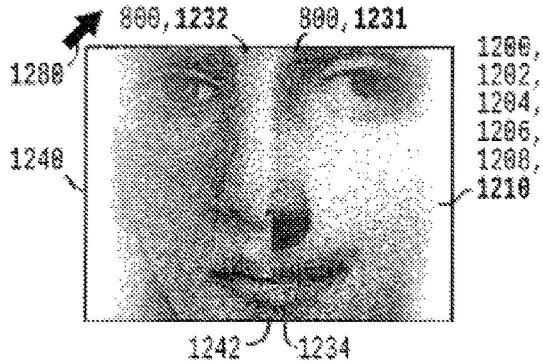

FIG. 12F shows combination of face two and face one 1231 in one frame.

Figure 12G:
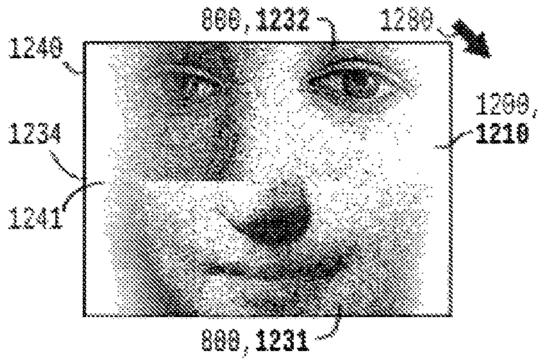

FIG. 12G shows horizontal split screen view, top half second face, bottom half first face.

Figure 12H:
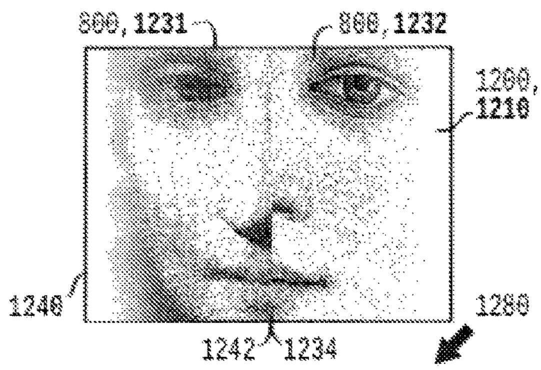

FIG. 12H shows vertical split screen view, left half first face, right half second face.

Figure 12I:
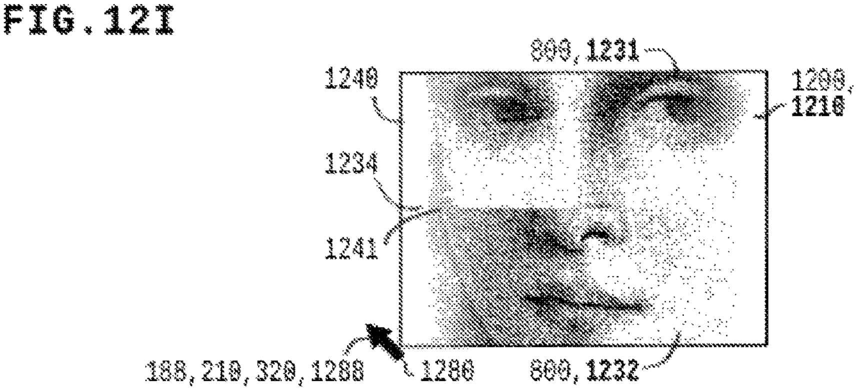

FIG. 12I shows horizontal split screen view, top half first face, bottom half second face.

Figure 12J:
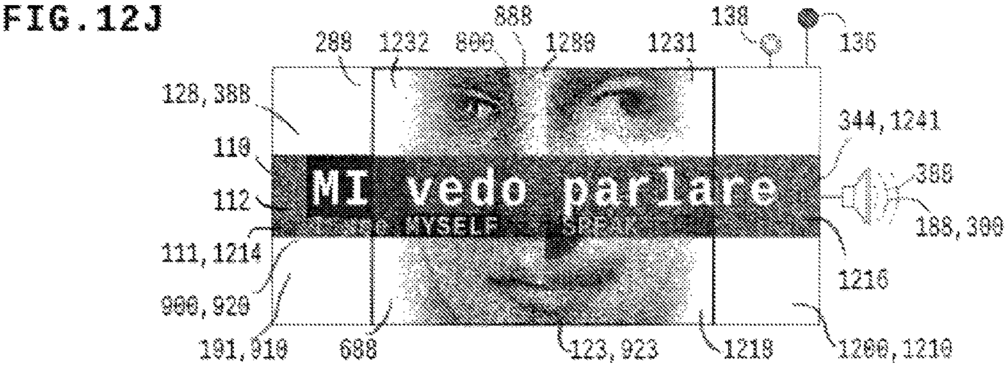

FIG. 12J shows FIG. 12F view under synchronous playback, translation context and superimposition controls.

Figure 12K:
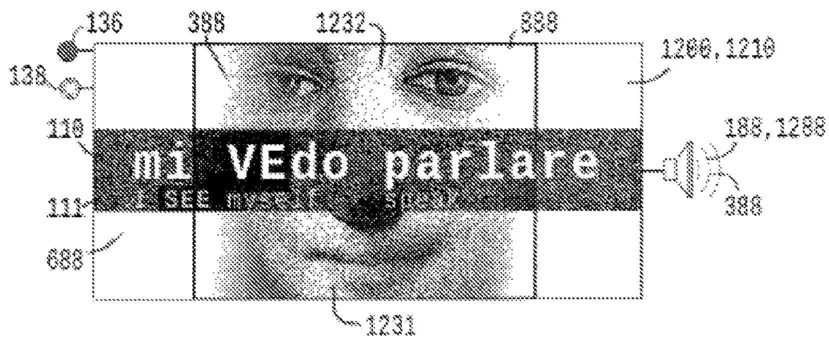

FIG. 12K shows vocal text play next segment after FIG. 12J example, while spin control is applied in face combination.

Figure 12L:
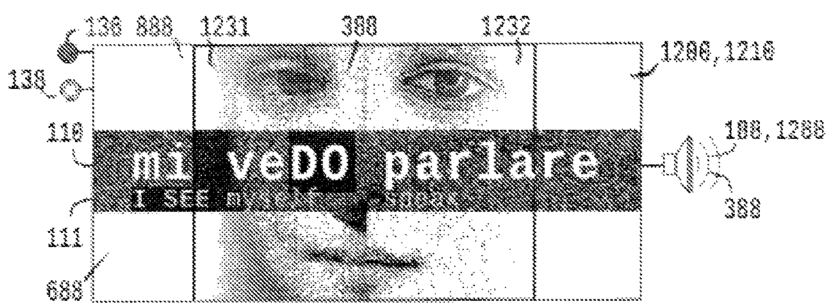

FIG. 12L shows continuation of spin control applied with face combination control; vocal text plays next segment.

Figure 12M:
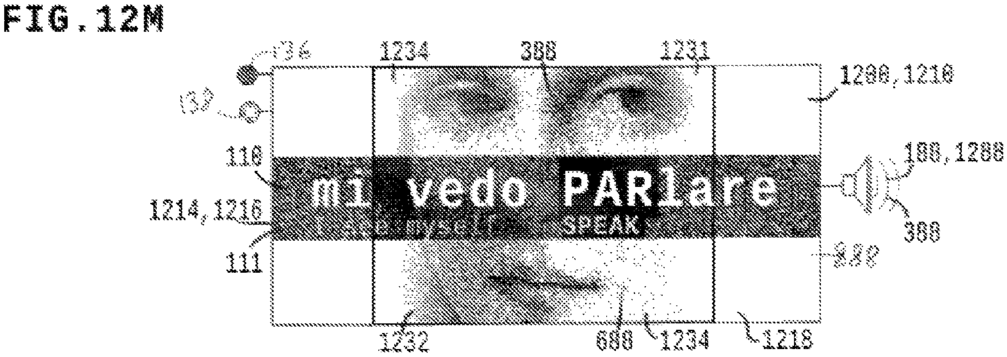

FIG. 12M shows next vocal text segment play while spin control is applied with face combination.

Figure 12N:
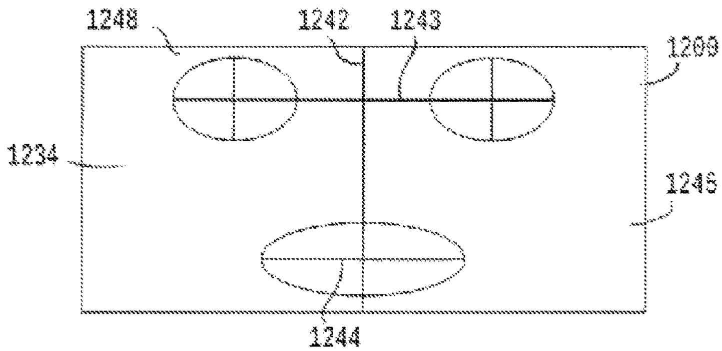

FIG. 12N shows an alternative larger scale face feature placement guide to FIG. 12C example.

Figure 12O:
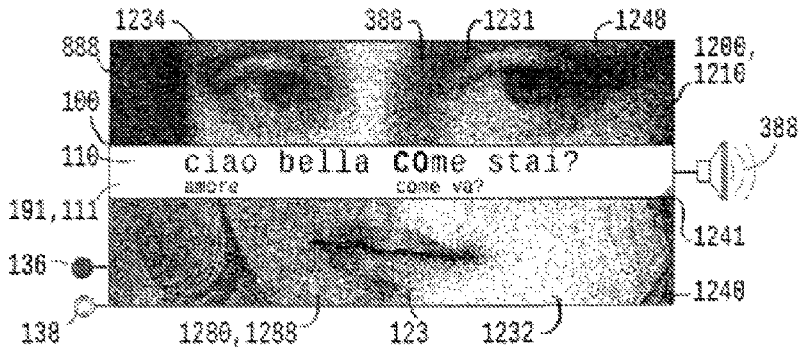

FIG. 12O shows baby face placement applied in combination; face one eyes seen above face two mouth.

Figure 12P:
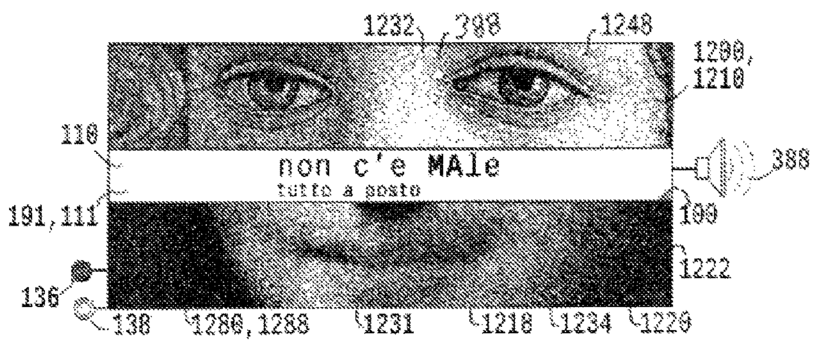

FIG. 12P shows baby combination reversed: first mouth below second eyes.

Figure 12Q:
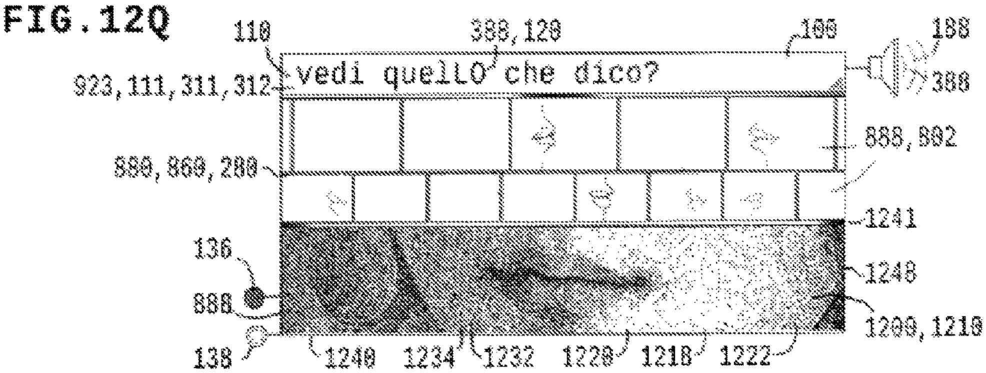

FIG. 12Q shows picture sorter applied with vocal text and LIFE system.

DETAILED DESCRIPTION OF THE PREFERRED EXAMPLES

Figure 1A:
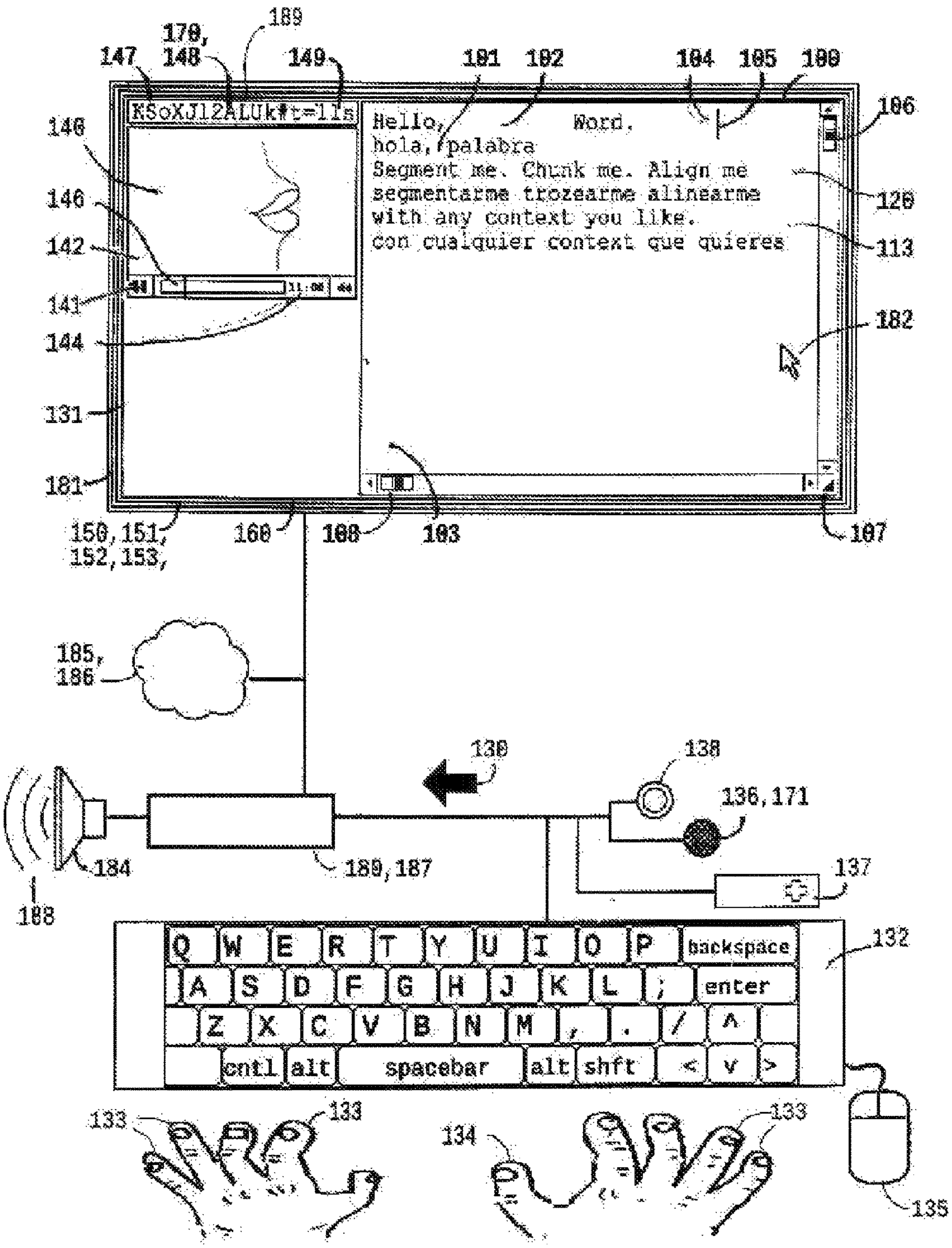
FIG. 1A shows a computer environment applied in the invention.

FIG. 1A shows a computer system 180 applied in accordance with the present invention; within computer 180, a processor executes computer instructions or software program(s) 150; computer memory stores programs 150 and other text files in a medium readable by computer 180.

Computer 180 as shown includes: a monitor 181 to provide visual display; a keyboard 132, touchscreen 131, and/or mouse 135 to enable input 130 from fingers 133 and thumb 134 of one or both hands; a sound system 184 to reproduce audio playback; preferably, computer 180 includes a microphone 136 provided for input 130 via voice and a video recorder 138, all shown.

Network access 186 seen preferably engages the internet: computer 180 shown is understood as client 187 connecting to other clients 187 via network 186; server 185 shown with network 186 is applied to connect clients 187, and also to serve content to clients 187.

Computer 180 shown is representative; the full scale computing environment shown in FIG. 1 optionally applied; mobile platforms such as smart phones and tablets are optionally applied.

Programs 150 applied using computer system 180 are understood to include: programs 150 which control above shown computer 180 hardware systems, including operating modern operating systems such as iOS, Android, Mac X, Windows 8, and such; a recent browser implementation to access local computer 180 memory and/or network 186 computer 180 memory; a graphical user interface GUI 160 to control information shown displayed on monitor 181; a pointer 182 used to define input 130 positions within in GUI 160; programs 150 are shown with standard functions including start 151, loop 152, and end 153, all shown.

Input 130 seen controls program 150 functions; throughout the disclosure, input 130 is seen to contents presented by computer 180; "input" 130 is always understood applied via one or more of multiple devices shown, including keystroke to preconfigured keyboard 132 key or key combination, voice to microphone 136 in conjunction with "speech to text" or "STT" system 171, video camera 138, motion sensor 137, where motion sensor 137 optionally applies accelerometer, optical sensor, functional magnetic resonance imaging and such.

Basic programs 150 applied in the example of the present invention shown in FIG. 1 include a media player 140, and an editable textarea 100. Textarea 100 is optionally applied to transcribe and/or correct transcriptions of vocalizations 188 heard reproduced in sound system 184, and then define transcription text 110 and contexts 111, as set forth below.

Media player 140 has multiple applications: media player 140 is optionally used to control sound system 184 playback; a pause/play 141 controls a start and a stop of playback 142; a cue time 144 specifies a start time for playback 142; a cue scroll 146 is used to modify cue time 144; a search field 147, within which an media link 148 is modified to access select contents for view and playback 142; a media link cue 149 optionally specifies cue time 144 to start playback 142.

Media link 148 seen is understood to access any preexisting recordings, recordings created in real-time 189 shown, or generation program such as below described TTS 170.

Audio media encoded in common formats, such as MP3, WAV, AU and the like; timing data encoded within the audio format is applied to synchronize timings in text 110, in synchronous players 288 of vocalized text 388 as shown and described in conjunction with FIG. 2, and FIG. 3B-FIG. 3C, below.

Video media encoded in common formats such as FLV, AVI, MP4, Quicktime, WebM and the like; timing data encoded within the audio/video format is applied as described above.

Real-time web conferencing streams between two or more participants connecting via network 186, optionally controlled as described in conjunction with examples seen in FIG. 12A-FIG. 12Q series, are understood as reproduced from media links 148 by media player 140.

Visual media encoded in other forms, such as animated GIF, GIF, JPG, PNG and the like are understood as reproduced from media links 148 by media player 140.

TTS or Text-To-Speech 170 systems such as Nuance, eSpeak and the like are understood as reproduced from media links 148 (configured to call TTS 170 function) by media player 140.

Textarea 100 controls as shown in FIG. 1 include: a caret 105 used in conjunction with pointer 182 to define input 130 insert points within textarea 100; a resize 107 control to adjust height and width parameters of textarea 100; a horizontal scroll 108 control used to access contents which exceed width parameters of textarea 100; and a vertical scroll 106 control used to access contents which exceed height parameters of textarea 100.

Text 110 contents are input from caret 105 positions as shown within textarea 100 via input 130 methods described above. Contents in textarea 100 comprise one or more numbers, mathematical symbols, and characters from one or more alphabets or writing systems.

Unicode 113 seen is preferably applied to encode textarea 100 characters, so that multiple human language writing systems are controlled.

Plain text 120 shown applicable is understood as unformatted, unstyled text 110 applied in program 150.

"Characters" include space 101 or spaces 102 shown used to delineate separate words, and "line break", "carriage return" or "new line" 103; one input 130 of keyboard 132 keystroke on delete or backspace 104 key shown is understood to remove one empty space 101.

Figure 1B:
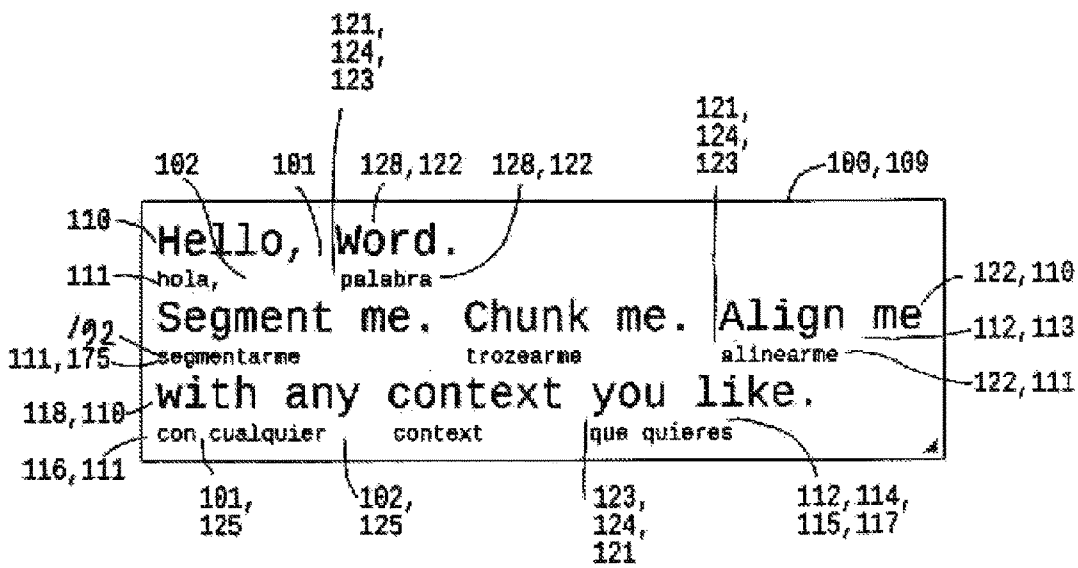
FIG. 1B shows textarea within computer control text with aligned context.

FIG. 1B shows textarea within computer control text with aligned context.

Same textarea 100 with same contents and controls as FIG. 1A are seen; textarea 100 contents are controlled in two separate forms, a text 110, optionally controlled in rows and/or lines, and an aligned context 111, also controlled optionally in rows and/or lines, as described in conjunction with FIG. 10A-FIG. 101; together both are seen controlled as an aligned bitext 112.

Text 110 contents are comprised of alphabetic or other writing system characters, which are used to represent words in human language. The words are variously arranged to convey variable meanings. Text 110 contents may include language that is unknown to a person using the invention. Accordingly, a separate text form is controlled to apply defining contextual information as shown, herein referred to as "contexts" or "context" 111, which are shown in alignment 123 with various parts of text 110, under control of chunk array 121 shown.

Context 111 contents may be comprised of numbers and/or characters, which are controlled in alignment 123 with text 110; context 111 may appear in various forms, optionally including one or more of the following: numeric timing specifications for parts of text 110; structural classifications for parts of text 110; links to select visual representation of parts in text 110; restatements 191 and translations 192, written in any language, of parts of text 110; comments regarding parts of text 110; comments regarding separately aligned context 111; linguistic "ties" to map parts in context 111 with parts in text 110.

Context 111 seen in translation 192 form shown is optionally generated mechanically in real-time mechanical translation 193 process shown; restatement 191 context 111 understood in same language as text 110.

Figure 4A:
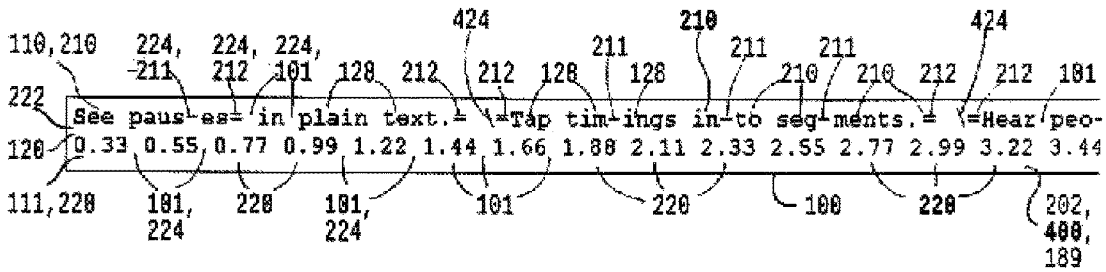
FIG. 4A shows unaligned, delineated timed text controlled in segment array.
Figure 4B:
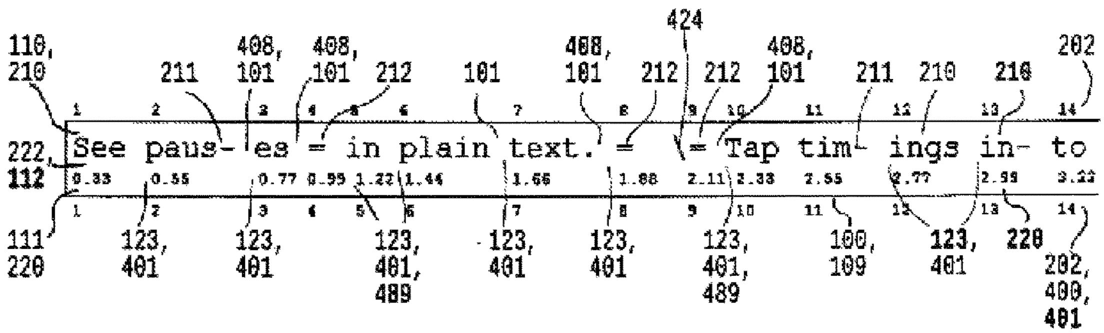
FIG. 4B shows timed text in bitext aligned by segment: expanded delineation and nudge allowance also shown.
Figure 4C:
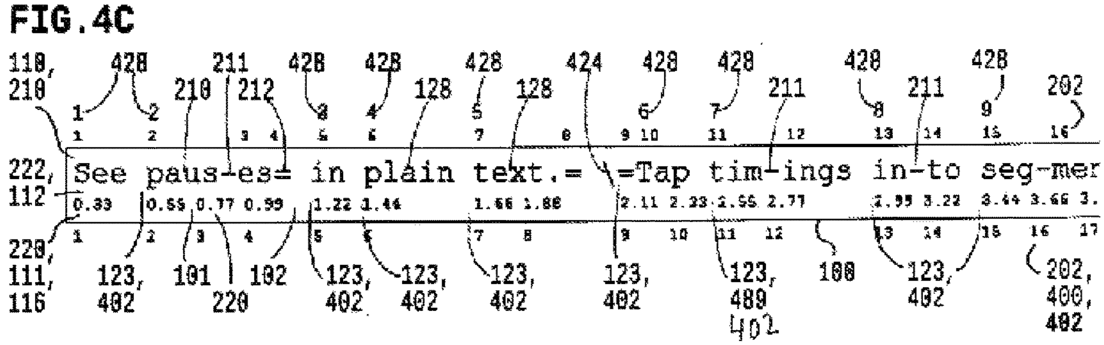
FIG. 4C shows timings aligned by the word.
Figure 5A:
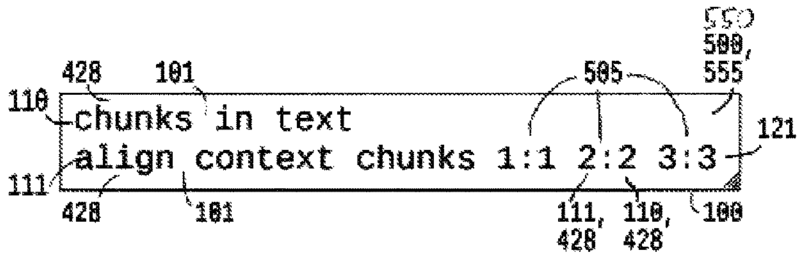
FIG. 5A example shows required resources including text, context and index of chunk pairs.
Figure 5B:
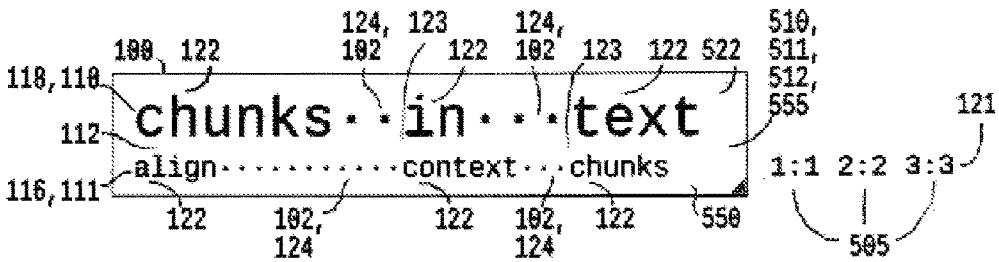
FIG. 5B shows wide alignment form; all chunks delineated by at least two empty spaces.
Figure 5C:
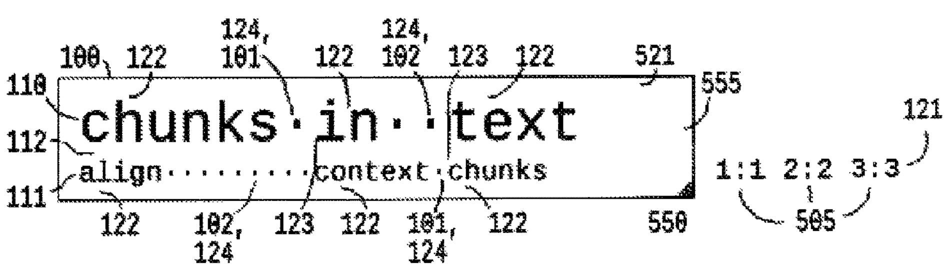
FIG. 5C shows trim alignment, where at least two empty spaces delineate at least one chunk per pair.
Figure 5D:
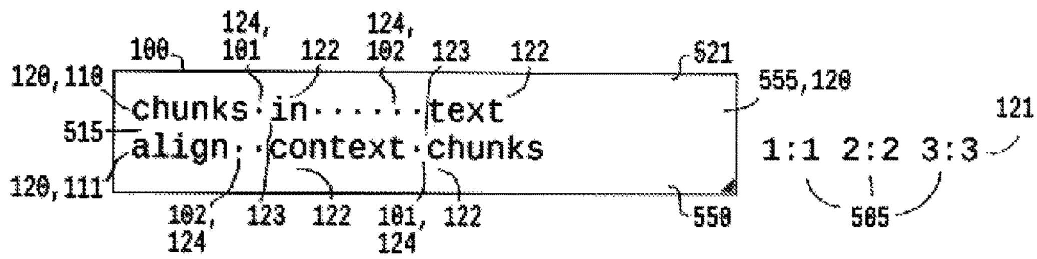
FIG. 5D shows trim alignment in "plain text" bitext, seen controlled in basic input forms.
Figure 5E:
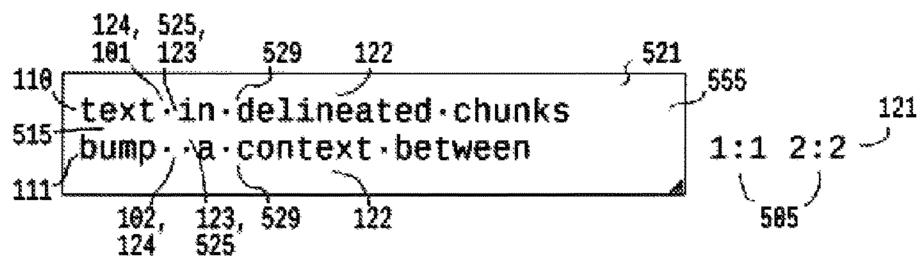
FIG. 5E shows bump control applied in "plain text" bitext to control incidental aligning.
Figure 5F:
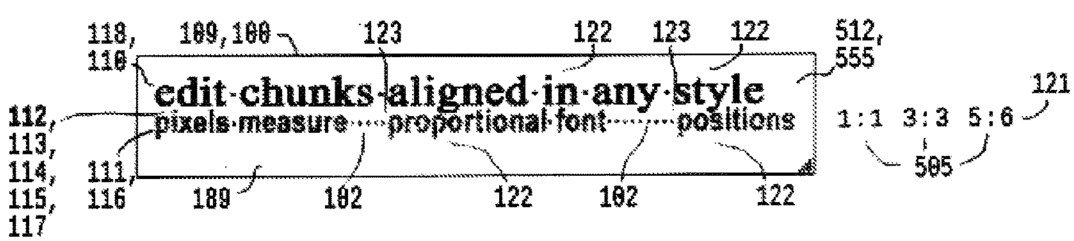
FIG. 5F shows example of directly editable proportional fonts aligned via span method.
Figure 5G:
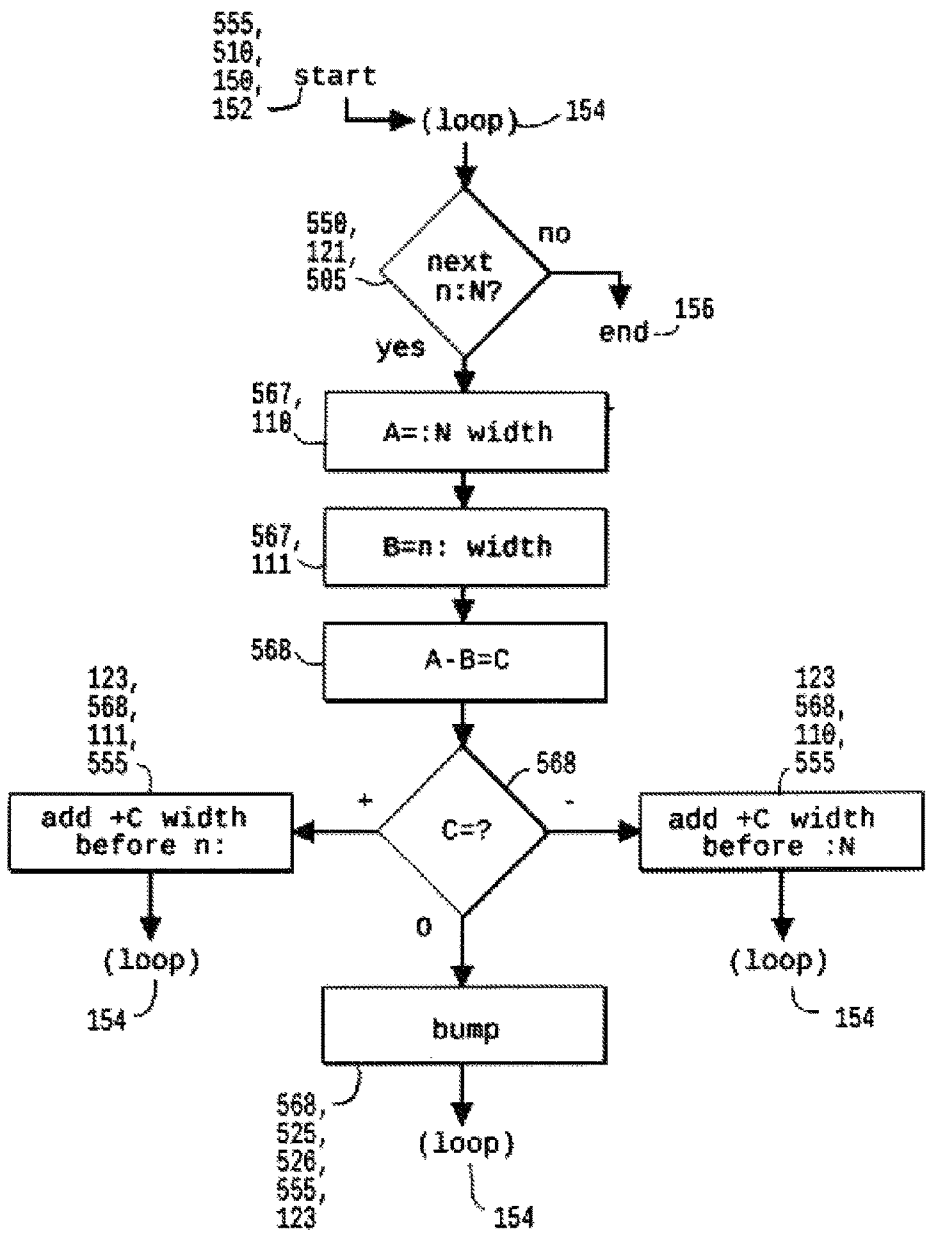
FIG. 5G shows flowchart of a basic method to align bitext chunks from pairs in index.
Figure 5H:
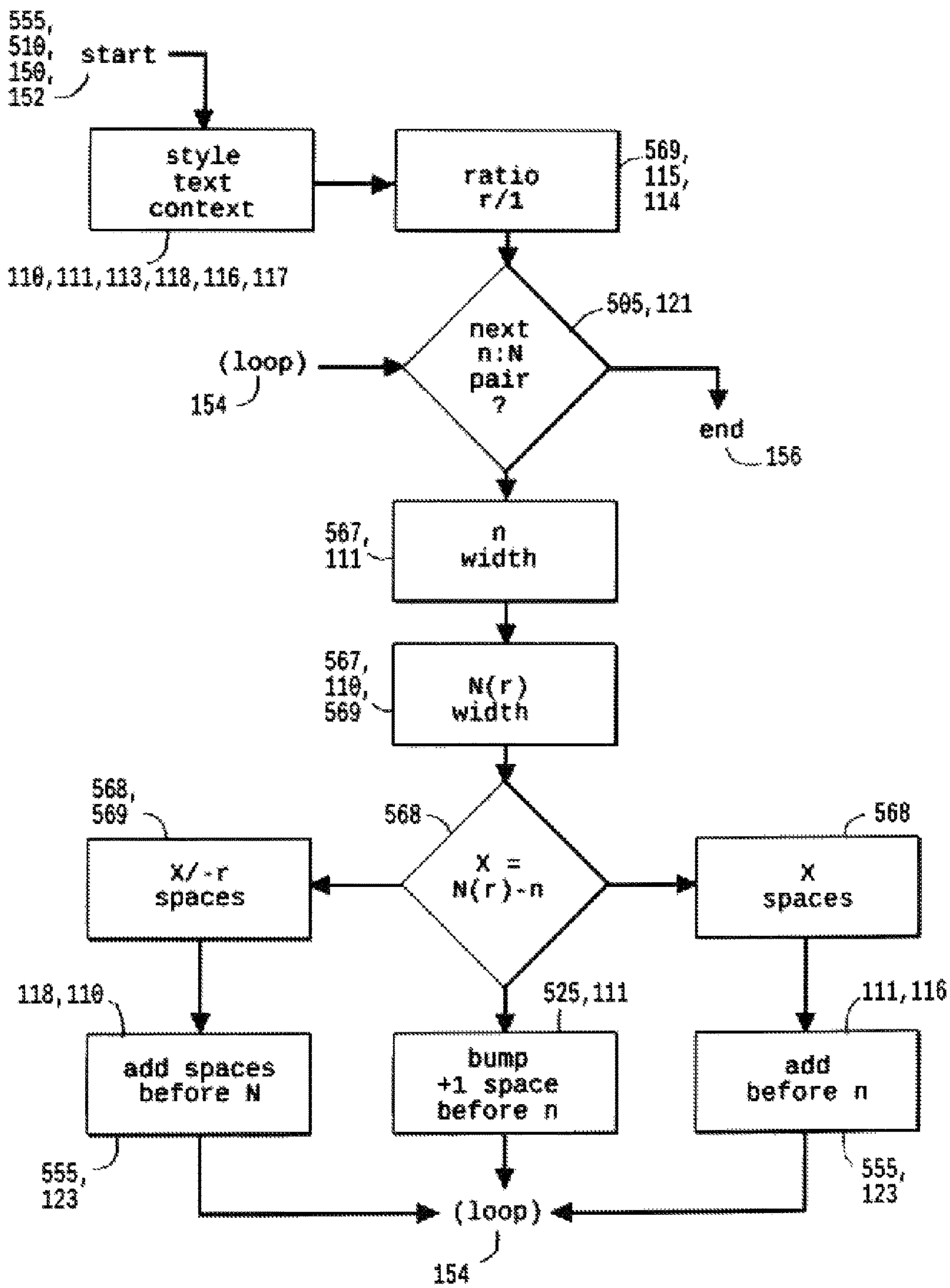
FIG. 5H shows flowchart of ratio factoring within basic ABC control.
Figure 5I:
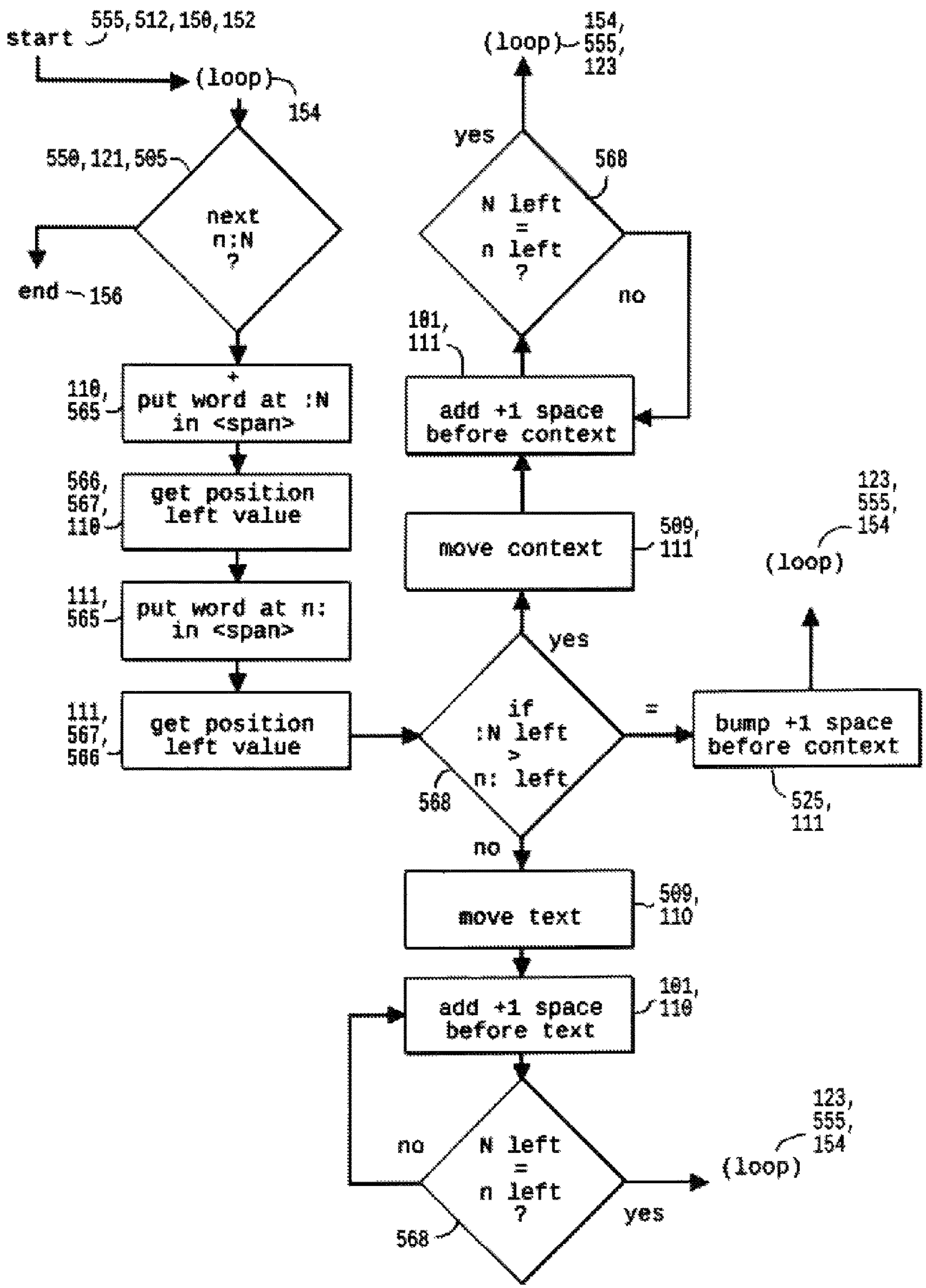
FIG. 5I shows flowchart example of a span method to measure spaces required to align bitext chunks.
Figure 5J:
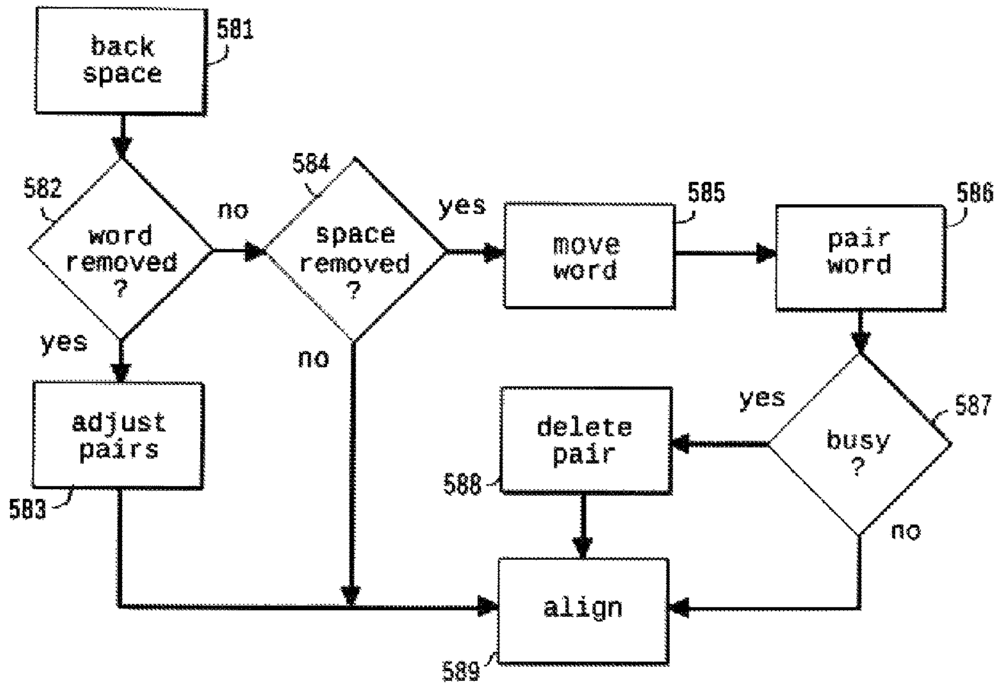
FIG. 5J shows flowchart example of pull control and associated controls.
Figure 5K:
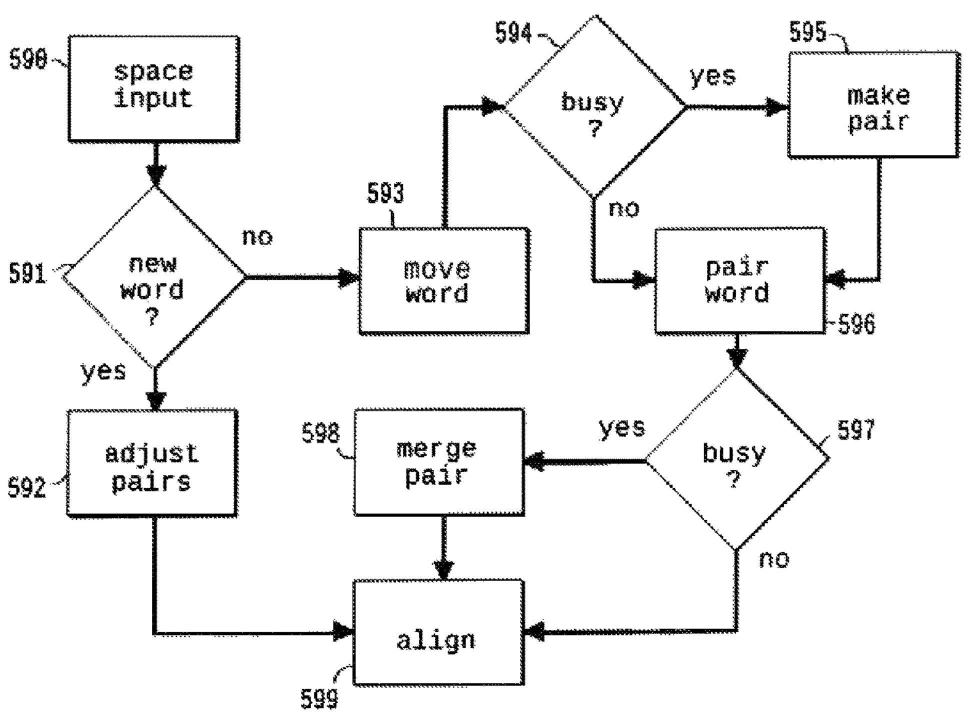
FIG. 5K shows example flowchart of push control and associated controls.
Figure 5L:
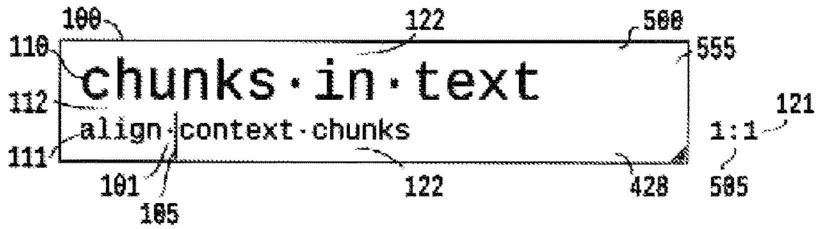
FIG. 5L shows a sample bitext before any make, push, merge, pull, delete controls are applied.
Figure 5M:
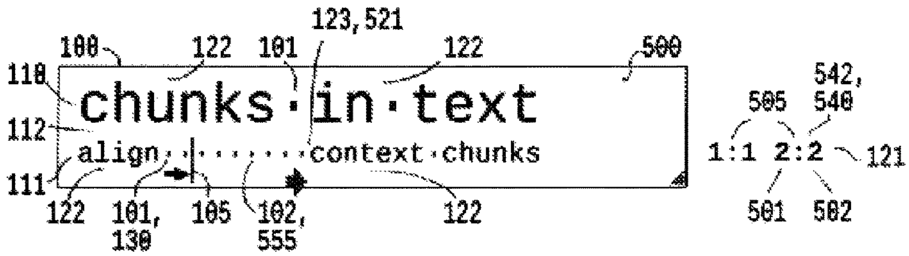
FIG. 5M shows system make new pair in index, then align bitext chunks accordingly.
Figure 5N:
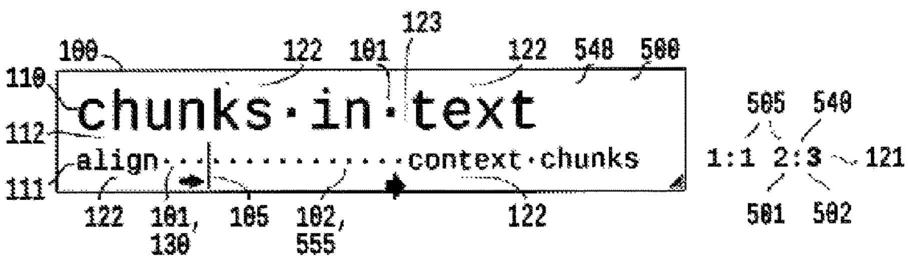
FIG. 5N shows push control applied to push chunk into alignment with next word in other line.
Figure 5O:
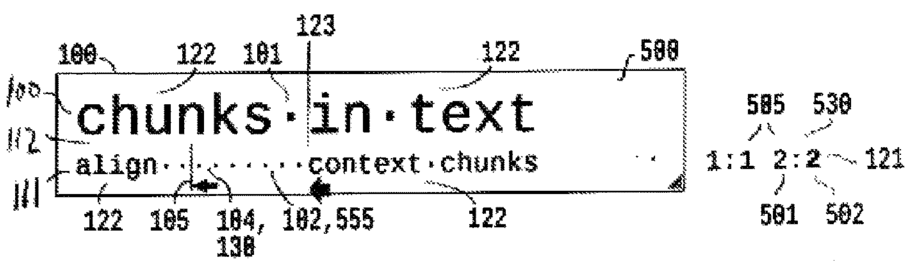
FIG. 5O shows pull control upon chunk to re-align it with previous word in other line.
Figure 5P:
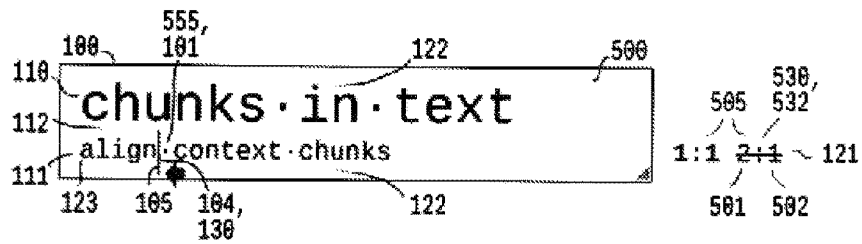
FIG. 5P shows pull and delete controls combine two pairs into one pair; a chunk is seen "pulled into" the previous chunk.
Figure 5Q:
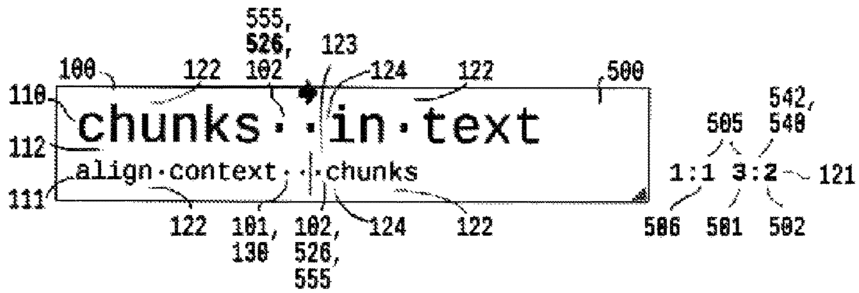
FIG. 5Q shows incidental alignment differentiated via double bump control.
Figure 5R:
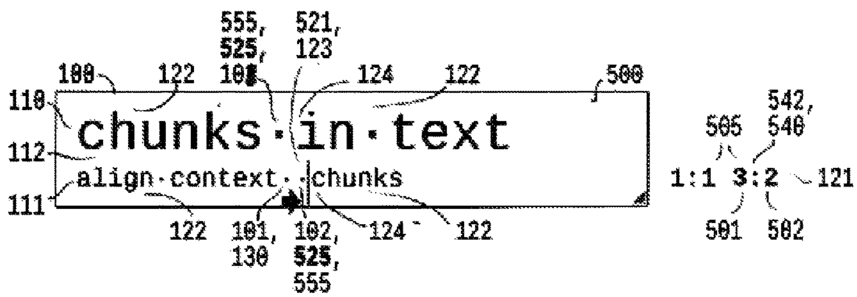
FIG. 5R shows incidental alignment differentiated via single bump control.
Figure 5S:
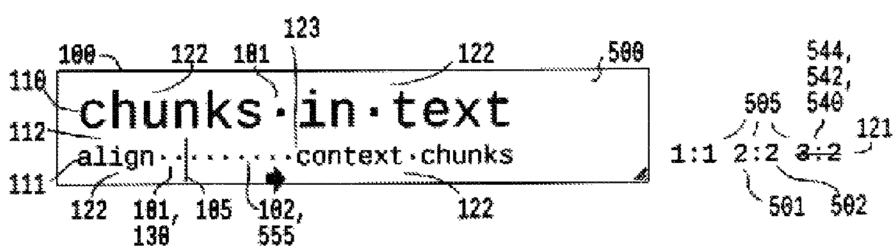
FIG. 5S example shows make and merge controls combined; a chunk is seen made and merged into the next pair.
Figure 5T:
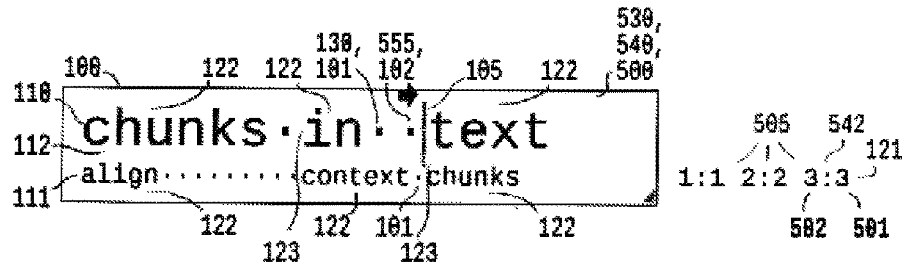
FIG. 5T example shows input in either text or context line applied in ABC system; make control is shown as example.
Figure 5U:
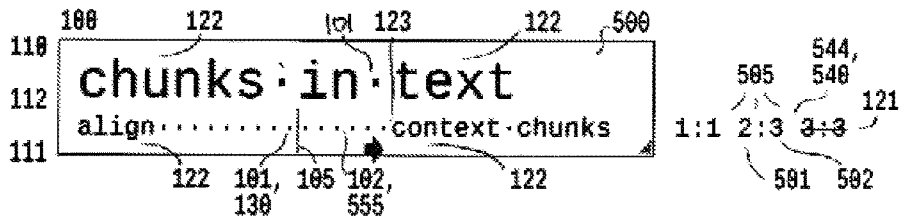
FIG. 5U example shows push and merge controls applied to ¬ ¬ ¬ ¬ merge a chunk into the next pair.
Figure 5V:
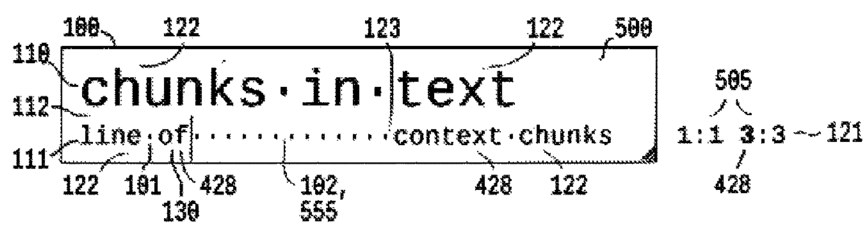
FIG. 5V example shows word array applied while adding a word within a chunk in ABC system.
Figure 5W:
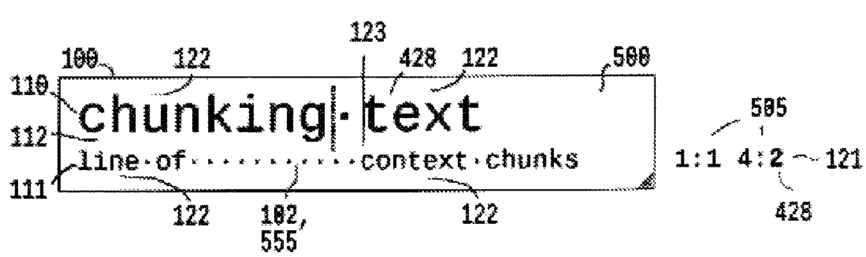
FIG. 5W example shows word array applied while removing a word within a chunk.
Figure 5X:
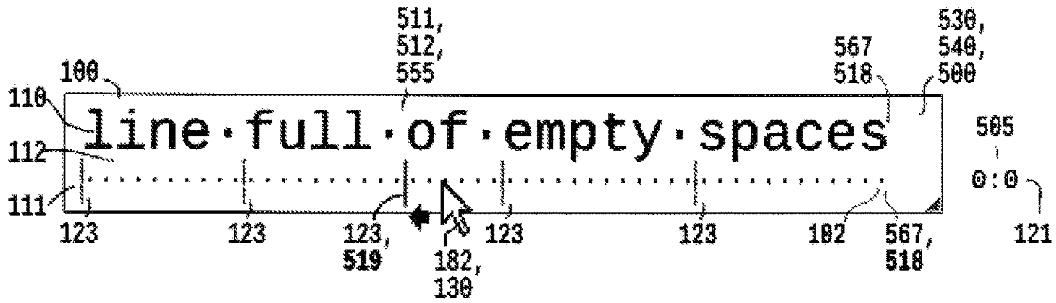
FIG. 5X example shows a space-fill control to fill context with spaces, and an align caret control to align caret with any text word.
Figure 5Y:
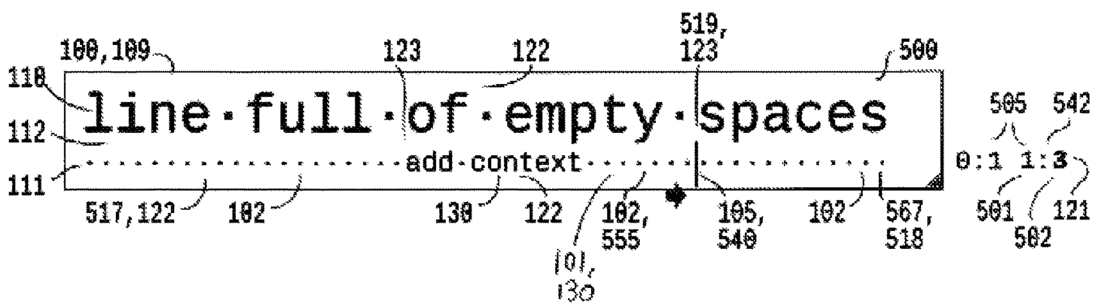
FIG. 5Y example shows selective context contents aligning with text within space-filled context line.
Figure 5Z:
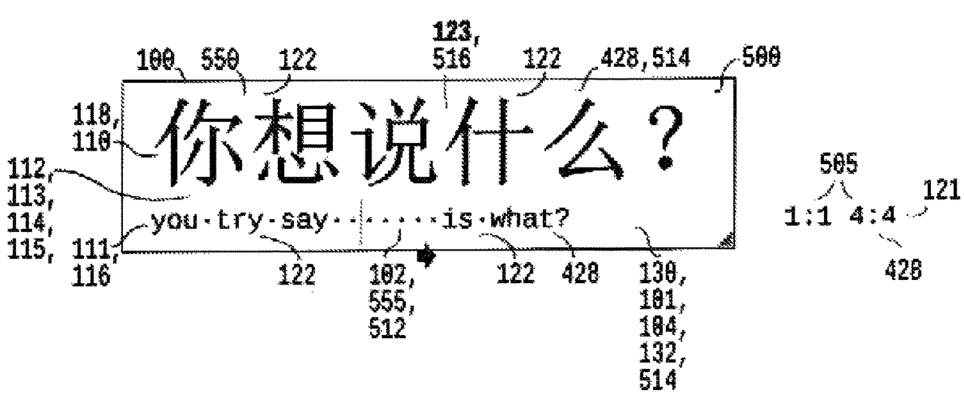
FIG. 5Z example shows ABC system applied in non-space delineated writing systems.

Words 128 are seen in word delineation 125 made by space 101 and spaces 102 between words; other controls of word delineation 125 are described in conjunction with FIG. 4C and FIG. 5Z.

Chunks 122 are seen within text 110 and context 111: a chunk 122 is understood to contain either one word or more than one words; a chunk 122 example seen in text 110 contents include "align me"; a chunk 122 example seen in context 111 contents as "alinearme".

Chunk delineation 124 seen between chunks 122 is shown in text 110 and context 111: chunk delineation 124 made in context 111 by multiple spaces 102 before second chunk 122 "between the lines" is applied to define chunk delineation 124 seen in text 110 before second chunk 122 "in text"; said text 110 chunk 122 "in text" is seen preceded by one space 101 while chunks delineation 124 is also seen, as described in detail in conjunction with FIG. 5C-FIG. 5F.

Alignment 123 between chunks 122 in text 110 and context 111 is seen: second text 110 chunk 122 "word" and second context 111 chunk 122 "palabra" are seen in alignment 123; spaces 102 seen added before second context 111 chunk 122 "palabra" optionally control alignment 123 seen; within example, alignment 123 is shown controlled flush left, at horizontal start positions found in both text 110 and context 111 chunks 122; alignment 123 is understood also to be optionally controlled in centered and flush right arrangements.

Chunk Array 121 is seen applied: chunks 122 in chunk delineation 124 and alignment 123 seen controlled by chunk array 121; chunk array 121 is optionally applied by numeric index, as described in conjunction with FIG. 5A-FIG. 5Z.

Bitext 112 is shown with content and styles controls: Unicode 113 shown is optionally rendered in proportional font 114 seen and/or monospace font 115 seen; horizontal scale 117 control is seen applied; styles 114, 115, 117 are preferably applied separately in text 110 and/or context 111.

Strong style 118 is seen with text 110: strong style 118 controls such as large-sized font, high-contrast color, horizontal scale and such are seen applied with text 110 to enhance visibility from more viewing angles and illumination levels, as seen in FIG. 11A-FIG. 11H.

Weak style 116 is seen with context 111: weak style 116 controls such as small sized font, low-contrast color, horizontal scale and such are seen applied in context 111 to reduce visibility to fewer viewing angles and illumination levels, as described in conjunction with FIG. 11A-FIG. 11H.

WYSIWYG 109 control is seen in textarea 100: "What You See Is What You Get" or WYSIWYG 109 edit control shown; bitext 112 contents optionally seen in proportional 114 or monospace 115 font face; text 110 optionally seen in strong style 118; context 111 optionally seen in weak style 116; Unicode 113 seen applied; in all cases, WYSIWYG 109 direct edit control within textarea 100 is shown controlled.

Textarea 100 is optionally applied in HTML or other forms: within HTMLS, contenteditable <div> is applied to enable Unicode 113 encoding of bitext 112 in styles 114, 115, 116, 118 to be applied now; until future HTML versions apply horizontal scale 117 controls, narrow font styles may be used; textarea 100 is also understood applied in other directly editable formats like Google Docs, Microsoft Word, Adobe InDesign and such.

Presentation views are understood to be optional: WYSIWYG 109 control of bitext 112 seen textarea 100 is not limiting; aligned text 112 controls shown as within textarea 100 are understood as applicable within non-directly editable presentation formats like PDF, ePub, kindle and such, as described in conjunction with FIG. 11A-FIG. 11E, and including printed matter on paper, as described in conjunction with FIG. 11F-FIG. 11H.

Context 111 contents are shown in multiple forms as described above, each independently controlled in alignment 123 with text 110 within the accompanying drawings. In one example, media player 140 is applied to reproduce audio vocalizations 188, as described above, which are transcribed into text 110 content, then synchronized in time with audio playback 242, as described and shown in conjunction with FIG. 2A, FIG. 2B and FIG. 3A-FIG. 3N.

Figure 2A:
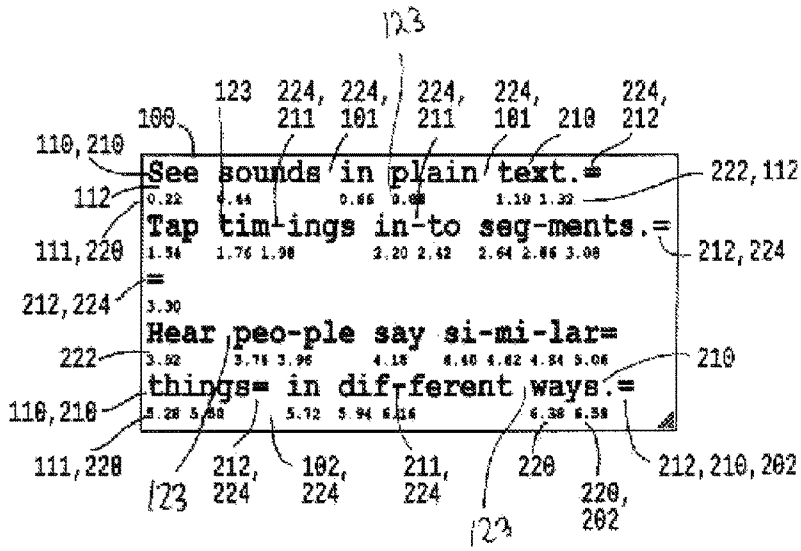
FIG. 2A shows FIG. 1B textarea with a new text applied in a timed text example.

FIG. 2*a* shows FIG. 1B textarea with a new text applied in a timed text example.

Textarea 100 contents shown include text 110 and context 111 controlled in bitext 112; same textarea 100 and contents seen in FIG. 2B and FIG. 3A-FIG. 3E.

Text 110 is seen with segments 210: segment markers 211, optionally represented as dashes "-", are shown inserted within multi-syllabic words; pause markers 212, optionally represented as equal signs "=", are shown inserted; total number of segments 210 seen is "30".

Context 111 is seen with timings 220 shown: timing 220 values such as "6.38" and "6.59" are seen to increase progressively; the total number of timings 220 seen is "30".

Figure 4D:
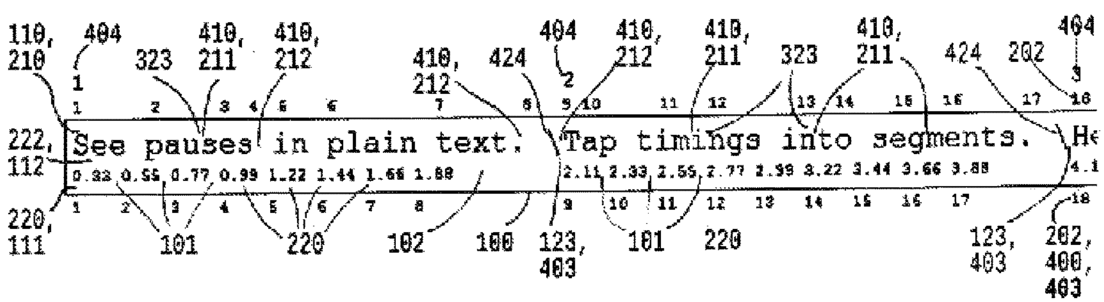
FIG. 4D shows timings aligned with lines in text; segmentations are applied while hidden from view.
Figure 4E:
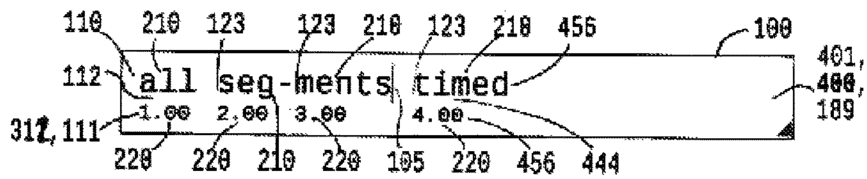
FIG. 4E shows a sample text in segments, aligned with timings, to illustrate segment-time control.
Figure 4F:
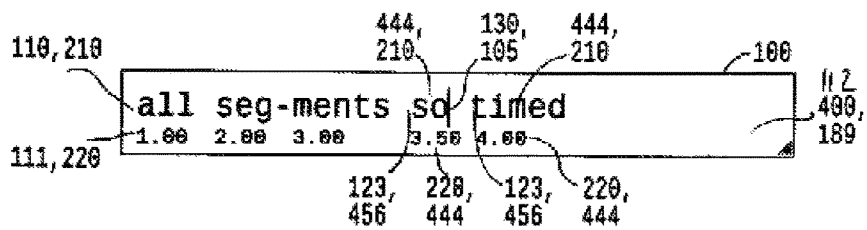
FIG. 4F shows a word added as input to FIG. 4E text; program makes a timing for the added word.
Figure 4G:
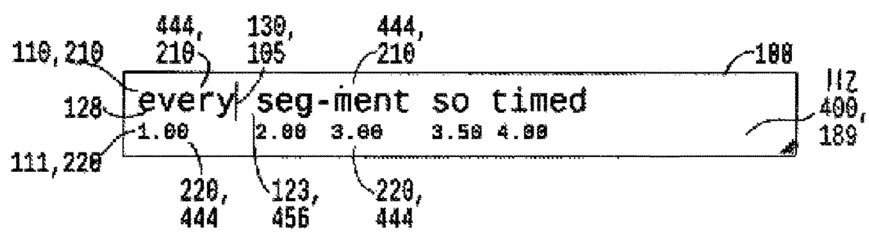
FIG. 4G shows edits applied without affecting correspondence or alignment; no segment is added or removed.
Figure 4H:
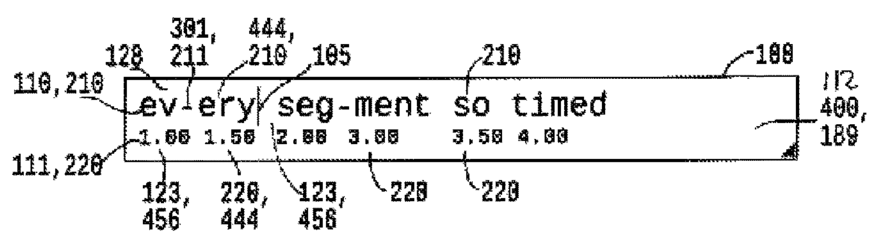
FIG. 4H shows syllabification applied to word added in FIG. 4G; program adds timing(s) as needed.
Figure 4I:
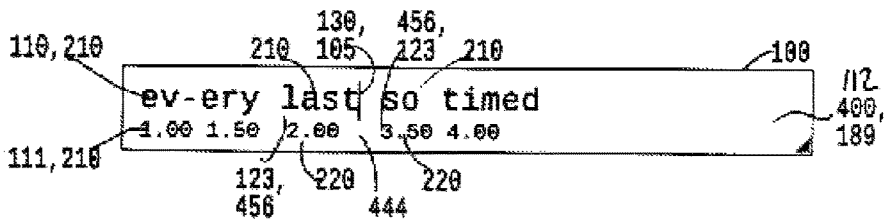
FIG. 4I shows a two segment word replaced by a one segment word; program removes corresponding timing.
Figure 4J:
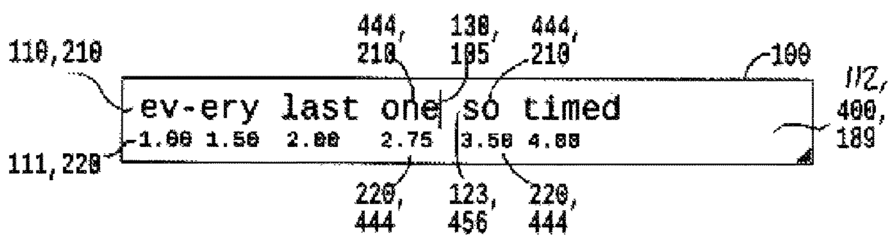
FIG. 4J shows a word added; program adds corresponding timing.
Figure 4K:
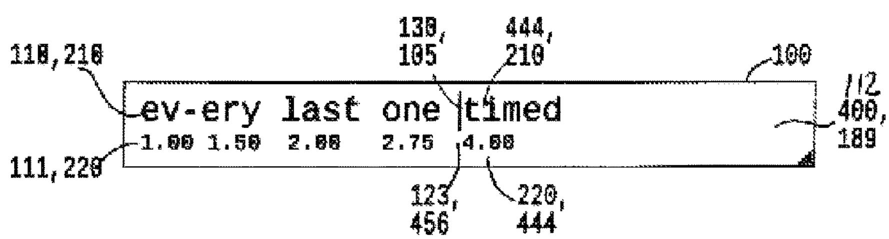
FIG. 4K show a word removed; program removes corresponding timing.
Figure 4L:
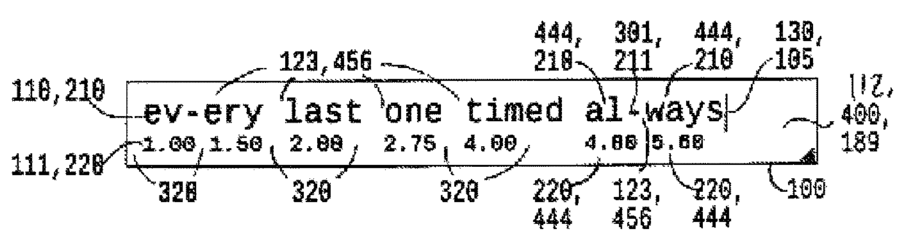
FIG. 4L shows a two segment word appended; program adds corresponding timings.
Figure 4M:
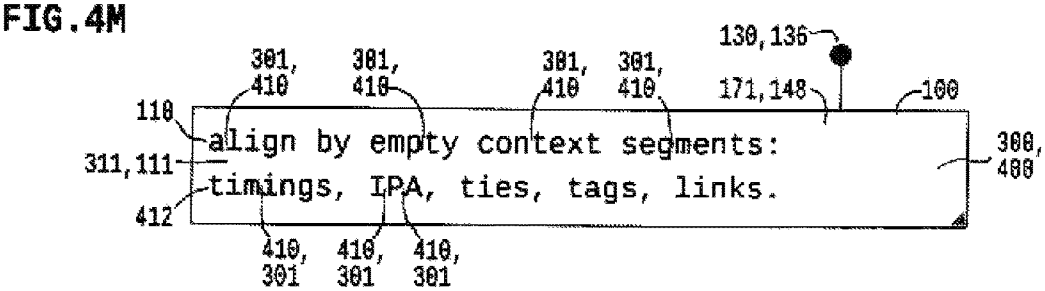
FIG. 4M shows a new text example in same textarea with context hidden.
Figure 4N:
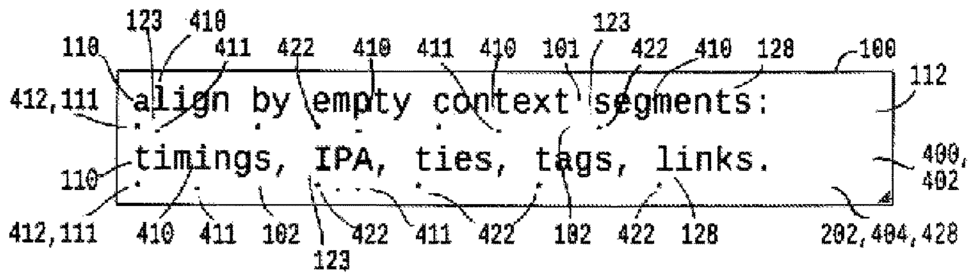
FIG. 4N shows FIG. 4M text with empty context segments.
Figure 4O:
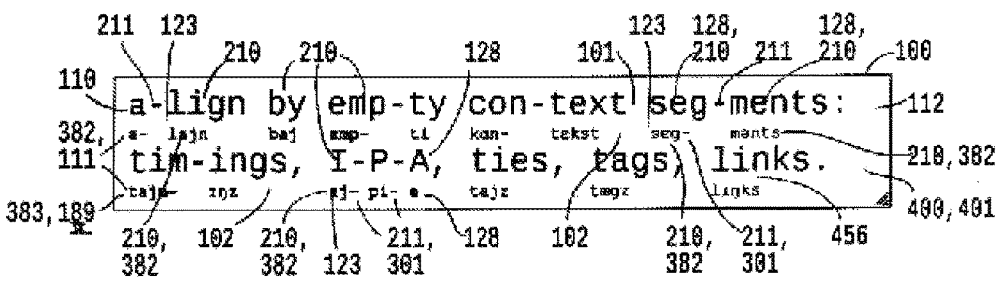
FIG. 4O shows IPA context under segment aligner control; segments are seen in text and segments are seen in context.
Figure 4P:
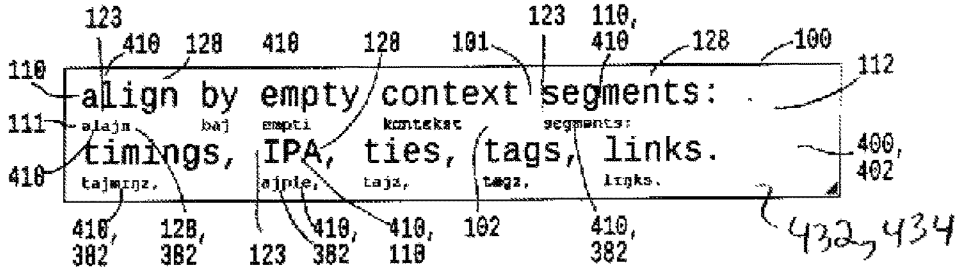
FIG. 4P shows IPA context under word aligner control; segments in text and context both hidden.

Timed text 222 within bitext 112 is seen: for each segment 210 in text 110, one timing 220 in context 111 is seen; timing 220 per segment 210 parity is shown controlled in segment array 202; various alignment 123 forms in timed text 222 are discussed in conjunction with FIG. 4A-FIG. 4P.

Figure 2B:
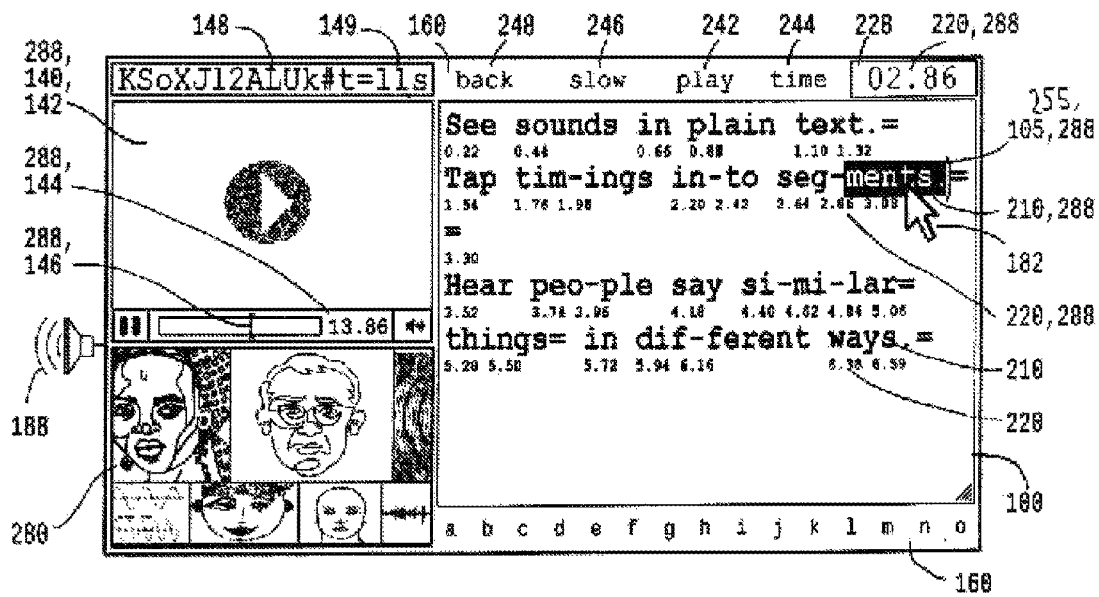
FIG. 2B shows FIG. 2A textarea contents within GUI applying multiple context alignment controls.

Timed text 222 is seen applied with media link 148 and cue 149 as described in FIG. 2B; markings with timed text 222 within the disclosure are understood optionally to apply specific cue 149 within media link 148.

Alignment 123 is shown: second segment 210 "sounds" seen in text 110 is shown in alignment 123 with second timing 220 value "0.44" seen in context 111; controls for alignment 123 are discussed in conjunction with FIG. 4A-FIG. 4P and FIG. 5A-FIG. 5Z drawings.

Segment 210 delineation 224 is seen: space 101, spaces 102, segment markers 211, pause markers 212 all seen to control segment 210 delineation 224, separately from chunk delineation 124 shown in FIG. 1B.

Segment array 202 is shown: as example, in fifth text 110 line, eight segments 210 seen are controlled in array 202; in fifth context 111 line, seven timings 220 seen are controlled in same array 202; segment array 202 is understood to control parity between all segments 210 and timings 220.

FIG. 2B shows FIG. 2A textarea contents within GUI applying multiple context alignment controls.

Same textarea 100 and contents from FIG. 2A are seen within optional GUI 160; GUI 160 controls are shown added above and below textarea 100; below media player 140, a set of additional pictures is shown contained within picture sorter 280.

Figure 3A:
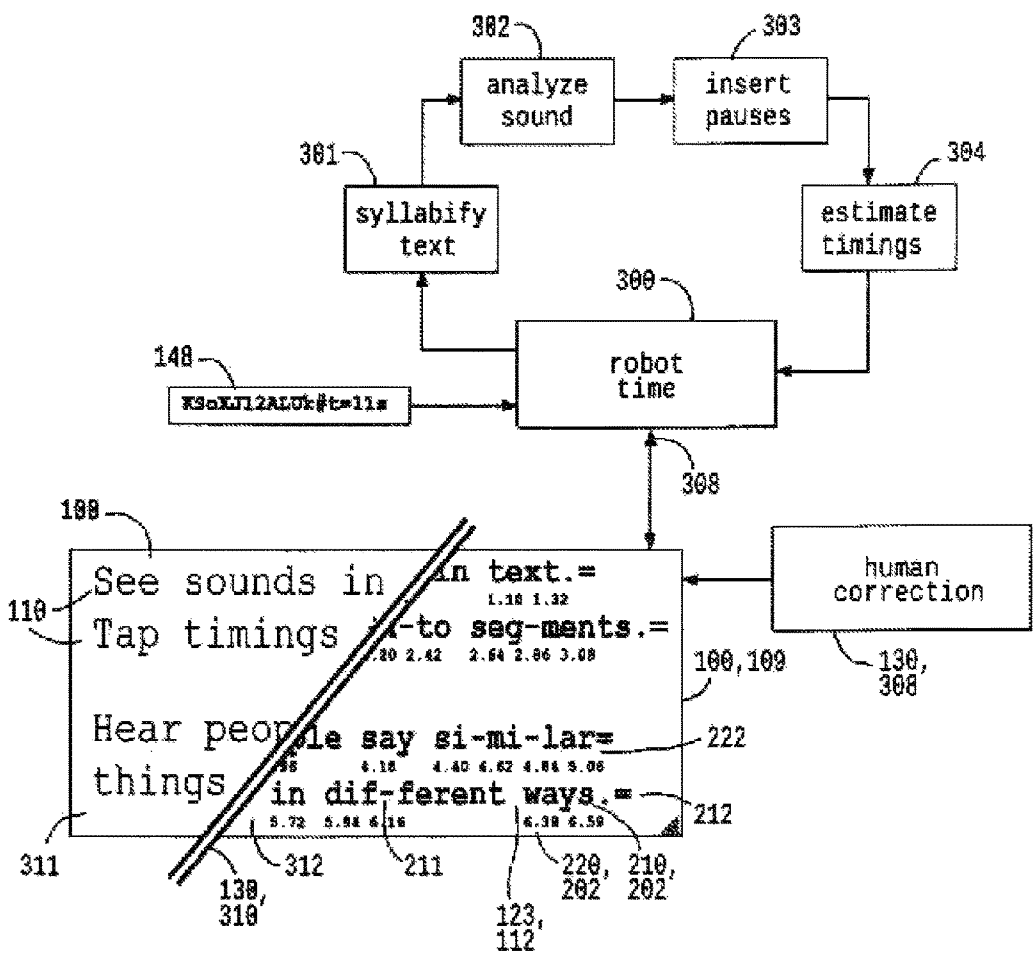
FIG. 3B represents a reversed case element moving sequentially through segments in plain text.
FIG. 3C represents the reversed case element shown in sequential copies.
FIG. 3D shows text sample after "SybCase" syllable preview applied.
FIG. 3E shows sybcase control turned off: text appears without visible segmentations in words.
FIG. 3F shows robot timed vocal text applied in example text; a timing error is experienced.
FIG. 3G shows multiple finger "tap tap" process to synchronize timings.
FIG. 3H shows a sample text before join and pause controls are seen applied in tap process.
FIG. 3I shows segment join control while tap timing.
FIG. 3J shows pause insert control while tap timing.
FIG. 3K shows vertical superimposition control while tap timing text.
FIG. 3L shows superimposition control move text near vocalizing lips.
FIG. 3M show superimposition control loop from bottom to top.
FIG. 3N shows a selected text timing adjustment control in textarea.
FIG. 3O shows average timings of multiple tapped times.
FIG. 3P show a tap timing game to play.
FIG. 3Q shows a tap playback control applied with media link playback.
FIG. 3R shows a tap playback control applied with Text-To-Speech and robotic avatar.
FIG. 3S shows phonetic transcription switch back and forth in vocal text playback.
FIG. 3T shows conversion from timed text format to other captions formats.
Figure 3B:
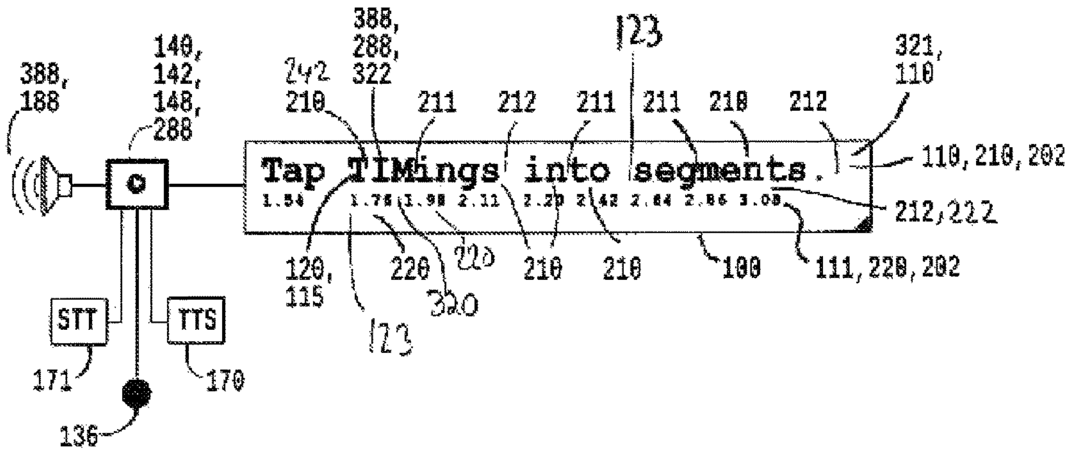
Figure 3C:
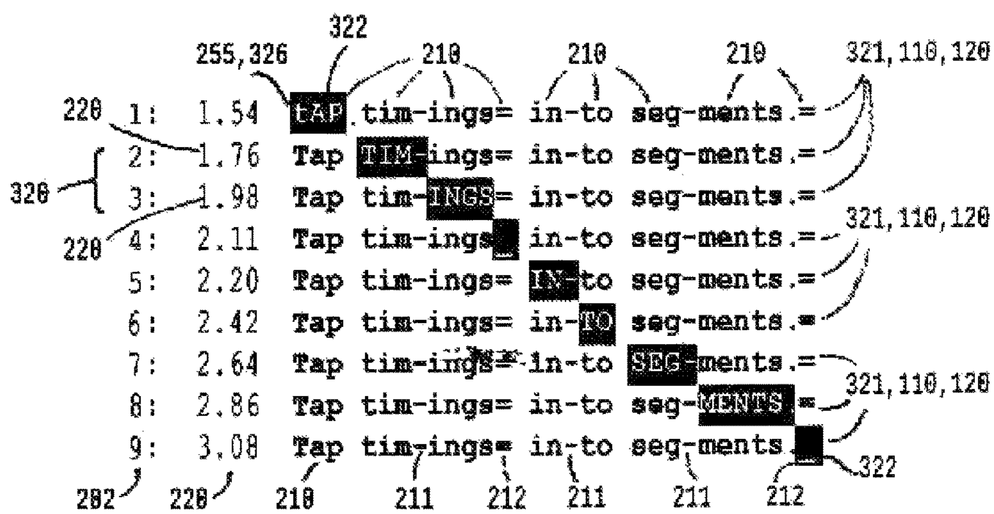
Figure 3D:
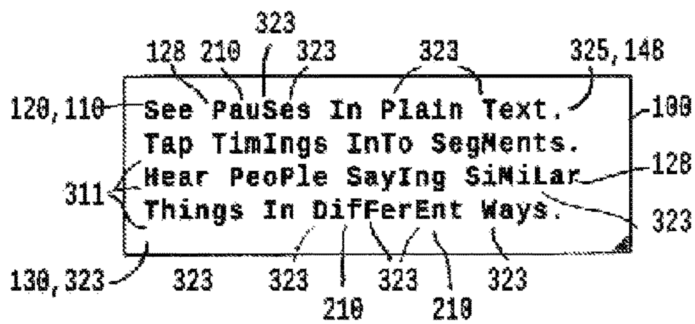
Figure 3E:
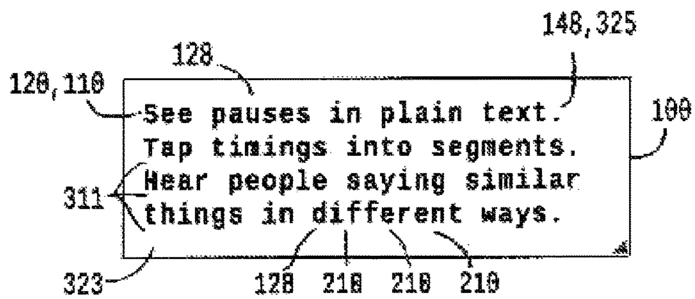
Figure 3F:
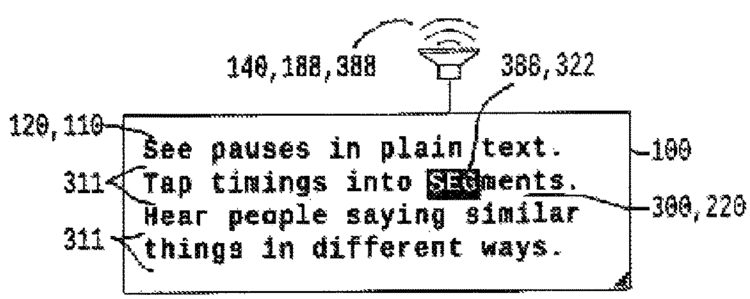
Figure 3G:
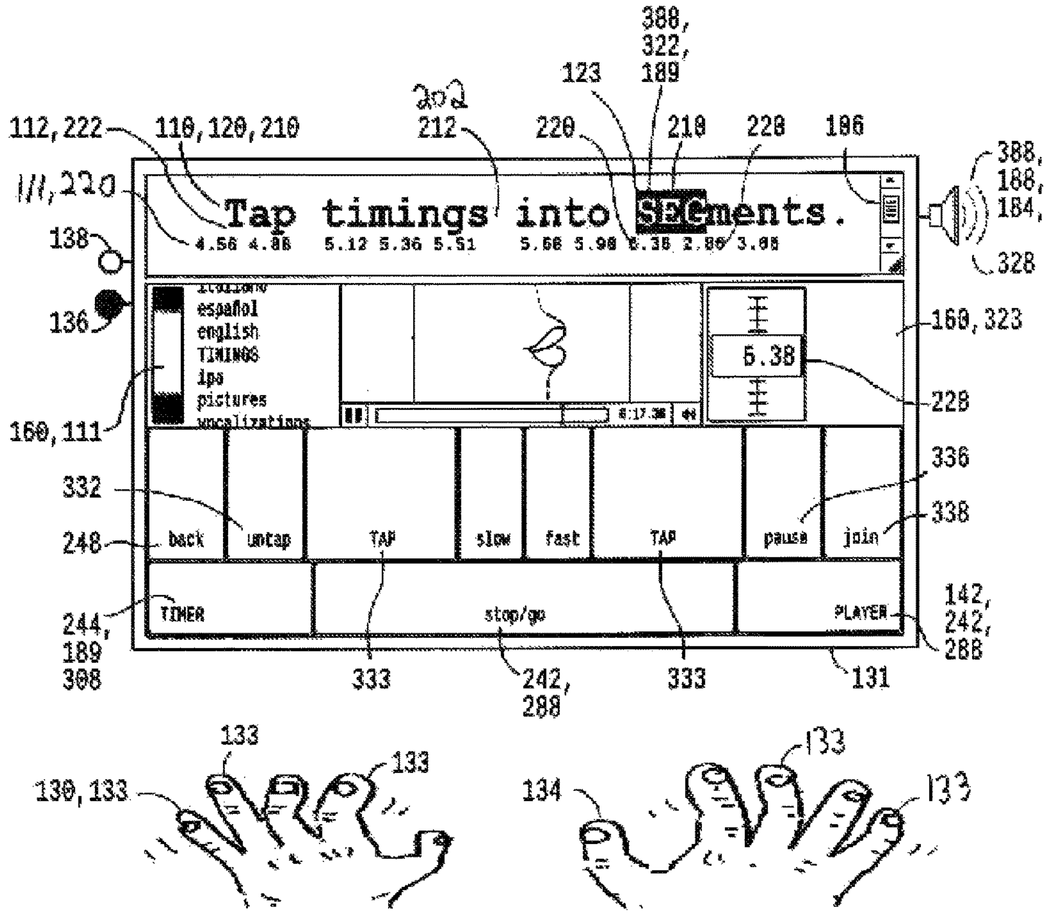

Playback 242 controls in timed text 222 are seen: above textarea 100, playback 242 pause/play switch is applied media link 148 contents; timer 244 is applied to correct timing 220 values, as described in conjunction with FIG. 3G; go back 248 accesses previous cue times 144 within media link 148; playback speed 246 control regulates playback speed rates, while adjusting audio pitch.

Figure 3H:
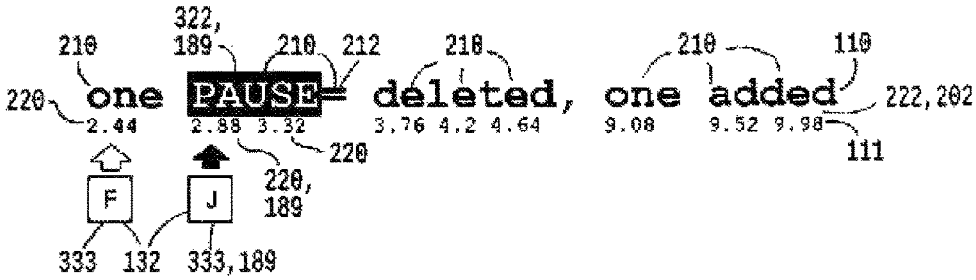
Figure 3I:
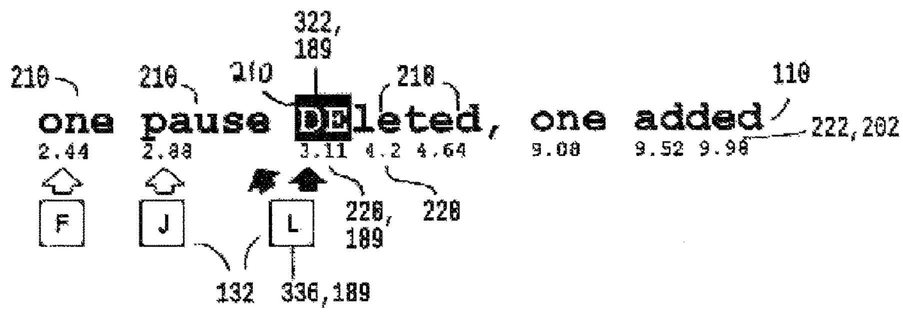
Figure 3J:
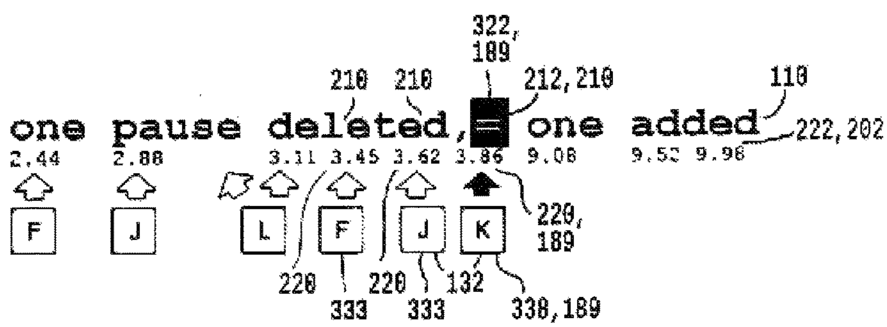
Figure 3K:
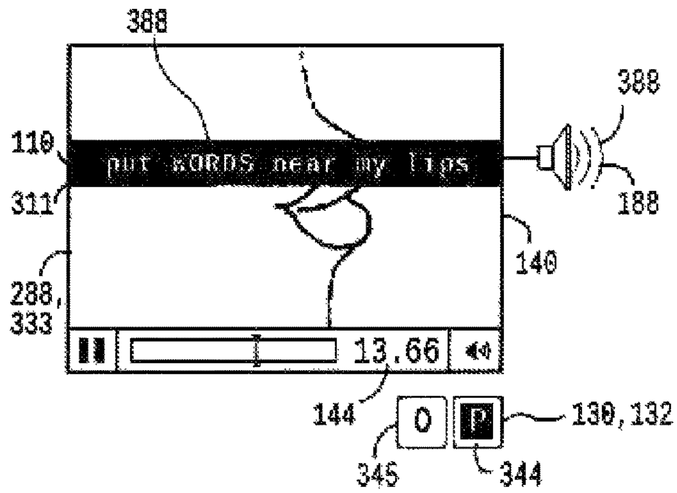
Figure 3L:
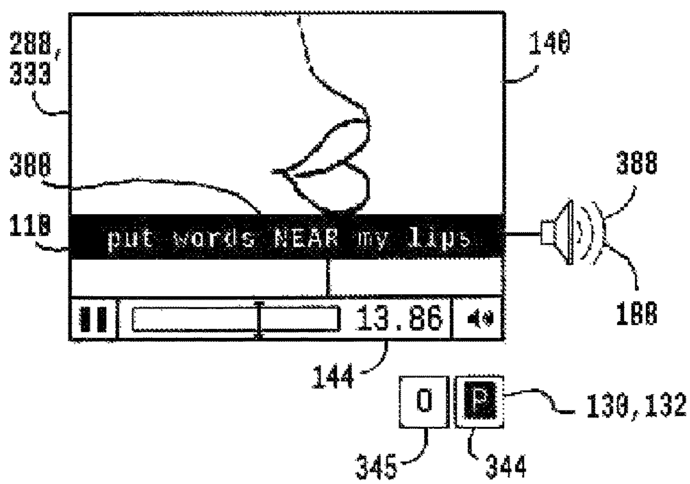
Figure 3M:
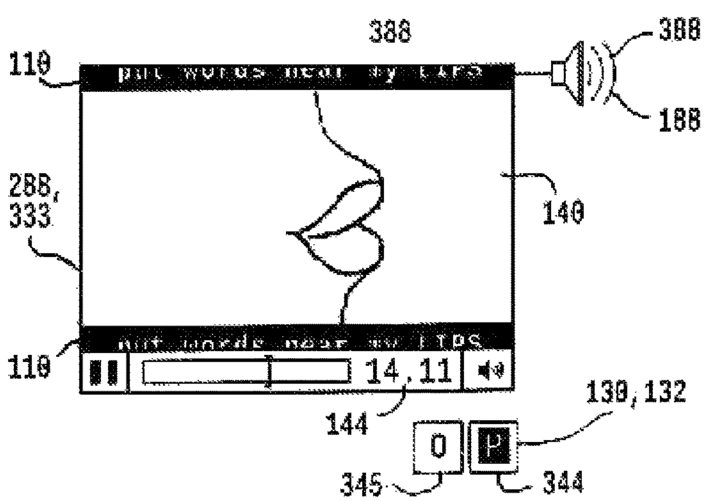

Big time 228 edit controls timing 220 value per segment 210: timing 220 values are seen in large scale and easily adjusted; timing 220 values are also adjust by applying input 130 to selected text 110, as described in conjunction with FIG. 3M; multiple means are provided to produce precise timings 220 per segment 210.

Synchronous players 288 are seen repeatedly in example timing 220 value "2.86" seconds: synchronous players 288 in big time 228 edit; synchronous players 288 in thirteenth timing 220 corresponding with thirteenth segment 210 "ments."; synchronous players 288 where pointer 182 inserts caret 105 in thirteenth segment 210 "ments."; synchronous players 288, when compared to FIG. 1, where scroll cue 146 in FIG. 2 is seen repositioned; synchronous players 288 within media player 140 cue position 144. Composite text player 242 and media player 140 are seen synchronized in synchronous players 288.

Synchronous players 288 are understood; if caret 105 is moved to twenty-ninth segment 210 in text 110 "way" (or twenty-ninth timing 220 value "6.38" seconds), then cue 144 in media player 140 is moved synchronously to "17.38" seconds (where media link cue 149 value "11" seconds is factored, as described below); caret 105 position including selection 255 shown within timed text 222 is applied as cue position 144 in within media link 148 in media player 140.

Media link cue 149 timings 220 are seen controlled; synchronized timing 220 value "2.86" is shown added to media link cue 149 value "11" seconds, as seen in resulting value of "13.86" shown in cue position 144 within media player 140.

Timed text 222 excerpts synchronize precisely with cue positions 144 within media links 148; thus, separate media links 148 containing expression of a same or similar meaning text 110 string can be compared and sorted, as described in conjunction with FIG. 8C-FIG. 8F, and imitated as described in conjunction with FIG. 12A-FIG. 12P.

Figure 3N:
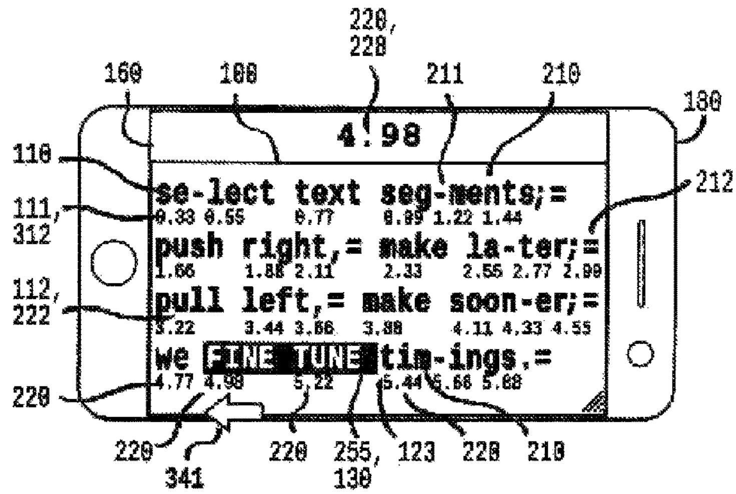
Figure 3N:
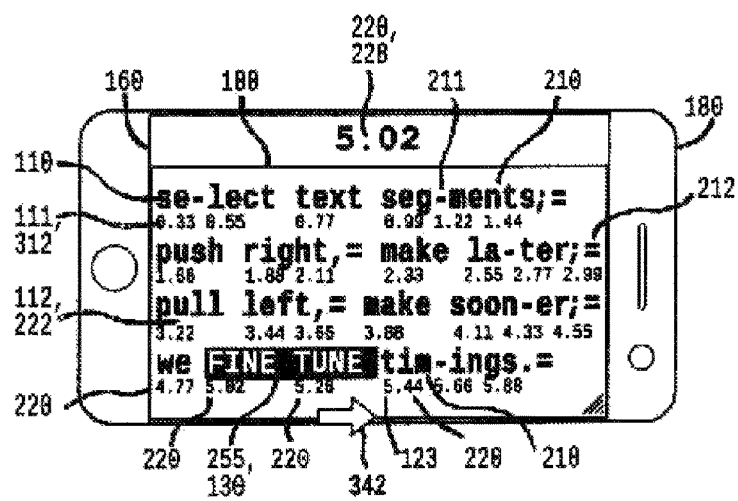
Figure 3O:
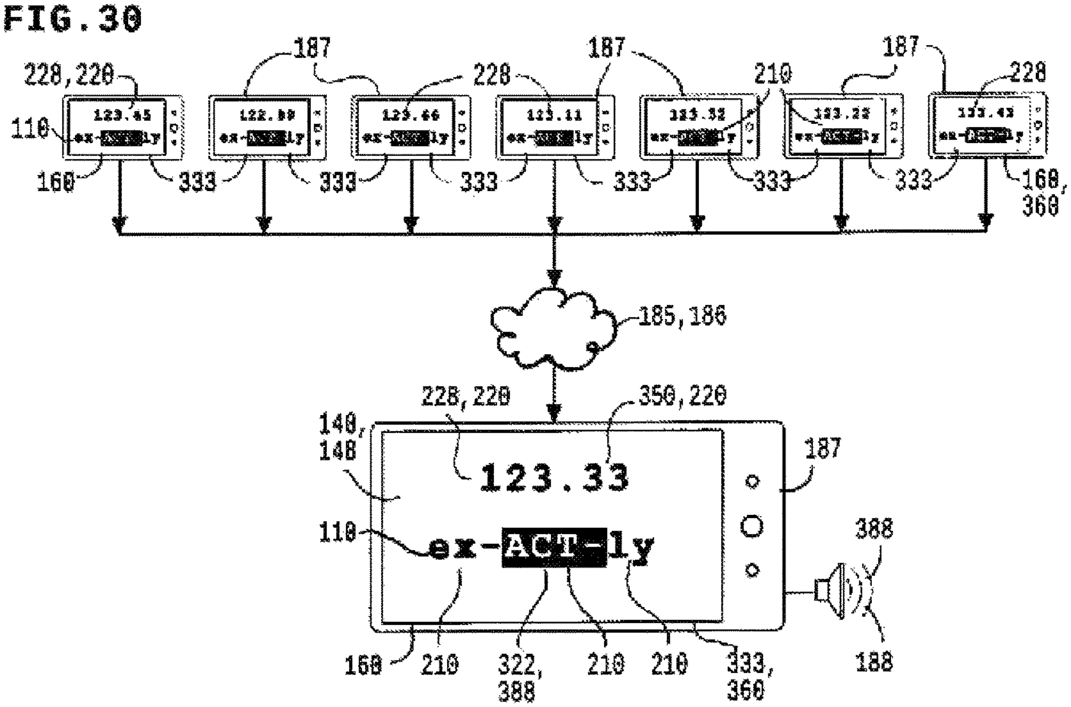
Figure 3P:
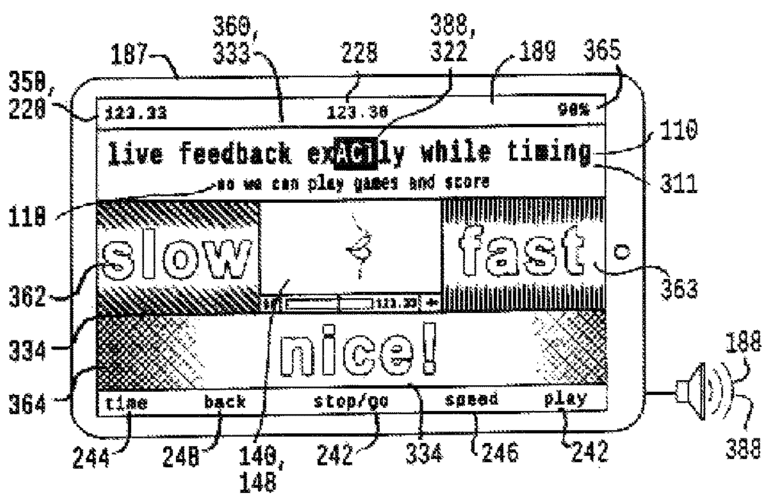
Figure 3Q:
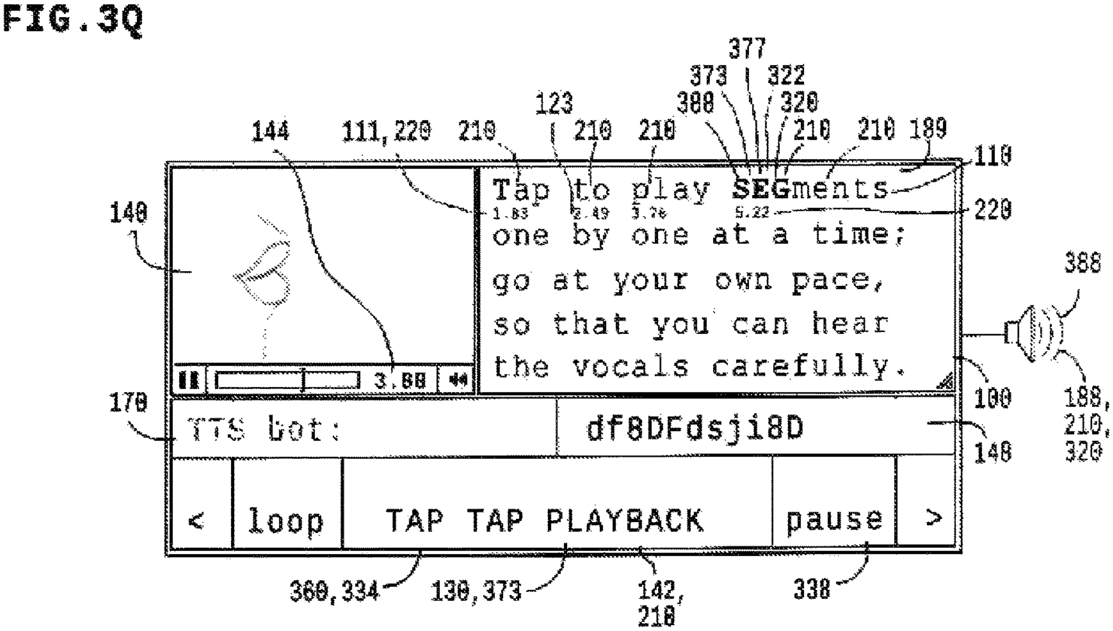
Figure 3R:
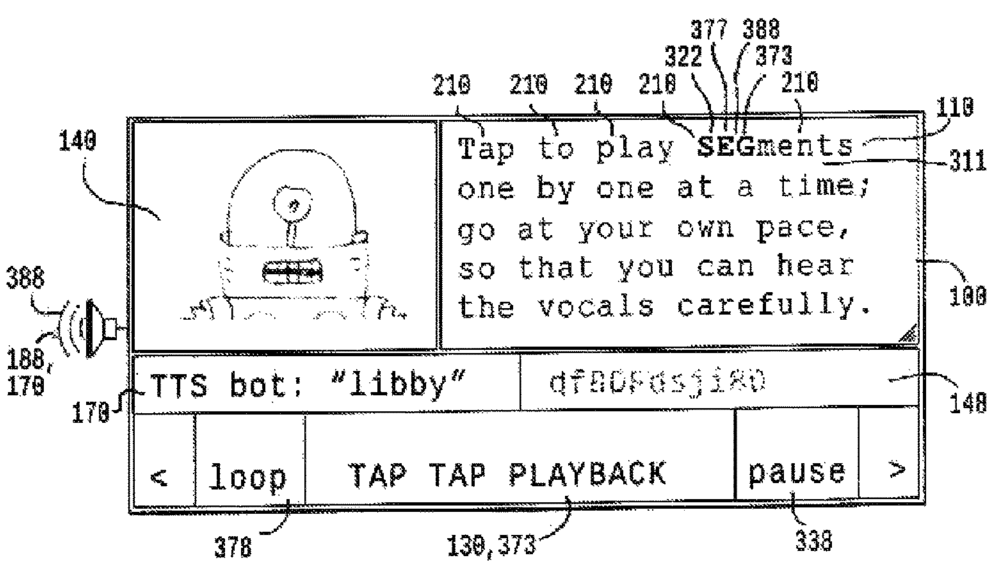
Figure 3S:
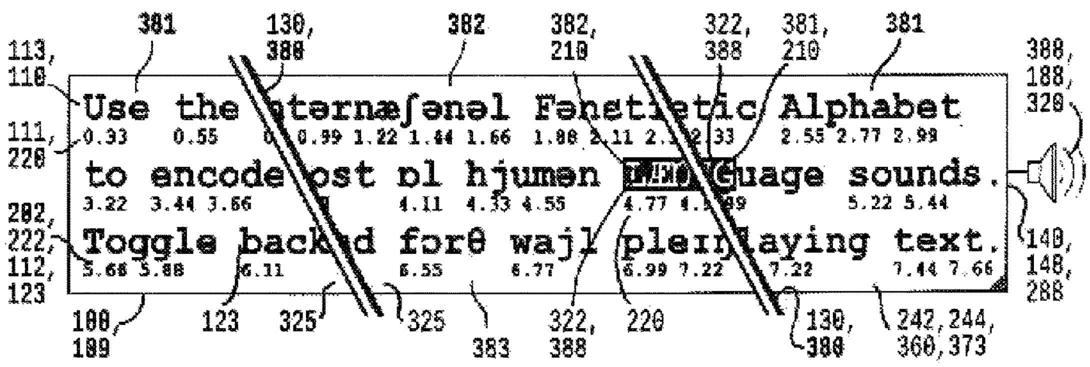
Figure 3T:
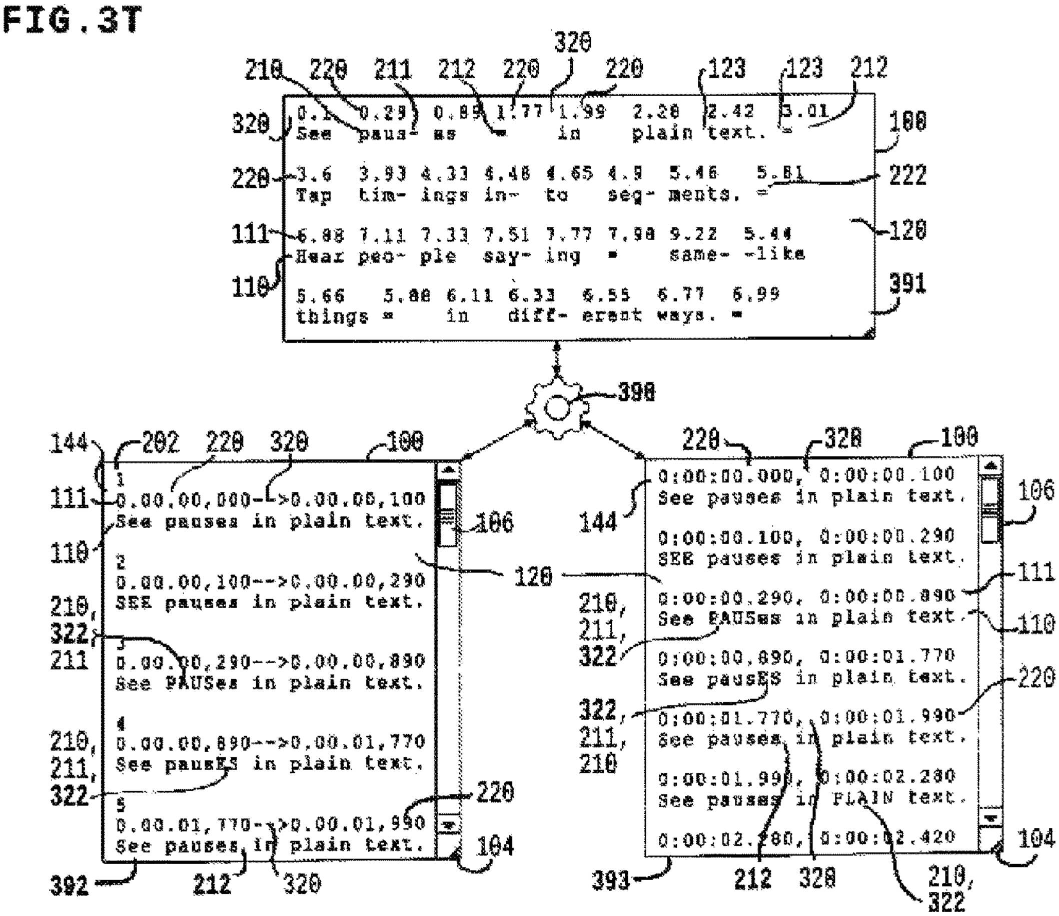
Figure 6A:
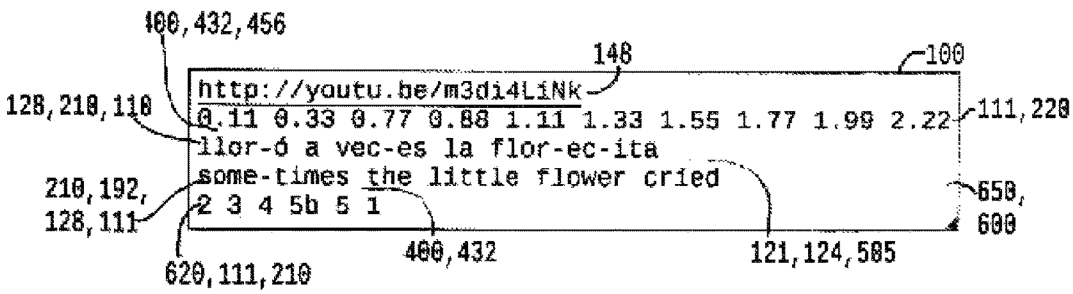
FIG. 6A shows source needed to synchronize parts in context with parts in timed text.
Figure 6R:
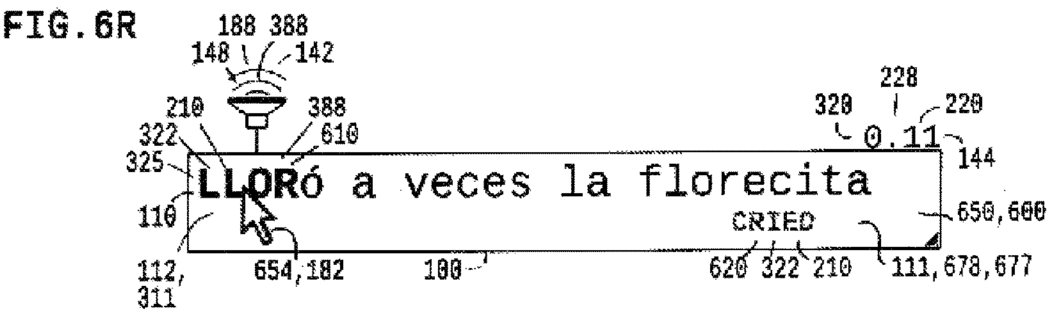
Figure 7A:
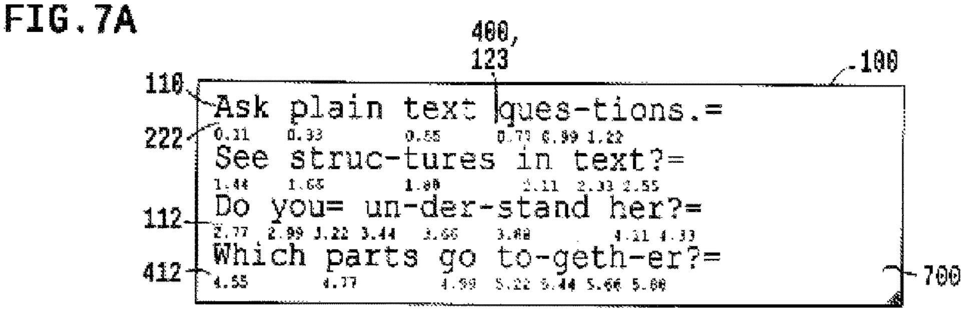
FIG. 7A shows a timed text as example for switching to tag context.

Below textarea 100, GUI 160 links are seen optionally arranged to access various controls disclosed; controls optionally include, but not limited to those described in conjunction with FIG. 3A, to switch context on/off, optionally while mechanically segmenting and timing text 110 in association with media link 148 contents; FIG. 3D-FIG. 3F, to preview segmentation within normally appearing text; FIG. 3G-FIG. 3J, to tap timings in sync with media player 140 playback; FIG. 3K-FIG. 3M, to control superimposition placement of text 110 over media player 140; FIG. 3N, to fine tune timing; FIG. 3O, to compare an instance of timings 220 with average timings 220; FIG. 3P, to test tap timing skills within a game, and score; FIG. 3Q, to apply tap playback process to alter pace of previously synchronized segments; FIG. 3R, to apply tap playback to control TTS playback speed, pausing, and voices; FIG. 3S, to switch text rendition in IPA on/off; FIG. 3T, to convert of timed text 222 to other encoding methods; FIG. 4A-FIG. 4D, to control segment 210 parameters and forms of alignment 123 in segments; FIG. 4E-FIG. 4L, to control correspondence between timings and text; FIG. 4M-FIG. 4P, to control alignment in other segment forms; FIG. 5A-FIG. 5Z, to control alignment 123 of chunks 122 while editing; FIG. 6A-FIG. 6R, to tie together separate parts between text 110 and context 111 within paired chunks 122; FIG. 7A-FIG. 7P, to tag text 110; FIG. 8C-FIG. 8G, to sort preferred vocalizations 188 of meaningful texts 110 within picture sorter 280, FIG. 8H-FIG. 8J, to visually reference words, chunks 122 and lines of text 110 via sortable picture sets; FIG. 9A-FIG. 9Y, to toggle between versions, languages and forms of independently aligned context 111; FIG. 10A-FIG. 10C to control spaces 102 in text 110 while toggling contexts 111; FIG. 11A-FIG. 11H, to control visibility in aligned context 111; and FIG. 12A-FIG. 12Q, to combine faces, languages and identities while experiencing and sharing vocalizations 188 in text 110.

"Switch" control is understood within the disclosure as "on/off" switch; examples of "switch" are seen in FIG. 3A and FIG. 3S; in "switch", repeated input 130 via preconfigured method switches back and forth between two states.

"Toggle" controls is understood within the disclosure as sequential view of multiple states; examples of "toggle" controls are seen in FIG. 9A-FIG. 9Y, and also FIG. 11L-FIG. 11Q; in "toggle", repeated input 130 via preconfigured method sequentially loops through multiple states.

FIG. 3A shows a context on/off switch, optionally seen applied with a human-machine interface to generate mechanical timed text.

Two states in Text 110 are represented within same textarea 100 shown: on left, only text 110 contents are seen; on right, same text 110 contents are seen with context 111 contents in alignment 123; graphic slash seen between the states represents on/off switch 310 for context 111.

Context switch 310 is seen controlled: input 130 is applied via show context control 312 or hide context control 311; zoom control is optionally applied with context switch 310, as described in conjunction with FIG. 11L-FIG. 11Q.

Hide context control 311 shows text 110 contents only: to left, no other information is seen; only text 110 contents within textarea 100.

Show context control 312 shows context 111 included with text 110: to right, lines of context 111 are seen in alignment 123 between lines of text 110.

Context 111 seen within example is formed of timings 220 as described in conjunction with FIG. 9A-FIG. 9Z various forms, languages and versions of context are accessed; in FIG. 3A example, timings 220 are seen in context 111; complete contents of same text 110 and context 111 are seen in FIG. 2A.

Robot time 300 shown is optionally applied with context on/off switch 310: if text 110 transcription of media link 148 has not been previously timed and validated by human, as described in conjunction with FIG. 3G, then mechanical estimates 304 of timings 220 are seen made.

Robot time 300 processes optionally include following: speech-to-text or SST 171, as described in conjunction with FIG. 1A to generate text 110, syllabification 301 to insert segment markers 211 in text, sound analysis 302 to estimate pauses 303 (insert pause markers 212) and estimate timing values 304 for each timing 220 seen.

Human corrections 308 are seen applied; errors in text 110 transcription, segments 210, timings 220 are understood as corrected by humans; WYSIWYG 109 edit control seen in textarea 100 is applied to correct text 110; tap timing 333 process, as described in conjunction with FIG. 3G is applied to correct timings 220; human corrections seen as valid data 308 are shown sent to robot time 300.

Valid data 308 is seen sent to robot time 300: human input 130 correction of errors may be applied as needed in any speech-to-text 171 system, syllabification 301 system, sound analysis 302 system, pause insertion 303 system and timings estimation 304 system; all systems require validated data 308 to improve future results.

Alignment 123 within bitext 122 format is seen: as example, segment 210 "ways" and timing 220 value "6.38" seconds are seen in alignment 123; controls of segment 210 alignment 123 under segment array 202 shown are described in conjunction with FIG. 4A-FIG. 4D.

Context on/off switch 310 is applied to valid data 308; robot time 300 results are optionally viewed as a separate version, as described in conjunction with FIG. 9F-FIG. 9R; context 111 contents applied under on/off switch 310 are understood as the human-corrected version of "valid data" 308.

Timed text 222 seen is applied in vocalized text 388, as described in conjunction with FIG. 3B, FIG. 3C and subsequent figures throughout the disclosure.

"Human computation" machine learning systems are known; however, no previously known bitext alignment format efficiently gathers human input of valid data 308; timing 220 data seen is edited directly, and viewed in synchronous players 288 as shown in FIG. 2B.

FIG. 3B represents a reversed case element moving sequentially through segments in plain text.

Textarea 100 shows second bitext 112 line from FIG. 2A, same timed text 222 seen, (one hidden pause marker 212 shown understood added after third segment 210 "ings"); same alignment 123 shown applied.

Text 110 contents are seen as "tap TIMings into segments"; segment and pause markers 211,212 seen applied while are hidden, as described in conjunction with FIG. 3C and FIG. 4D; segments 210 shown in text 110 are understood as total "9" segments 210.

Context 111 seen as timings 220 with values "1.54 1.76 1.98 2.11 2.20 2.42 2.64 2.86 3.08", understood as total "9" timings 220.

Segment array 202 seen is applied; each sequential segment 210 in text 110 is understood in association with a sequential timing 220.

Time spans 320 seen are understood applied between timings 220; as described in conjunction with FIG. 3C below, time spans 320 are applied in sequential copies 321 to define "ON" and "OFF" timings 220 for application of reversed case 322 element Sequential copies 321 shown are understood; as described in conjunction with FIG. 3C below, sequential copies 321 of same text 110 apply reversed case 322 element advancing sequentially through segments 210 in text 110;

Reversed case 322 is shown; second segment 210 "TIM" understood to appear in reversed case 322 for time span 320 of "0.22" seconds, as described in conjunction with FIG. 3C below.

Reversed case 322 is understood; single segments 210 of text 110 appear in reversed case 322 for specified time spans 320 uppercase letters seen temporarily in segments 210 where lowercase letters are expected to appear; conversely, reversed case 322 control optionally switches uppercase to lowercase while applied; in playback 242 of text 110, each segment 210 is separately seen transformed in height, form and shape.

Synchronous players 288 are seen; media link 148 and media player 140 are applied synchronously in playback 142 of media link 148 concurrently with playback 242 in text 110; text 110 appears synchronously animated with vocalization 188.

Paused synchronous players 288 enables direct edits in bitext 112 contents; text 110 transcription of vocalization 188 in media link 148 is edited under WYSIWYG control 109, as described in conjunction with FIG. 1A; transcription is also controlled in International Phonetic Alphabet form, as described in conjunction with FIG. 3S.

Plain text 120 shown is applicable: monospace font 115 shown preferably applied; proportional font 114 as described in conjunction with FIG. 1A optionally applied; styles such as colorization, highlighting optionally applied; sequential copies 321 of reversed case 322 animate plain text 120.

Vocalization 188 shown is applied in audio system 184 (not seen); vocalization 188 understood as optionally recorded via microphone 136, generated via Speech-To-Text SST 171 or Text-To-Speech (TTS) 170, reproduced from media link 148 in media player 140 all shown; synchronous players 288 applied with vocalization 188 are seen as vocalized text 388.

Vocalized text 388 is shown; vocalization 188 is performed in synchronous players 288 reversed case 322 playback transforms height, shape, form of segments 210 within text 110, including plaintext 120 time spans 320 between segments 210 are controlled to synchronize vocals 188 and text 110 precisely Vocalized text 388 is applied; "vocal text" 388 is referenced throughout the disclosure; for example, vocalized text 388 is often seen applied while context 111 forms other than timing 220 are seen; it's understood that "vocal text" 388 refers to combined controls as described in conjunction with FIG. 3B and FIG. 3C.

Vocalized text 388 is not limited to textarea 100; final presentations in non-directly editable forms are understood to be applied; for example such as books-on-tape or video distribution systems, including DVD products and video sharing websites, such as Youtube.com.

No previously known method synchronizes plain text with vocalization by applying reversed case to transform height, shape and form in plain text segments while vocalization is heard.

FIG. 3C represents the reversed case element shown in sequential copies.

Nine sequential copies 321 are seen of same text 110; contents of each copy understood as "Tap tim-ings=in-to seg-ments.=”; segment markers 211 and pause markers 212 seen are visible within each copy, and optionally applied while hidden from direct views, as shown in FIG. 3B.

Sequential copies 321 appear in FIG. 3B textarea 100; for example, second sequential copy 321 is shown in FIG. 3B with time span 320 of “0.22” seconds, as described below each copy understood to appear sequentially, one-at-a-time as text 110 in textarea 100 shown in FIG. 3B.

Segment array 202 is shown; numbers left of timings 220 represent segment array 202 of corresponding segments 210 and timings 220; segment array 202 applied in alignment 123 shown; segment array 202 applied to find next timings 220 to thereby define time spans 320.

Timings 220 are seen; values such as “1.54” seconds seen left of each sequential copy 321 are understood as “ON” timings 220; “ON” timings 220 define time to turn reversed case 322 “ON”; in second sequential copy 321, for example, timing 220 value “1.74” is applied as “ON” timing 220; in next and third sequential copy 321, timing 220 value “1.98” is applied as “ON” timings 220.

Time spans 320 shown are understood in example; third sequential copy 321 “ON” timing 220 value “1.98” is applied as “OFF” timing 220 for second sequential copy 321; it’s understood that “OFF” timings 220 are found in next “ON” timing 220; time span 320 values are calculated by subtraction of “ON” timing 220 value from “OFF” timing 220; in the example, “ON” timing 220 value “1.76” seconds subtracted from “OFF” timing 220 value “1.98” results in time span 320 value of “0.22” seconds.

Reversed case 322 is seen; first segment 210 appears as “tAP” while reversed case 322 is “ON” (first sequential copy 321); first segment 210 appears as “Tap” while reversed case 322 is “OFF” (remaining sequential copies 321); uppercased “T” with “Tap” is understood as optionally lowercased while reversed case 322 applied.

Selection 255 shown is optionally applied: selection 255 understood as selected part of editable text 110 while in playback 242; highlight 326 shown, understood tint change behind text 110 segment, optionally applied; selection 255 or highlight 326 optionally not visible while pause marker 212 is hidden; selection 255 or highlight 326 are optionally not applied, as seen in FIG. 3B.

Reversed case 322 is shown for time spans 320 in examples: “0.22” second time span 320 specifies reversed case 322 period in second segment 210 “tim-”; “0.13” second time span 320 specifies reversed case 322 period in third segment 210 “ings”; “0.09” second time span 320 specifies reversed case 322 period in fourth segment 210 “=” (pause marker 212); “0.22” second time span 320 specifies reversed case 322 period in fifth segment 210 “in”, and so on.

Segments 210, if hidden, are experience in text 110 playback 242 within vocalized text 388; reversed case 322 is seen applied in FIG. 3B to segment 210 “TIM” within words “TIMings into”; reversed case 322 in next four sequential copies 321 are understood to appear as “timINGS into”, “timings into”, “timings INto”, “timings inTO”.

Pause markers 212, if hidden, are experienced in text 110 playback 242; within above example, first three of next four sequential copies 321 appear as “timINGS into”, “timings into”, “timings INto”; middle sequential copy 321 “timings into” understood with hidden pause marker 212 appears within the example for time span 320 of “0.09” seconds; extremely precise timings in segments 210 including pauses are shown controlled, in plain text 120 seen.

FIG. 3D shows text sample after “SybCase” syllable preview applied.

Text 110 is shown in textarea 100: hide context control 311 shown applied; text 110 contents understood same as described in conjunction with FIG. 3B, second word 128 shown understood changed from “sounds” to “pauses”.

Segment array 202 is seen applied; as described in conjunction with FIG. 4D, segments 210 seen in text 110 understood controlled in hidden source; inclusion of segment markers 211 and pause markers 212 seen in FIG. 3C example show same second text 110 line as “tap timings=in-to seg-ments”; characters “=” and “-” hidden from view, same as FIG. 3B.

Input 130 seen is applied switch shown “SybCase” 323 control “OFF” or “ON”: FIG. 3D example is understood with SybCase 323 “ON”; FIG. 3E example is understood with SybCase 323 “OFF”.

SybCase 323 (syllable case) method is seen applied; first letters of each text 110 segment are seen in uppercase; within example, text 110 contents are seen as “Tap Timings InTo SegMents”.

Alternating case 324 (not shown) is also understood as applicable; applied in same example text 110, segments 210 under alternating case 324 control would appear as “TAP timINGS inTO segMENTS” and/or “tap TIMings INto SEGments”; odd or even segments 210 understood to appear in reversed case 322 (not shown).

Alternation frequency 325 seen is optionally applied; SybCase 323 understood to switch between states shown in FIG. 3E, FIG. 3F; alternating case 324 switching between “odd” and “even” segments 210 in reversed case 322; alternation frequency 325 regulates rate of ON/OFF switching.

Media link 148 is seen optionally applied in alternation frequency 325; rhythms in audio track of media link 148 optionally modulate alternation frequency 325 rate; applied with music, for example, segments 210 in text 110 are seen in an entertaining way.

SybCase 323 and alternating case 324 provide preview of segments 210 in text 110; preview is optionally applied before tap 333 process, as described in conjunction with FIG. 3G; in plain text 120, segments 210 within WORDS are previewed without extra width added in text 110; further control of segments 210 in text 110 are described in conjunction with FIG. 4A-FIG. 4D.

FIG. 3E shows sybcase control turned off: text appears without visible segmentations in words.

Same text 110 contents in plain text 120 are seen in same textarea 100 seen in FIG. 3D: segments 210 understood applicable while hidden; multisyllabic words 128 apparently unsegmented.

SybCase 323 control seen is understood as OFF; alternation frequency 325 control shown optionally applied in alternation rate between FIG. 3D, FIG. 3E states; media link 148 shown optionally applied with alternation frequency 325; hide context 311 shown applied; vocalized text 388 (not shown) seen in FIG. 3F.

FIG. 3F shows robot timed vocal text applied in example text; a timing error is experienced.

Same text 110 contents in plain text 120 are seen in same textarea 100 under same conditions described in FIG. 3E robot time 300 shown understood applied to generate timings 220, as described in conjunction with FIG. 3A.

Vocalized text 388 is seen in text 110: reversed case 322 seen applied to text 110 segment 210 “SEG”; synchronous playback 288 (not shown) understood incorporated in vocalized text 388.

Vocalized text 388 is synchronously heard: vocalization 188 seen applied by media player 140 shown understood incorporated in vocalized text 388.

Input 130 seen is understood applied to stop performance of vocalized text 388; it's understood that incorrect timing(s) 220 (hidden) have been experienced; a method to correct timings 220 is described below in FIG. 3G.

FIG. 3G shows multiple finger "tap tap" process to synchronize timings.

Same text 110 contents from FIG. 3F is shown in same textarea 100: scroll 106 shown applied to access other lines in text 110; timing 220 error understood experienced as described in FIG. 3F; correction applied in tap 333 process shown.

Tap 333 process synchronizes vocalized text 388 seen; playback 142 in text 110 is generated directly from input 130 via multiple fingers 133, all shown; incorrect timings 220 are over-written with more accurate timings 220 seen; reversed case 322 element provides visual feedback 334 in real-time 189, all seen in tap 333 process.

Vocalization 188 is heard; audio system 184 reproduces vocalization 188 from media link 148 via media player 140, all shown; player 242 shown is applied to review synchronous playback 288 from existing timings 220; timer 244 shown is applied to make new timings 220 under multiple finger tap 333 process.

Reversed case 322 element is seen in text 110; as described in conjunction with FIG. 3B, FIG. 3C, reversed case 322 proceeds through segments 210 in text 110; existing timings 220 are reviewed in player 242 with reversed case 322 element seen; in timer 244, new timings 220 are written in real-time 189 and simultaneously applied is reversed case 322 to sequential segment 210 in text 110.

Synchronous players 288 are seen and heard: stop/go 241, speed 246, and go back 248 controls understood applied in synchronous players 288, as described in conjunction with FIG. 2B; same controls understood applied equally in timer 244 and player 242.

Stop/go 241 control shown is understood as synonymous with play/pause 241 control, (separate use for term "pause" within tap 333 process explained below).

Speed control 246 is seen; slow speeds such as 50% and 25% applied enable accurate synchronizations in tap 333 process; fast speeds such as 200% and 400% provide fast forward control.

Go back 248 control is shown; if errors in timings 220 experienced in within player 242, go back 248 is applied to control cue position 144 shown in media player 140; pause marker 212 shown and line starts understood as sequential steps backwards under go back 248 control, with segment array 202 control shown applied.

SybCase 323 control is seen in GUI 160; segments 210 seen in text 110 optionally previewed before timer 244 applied in tap 333 process.

GUI 160 shown provided dedicated areas for input 130 seen; if physical keyboard 132, as described in conjunction with FIG. 1A is applied, input 130 is arranged on dedicated keys; if touchscreen 131 shown applied, input 130 is arranged in dedicated areas.

Multiple fingers 133 apply input 130; player 242 position within GUI 160 maps to right-most "pinky" finger 133; timer 244 position within GUI 160 maps to left-most "pinky" finger 133; stop/go 241 within GUI 160 maps to thumbs 134; various configurations understood applied as per preference; multiple controls described below, and in conjunction with FIG. 3H-FIG. 3K, are quickly applied.

Audible preview 328 shown is optionally applied; copy of media link 148 audio is placed in separate track; separate track copy is simultaneously played from CUE position "one" second earlier CUE position; volume in separate track is muted to 10-20% volume; simultaneous playback under audible preview 328 provides lead time audible hints applied in tap 333 process.

Pause insertion 338 and segment join 336, as described in conjunction with FIG. 3H-FIG. 3J are shown implemented.

Tap 333 process to synchronize timings 220 is understood; multiple fingers 133 apply input 130 to tap 333 areas shown; multiple fingers 133 on separate hands are optionally applied; fast vocalization 188 heard is optionally controlled in slow speed 246; stop/go 241 and go back 248 controls under timer 244 allow extremely accurate tap 333 process revisions in real-time 189 shown.

Untap 332 control is shown applied; if a tap 333 is applied too soon, then untap 332 control is applied to delete timing 220, while applying reversed case 322 to previous segment 210, so that next segment 210 can be accurately timed; it's understood that multiple controls are applied at high speed; multiple fingers 133 and thumb 134 apply input 130 most precisely.

Timings 220 are shown re-written within timer 244 by tap 333 process; reversed case 322 shown in segment 210 "SEG", seen in alignment 123 with timing 220 with value "6.38"; FIG. 3B shows same segment 210 "seg" in alignment 123 with timing 220 value "2.64"; next timing 220 in both figures is seen with value "2.86"; next tap 333 applied understood to re-write next timing 220 to value "6.55"; all timing 220 values understood as in "seconds"; re-written timings 220 under tap 333 process understood as more synchronous with vocalization 188 in media link 148.

Tap 333 process shows timings 220 written in real-time 189; timings 220 shown are understood adjusted in accordance with link cue 149 applied in media link 148, as described in conjunction with FIG. 2B; without "11" seconds adjustment for cue 149 value, actual timings 220 values shown are understood as "15.56", "15.88", "16.12", and so on; real-time 189 timings 220 provide additional feedback 334.

Context 111 shown as timed text 222 is optionally changed; other context 111 forms, such as restatements or translations are accessed, in real-time 189, within GUI 160 control shown.

Big time 228 control is shown optionally configured for manual timing 220 value fine tuning; finger 133 pushing big time 228 up/down is understood to increase/decrease segment 210 timing 220 value in "0.01" millisecond increments; similar controls applied directly to text 110 are shown and described in conjunction with FIG. 3N; extremely precise timings 220 for segments 210, including pause markers 212, are shown controlled. Robot time 300 is seen informed by validated data 308.

Microphone 136 shown optionally provided applies tap 333 input 130, for example while imitating foreign language. Video camera 138 shown optionally provided understood applied in web-conference sharing of tap 333 process.

Plain text 120 shown is optionally applied; it's understood that plain text 120 requires no special styles or formatting; reversed case 322 element in vocalized text 388 in both timer 244 and player 242 is understood optionally controlled in plain text 120.

Multiple fingers 133 applied as shown used in tap 333 process enhances both input rate and accuracy of timing values 220; single finger 133 tap synchronization process is known in prior art, but multiple 133 finger tap 333 process, applied with separate areas for input 130 from multiple fingers 133 provides useful new utility; applied with additional controls shown in FIG. 3H-FIG. 3J, the advantages are readily apparent.

FIG. 3H shows a sample text before join and pause controls are seen applied in tap process.

Text 110 contents are seen "one pause=deleted, one added"; pause marker 212 seen after second word "pause" is visible; segment markers 211 are understood as hidden in source "one pause=de-let-ed, one add-ed", as described in conjunction with FIG. 3A-FIG. 3E.

Segment array 202 is seen applied in timed text 222 shown: segments 210 seen in text 110 understood as "9" total; timings 220 seen in context 111 shown understood as "9" total.

Tap 333 process seen is shown in real-time 189; keyboard 132 keystrokes (F) and (J) represented applied in tap 333 process; timing 220 value "2.44" seconds previously tapped for first segment 210 "one"; timing 220 value "2.88" seconds currently tapped for second segment 210 "pause".

Reversed case 322 is seen in second segment 210 "pause"; timing 220 value "2.88" seconds seen defined in real-time 189 shown.

Pause marker 212 is seen as third segment 210; timing 220 value "3.32" seconds understood to correspond with said pause marker 212.

FIG. 3I shows segment join control while tap timing.

Same timed text 222 is seen under same segment array 202 shown in FIG. 3H modified text 110 contents from FIG. 3H are seen as "one pause deleted, one added"; pause marker 212 seen in FIG. 3H is understood deleted; corresponding timing 220 is understood as simultaneously deleted; next segment 210 in text 110 "de" is seen with updated timing 220 value "3.11".

One keyboard 132 keystroke applies segment join control 336; single keyboard 132 keystroke (L) seen in the example deletes pause marker 212 and corresponding timing 220, while creating new timing 220 for next segment 210 under tap 333 control shown.

Reversed case 322 is seen in segment 210 "de" within word "deleted" FIG. 3H shows timing 220 value "3.76" seconds corresponding with same segment 210 "de"; FIG. 3I shows timing 220 value "3.11" seconds corresponding with same segment 210 "de"; segment join 336 and tap 333 timing 220 controls are integrated.

Segment join control 336 is optionally applied within words; as example, if keyboard 132 keystroke (L) is applied to next segment 210 "let", then segments 210 "let" and "ed" (within word "deleted") would be joined, timing 220 seen with value "4.64" corresponding with segment 210 "ed" would be removed, while new timing 220 for joined segment 210 "leted" would be made under integrated tap 333 control.

Segment join control 336 is applied to edit segmentations 210 within tap 333 timing process; fast vocalization 188 of multisyllabic words such as "gon-na" are optionally tap 333 timed and changed to monosyllabic "gonna", in real-time 189; pause markers 212 and corresponding timings 220 within tap 333 are optionally deleted as described above.

FIG. 3J shows pause insert control while tap timing.

Same timed text 222 is seen under same segment array 202 shown in FIG. 3I; FIG. 3I shows fourth and fifth timings 220 as "4.2" and "4.64"; FIG. 3J shows fourth and fifth timings 220 as "3.45" and "3.62"; tap 333 process shown is understood to have updated timings 220 corresponding with fourth and fifth segments 210 in text 110.

Modified text 110 contents from FIG. 3I are seen as "one pause deleted,=one added"; pause marker 212 seen added after segment 210 "ed" (in word "deleted"); corresponding timing 220 with value "3.86" seconds seen added.

One keyboard 132 keystroke applies pause insert control 338; single keyboard 132 keystroke (K) seen applied inserts pause marker 212; corresponding timing 220 is defined in integrated tap 333 process.

Reversed case 322 is seen in pause marker 212, also seen as sixth segment 210 in text 110; real time 189 control is shown with all integrated processes described under pause insert control 338.

Keyboard 130 keystrokes shown used in FIG. 3H-FIG. 3J are representative. Multiple options in UI arrangements are possible, for example as described in conjunction with FIG. 3G.

Manual edit of pause markers 212 within a text 110 is impractical, time-consuming and not needed. Insertion and deletion of pause markers 212, and also joining segments 210, within tap 333 timing process in real time 189 is shown.

No previous method is known to control insertion and deletion of pause markers 212, while sequentially applying multi-finger tap 333 process, in real time, into alignment with into segmented text.

FIG. 3K shows vertical superimposition control while tap timing text.

Text 110 is seen superimposed over media player 140: text 110 contents seen as "put words near my lips"; hide context 311 control shown.

Superimposition down 344 control of text 110 is seen approximately 40% down from top; horizontal placement appears centered.

Vocalized text 388, synchronous players 288 and optional tap 333 timing process are seen: reversed case 322 seen in second word "WORDS"; media player 140 cue 144 value seen as "13.66" seconds; vocalization 188 seen heard from media player 140.

Input 130 is shown: understood optionally applied via voice or motion, as described in conjunction with FIG. 1A; in example shown, keystroke (O) if applied understood to move superimposition up 345; keyboard 132 keystroke (P) understood to move superimposition down 344; two strokes understood applied to move superimposition down 344 to position seen in FIG. 3L.

FIG. 3L shows superimposition control move text near vocalizing lips.

Same text 110, media player 140, synchronous players 288 and tap 333 controls seen in FIG. 3K are all shown; same vocalized text 388 is seen; reversed case 322 is seen applied to subsequent segment "NEAR"; media player 140 cue 144 value is seen as "13.86" seconds; vocalization 188 seen is heard from media player 140.

Superimposition down 344 control is seen; FIG. 3K shows text 110 approximately 40% down from top; FIG. 3L shows text 110 approximate 80% down from top.

Vocalized text 388 is seen closer to lips; minimal distance separates text 110 from motion picture of lips forming words; pronunciation heard is seen in text 110 and image in media player 140.

Input 130 is seen again to keyboard 132 keystroke (P); two strokes understood applied to move superimposition down 344 to position seen in FIG. 3M.

FIG. 3M show superimposition control loop from bottom to top.

Same text 110, media player 140, synchronous players 288 and tap 333 controls seen in FIG. 3L are all shown; same vocalized text 388 is seen; reversed case 322 is seen applied to final segment "LIPS"; media player 140 cue 144 value is seen as "14.11" seconds; vocalization 188 seen is heard from media player 140.

Superimposition down 344 is seen; FIG. 3K shows text 110 approximately 40% down from top; FIG. 3L shows text 110 approximately 80% down from top; FIG. 3M shows text 110 split 5% down from top and 95% down from top.

Superimposition down 344 is represented to loop from bottom to top superimposition up 345 is understood to optionally put vocalized text 388 in textarea 100, above media player 140, as shown in multiple examples throughout the disclosure.

Input 130 is seen again to keyboard 132 keystroke (P); two strokes understood applied to move superimposition down 344 to position seen in FIG. 3K.

Superimposition controls 344,345 are applied in real-time 189; from media player 140 cue 144 seen in FIG. 3K-FIG. 3M, it's understood the repositioning is applied in fractions of a second time.

Positions are preferably saved and optionally applied in presentation of vocalized text 388; separate context 111 row controls record of changing superimposition information.

FIG. 3N shows a selected text timing adjustment control in textarea.

Same computer 180 is seen twice, and within both: same textarea 100 with same GUI 160; same text 110 contents with same segment markers 211 and pause markers 212 seen; same context 111 contents made of timings 220, seen adjusted as described below; same bitext 112 format of same timed text 222 seen; same big time edit 228 control seen above textarea; two views of same computer 180 show selected text manipulated to adjust timings.

Same text 110 contents are seen; if segment, pause markers 211,212 are hidden, it's understood that text 110 contents read as "select text segments; push right, make later; pull left, make sooner; we fine tune timings."

Timing 220 values are seen in alignment 123; each timing 220 value is seen in alignment 123 with a corresponding segment 210 in text 110; for example, twenty-fourth segment 210 "tim-" is seen in alignment with timing 220 value "5.44" seconds in both views.

Selection 255 control in text 110 is seen; in both views of same computer 180, twenty-second and twenty-third segments 210 "fine" and "tune" are seen selected; in left view, sooner timings 341 control is applied, while in right view, later timings control 342 is applied.

Sooner timings control 341 seen adjusts timings 220 down; in view of same computer 180 seen above, input 130 is seen applied to text 110 in selection 255; timing 220 values corresponding with selected text 110 are changed; selected text 110 contents "fine tune" are seen to correspond with timing 220 values "4.98" seconds and "5.22" seconds.

Later timings control 342 seen adjusts timings 220 up; in view of same computer 180 seen below, input 130 seen is applied to text 110 in selection 255; timing 220 values corresponding with selected text 110 are changed; selected text 110 contents "fine tune" are seen to correspond with timing 220 values "5.02" seconds and "5.26" seconds.

Big time edit 228 is seen with adjusted timings 220; input 130 via said methods isoptionally applied to big time edit 228 control seen above textarea 100; values seen in big time edit 228 control correspond with first segment 210 seen in selection 255; all subsequent segments 210 in selection 255 in text 110 are understood as adjusted in accordance with first segment 210 timing 220 seen in big time 228.

Timings 220 corresponding with text 110 in selection 255 is adjusted; in both views, twenty-first segment 210 "we" timing 220 value "4.77" is seen; in both views, twenty-fourth segment 210 "tim-" timing 220 value "5.44" is seen; only timings 220 corresponding with text 110 in selection 255 are seen modified.

Any number of timings 220 are optionally adjusted; two segments 210 are seen adjusted in example; it's understood that any number of timings 220 are adjusted, depending upon number of segments 210 in selection 255.

Hide context 311 control is optionally applied; same input 130 to sooner, later timing controls 341,342 is applicable under hide context 311 control; under show context 312 seen applied, timings 220 are also optionally manually edited.

Precise timings 220 adjustment is seen controlled; tap 333 process provided allows instantaneous correction of timings 220, as described in conjunction with FIG. 3G above; addition fine tuning is provided by sooner, later timing controls 341,342 described.

FIG. 3O shows average timings of multiple tapped times.

Network 186 connection is seen; cloud in middle seen as central server 185 on network 186; remaining eight devices shown are seen as clients 187; seven smaller remote clients 187 seen sending data to server 185; server 185 seen sending data to one bigger local client 187 below.

Same GUI 160 seen understood in all clients 187; big time 228 seen above text 110; same text 110 contents seen within all GUI 160's; for simple description, one word "exactly" seen in segments 210 "ex-", "act-", "ly"; middle segment 210 seen in reversed case 322; same media player 140, link 148 seen understood applied in all clients 187; vocalized text 388 seen understood applied in all clients 187.

Tap process 333 is seen on remote clients 187; multiple clients 187 seen to apply tap process 333 from same media link 148 produce approximate timings 220 per segment 210; vocalization 188 shown in big client 187 understood applied in all clients 187.

Big time 228 shown timing 220 values are seen to be different on each client 187; values (in seconds) seen "123.45", "122.89", "123.66", "123.11", "123.52", "123.22", "123.43" seen sent from smaller remote clients 187 above to server 185 in middle; big local client 187 below seen with big time 228 value "123.33".

Average context 350 in timing 220 is seen in local client 187; average of timings 220 in remote clients 187 understood as "123.325714286", rounded to nearest hundredth-second as "123.33"; average context 350 in timing 220 seen put from server 185 into local client 187.

Server 185 is understood to control average context 350: in example, average context 350 is controlled in timing 220 form; it's understood that any remote client 187 can access average context 350 in timings 220 from server 185; access to average context 350 in timings 220 is optionally applied in tap game 360 as described in conjunction with FIG. 3P below.

Clients 187 are understood to control both average context 350 and client context 351 in timings 220; multiple other forms in context 111 (not shown) are controlled in both average context 350 and client context 351, as described in conjunction with FIG. 9A-FIG. 9Z.

FIG. 3P shows a tap timing game to play.

Client 187 is seen with a sample GUI 160 for tap game 360; same media player 140, link 148 and text 110 content as FIG. 3O is understood applied; FIG. 3O only shows one word "exactly" as example focus; FIG. 3P includes more text 110 contents "live feedback exactly while timing", along with upcoming line (also seen as text 110), "so we can play games and score".

Text 110 seen is not directly editable; transcription and timing 220 (seen in big time 228 shown) are verified; multiple forms/versions in context 111 understood available, as described in conjunction with FIG. 9A-FIG. 9Z; hide context 311 control seen allows focus on accurate performance within tap game 360 shown.

Tap game 360 controls are seen along bottom of GUI 160: timer 244, player 242, stop/go 241, speed 246, back 248 controls, all seen; average context 350 in timings 220 is seen applied as described below to generate score 365 seen.

Tap 333 process is seen; same segment 210 "act-" seen above in FIG. 3O shown in reversed case 322; vocalized text 388 seen understood as synchronous with vocalization 188 shown.

Feedback 334 via speed alert 362, 363, 364 controls is seen; alerts slow 362, fast 363, and nice 364 instant feedback 334; score 365 is preferably shown updated in real-time 189.

Slow alert 362 warns if a tap 333 control in timing 220 is too late; seen left in sample GUI 160 for tap game 360, slow alert 362 illuminates if tap 333 within game 360 is too late; illumination optionally increases as number in score 365 defined below decreases; slow alert 362 is optionally represented in a separate color such as "green".

Fast alert 363 warns if a TAP control in timing 220 is too soon; seen right in sample GUI 160 for tap game 360, fast alert 363 illuminates if tap 333 within game 360 is too soon; illumination optionally increases as rate in score 365 defined below decreases; fast alert 363 is optionally represented in a separate color such as "red".

Nice alert 364 confirms that a tap 333 control in timing 220 is accurate; seen below in sample GUI 160 for tap game 360, nice alert 364 illuminates if tap 333 within game 360 is well timed; illumination optionally increases as rate in score 365 defined below increases; fast alert 363 is optionally represented in a separate color such as "yellow".

Speed alerts 362, 363, 364 are optionally applied in styled text 110; changing style, such as color, directly in text 110 optionally provides feedback 334 in real-time 189 via slow 362, fast 363, nice 364 alerts in styled text 110.

Score 365 seen is generated; average context 350 in timings 220 provide standard against which new instance of tap 333 process is compared; each new timing 220 for same segment compared with corresponding average context 350 in timings 220.

Margins of error found are applied as scores 365: 100% score 365 within margin+/−"0.01" millisecond; 98% score 365 within margin+/−"0.02" milliseconds; 90% score 365 within margin+/−"0.03" milliseconds; 80% score 365 within margin+/−"0.04" milliseconds; 70% score 365 within margin+/−"0.05" milliseconds; 60% score 365 within margin+/−"0.06" milliseconds; 50% score 365 within margin+/−"0.07" milliseconds; 40% score 365 within margin+/−"0.08" milliseconds; 30% score 365 within margin+/−"0.09" milliseconds; 20% score 365 within margin+/−"0.10" milliseconds; 10% score 365 within margin+/−"0.20" milliseconds; 0% score 365 below margin+/−"0.21" milliseconds.

Scores 365 may be configured to be more or less lenient; challenge is required to get perfect score 365, so tap game 360 skills are improved, and so multiple timings 220 are averaged, to thus generate extremely precise average context 350 in timings 220.

Feedback 334 mechanisms such as scoring and comparing peer performance are widely applied in games; what is not previously known is any game to apply the presently disclosed multiple finger tap timing process, while comparing and individual tap timing performance against a precise average generated from multiple performances of tap timing.

FIG. 3Q shows a tap playback control applied with media link playback.

Tap playback 373 process seen plays one segment 210 per tap; each input 130 of tap playback 373 control reproduces vocalized text 388 playback of one segment 210 for one time span 320 at a time, all shown.

Media player 140 seen plays either TTS 170 or media link 148; previously synchronized vocalized text 388 with media link 148 is seen in FIG. 3Q example; Text-To-Speech 170 example, optionally in conjunction with robotic avatar, is shown in FIG. 3R.

Textarea 100 is seen next to media player 140; text 110 contents seen as "Tap to play segments one by one at a time; go at your own pace, so that you can hear the vocals carefully."; hidden segment markers 212 and pause markers 212 (not shown) are understood applied as described in conjunction with FIG. 3A-FIG. 3F.

Vocalized text 388 under tap playback 373 control is seen active in fourth segment 210 in text 110 "seg"; vocalization 188 of segment 210 for time span 320 also shown.

Context 111 is seen as timings 220; timings 220 are seen in alignment 123 with segments 210 in text 110 until fourth timing 220 value "5.22" seconds; previously synchronized timings 220 (hidden) are not seen.

Cue value 144 in media player 140 is seen as "3.88" seconds; tap playback 373 is understood, within example, to proceed at slower rate than normal playback 142; vocalized text 388 playback is seen paced not by pre-existing media link 148 speed, but rather by rate of input 130, segment 210 by segment 210, under tap playback 373 control.

Slow tap playback 373 is understood as slower than previously synchronized timings 220; it's understood that without elastic vowel 377 control described below, slow tap playback 373 results in audible gaps between segments 210 of vocalization 188.

Fast tap playback 373 is understood as faster than previously synchronized timings 220; in case of fast tap play 373, media player 140 is optionally configured either to playback end of previous segment 210 and start of new segment 210 in overlap, or to interrupt playback at end of previous segment 210 by replacing it with start of new segment 210; in advanced configurations, below described elastic vowel 377 control is applied.

Three example implementations of tap playback 373 are described: tap game 360 is seen provided with additional feedback 334 in separate audio track; TTS 170 controls described below in FIG. 3R-FIG. 3S; new media link 148 is created with new timings 220 written under tap playback 373 process.

Tap game 360 is optionally enriched with real-time 189 audio feedback 334; normal playback 142 from media link 148 occurs in left stereo channel in media player 140 shown; asynchronous playback 142 in right stereo channel generated in tap playback 373; tap game 360 described in FIG. 3P is served with real-time 189 aural feedback 334.

New media link 148 is optionally generated with timings 220 controlled by tap play 373; pause insert 338 control shown is applied with new pause markers 212, as described in conjunction with FIG. 3J; previously synchronized timings 220 (hidden) are not overwritten; new timings 220 seen are saved separately, and optionally applied with elastic vowel 377 control (described below) to modify vocalization 188 in media link 148 according to tap playback 373 defined timings 220.

Elastic vowel 377 control seen is optionally configured and applied; segments in text 110 are further segmented automatically to isolate vowels; timing 220 values for additional segmentations are found as described in conjunction with FIG. 4E-FIG. 4L; estimated timing 220 values for vowels are applied to estimate time spans 320 for vowels shown; in slow tap play 373, time spans 320 in vowels are extended under elastic vowel 377 control; in fast tap play 373, time spans 320 in vowels are shrunk under elastic vowel 377 control.

FIG. 3R shows a tap playback control applied with Text-To-Speech and robotic avatar. FIG. 3R shows same tap playback 373 controls, text 110 contents, media player 140 seen in FIG. 3Q; Text-To-Speech 170 control seen activated; media link 148 disabled; hide context 311 control shown applied; same text 110 experienced in FIG. 3P media link 148 is now shown with robotic avatar and TTS 170 artificial speech generation.

Tap playback 373 process seen plays one segment 210 per tap; each input 130 of tap playback 373 controlling vocalized text 388 playback of one segment 210 at a time; if text 110 optionally parsed in phonemes, then one phoneme is played per input 130 of tap playback 373.

Prosody rate is optionally controlled dynamically by rate of taps 373 per second; pause insert 338 control shown optionally inserts pause markers 212 (not shown) dynamically; elastic vowel 377 control seen is optionally configured and applied; tag 700 (not shown) controls as described in conjunction with FIG. 7R are optionally generated in real-time 189 within tap playback 373 process applied with TTS 170.

Loop 378 control seen under tap playback 373 shown provides instant replay of tap playback 373 "burst" of tap playback 373 is understood as applied to string in vocalized text 388; new timings 220 defined in burst are reviewed under synchronous vocalized text 388 control in loop 378.

Timings 220 recorded in tap playback 373 process within TTS generation are optionally recorded; elastic vowel 377 control is optionally applied, especially instances of slow tap play 373; speed modulated TTS with real-time pause insertion 338 is controlled, and optionally saved as new media link 148.

FIG. 3S shows phonetic transcription switch back and forth in vocal text playback.

Same textarea 100 seen in previous figures with new contents: Unicode 113 seen applied in text 110 to represent inclusion of a language; English language applied in example; text 110 contents understood as "Use the International Phonetic Alphabet to encode most all human language sounds. Toggle back and forth while playing text."

Same text 110 information is represented in native writing system 381 alternating with IPA transcription 382 version, under IPA switch 380 control.

IPA switch 380 seen is optionally controlled by INPUT shown; represented as slash overlaying textarea 100, IPA switch 380 is applied in example: before IPA switch 380 applied (left), same information seen in native writing system 381; after IPA switch 380 applied (middle), same information seen in IPA transcription 382; after IPA switch 380 applied again (right), same information seen in native writing system 381.

Alternation frequency 325 control is seen; as described in conjunction with FIG. 3D, FIG. 3E, alternation frequency 325 control is applied to vary frequency of switching; it's understood that multiple configurations are possible, including optional coordination with audio modulation within media link 148 shown.

Vocalized text 388 is seen while IPA switch 380 is applied: reversed case 322 transforms twenty-first segment 210 from start timing 220 value seen as "4.77" seconds; twenty-first segment 210 is seen in IPA transcription 382 as "læŋg"; after second IPA switch 380 (understood applied at "4.88" seconds), same twenty-first segment 210 is seen in native writing system 381 as "lang"; corresponding vocalization 188 seen with time span 320 understood as "0.22" seconds is uninterrupted.

Segment array 202 shown controls alignment 123: timed text 222 shown with timings 220 in context 111 and segment 210 in text 110 is seen in bitext 112 format and alignment 123; segment markers 211 and pause markers 212 (not shown) are understood as applied while hidden, as described in conjunction with FIG. 3A-FIG. 3E; segments 210 in IPA transcription 382 and segments 210 in native writing system 381 are controlled in correspondence 456, as described in conjunction with FIG. 4O, FIG. 4P.

Player 242, timer 244, tap game 360, tap playback 373 all seen are optionally applied: player 242, as described in conjunction with FIG. 3B, FIG. 3C, optionally incorporates IPA switch 380; timer 244, as described in conjunction with FIG. 3G, optionally incorporates IPA switch 380; tap game 360, as described in conjunction with FIG. 3P, optionally incorporates IPA switch 380; tap playback 373, as described in conjunction with FIG. 3Q, FIG. 3R, optionally incorporates IPA switch 380.

Context 111 seen optionally changes in form and version; timings 220 seen in context 111 are optionally replaced with other contexts 111, as described in conjunction with FIG. 9A-FIG. 9Z; for example, context 111 in corresponding segments 210 of IPA transcription 382 are optionally controlled, as described in conjunction with FIG. 40, FIG. 4P; alignment 123 seen is understood to adapt in accordance with context 111 contents in view.

Textarea 100 is seen with WYSIWYG 109 edit control; synchronous players 288 shown, when paused, allow edit control in text 110; IPA switch 380 is applied to edit either version native writing system 381 or IPA transcription 382 of same information.

Vocalization 188 heard is encoded in IPA transcription 382; variable pronunciations of same text 110 within native writing system 381 are controlled; IPA transcription 382 for same text 110 string may vary; for example, vocalization 188 of word "what" written in native writing system 381 English is optionally encoded as "wə t" or "wɛt" or "wæt" under IPA transcription 382 control.

IPA database 383 is seen: records of IPA transcriptions 382 are cross-referenced with segments 210 of vocalization 188 in audio and segments 210 with text 110; applications for cross-referencing IPA database 383 include Text-To-Speech 170 and Speech-To-Text 171 systems, as well generation of IPA transcription 382 applied in IPA switch 380; it's understood that IPA transcription 382 is representative; any form of phonetic transcription is optionally applied.

FIG. 3T shows conversion from timed text format to other captions formats.

SYB, or SYllaBic 391 as shown represents an encoding format applied in the present invention; SRT, or SubRip 392 shown represents a widely used encoding format; SUB, or SubViewer 393 as shown represents another widely used encoding format.

Included examples for encoding formats are representative, and are shown as examples, and thus should not be considered as limiting; conversion system 390 is preferably applied to multiple caption system encoding formats.

Conversion system 390 is shown interconnecting SYB 391, SRT 392, and SUB 393 encoding formats to coordinate identical information contained within SYB 391, SRT 392, and SUB 393 encoding methods. Conversion system 390 is preferably accessed using either client 187 (not shown) or server 185 (not shown) via network 186 (not shown).

Textarea 100 as shown represented in each of encoding methods SYB 391, SRT 392, and SUB 393 should optionally be considered as same textarea 100, shown on same computer 180, or optionally as separate textarea 100 shown on another computer 180 with the internet 186; in either case, conversion system 390 is shown as central comparator coordinating identical information contained within formats SYB 391, SRT 392, and SUB 393.

Encoding methods as shown in the encoding formats SYB 391, SRT 392, and SUB 393 include similarities like inclusion of natural language text 110, and numeric timing context 111 information; text 110 being located below timing context 111; multiple lines are used to present the information; text 110 appears rendered as plain text 120, as described in conjunction with FIG. 1A.

Differences between encoding methods as shown in the encoding formats SYB 391, SRT 392, and SUB 393 are minimal; SUB 393 and SRT 392 encoding formats, as shown, require all timings 220 to be in millisecond timing 220, while SYB 391 format permits hundred millisecond or 1⁄10 second timing 220.

Timings 220 values are shown represented variably though they contain identical information. For example, "1.99" second value shown in SYB 391 format is rendered in SRT 392 format as "0.00.01,990" and in SUB 393 format as "0:00:01.990".

Segment array 202 providing a numeric index for each segment 210, as described in conjunction with FIG. 2A, is shown explicitly declared for SRT 392 encoding format and not for SYB 391 and SUB 393 formats.

Time spans 320 for each of the text segment 210, as described in FIG. 3C, are shown represented in full lines in both SRT 392 and SUB 393 encoding formats. For example, "0.00.01,770→0.00.01,990" represent time span 320 in SRT format 392, while "0:00:01.770, 0:00:01.990" represents time span 320 in SUB format 393; in SYB format 391, the same time span 320 is shown, within editable textarea 100, as "1.77 1.99".

Time span 320 values, are not explicitly shown in any of encoding formats SYB 391, SRT 392, and SUB 393.

The time span 320 values are simply derived from timings 220 information shown in each of encoding formats SYB 391, SRT 392, and SUB 393. By the way of above example, no matter how timings 220 are encoded numerically, same "0.22" second result is derived by subtraction of a current timing 220 value of "1.77" from a next timing 220 value of "1.99".

First time spans 320, as are shown explicitly in SRT 392 format and SUB 393 format synchronizes with media player 140 with cue value 144, as described in conjunction with FIG. 1A. As further shown in FIG. 3T, start time cue value 144 is specified as "0.00.00,000" in SRT 392, and "0:00:00.000" in SUB 393 format; in SYB 391 format, initial cue value 144 is not shown, as it is considered to be zero, or "0.0".

Segment number column 410 providing a numeric index for each segment 210 is adjusted, a "0" value segment 210 in the index corresponds to "0.0" value timing 220; second timing in SRT 392 format, shown labeled as index "2", is factored by implicit zero start count of segments 210 in SYB 391 encoding format: first segment 210 "see" while count in SYB 391 format starts from zero and includes value as zero, segment array 202 is adjusted accordingly.

While no pause marker 212 is shown in SYB 391 encoding format to mark first timing "0.0", program 150, as described in conjunction with FIG. 1A, applies first timing 220 automatically; in SYB 391 format, segment 210 and timing 220 count also includes unseen "0". Second timing 220 in SRT 392 is shown matched with first timing 220.

Reversed case 322 segments 210 are as shown written in both SRT 392 and SUB 393 encoding formats.

Segment 210 "PAUS" is shown as reversed case 322 ON for a time span 320 specifically "0.00.00,290→0.00.00,890" in SRT format 392, and for a time span 320 specifically "0:00:00.290, 0:00:00.890" in SUB format 393; Alternatively, segment 210 "ES" is shown as reversed case 322 ON for time span 320 specifically "0.00.00,890→0.00.01,770" in SRT 392 format, and time span 320 specifically "0:00:00.890→0:00:01.770" in SUB format 393.

Sound markers 211 encoded in SYB 391 format are shown written in conversion system 390. Considering above mentioned encoding formats SYB 391, SRT 392, and SUB 393, the reversed case 322 ON segment shown as "PAUS" for a time span 320 with value of "0.60" seconds'; said value is obtained by subtraction of a current timing 220 values "0.00.00,290" from "0.00.00,890" as is shown encoded in SRT 392 format, by subtraction of "0:00:00.290" from "0:00:00.890" as is shown encoded in SUB 393 format, and by subtraction of "0.29" from "0.89" as is shown encoded in SYB 391 format.

Pause markers 212 encoded in SYB 391 format are shown written in conversion system 390. Considering above mentioned encoding formats SYB 391, SRT 392, and SUB 393, the reversed case 322 segment is not seen for time span 320 with value "0.22" seconds, encoded as "0.00.01,770→0.00.01,990" in SRT 392 format, encoded as "0:00:01.770, 0:00:01.990" in SUB 393 format.

Second segment 210 "paus" in SYB 391 format is shown converted as reversed case 322 ON for a time span 320 specifically "0.00.00,290→0.00.00,890" in SRT format 392, and for a time span 320 specifically "0:00:00.290, 0:00:00.890" in SUB format 393; text 110 in both SUB 393 and SRT 392 is shown for "0.6" seconds as "See PAUSes in plain text."

Third segment 210 "es" in SYB 391 format is shown converted as reversed case 322 ON for time span 320 specifically "0.00.00,890→0.00.01,770" in SRT 392 format, and time span 320 specifically "0:00:00.890→0:00:01.770" in SUB format 393; text 110 in both SUB 393 and SRT 392 is shown for "0.88" seconds as "See pausES in plain text."

Fourth segment 210 seen within SYB 391 format is shown as pause marker 212; as shown in both SRT 392 and SUB 393 formats in conversion process 390, no pause marker 212 "=" is seen, no reversed case 322 is applied; the pause is experienced for "0.22" seconds, however, between third and fifth segment, where text 110 is seen in both SUB 393 and SRT 392 formats as "See pauses in plain text."

Fifth segment 210 within SYB 391 format "plain" is written via conversion system 390 in both SRT 392 and SUB 393 formats show reversed case 322 ON with start time equivalent to "1.99" seconds, and put an end to the pause experienced in forth segment where text 110 read "See pauses IN plain text."

Reversed case 322 element is understood to proceed through plain text 120 as follows: "See pauses in plain text"; "See PAUSes in plain text"; "See pausES in plain text"; "See pauses in plain text"; "See pauses IN plain text"; "See pauses in PLAIN text"; "See pauses in plain TEXT."; "See pauses in plain text".

Segments 210 within multi-syllabic expressions, in plain text 120, in conversion system 390 are shown to apply to common captioning systems. Reversed case 322 segments are written in common encoding formats; pauses between words, which are encoded in SYB 391 format, are also written in conversion system 390 in common encoding formats, preferably including SRT 392 and SUB 393 formats, as shown.

Advantages of timed text 222 as applied in SYB 391 encoding method are further shown.

Complex encoding of simply derived time span 320 information shown in SRT 392 and SUB 393 formats are not readily editable then compared to SYB 391 format contents which are more easily controlled.

Contents formatted as timed text 222 encoded in SYB 391 format are fully visible, arranged upon eleven lines, as shown. The same information encoded in SUB 393 format are arranged upon ninety-six lines; and while same information encoded in SRT 392 format, one hundred and twenty-eight lines are required.

Corrections are easily found and applied in SYB 391 format. Duplicate timings shown in SRT 392 and SUB 393 formats are not seen in SYB 391 format. Redundant information is not shown in SYB 391 format.

Conversion system 390 enables easy correction of information as shown in SYB 391 format, to be applied in commonly used captioning system, including SRT 392 and SUB 393 formats.

2-way conversion system 390 is shown, wherein arrows represents bi-directional conversion. Captioning information found in common captioning encoding formats, including SRT 392 and SUB 393, are shown converted to easily corrected SYB 391 format.

Constant information, separately encoded in formats SYB 391, SRT 392, and SUB 393 are seen coordinated in conversion system 390.

FIG. 4A shows unaligned, delineated timed text controlled in segment array.

Textarea 100 shows timed text 222 in plain text 120; text 110 with segments 210 made by segment and pause markers 211,212, and context 111 with timings 220 all shown, (full contents understood as slightly edited version from FIG. 2A).

Segment delineation 224 seen in text 110 is applied by following: single space 101 shown between separate words 128; segment marker 211 applied within words 128; pause marker 212 applied between words 128.

Segment delineation 224 also seen in context 111: single space 101 seen is applied between separate all timings 220.

Segment array 202 is shown: one timing 220 for every segment 210 controlled in segment array 202; example alignment 123 forms applied under BSA 400 controls described below.

Line markers 424 are applied: optionally represented in backslash "\", line markers 424 appear before ninth and eighteen segments 210 in text 110; line markers 424 are applied in line alignment 403, as described in conjunction with in FIG. 4D; line markers 424 also applied in row set wrap 1050 control, as described in conjunction with FIG. 10. Alignment 123 (not seen) is not apparent; fourteenth segment 210 "in-" and thirteenth timing 220 "2.99" seconds, as examples, appear unaligned.

Bitext segment aligner or BSA 400 control shown incorporates multiple controls: expand segments 408 control seen in FIG. 4B; hide segments 410 seen in FIG. 4D; expand, hide segments 408,410 optionally applied with aligners; segment aligner 401 seen in FIG. 4B; word aligner 402 seen in FIG. 4C; line aligner 403 seen in FIG. 4D; correspondence 456 controls as described in conjunction with FIG. 4E-FIG. 4L; space 101 and spaces 102 understood to control alignment 123, as described in conjunction with FIG. 5C, FIG. 5D, FIG. 5I; correspondence 456 and alignment 123 controls shown applied in real-time 189.

FIG. 4B shows timed text in bitext aligned by segment: expanded delineation and nudge allowance also shown.

Same timed text 222 from FIG. 4A seen applied within same textarea 100; same line markers 424 shown; same text 110, segments 210, sound and pause markers 211,212, all shown; same context 111 seen with same timings 220; same segment array 202 seen applied; same BSA 400 control shown.

Expand segments 408 control is seen in text 110, space 101 added after segment markers 211; space 101 added before/after pause markers 212; minimum one space 101 seen between all segments 210.

Bitext 112 control is seen: bitext 112 as described in conjunction with FIG. 1B is understood to control separate sizes and styles in text 110 and context 111; within the example, context 111 size is 50% that of text 110 size; alignment 123 is optionally controlled via ratio 511 shown in FIG. 5H, or via span 565 shown in FIG. 5I.

Segment array 202 is shown: for description purposes, numbers seen above and below textarea 100 represents segment array 202; it's understood that "30" segments 210 and timings 220 are controlled, as shown in FIG. 2A; unwrap view 1001 (not shown) is understood, as described in conjunction with FIG. 10A.

Alignment 123 is seen between each timing 220 and each segment 210; space 101 and spaces 102 seen are applied, as described in conjunction with FIG. 5C, FIG. 5D; FIG. 4A shows thirteenth segment 210 "in-" and thirteenth timing 220 "2.99" unaligned; FIG. 4B shows same segment 210 "in-" and same timing 220 "2.99" in alignment 123.

Nudge allowance 489 is seen: seen in fifth, sixth and tenth timings 220, nudge allowance 489 minimizes space 101 in text 110; if width to end of timing 220 does not exceed width to start of next segment 210, then no extra space 101 is added before corresponding segment 210 in text; timings 220 and segments 210 remain in perceptible alignment 123.

Segment aligner 401 control is seen: each segment 210 in text 110 shown in alignment 123 with corresponding timings 220 in context 111; bitext 112 control applied while WYSIWYG 109 edit control shown; total number of segments 210 and timings 220 seen in FIG. 4B is "14" each.

FIG. 4C shows timings aligned by the word.

Same timed text 222 from FIG. 4A seen applied within same textarea 100; same line markers 424 shown; same text 110, segments 210, sound and pause markers 211,212, all shown; same context 111 seen with same timings 220; same segment array 202 seen applied; same BSA 400 control shown.

Word array 428 is applied; for description, word array is shown represented above segment array, above textarea; word array 428 is applied in word aligner 402 described below.

Alignment 123 is seen in examples: second word 128 "pauses" with second timing 220 value "0.55"; third word 128 "in" with fifth timing 220 value "1.22"; fourth word 128 "plain" with sixth timing 220 value "1.44", and so on.

Nudge allowance 489 is seen; eleventh timing 220 value "2.55" remains in perceptible alignment 123 with eleventh segment 210 "tim-".

Word aligner 402 is shown: timings 220 in context 111 seen in alignment 123 with words 128 in text 110; for example, three segments 210 understood in second word 128 "paus-es=" seen in alignment 123 with three corresponding timing 220 values "0.55 0.77 0.99"; single space 101 seen between said timings 220 "0.55 0.77 0.99".

Word aligner 402 is understood; alignment 123 of large timing 220 values such as "1234.56" forces spaces 102 between segments 210 in text 110; word aligner 402 and weak style 116 controls shown in context 111, minimizes spaces 102 in text 110; multiple timings 220 appear in perceptible alignment 123 with multi-segment words 128 in text 110; total number of segments 210 and timings 220 seen in FIG. 4C is "16".

FIG. 4D shows timings aligned with lines in text; segmentations are applied while hidden from view.

Same timed text 222 from FIG. 4A seen applied within same textarea 100; same line markers 424 shown; same text 110, segments 210, sound and pause markers 211,212, all shown; same context 111 seen with same timings 220; same segment array 202 applied; same BSA 400 control shown.

Hide segments 410 control is seen in text 110: segment markers 211 shown understood as hidden; pause markers 212 shown understood as hidden; segmentation optionally viewed via SybCase 323 control shown, as described in conjunction with FIG. 3D.

Line array 404 is seen; for description, line array 404 is shown represented above segment array 202, above textarea 100; line markers 424 seen before ninth, eighteenth segments 210 in text 110 applied in line array 404.

Alignment 123 is seen in example: ninth segment 210 (shown as line marker 212), and ninth timing 220 value "2.11" in context 111; single space 101 shown between timings 220 applied in separate lines represented; spaces 102 shown controlled in context 111 before ninth timing 220 to apply alignment 123.

Line aligner 403 is seen: timings 220 are seen in alignment 123 with first words within represented lines; line markers 424 shown understood optionally hidden under hide line markers 425 control (not seen); points of alignment 123 are understood to be defined by line markers 424.

Line aligner 403 is understood: hide segments 410 control applied in text 110 minimized spaces 102, so more contents are visible; line aligner 403 controls multiple timings 220 in alignment 123 with full lines in text 110; addition line controls in text 110 and context 111 are described in conjunction with FIG. 10A-FIG. 10E; total number of segments 210 and timings 220 seen in FIG. 4C is "18".

FIG. 4E shows a sample text in segments, aligned with timings, to illustrate segment-time control.

Same textarea 100, bitext 112, BSA control 400, correspondence 456, real-time 189, segment-time 444 controls, all shown, are understood applied in FIG. 4E-FIG. 4L; same text 110, segments 210, context 111, timings 220, all shown, are described as edited in FIG. 4E-FIG. 4L, as example of correspondence 456 control.

Show context 312 seen is applied; context 111 in timings 220 form is seen; correspondence 456 and segment-time 444 controls described in FIG. 4F-4L are understood applied even if HIDE context 111 (not seen) is optionally applied.

Textarea 100 contents "all seg-ments timed" has "four" segments 210; timings 220 in context 111 seen as "1.00 2.00 3.00 4.00"; alignment 123 seen under BSA control 400 of segment aligner 401 shown.

Correspondence 456 control is seen between timings 220 and segments 210 in examples: "second" segment 210 "seg-" with ""second"" timing 220 value "2.00", "third" segment 210 "ments" with "third" timing 220 value "3.00", "fourth" segment 210 "timed" with "fourth" timing 220 value "4.00" seconds.

Alignment 123 seen under BSA control 400 segment aligner 401 shown applied as example; word aligner 402 and line aligner 403 (not shown) understood as applicable within correspondence 456 and segment-time 444 controls.

Real-time 189 control is applied; correspondence 456 control, as described in conjunction with FIG. 4F-FIG. 4L, and alignment 123 control, as described in conjunction with FIG. 5C, FIG. 5D, FIG. 5I are applied dynamically under BSA control 400 in real-time 189.

Caret 105 is seen positioned to add text 110 seen in FIG. 4F

FIG. 4F shows a word added as input to FIG. 4E text; program makes a timing for the added word.

Same textarea 100 from FIG. 4E is seen; same bitext 112 contents seen progressively edited, under same controls.

Input 130 seen adds "fourth" segment 210 "so"; caret 105 position shown; text 110 contents "all seg-ments so timed" now understood with "five" segments 210 shown.

Segment-time 444 control is seen applied: context 111 contents now understood with "five" timings 220 shown; "fourth" timing 220 value "3.50" seconds seen in alignment 123 with added text 110 segment 210 "so".

Correspondence 456 shown is maintained:

FIG. 4E shows correspondence 456 between "fourth" segment 210 "timed" and "fourth" timing 220 "4.00" seconds; FIG. 4F shows correspondence 456 between "fifth" segment 210 "timed" and "fifth" timing 220 "4.00" seconds; segment 210 "so" added in text 110 does not affect correspondence 456 of surrounding timings 220 and segments 210;

Segment-time 444 control is understood: "fourth" timing 220 value is calculated in response to input 130 of new "fourth" segment 210; space 101 and spaces 102 seen are controlled so all timings 220 and segments 210 appear in alignment 123.

Correspondence 456 and alignment 123 under BSA 400 are controlled in real-time 189 shown.

FIG. 4G shows edits applied without affecting correspondence or alignment; no segment is added or removed.

Same textarea 100 from FIG. 4F is seen; same bitext 112 contents seen progressively edited, under same controls.

Input 130 seen is applied to edit text 110; caret 105 position shown; in comparison to FIG. 4F, "first" segment 210 changed from "all" to "every", "third" segment 210 changed from "ments" to "ment"; text 110 contents "every seg-ment so timed" seen in same "five" number of segments 210.

Segment-time 444 control does not change timings 220: no segment 210 added to text 110; no segment 210 removed from text 110.

Correspondence 456 control shown is maintained: "first" segment 210 seen in alignment 123 with "first" timing 220 "1.00"; "third" segment 210 "ment" seen in alignment 123 with "third" timing 220 "3.00".

Alignment 123 is seen adjusted under real-time 189 control; "first" segment 210 seen changed from "all" to "every"; "second" segment 210 "seg-" and "second" timing 220 value "2.00" seconds seen in alignment 123; "third" segment 210 seen changed from "ments" to "ment"; "fourth" segment 210 "so" and "fourth" timing 220 value "3.50" seconds seen in alignment 123.

Correspondence 456 and alignment 123 under BSA 400 are controlled in real-time 189 shown.

FIG. 4H shows syllabification applied to word added in FIG. 4G; program is seen to add timing(s) as needed.

Same textarea 100 from FIG. 4G is seen; same bitext 112 contents seen progressively edited, under same controls.

Syllabification 301 control seen is applied in real-time 189 shown; as described in conjunction with FIG. 3A, syllabification 301 control mechanically applies segment marker 211 as shown within word 128 "every" seen added in FIG. 4G; caret 105 position seen is same seen in FIG. 4G, without input 130 (not shown); text 110 contents "ev-ery seg-ment so timed" now seen with "six" segments 210.

Segment-time 444 control is applied: context 111 contents now seen with "six" timings 220; "second" segment 210 now seen as "ery"; "second" timing 220 value "1.50" seconds seen generated by segment-time 444 control.

Correspondence 456 shown is maintained in examples seen FIG. 4G shows "second" segment 210 "seg-" with "second" timing 220 value "2.00" seconds; FIG. 4H shows "third" segment 210 "seg-" with "third" timing 220 value "2.00" seconds.

Alignment 123 is seen adjusted in real-time 189 in examples: "second" segment 210 "ery" with "second" timing 220 value "1.50" seconds "third" segment 210 "seg-" with "third" timing 220 value "2.00" seconds.

Correspondence 456 and alignment 123 under BSA 400 are controlled in real-time 189 shown.

FIG. 4I shows a two segment word replaced by a one segment word; program removes corresponding timing.

Same textarea 100 from FIG. 4H is seen; same bitext 112 contents seen progressively edited, under same controls.

Input 130 seen to change two segments 210 "seg-", "ment" to one segment 210 "last"; caret 105 position seen; text 110 contents "ev-ery last so timed" now seen with "five" segments 210; "third" segment 210 now seen as "last"; "fourth" segment 210 now seen as "so".

Segment-time 444 control responds to input 130 seen; context 111 contents now seen with "five" timings 220; "fourth" timing 220 value "3.00" seconds seen in FIG. 4H now removed.

Correspondence 456 is maintained in examples seen: FIG. 4H shows "fifth" segment 210 "so" with "fifth" timing 220 value "3.50" seconds; FIG. 4I shows "fourth" segment 210 "so" with "fourth" timing 220 value '3.50" seconds.

Alignment 123 is seen adjusted in examples: "third" segment 210 "last" with "third" timing 220 value "2.00" seconds; "fourth" segment 210 "so"" with "fourth" timing 220 value "3.50" seconds.

Correspondence 456 and alignment 123 under BSA 400 are controlled in real-time 189 shown.

FIG. 4J shows a word added; program adds corresponding timing.

Same textarea 100 from FIG. 4I is seen; same bitext 112 contents seen progressively edited, under same controls.

Input 130 seen adds new "fourth" segment 210 in text 110 seen as "one"; caret 105 position seen; text 110 contents "all seg-ments one so timed" now seen with "six" segments 210.

Segment-time 444 control shown responds to input 130 seen; context 111 contents now seen with "six" timings 220; "fourth" timing 220 value "2.75" seen added before "fifth" timing 220 value "3.50" seconds.

Correspondence 456 shown is maintained in examples seen: FIG. 4I shows "fourth" segment 210 "so" with "fourth" timing 220 value "3.50" seconds; FIG. 4J shows "fifth" segment 210 "so" with "fifth" timing 220 value "3.50" seconds.

Alignment 123 is seen adjusted in real-time 189 in examples: "fourth" segment 210 "one" and timing 220 value "2.75" seconds; "fifth" segment 210 "so" and timing 220 value "3.50" seconds.

Correspondence 456 and alignment 123 under BSA 400 are controlled in real-time 189 shown.

FIG. 4K show a word removed; program removes corresponding timing.

Same textarea 100 from FIG. 4J is seen; same bitext 112 contents seen progressively edited, under same controls.

Input 130 seen removes segment 210 "so" seen in FIG. 4J; caret 105 position seen; FIG. 4J shows text 110 with "six" segments 210 total with "fifth" segment 210 seen as "so"; FIG. 4K shows text 110 with "five" segments 210 total with "fifth" segment 210 seen as "timed".

Segment-time 444 control seen is applied: FIG. 4J shows context 111 with "six" timings 220 total with "fifth" timing 220 seen as "3.50" seconds; FIG. 4K shows context 111 with "five" timings 220 total with "fifth" timing 220 seen as "4.00" seconds.

Correspondence 456 shown is maintained in examples seen: FIG. 4J shows "sixth" segment 210 "timed" with "sixth" timing 220 value "4.00" seconds; FIG. 4K shows "fifth" segment 210 "timed" with "fifth" timing 220 value "4.00" seconds.

Alignment 123 is shown in example: "fifth" segment 210 "timed" in text 110 with "fifth" timing 220 value "4.00" seconds in context 111.

Correspondence 456 and alignment 123 under BSA 400 are controlled in real-time 189 shown.

FIG. 4L shows a two segment word appended; program adds corresponding timings.

Same textarea 100 from FIG. 4K is seen; same bitext 112 contents seen progressively edited, under same controls.

Input 130 is seen to append one word "always": syllabification 301 control seen makes two segments 210 "al-", "ways" via segment marker 211 shown; caret 105 position seen; text 110 contents "ev-ery last one timed al-ways" now seen with "seven" segments 210.

Segment-time 444 control seen is applied: context 111 contents now seen with "seven" timings 220; "sixth" timing 220 value "4.80" and "seventh" timing 220 value "5.60" understood generated from average of time spans 320 seen between previous timings 220 is applied to estimate values for appended timings 220.

Correspondence 456 shown is maintained; same first five text 110 segments 210 "ev-", "ery", "last", "one", "timed", and same first five timings 220 "1.00", "1.50", 2.00", "2.75" are seen in both FIG. 4K and FIG. 4L.

Alignment 123 seen is controlled: "sixth" segment 210 "al-" in text 110 and sixth timing 220 value "4.80" seen in alignment 123; "seventh" segment 210 "ways" in text 110 and eleventh timing 220 value "5.60" seen in alignment 123.

Correspondence 456 and alignment 123 under BSA 400 are controlled in real-time 189 shown.

Timing(s) 220 added as input 130 after final timing 220 are deleted;

if no segment 210 in text 110 is controlled in correspondence 456 with timing 220, then timing is deleted; if a timing 220 is added between existing timings 220, then the final timing 220 within the line is deleted; correspondence 456 is constantly maintained.

FIG. 4E-FIG. 4L show segment-time 444 control applied to maintain correspondence 456 between timings 220 with segments 210 while applying edits, optionally in conjunction with tap 333 process; it's understood that segment-time 444 control may produce imperfect results; as described in conjunction with FIG. 3G, tap 333 process is designed to easily correct errors in timings 220.

FIG. 4M shows a new text example in same textarea with context hidden.

Textarea 100 seen controls BSA 400: robot time 300 controls applied; previously specified controls such as tap 333 process, vocalized text 388 (not shown) are understood applied; said control understood applied in textarea 100 seen in FIG. 4M-4P.

Text 110 in same FIG. 4I textarea 100 is seen with new contents: "align by empty context segments: timings, IPA, ties, tags, links."; input 130 optionally via microphone 136 shown under SST generating media link 148.

Syllabification 301 is shown while hide segments 410 seen applied in text 110; context 111 shown is understood hidden under hide context 311 control; show empty context 412 control seen is applied in FIG. 4N.

FIG. 4N shows FIG. 4M text with empty context segments.

Same textarea 100 and text 110 contents seen under same controls are understood applied from previous figure; bitext 112 as described in conjunction with FIG. 1B is seen applied.

Hide segments 410 control is seen in text 110; FIG. 4N segments 210 (not shown) in text 110 are hidden under hide segments 410 control; FIG. 4O same segments 210 seen are understood to total "17".

Show empty context 412 control is seen applied; line array 404 seen under BSA 400 control shown is applied; for every text 110 line, a context 111 line is made, optionally positioned below text 110 as shown; each context 111 line shown contains a number of empty word markers 422 and empty segment markers 411.

Empty word markers 422 seen are understood to total "10"; words 128 seen in text 110 are understood to total "10"; word array 428 seen is applied.

Empty segment markers 411 seen are understood to total "7"; empty word markers 422 are included in empty context 412 total segment 210 count understood as "17"; segment array 202 seen is applied.

Space 101 and spaces 102 are seen between empty segment markers 411 and empty word markers 422; as described in conjunction with FIG. 5C, FIG. 5D, FIG. 5H, FIG. 5I, space 101 and spaces 102 are controlled to form alignment 123; it's understood that BSA 400 control optionally applies similar methods.

Alignment 123 under BSA 400 controlled word aligner 402 is seen in examples: "second" empty segment marker 411 in context 111 "-" with "second" segment 210 in text 110 "lign"; "fifth" empty word marker 422 in context 111 "*" with "fifth" word 128 "segment" (and "eighth" segment 210 "seg") in text 110; "seventh" empty word marker 422 in context 111 "*" with "seventh" word 128 "IPA" (and "twelfth" segment 210 "I") in text 110; all segments 210 (not shown) understood same as segments 210 seen in FIG. 4O; all empty segment markers 411 in context 111 understood in alignment 123 with segments 210 in text 110; all empty word markers 422 in context 111 understood in alignment 123 with words 128 (and segments 210) in text 110.

FIG. 4O shows IPA context under segment aligner control; segments are seen in text and segments are seen in context.

Same textarea 100 and text 110 contents seen under same controls are understood applied from previous figure; bitext 112 is seen applied.

Context 111 in ipa transcription 382 form is seen; ipa transcription 382 segments 210 seen in context 111 in alignment 123 with segments 210 in text 110; IPA in context 111 understood applied as described in conjunction with FIG. 3S; IPA contents understood preferably generated from IPA database 383 lookup.

IPA database 383 shown is understood as key/value pair for any word in text 110; depending on language applied and pronunciation variation, it's understood that multiple IPA transcription 382 values are optionally provided for each text 110 key; corresponding syllabication 301 is understood controlled.

Segments 210 are shown in text 110; segment markers 211 seen understood generated in syllabification 301 shown in FIG. 4M; pause markers 212 (not shown) understood as visible if timed text 222 (not shown) is viewed; total "17" segments 210 are understood in text 110.

Segments 210 are shown in context 111; segment markers 211 seen understood generated in parallel syllabification 301 process, in coordination with IPA database 383 shown and seen applied in real-time 189; pause markers 212 (not shown) understood optionally applied under IPA switch 380 control; total "17" segments 210 understood in context 111.

IPA transcription 382 context 111 contents seen replaces empty context 412; alignment 123 positions defined by empty segment markers 411 and empty word markers 422 seen in FIG. 4N; space 101 and spaces 102 seen understood to control alignment 123.

Alignment 123 shown under BSA 400 controlled segment aligner 401 is seen in examples: "second" ipa transcription 382 segment 210 in context 111 "lajn" with "second" segment 210 in text 110 "lign"; "fifth" ipa transcription 382 word 128 in context 111 "segments" with "fifth" word 128 "segment" (and "eighth" segment 210 "seg") in text 110; "seventh" ipa transcription 382 word 128 "ajpie" with "seventh" word 128 "IPA" (and "twelfth" segment 210 "I") in text 110; all segments 210 and words 128 in context 111 understood in alignment 123 with corresponding segments 210 and words 128 in text 110.

Correspondence 456 control seen applied is understood; as described in conjunction with FIG. 4E-FIG. 4L, segments 210 in context 111 are shown controlled in correspondence 456 with segments 210 in text 110; edits in text 110 are understood similarly applied to context 111 controlled in IPA form shown; IPA database 383 and parallel syllabification 301 process seen is applied in real-time 189.

FIG. 4P shows IPA context under word aligner control; segments in text and context both hidden.

Same textarea 100, text 110 and context 111 contents seen are understood applied from previous figure; same controls including bitext 112 shown understood applied.

Hide segments 410 control seen is applied to text 110 and context 111: as example, FIG. 4O shows segment marker 211 within "fifth" word 128 "seg-ments" in text 110 and "fifth: word 128 "sɛgmə nts" in context 111; FIG. 4P shows hide segments 410 control applied in same words 128 to hide segment markers 211 (not shown).

Alignment 123 shown under BSA 400 controlled word aligner 402 is seen in examples: "second" ipa transcription 382 segment 210 in context 111 "lajn" with "second" segment 210 in text 110 "lign"; "fifth" ipa transcription 382 word 128 in context 111 "segments" with "fifth" word 128 "segment" (and "eighth" segment 210 "seg") in text 110; "seventh" ipa transcription 382 word 128 "ajpie" with "seventh" word 128 "IPA" (and "twelfth" segment 210 "I") in text 110; all segments 210 (not shown) understood same as segments 210 seen in FIG. 4O; all segments 210 and words 128 in context 111 understood in alignment 123 with corresponding segments 210 and words 128 in text 110; space 101 and spaces 102 seen understood to control alignment 123.

3D array 432 seen is applied in bitext 112: as described in conjunction with FIG. 4N, segment array 202, word array 428, and line array 404 are simultaneously applied within BSA 400 control; "three-dimensional" or "3D" array 432 is understood do control coordinated application of segment array 202, word array 428, and line array 404 controlled in bitext 112 under BSA control 400.

4D ARRAY 434 is seen optionally applied in bitext 112: empty word markers 422 and empty segment markers 411, as shown in FIG. 4N, are optionally applied as blank markers 413 (not shown), so that limited contents in context 111 are controlled, as described in conjunction with FIG. 5Y and FIG. 6O-FIG. 6R; extender markers 414 (not shown) are optionally applied as alternative means to control chunk array 121 (not shown); "four-dimensional" or "4D" array 434 is understood to control coordinated application of segment array 202, word array 428, line array 404 and chunk array 121 of text 110 and context 111 controlled in bitext 112 under BSA control 400.

BSA 400 controls are shown: as described in conjunction with FIG. 2A-FIG. 4L, multiple controls, such as expand segments 408 and line aligner 403 (not shown) are understood applicable while aligning context 111 in ipa transcription 382 form; timed text 222 (not shown) and various other forms in context 111 optionally apply BSA 400 controls, including tie 600 controls as described in conjunction with FIG. 6, tag 700 controls as described in conjunction with FIG. 7, pictures 800 as described in conjunction with FIG. 8

Additional controls in alignment 123 are described below in conjunction with similar Aligning Bitext Chunks or ABC system 500.

FIG. 5A example shows required resources including text, context and index of chunk pairs.

ABC 500 system and aligner 555 shown control alignment 123 of bitext 112 chunks 122; source 550 in plain text 120 applies chunk array 121 with context 111 and text 110, all shown; ABC 500 system understood applied as described in conjunction with FIG. 5A-FIG. 5Z.

Word array 428 seen numbers words; single space 101 shown between separate words; words 128 (not shown) understood as obvious; text 110 is seen with three words: "chunk in text"; context 111 is seen with three words: "align context chunks"; each word understood numbered in sequential order.

Chunk index 121 applies pairs 505 shown; first pair 505 shows values "1:1"; second pair 505 shows values "2:2"; third pair 505 shows values "3:3".

Each pair 505 shows two values: context 111 word number value is seen first; text 110 word number value is seen last; pairs understood optionally represented as "n:N".

Pairs 505 in index 121 are "set" for aligner 555 seen: first context 111 word set with first text 110 word; second context 111 word set with second text 110 word; third context 111 word set with third text 110 word.

Aligner 555 is applied with pairs 505: aligner 555 applies pairs 505 set within chunk array 121 for alignment 123 as shown below.

FIG. 5B shows wide alignment form; all chunks delineated by at least two empty spaces.

Wide form 522 of alignment 123 is seen applied to source 550 from FIG. 5A; same index 121, pairs 505, text 110, context 111 contents all shown in same textarea 100.

Bitext 112 format is shown: strong style 118 shown in text 110, weak style 116 shown in context 111, as described in conjunction with FIG. 1B; bitext 112 further specified in FIG. 5?, FIG. 11A-FIG. 11H.

Chunks 122 are seen: within the example, chunks 122 understood same as words; examples of multiple word chunks 122 are seen in FIG. 5L-FIG. 5Z below Index 121 (normally hidden) is seen (apart from textarea 100) for description: same pair 505 values "1:1" "2:2" "3:3" are shown.

Aligner 555 shown is applied; span method 512 seen preferably applies alignment 123 shown; basic method 510 and ratio 511 method seen are optionally provided.

Spaces 102 seen are changed in number: "eleven" spaces 102 are seen before second context 111 word "context"; "two" spaces 102 are seen before second text 110 word "in"; "three" spaces 102 are seen before third context 111 word "chunks"; "three" spaces 102 are seen before third text 110 word "text".

Alignment 123 is seen in examples: first context 111 word "align" with first text 110 word "chunks"; second context 111 word "context" with second text 110 word "in"; third context 111 word "chunks" with third text 110 word "text".

Wide form 522 in alignment 123 is seen: minimum two spaces 102 seen between all chunks 122 is applied to delineate, pair and align chunks 122; wider alignment would apply minimum three spaces 102 between all chunks 122, to increase visibility.

Chunk delineation 124 is clearly seen: space 102 applied make delineation 124 of all chunks 122 readily perceptible; delineation 124 optionally applied to generate index 121.

FIG. 5C shows trim alignment, where at least two empty spaces delineate at least one chunk per pair.

Trim form 521 in alignment 123 is seen; at least two spaces 102 used as delineation 124 of at least one chunk 122 per aligned pair 505.

Same contents are shown in same textarea 100 seen in FIG. 5B: same source 550 applied in same bitext 112 format; same pair 505 values within same INDEX, all shown.

Same aligner 555 seen forms same alignment 123 shown in examples: second context 111 word "context" with second text 110 word "in"; third context 111 word "chunks" with third text 110 word "text".

Spaces 102 seen are changed in number: in comparison to FIG. 5B, not eleven, but nine spaces 102 are seen before context 111 word "context"; not three spaces 102, but one space 101 is seen before text 110 word "in"; not three spaces 102, but one space 101 is seen before context 111 word "chunks"; not three, but two spaces 102 are seen before text 110 word "text".

Trim 521 alignment 123 form is understood: one space 101 is seen before second text 110 chunk 122 "in"; one space 101 is seen before third context 111 chunk 122 "chunks"; spaces 102 between chunks 122 are minimized.

Chunk delineation 124 is seen: spaces 102 before second context 111 word "context" are applied in chunk delineation 124; delineation 124 is seen before second text 110 word "in", while preceded by one space 101 shown.

Delineation 124 in one line is applied in other line: spaces 102 seen before third text 110 word "text" are applied in chunk 122 delineation 124; delineation 124 is found before third context 111 word "chunks", while preceded by one space 101 shown; delineation 124 optionally applied to generate index 121.

Trim 521 alignment 123 form is preferred: chunk delineation 124 is detected; unnatural extra spaces 102 in text 110 line are minimized; constant text 110 position is preferred under versions 900 control seen, as described in conjunction with FIG. 9A-FIG. 9W.

Same aligner 555 shown applies trim 521 alignment 123: same optional methods described in FIG. 5*b* understood appplied; aligner 555 methods understood as described in conjunction with FIG. 5A-5H.

FIG. 5D shows trim alignment in "plain text" bitext, seen controlled in basic input forms.

Same contents in same textarea 100 from previous figure are seen: same text 110, context 111, index 121, pair 505 values, all seen; same alignment 123 seen controlled by same aligner 555 now seen applied in plaintext bitext 515.

Plaintext bitext 515 is shown: no styles seen; text 110 and context 111 appear in same-sized font seen as plaintext 120; "bitext 112" understood to optionally apply separate sizes and styles; plaintext bitext 515 understood within the disclosure as handled separately.

Spaces 102 seen are changed in number: FIG. 5C shows nine spaces 102 before second context 111 chunk 122 "context"; FIG. 5D shows two spaces 102 before same chunk 122 "context"; FIG. 5C shows two spaces 102 before third text 110 chunk 122 "text"; FIG. 5D shows six spaces 102 before same chunk 122 "text".

Alignment 123 seen is same: second context 111 chunk 122 "context" with second text 110 chunk 122 "in"; third context 111 chunk 122 "chunks" with third text 110 chunk 122 "text".

Trim 521 alignment 123 is seen: one space 101 seen between context 111 chunks 122 "context" and "chunks"; one space 101 seen between text 110 chunk 122 "chunks" and "in"; delineation 124 shown between all chunks 122 controlled in pairs 505.

Textarea 100 is seen with plaintext 120: plaintext 120 version of textarea 100 represents the most basic form of textarea 100; no "contenteditable div" or other format control is applied.

Plaintext 120 textareas 100 are widely applied: the most common online input form used on the Internet is plaintext 120 textarea 100; source 550 shown understood controlled in plaintext 120.

Custom implementations of plaintext 120 textarea are understood: as example, basic input forms are optionally accessed via pop-up in direct proximity to bitext contents within non-directly editable presentation formats like PDF, ePub, HTML and such.

FIG. 5E shows bump control applied in "plain text" bitext to control incidental aligning.

Same aligner 555 applied in same textarea 100 from previous figure is seen: same plaintext bitext 515 control and trim 521 alignment 123 all shown.

Text 110 is seen as "text in delineated chunks"; context 111 seen as "bump a context between"; index 121 shown with pair 505 values "1:1", "2:2"; second context 111 word "a" set to align with second text 110 word "in".

An "incidental alignment" 529 is seen: third context 111 word "context" and third text 110 word "delineated" appear to be aligned; but no pair 505 seen in index 121 shows values "3:3"; said words "context" and "delineated" are seen in "incidental alignment" 529; bump control 525 seen differentiates "incidental alignment" 529 from planned alignment 123.

Space 101 and spaces 102 are shown controlled: two spaces 102 are seen before second context 111 word "a"; one space 101 is seen before second text 110 word "in".

Alignment 123 in trim 521 form is seen: second context 111 word "a" is seen in alignment 123 with second text 110 word "in"; alignment 123 seen shows context 111 indented by one extra space 101; no unnatural spaces 102 are seen between words in text 110.

Bump control 525 in alignment 123 is seen: one space 101 is seen added before second chunk 122 in context 111; two spaces 102 total are seen before second context 111 word "a"; "incidental alignment" 529 is thereby differentiated from planned alignment 123.

Delineation 124 of chunks 122 is seen: delineation 124 of chunk 122 found in one line (where spaces 102 precede word) is applied to find delineation 124 of paired chunk 122 in other line; delineation 124 seen with spaces 102 shown before second chunk 122 in context 111 is applied to show delineation 124 of second chunk 122 in text 110.

Index 121 seen is optionally generated from contents: delineation 124 is seen before second chunk 122 in context 111; delineation 124 is shown found before second chunk 122 in text 110; program 150 shown optionally constructs pairs 505 from contents.

FIG. 5F shows example of directly editable proportional fonts aligned via span method.

Aligner 555 controls alignment 123 of bitext 112 chunks 122 in textarea 100, all shown: text 110 seen with "edit chunks aligned in any style"; context 111 seen with "pixels measure proportional font positions"; index 121 seen right of textarea 100 with pair 505 values shown as "1:1 3:3 5:6".

Bitext 112 is seen with styles applied: strong style 118 shown with text 110; weak style 116 shown with context 111; multiple style controls seen with bitext 112.

UNICODE 113 seen is controlled in bitext 112: any variable width character in any writing system optionally applied.

Monospace font 115 seen is controlled in bitext 112: styles "courier", "mono" and such understood optionally applied, although not in the example shown.

Proportional font 114 seen is controlled in bitext 112: text 110 seen in font face "Times New Roman"; context 111 seen in font face "Arial".

Sizes in any variation are controlled in bitext 112: text 110 seen in strong style 118 size of "18 pt"; context 111 seen in weak style 116 size of "14 pt"; context 111 height seen is approximately 80% of text 110 height shown.

Contrast in strong 118 and weak 116 styles are seen: text 110 is seen in strong style 118 contrast against background color; context 111 is seen in weak style 116 contrast against background color.

Horizontal scale 117 control is seen: context 111 optionally seen at under 80% horizontal scale; text 110 optionally seen at 110% horizontal scale.

Bitext 112 is understood with styles applied; bitext 112 incorporating style controls understood applied throughout the disclosure.

Spaces 102 seen are controlled: four spaces 102 are seen before third context 111 word "proportional"; seven spaces 102 are seen before fifth context 111 word "positions".

Alignment 123 is shown: third context 111 word "proportional" with third text 110 word "aligned"; fifth context 111 word "positions" with sixth text 110 word "style".

Span method 512 is seen applied in aligner 555: pixel count applied to measure widths 567 seen as described in conjunction with FIG. 5I; alignment 123 seen controlled in multiple computing environments; any size, style and Unicode 113 font optionally applied.

Aligner 555 controls alignment 123 in real-time 189 shown; alignment 123 seen adapts to changes in styles 116,118: changes to either may affect widths 567; aligner 555 is applied upon any changes to styles 116,118.

WYSIWYG edit control 109 is seen: aligner 555 shown is applied in textarea 100; as with all figures shown, unless otherwise noted, bitext 112 contents shown are understood as edited directly.

FIG. 5G shows flowchart of a basic method to align bitext chunks from pairs in index.

Basic method 510 is seen to apply aligner 555 is seen: source 550 provides text 110, context 111, index 121, pairs 505, all shown.

Program 150 runs start 152 of loop 154, all shown; loop 154 sequentially processes pairs 505; pairs 505 seen are found in index 121 shown; if no next pair 505 is found, then program 150 shows end 156.

If next pair 505 found, widths 567 are seen measured: characters are optionally counted, then factored by ratio method; pixels are optionally counted between positions found by span or other method; any means to measure width 567 positions are understood as applicable.

Text 110 word is seen with width 567 measured: text 110 word represented as ":N" word number, found in index 121; numbered text 110 word is located within contents, then measured to find width 567 value, seen as "A".

Context 111 word is seen with width 567 measured: context 111 word is represented as "n:" word number, found in index 121; numbered context 111 word is located, then measured to find width 567 value, seen as "B".

Width difference 568 seen is found: context 111 "B" value is seen subtracted from text 110 "A" value; resulting "C" value is seen as width difference 568; width difference 568 shown is one of "0", ">O" or "<0".

If width difference 568 value is ">0", that same value is seen added before context 111 word; aligner 555 of pair 505 is seen.

If width difference 568 value is "<0", that same value is seen added in positive numbers before text 110 word; (it's understood the negative value is multiplied by "−1"); aligner 555 of pair 505 is seen.

If width difference 568 value is "0", then bump control 525 is seen applied; tdouble bump control 526 shown, as described in conjunction with FIG. 5Q is optionally applied; aligner 555 of pair 505 is seen.

Loop 154 is then seen performed; in all cases, after aligner 555 controls pair 505, and alignment 123 is shown, then program 150 continues loop 154, until end 156 seen.

FIG. 5H shows flowchart of ratio factoring within basic ABC control.

Ratio method 511 in aligner 555 is seen: basic method 510 is shown applied with ratio 569 defined and applied; source 550 provides text 110 context 111, index 121, pairs 505, all shown; program 150 seen start 152 is shown.

Styles 116, 118 are seen defined: strong style 118 in text 110 seen is defined in "font face" and "size"; weak style 116 in context 111 seen is defined in "font face" and 'size"; "horizontal scale" style 117 seen is optionally applied.

Ratio 569 seen is defined; for average width 567 found in each strong style 118 text 110 character, a number of weak style 116 context 111 characters are found.

Monospace font 115 is seen applied by ratio 569: same monospace font face is understood applied in both strong and weak styles 116, 118 shown; where, as example, two context 111 characters have equal width 567 of one text 110 character, then "2/1" ratio 569 found is applied in aligner 555 seen of alignment 123 shown; other example ratios 569, like "3/1", "4/1" and "3/2" and such are understood as applicable.

Proportional font 114 is seen applied by ratio 569: complex ratios 569 are found between variable-width proportional fonts 114; average character width 567, letter frequency, and width 567 of space 101 are factored; resulting fractional ratios 569 like "1.896/1" to yield approximate alignment 123 seen; proportional font 114 is better controlled under span method 512 seen below.

Loop 154 shown is applied: after ratio 569 defined, loop 154 finds next pair 505 shown in index 121 seen; if none found, the end 156 is seen in program 150 shown; if next pair 505 is found, program 150 continues loop 154 shown.

Width 567 to context 111 word is seen measured: next word in context 111 contents defined by "n:" value in pair 505 seen in index 121 shown; characters from start of line to start of word in context 111 counted.

Width 567 to text 110 word is seen measured: next word in text 110 contents defined by ":N" value in pair 505 seen in index 121 shown; characters from start of line to start of word in text 110 counted; resulting count seen factored by ratio 569.

Width difference 568 is seen compared: context 111 width 567 seen subtracted from ratio 569 factored text 110 wdth 567; width difference 568 shown is one of "0", ">O" or "<0".

If width difference 568 value is "<0", then width difference 568 is seen re-factored by ratio 569; width difference 568 is expressed in a number of spaces 102 in strong style 118; resulting spaces 102 seen are added before text 110 word; aligner 555 of pair 505 is seen.

If width difference 568 value is ">0", that same value is seen added before context 111 word; ratio 511 is understood optionally applied; aligner 555 is seen.

If width difference 568 value is "0", then bump control 525 is seen applied; double bump control 526 shown, as described in conjunction with FIG. 5Q is optionally applied; aligner 555 of pair 505 is seen.

Loop 154 is then seen performed; after aligner 555 of pair 505 is seen, then program 150 continues loop 154, until no next pair 505 found and end 156 is seen.

Ratio 569 seen is applied twice: first, to find common measure to differentiate width 567 to text 110 and context 111 words; second, to factor width difference 568 into spaces 102 within defined styles 116, 118.

Aligner 555 is seen applied with ratio method 511: for every pair 505, width difference 568 found is applied with aligner 555 to coordinate alignment 123 seen; ratio 569 is applied to measure and express width difference 568 within separate styles 118, 116 in text and context 110, 111.

FIG. 5I shows flowchart example of a span method to measure spaces required to align bitext chunks.

Span method 512 seen is applied with aligner 555; source 550 provides text 110, context 111, index 121, pairs 505, all shown;

Each pair 505 seen contains "N" value of numbered text 110 word; each pair 505 seen contains "n" value of numbered context 111 word; aligner 555 is applied to both words in each pair 505 found.

Program 150 is seen in start 152 shown: loop 154 seen applies aligner 555 to next pair 505.

Width 567 seen to text 110 word seen is found: text 110 word found in contents is shown put within html <SPAN> tag 565; get position control 566 is seen applied to find "left value" of text 110 word;

Width 567 seen to context 111 word seen is found: context 111 word found in contents is shown put within separate html <SPAN> tag 565; get position control 566 is seen applied to find "left value" of context 111 word.

Width difference 568 seen is compared: in comparison with width 567 value to context 111 word ("n:"), width 567 value to text 110 word (":N") is found to be "greater", "lesser" or "equal".

If width 567 to text 110 word is found "greater", then move control 509 seen is applied before context 111 word seen; if width 567 to text 110 word is found "lesser", then move control 509 is seen applied before text 110 word seen; if width 567 to text 110 word is found "equal", then bump control 525 seen is applied before context 111 word seen.

Move control 509 seen is applied incrementally: one space 101 seen is added before word being moved; widths 567 to text 110 word and to context 111 word are again compared.

If "width difference" 569 seen is found, then another space 101 is seen added before word being moved; widths 567 seen are compared again, until widths 567 are equal; if widths 567 are found equal, then alignment 123 is shown; aligner 555 of pair 505 is seen.

Loop 154 seen is repeated: after aligner 555 of pair 505 is seen, program 150 seen repeats loop 154 shown; if no next pair 505 is found, program 150 shows end 156.

FIG. 5A thru FIG. 5I above show aligner 555 forms and methods to align bitext 112 chunks 122 from index 121; FIG. 5J thru FIG. 5X show input 130 methods to control index 121 and alignment 123 of bitext 112 chunks 122 within ABC 500 system.

FIG. 5J shows flowchart example of pull control and associated controls.

Pull control 530, re-aligns chunk 122 in one line with previous word in other line, as shown in FIG. 5O; delete pair 505 control 532 under pull control 530 is shown in FIG. 5P; word array 428 control is seen applied in FIG. 5W; combined controls within pull control 530 are represented in flowchart described below.

Step 581 in flow represents program detection of removed character space 101 in text 110 or context 111; delete or backspace 104 key understood applied as input 130 within either context 111 or text 110;

Step 582 in flow represents word array 428 check for word number count; if the number of words is found to be reduced in either text 110 or context 111, then pair 505 values within chunk index 121 are adjusted in step 583, and then chunk index 121 is applied in alignment 123 of chunks 122 in step 589; if after backspace 104, number of words is not changed, the flow proceeds with step 584.

Step 583 in fLow represents chunk index 121 correction; if word array 428 finds one less word in contents in step 582, then subsequent values within pairs 505 in chunk index 121 are adjusted; for example if pairs 505 in chunk index 121 are "1:1" "2:3" "3:4", and then backspace 104 joins second and third text 110 words, pairs 505 in chunk index 121 are adjusted to "1:1" "2:2" "3:3"; after chunk index 121 adjustment, aligner 555 is applied within step 589.

Step 584 in flow represents spaces 102 count check within line where content was removed; program 150 detects if a space 101 was removed; if no space 101 is removed, for example if typo within word was corrected, then aligner 555 applies chunk index 121 in step 589; if a space 101 is found removed, flow proceeds with step 585.

Step 585 in flow represents definition of variable move-word 501; move-word 501 is understood as the word to move, in either text 110 or context 111; move-word 501 is optionally first in a string of words controlled as chunk 122; move-word 501 is always the word immediately right of caret 105 position after space 101 removal; move-word 501 is understood as controlled by number within pair 505 in chunk index 121; with move-word 501 number defined, flow proceeds with step 586.

Step 586 in flow represents definition of variable "pair-word" 502; pair-word 502 is the numbered word that's paired with move-word 501 within chunk index 121; under pull control 530, "−1" is subtracted from old pair-word 502 value found; chunk index 121 is set to align move-word 501 with previous word in other line, but first the new pair-word 502 value is checked in step 587.

Step 587 in flow represents check if new pair-word 502 is "busy" in chunk index 121; "busy" means new pair-word 502 value is found already in use within chunk index 121; "not busy" means new pair-word 502 value is not found used in chunk index 121; if new pair-word 502 is "not busy", then chunk index 121 is applied in alignment 123 step 589; if new pair-word 502 is "busy", then chunk index 121 is modified in step 588.

Step 588 represents delete pair 505 control; applied if new pair-word 502 is found busy, then the move-word 501 is not applied in chunk index 121; move-word 501 number is deleted from chunk index 121; busy pair-word 502 remains busy within existing pair 505; (an example of delete pair 505 control under pull control 530 is shown in FIG. 5P); chunk index 121 is then applied in alignment 123 control shown in step 589.

Step 589 represents real-time alignment 123 controlled with aligner 555; if a letter is removed within a word (step 584), aligner 555 is applied; if a word is removed from within a chunk 122 (step 583), aligner 555 is applied; if a chunk 122 is "pulled" to previous word in other line (step 587), aligner 555 is applied; if previous word in other line is busy 503, then paired move-word 501 and old pair-word 502 are deleted from chunk index 121 before aligner 555 is applied.

Step 589 aligner 555 applies defined methods: basic 510 method flow described in FIG. 5G, ratio 511 method flow described in FIG. 5H; span 512 method flow described in FIG. 5I; all methods understood incorporated within and optionally applied under aligner 555 control described in FIG. 5A-FIG. 5I; span 512 method understood as preferred.

Step 589 aligner 555 methods apply alignment 123 controls: wide alignment 123, as described in conjunction with FIG. 5B; trim alignment 123, as described in conjunction with FIG. 5C; bump control, as described in conjunction with FIG. 5E; "plaintext bitext 515", as described in conjunction with FIG. 5D-FIG. 5E.

Step 589 aligner 555 is understood as incorporated within ABC 500 control; as described in FIG. 5L-FIG. 5Z, ABC 500 control understood applied to arrange juxtaposition of chunks 122 within bitext 112 in real-time 189.

pull control 530 is understood; in a common use case, a single input 130 made before a bitext 112 chunk 122 in alignment 123 is interpreted to re-align said chunk 122 with previous in other line; flowchart shown is by example, and simplified for description purpose; it's understood that delete pair 505 control is optionally applied if width 576 to end of previous chunk 122 in other line is greater than width 576 of previous chunk 122 within the same line.

ABC 500 system is understood; pull control 530 applies word array 428 in text 110 and context 111; pairs 505 and pair 505 values within chunk index 121 are controlled; a chunk 122 is easily moved without affecting the alignment 123 of surrounding chunks 122; minimal input 130 provides maximum control of alignment 123 in bitext 112 chunks 122.

FIG. 5K shows example flowchart of push control and associated controls.

Push control 540 moves a chunk 122 into alignment 123 with next word in other line: an example of push control 540 is shown in FIG. 5N; an example of make pair control 542 under push control 540 is shown in FIG. 5M and FIG. FT; an example of merge pair control 544 under push control 540 is shown in FIG. 5U; an example of make pair 542 and merge pair 544 controls under push control 540 is shown in FIG. 5S; an example of make word 545 in word array 428 under push control 540 is shown in FIG. 5V; combined controls make pair 542, make word 545 and merge pair 544 under pull control 540 are represented in flowchart described below.

Step 590 in flow represents program detection of one space 101 added; one space 101 is understood added within one text 110 or context 111 line; (bitext 112 controls in text 110 and context 111 understood applied); added space 101 potentially creates new word, which is controlled as described in flow step 591.

Step 591 in flow represents word array 428 applied to count words; if word array 428 number check finds one added word in context 111 or text 110 line, then subsequent values within pairs 505 in chunk index 121 are adjusted as described in flow step 592; if no new word is found added, then flow proceeds with step 593.

Step 592 in flow represents chunk index 121 correction; if step 591 check word array 428 finds contents with one more word, then subsequent values within pairs 505 in chunk index 121 are adjusted; (for example if pairs 505 in chunk index 121 are "1:1" "2:3" "3:4", and space 101 added within first context 111 word makes new second word, then pairs 505 in chunk index 121 are adjusted to "1:1" "3:3" "4:4", with first chunk 122 in context 111 understood now to have two words); after chunk index 121 correction, aligner 555 is applied within step 599.

Step 593 in flow represents definition of variable "move-word" 501; move-word 501 is always the word immediately following caret 105; move-word 501 is always in one of text 110 or context 111 line; move-word 501 is defined as in number either as "n:" (context 111) or ":N" (text 110) in chunk index 121; pair-word 502 is then understood to be in the opposite line, and defined in flow step 595 and step 596, after chunk index 121 is checked in flow step 594.

Step 594 in flow represents chunk index 121 check if move-word 501 is busy or not busy; "busy" means move-word 501 value is found already used in chunk index 121; "not busy" means move-word 501 value is not found used in chunk index 121; if move-word 501 is busy, then variable pair-word 502 is defined in flow step 596; if move-word 501 is not busy, then make pair control 542 is applied as seen in flow step 595.

Step 595 in flow represents make pair control 542 make a new pair 505 in chunk index 121; as example, if chunk index 121 pairs 505 are 1:1 3:3, and space 101 added before second context 111 word, then new pair 505 with move-word 501 value "2:" would be applied in chunk index 121; variable pair-word 502 found in flow step 596.

Step 596 in flow represents the defining of variable pair-word 502 value; pair-word 502 value is found to apply in pair 505 with move-word 501 value found in step 595; various methods are applied to find pair-word 502 value: if move-word 501 is made under make pair control 542 in step 595, then add "+1" to previously applied pair-word 502, or measure content to find next word in pair 505 row; if move-word 501 is found busy in step 594, then add "+1" to old pair-word 502, so that applied chunk index 121 moves move-word 501 into alignment 123 with next word in other line; but first, chunk index 121 is checked in flow step 597.

Step 597 in flow represents check if new pair-word 502 is "busy" in check chunk index 121; "busy" means new pair-word 502 value is found already in use within chunk index 121; "not busy" means new pair-word 502 value is not found used in chunk index 121; as seen in examples shown in FIG. 5N, FIG. 5M and FIG. 5T, if new pair-word 502 is "not busy", then chunk index 121 is applied in alignment 123 step 599; if new pair-word 502 is "busy", then chunk index 121 is modified in flow step 588.

Step 598 in flow represents merge pair control 544; if pair-word 502 found busy in flow step 597, then the pair 505 in which pair-word 502 is found busy in deleted under merge pair control 544; move-word 501 and pair-word 502 remain as pair 505 in chunk index 121; move-word 501 in effect steals next pair-word 502 from next pair 505 before next pair 505 is deleted; (examples of this behavior are shown in FIG. 5S and FIG. 5U); modified chunk index 121 is then applied in flow step 599.

Step 599 in flow represents real-time alignment 123 controlled with aligner 555; if space 101 added makes new word, word array 428 is applied and chunk index 121 adjusted; if space 101 added before existing chunk 122, "+1" is added to existing pair-word 502 in chunk index 121; if space 101 added creates new chunk 122, pair-word 502 is found and new pair 505 added to chunk index 121; if pair-word 502 is found busy in next pair 505, next pair 505 is deleted from chunk index 121; in all cases, modified chunk index 121 is applied by aligner 555 to align bitext 112 chunks 122.

Step 599 in flow aligner 555 is understood to be same as Step 589 in FIG. 5J; same methods and controls are understood applied; same understanding of aligner 555 as incorporated within ABC 500 control.

Pull control 540 is understood; in a common use case, a single input 130 made before a bitext 112 112 chunk 122 in alignment 123 is interpreted to re-align said chunk 122 with next word in other line; flowchart shown is by example, and simplified for description purpose; optionally details such as last word control 548, where pair-word 502 may not exceed word count are excluded for brevity sake.

ABC 500 system is described in FIG. 5J-FIG. 5K flows, and FIG. 5L-FIG. 5Z examples; push control 540, in conjunction with word array 428, make word control 544, make pair control 542, and merge pair control 544 is understood as incorporated within ABC 500 system; ABC 500 system is shown to require minimal input 130 to maximize control of alignment 123 in bitext 112 chunks 122.

FIG. 5L shows a sample bitext before any make, push, merge, pull, delete controls are applied.

Aligning Bitext Chunks or ABC 500 system is shown: aligner 555 controls described in FIG. 5A-FIG. 5I understood incorporated within ABC 500 system; realignment controls described in FIG. 5M-FIG. 5Z understood as incorporated within ABC 500 system; alignment 123, and independent alignment 923 as described in conjunction with FIG. 9-FIG. 9W, of chunks 122 within bitext 112 seen throughout the disclosure understood as preferably controlled under ABC 500 system.

Same textarea 100, text 110, context 111, bitext 112 form, chunk index 121, aligner 555 from FIG. 5B are all seen; word array 428 shown understood always applied to control word numbers in text 110 and context 111; same contents text 110, "chunks in text", context 111 "align context chunks".

Pairs 505 in index 121 are changed: FIG. 5A and FIG. 5B show pair 505 values as "1:1 2:2 3:3"; FIG. 5L shows pair 505 values as "1:1"; alignment 123 is seen in first words of text 110 and context 111.

Chunks are 122 seen: "chunks in text" in text 110 is seen as one chunk 122; "align context chunks" in context 111 is seen as separate chunk 122; no separate chunk 122 is seen to start with second text 110 word "in"; no separate chunk 122 is seen to start with second context 111 word "context".

Caret 105 is seen in context 111 between first word "align" and second word "context"; no aligning is seen between said word "context" and any word in text 110; one space 101 is seen to separate said words "align" and "context".

FIG. 5M shows system make new pair in index, then align bitext chunks accordingly.

Same contents in same textarea 100 from previous figure are seen: same text 110, context 111, bitext 112, ABC system 500 all shown; changes in index 121, spaces 102, chunks 122 and alignment 123 all seen.

Input 130 total of one space 101 is shown: make control 542 and push control 540 both seen applied in index 121; spaces 102 made by aligner 555 form alignment 123.

Move-word 501 is seen as "2:" in index 121:caret 105 seen left of second context 111 word "context"; index 121 shows move-word 501 value represented as "2:".

Move-word 501 is understood as "not busy", as described in conjunction with FIG. 5K flow; value "2:" was not seen in FIG. 5L index 121; second context 111 word was not aligned in contents.

Make control 542 is seen: move-word 501 seen put in pair 505 as "2:"; pair-word 502 in same pair 505 seen as ":2"; pair-word 502 found under push control 540 seen, as described in conjunction with FIG. 5K.

Pair "2:2" is seen made in index 121; FIG. 5D shows pair 505 values "1:1"; FIG. 5E shows pair 505 values "1:1 2:2".

Index 121 is applied in aligner 555: second context 111 word set to align with second text 110 word.

Spaces 102 seen are added: eight spaces 102 seen added before second word "context" in context 111; no extra spacing seen added before second word "in" in text 110.

Chunks 122 seen are added; FIG. 5L shows no separate chunk 122 start with second context 111 word "context"; FIG. 5M shows second context 111 word "context" start separate chunk 122; FIG. 5L shows no separate chunk 122 start with second context 111 word "context"; FIG. 5M shows second text 110 word "in" start separate chunk 122.

Alignment 123 is seen in example: second text 110 word "in" with second context 111 word "context"; trim 521 alignment 123 shown understood applied in all examples, unless otherwise noted.

Make control 542 is understood; input 130 of one space 101 before a word within a chunk 122 is seen to write new pair 505 of chunks 122 into index 121, then apply index 121 in aligner 555 control of alignment 123.

FIG. 5N shows push control applied to push chunk into alignment with next word in other line.

Same contents in same textarea 100 from previous figure are seen: same text 110, context 111, bitext 112, aligner 500, ABC system 500 all shown; changes in index 121, spaces 102, chunks 122 and alignment 123 all seen.

Input 130 of one space 101 is seen: push control 540 seen to change pair 505 values in index 121; spaces 102 seen controlled aligner 555.

Move-word 501 is seen as "2:": caret 105 seen left of second context 111 word "context"; index 121 shows move-word 501 value represented as "2:".

Move-word 501 is understood as "busy", as described in conjunction with FIG. 5K flow; FIG. 5M index 121 shows value "2:" within second pair 505 value "2:2".

Push control 540 finds pair-word 502 value ":3"; FIG. 5M shows move-word 501 understood as "busy" with pair word ":2"; "+1" is added, resulting in pair-word 502 value ":3".

Pair-word 502 is understood as "not busy"; FIG. 5M index 121 shows no value ":3" in use; no merging is applied.

Pair 505 seen in index 121 is changed; FIG. 5M index 121 shows pair 505 values "1:1 2:2"; FIG. 5N index 121 shows pair 505 values "1:1 2:3"; second context 111 word "context" and third text 110 word "text" are set to align.

Spaces 102 are seen added; FIG. 5M shows "nine" spaces 102 before second context 111 word "context"; FIG. 5N shows "fifteen" spaces before same word "context".

Chunks 122 seen are changed: FIG. 5M shows chunks 122 in text 110 as "chunks" and "in text"; FIG. 5N shows chunks 122 in text 110 as "chunks in" and "text"; no change is seen to chunks 122 in context 111.

Alignment 123 seen is changed: second context 111 word "context" and third text 110 word "text" seen in alignment 123; pairs 505 in index 121 applied under aligner 555 shown.

Push control 540 is understood: input 130 of one space 101 before existing chunk 122 "pushes" that chunk 122 into alignment 123 with next word in other row; ABC system 500 seen modifies pairs 505 in index 121, then applies aligner 555 shown of alignment 123.

Last word 548 is seen controlled: last word 548 is seen in text 110 as third word "text"; last word 548 is seen in context 111 as third word "chunks"; push control 540 is optionally configured to stop at last word 548.

FIG. 5O shows pull control upon chunk to re-align it with previous word in other line.

Same contents in same textarea 100 from previous figure are seen: same text 110, context 111, bitext 112, ABC system 500 all shown; changes in index 121, spaces 102, chunks 122 and alignment 123 all seen.

Input 130 of one backspace 104 is shown before caret 105: pull control 530 seen to change pair 505 values in index 121; spaces 102 seen controlled by aligner 555 shown.

(Input 130 is understood to be applied optionally from any position within spaces 102 before move-word 501 shown within this example and all other examples.)

Move-word 501 is seen as "2:"; caret 105 seen left of second context 111 word "context"; index 121 shows move-word 501 value represented as "2:".

Move-word 501 is understood as busy, as described in conjunction with FIG. 5J flow; FIG. 5N index 121 shows value "2:" within second pair 505 value "2:3";

Pull control 530 finds pair-word 502 value ":2"; FIG. 5N shows move-word 501 understood as "busy" with pair word ":3"; "−1" is subtracted, as seen in pair-word 502 value ":2".

Pair-word 502 found is understood as "not busy"; FIG. 5M index 121 shows no value ":3";

no deletion is applied.

Pair 505 in index 121 is changed; FIG. 5N shows pair 505 values "1:1 2:3"; FIG. 5O shows pair 505 values "1:1 2:2"; second context 111 word and second text 110 word set to align.

Spaces 102 seen are changed: FIG. 5N shows "fifteen" spaces 102 before second text 110 word "context"; FIG. 5O shows "nine" spaces 102 before same word "context".

Chunks 122 seen are changed: FIG. 5N shows chunks 122 in text 110 as "chunks in" and "text"; FIG. 5O shows chunks 122 in text 110 as "chunks" and "in text"; no change is seen to chunks 122 in context 111.

Alignment 123 seen is changed: FIG. 5N shows second context 111 word "context" with third text 110 word "text"; FIG. 5O shows second context 111 word "context" and second text 110 word "in".

Pull control 530 is understood; input 130 of one backspace 104 before existing chunk 122 "pulls" that chunk 122 into alignment 123 with previous word in other line; ABC system 500 seen modifies pairs 505 in index 121, then applies aligner 555 shown of alignment 123.

FIG. 5P shows pull and delete control combine two pairs into one pair; a chunk is seen "pulled into" the previous chunk.

Same contents in same textarea 100 from previous figure are seen: same text 110, context 111, bitext 112, ABC system 500 all shown; changes in index 121, spaces 102, chunks 122 and alignment 123 all seen.

Input 130 total one backspace is seen: caret 105 seen before second context 111 word "context"; pull 530 and delete pair 532 controls seen to update index 121; each space 101 seen under aligner 555 shown.

Move-word 501 seen has temporary value "2:": right of caret 105 seen, second context 111 word "context"; index 121 shows move-word 501 value "2:", (struck-out per delete 532 control described below).

Move-word 501 is understood as "busy", as described in conjunction with FIG. 5J flow; FIG. 5O index 121 shows value "2:" used in second pair 505 value "2:2".

Pull control 530 finds pair-word 502 value ":1"; FIG. 50 shows move-word 501 understood as "busy" with pair word ":2"; "−1" subtracted leaves pair-word 502 seen with value ":1", (struck-out as per delete 532 control described below).

Pair-word 502 is understood as "busy"; FIG. 5O index 121 shows value "1:" used in first pair 505 value "1:1".

Delete control 532 seen is applied: FIG. 5O index 121 shows pair 505 values "1:1 2:2"; FIG. 5P index 121 shows pair 505 value "1:1".

Strike out in second pair 505 value "2:1" represent deletion of said pair 505; move-word 501 and pair-word 502 are understood as deleted from index 121.

Index 121 seen is applied in aligner 555 shown: first context 111 word set to align with first text 110 word.

Spaces 102 are seen changed; FIG. 5O shows "nine" spaces 102 before move-word 501 "context"; FIG. 5P shows "one" space 101 before same word "context".

Chunks 122 seen are changed; FIG. 5O shows chunks 122 in text 110 as "chunks" and "in text"; FIG. 5P shows chunk 122 in text 110 as "chunks in text"; FIG. 50 shows chunks 122 in context 111 as "align" and "context chunks"; FIG. 5P shows chunk 122 in context 111 as "align context chunks".

Alignment 123 seen is changed: FIG. 5O shows second context 111 word "context" and second text 110 word "in"; FIG. 5P shows no aligning between same words "context" and "in".

Delete control 532 is understood; input 130 of one backspace 104 before chunk 122 applies pull control 530; pull control 530 finds pair-word 502 understood as "busy"; ABC system 500 seen deletes this pair 505 from index 121, then applies aligner 555 shown of alignment 123.

FIG. 5Q shows incidental alignment differentiated via double bump control.

Same contents in same textarea 100 from previous figure are seen: same text 110, context 111, bitext 112, ABC system 500 all shown; changes in index 121, spaces 102, chunks 122 and alignment 123 all seen.

Input 130 of one space 101 is seen: caret 105 seen before third context 111 word "chunks"; make pair 542 and push 540 controls seen to update index 121; spaces 102 seen added under aligner 555 shown.

Make pair control 542 makes new pair 505 value "3:2" seen: move-word 501 "3:" in context 111 understood "not busy" in FIG. 5P index 121; pair-word 502 ":2" in text 110 made from "+1" added to previous pair 506 ":1" found; pair-word 502 value ":2" understood as "not busy" in FIG. 5P index 121; pair 505 value "3:2" seen made in index 121.

Index 121 seen is applied under aligner 555 shown: third context 111 word and second text 110 word set to align.

Spaces 102 seen are changed: FIG. 5P shows "one" space 101 before third context 111 word "chunks"; FIG. 5Q shows "three" spaces 102 before third context 111 word "chunks"; FIG. 5P shows "one" space 101 before second text 110 word "in"; FIG. 5Q shows "two spaces 102 before second text 110 word "in".

Chunks 112 seen are changed: FIG. 5P shows chunk 112 "chunks in text" in text 110; FIG. 5Q shows chunks 112 "chunks" and "in text" in text 110; FIG. 5P shows chunk 112 "align context chunks" in context 111; FIG. 5Q shows chunks 112 "align context" and "chunks" in context 111.

Alignment 123 seen is changed: FIG. 5P shows no aligning of third context 111 word "chunks" and second text 110 word "in"; FIG. 5Q shows third context 111 word "chunks" and second text 110 word "in" in alignment 123.

Double bump control 526 is seen: spaces 102 seen added before move-word 501; spaces 102 seen added before pair-word 502.

Delineation 124 is seen before chunks 122:delineation 124 is seen before second chunk 122 "chunks" in context 111; delineation 124 is seen before second chunk 122 "in text" in text 110.

Alignment 123 shown is clearly defined; incidental alignment 529, as described in conjunction with FIG. 5E, is controlled;

text 110 and context 111 words within chunks 122 may appear to be aligned but not controlled in alignment 123; double bump 526 control clearly defines alignment 123.

As described in conjunction with FIG. 5E, bump control 525 (not seen) is optionally applied to differentiate incidental alignment 529 from alignment 123; double bump 526 now seen provides same differentiation.

FIG. 5R shows incidental alignment differentiated via single bump control.

FIG. 5R is almost identical to FIG. 5Q: same instant modification from previous state seen in FIG. 5P; same text 110 and context 111 contents seen; same input 130 of one space 101 seen; same make pair 542 seen applied; same move-word 501 value "3:" shown found; same pair-word 502 value ":2" shown found; same index 121 with same pair 505 value "1:1 3:2" seen; same third context 111 word "chunks" set to align with second text 110 word "in"; same case of incidental alignment 529 (not shown) differentiated from alignment 123.

Spaces 102 seen are changed: FIG. 5Q shows "three" spaces 102 before third context 111 word "chunks"; FIG. 5R shows "two" spaces 102 before third context 111 word "chunks"; FIG. 5Q shows "two" spaces 102 before second text 110 word "in"; FIG. 5R shows "one" space 101 before second text 110 word "in".

Alignment 123 is slightly changed: FIG. 5Q shows at least two spaces 102 before both text 110 and context 111 words; FIG. 5R shows two spaces 102 before context 111 word, one space 101 before text 110 word.

Delineation 124 seen is same: delineation 124 is seen before second chunk 122 "chunks" in context 111, and also before second chunk 122 "in text" in text 110.

Trim alignment 521 form seen controls delineation 124: as shown in FIG. 5E, delineation 124 seen before chunk 122 preceded by spaces 102 is applied to find delineation 124 shown before paired chunk 122 in other line; chunk 122 in other line preceded on one space 101, and also seen with delineation 124.

Bump control 525 is shown: alignment 123 is differentiated from incidental alignment 529; text 110 holds constant position, as no extra space is seen required; slight inset results in imperfect but useful alignment 123 seen.

FIG. 5S example shows make and merge controls combined; a chunk is seen made and merged into the next pair.

Same contents in same textarea 100 from previous figure are seen: same text 110, context 111, bitext 112, ABC system 500 all shown; changes in index 121, spaces 102, chunks 122 and alignment 123 all seen.

Input 130 total one space 101 is seen: caret 105 seen before second context 111 word "context"; make 542 and merge 544 controls seen applied in index 121; alignment 123 formed under aligner 555 shown.

Move-word 501 is seen as "2:": caret 105 seen before second context 111 word "context"; index 121 shows move-word 501 value represented as "2:".

Move-word 501 is understood as "not busy", as described in conjunction with FIG. 5K: value "2:" was not seen in FIG. 5R index 121; second context 111 word was not aligned in contents.

Make control 542 is seen: move-word 501 seen put in pair 505 as "2:"; pair-word 502 in same pair 505 seen as ":2"; pair-word 502 found as described in conjunction with FIG. 5K.

Pair-word 502 is shown understood as "busy": FIG. 5R shows value ":2" in pair 505 value "3:2".

Merge control 544 is seen: index 121 shows next pair 505 values "3:2" struck out to represent deletion.

Index 121 seen is changed: FIG. 5R shows index 121 with pair 505 values "1:1 3:2"; FIG. 5S shows index 121 with pair 505 values "1:1 2:2".

Aligner 555 seen applies index 121: second context 111 word is set to align with second text 110 word.

Spaces 102 seen are changed: FIG. 5R shows "two" spaces 102 before third context 111 word "chunks"; FIG. 5S shows "one" space 101 before third context 111 word "chunks"; FIG. 5R shows "one" space 101 before second context 111 word "context"; FIG. 5S shows "nine" spaces 102 before second context 111 word "context".

Chunks 122 seen are changed: FIG. 5R shows chunks 122 in context 111 as "align context" and "chunks"; FIG. 5S shows chunks 122 in context 111 as "align" and "context chunks"; no changes are seen to chunks 122 in text 110.

Alignment 123 seen is changed: FIG. 5R shows third context 111 word "chunks" in alignment 123 with second text 110 word "in"; FIG. 5S shows second context 111 word "context" in alignment 123 with same text 110 word "in".

Make 542 and merge 544 controls are understood; single input 130 before word within chunk 122 makes new pair 505; pair-word 502 in new pair 505 is understood as "busy" in next pair 505; merge control 544 deletes next pair 505; aligner 555 applies pairs 505 in index 121 to form alignment 123 of bitext 112 chunks 122.

FIG. 5T example shows input in either text or context line applied in ABC system; make control is shown as example.

Same contents in same textarea 100 from previous figure are seen: same text 110, context 111, bitext 112, ABC system 500 all shown; changes in index 121, spaces 102, chunks 122 and alignment 123 all seen.

Input 130 total one space 101 is seen: caret 105 seen before third text 110 word "text"; make control 542 seen to change pair 505 values shown in index 121; alignment 123 formed under aligner 555 shown.

Move-word 501 is seen as ":3": caret 105 seen left of third text 110 word "text"; index 121 shows move-word 501 value "3:" in pair 505 value "3:3".

Move-word 501 is understood as "not busy", as described in conjunction with FIG. 5K; value ":3" was not seen in FIG. 5L index 121; third text 110 word was not aligned in contents.

Make control 542 makes pair 505 values "3:3": move-word 501 shown in third pair 505 as ":3"; pair-word 502 shown in third pair 505 as "3:"; pair-word 502 found as described in conjunction with FIG. 5K.

Pair-word 502 is understood as "not busy"; FIG. 5S index 121 shows no context 111 word number "3:"; FIG. 5S third context 111 word "chunks" understood as "not busy"; no merge is seen.

Index 121 seen is changed: FIG. 5S shows pair 505 values "1:1 2:2"; FIG. 5T shows pair 505 values "1:1 2:2:3:3";

Aligner 555 seen applies index 121:second context 111 word and second text 110 word set to align; third context 111 word and third text 110 word set to align.

Spaces 102 seen are changed: FIG. 5S shows "one" space 101 before third text 110 word "text"; FIG. 5T shows "two" spaces 102 before third text 110 word "text".

Chunks 122 seen are changed: FIG. 5S shows chunks 122 in text 110 as "chunks" and "in text"; FIG. 5T shows chunks 122 in text 110 as "chunks", "in", and "text"; FIG. 5S shows chunks 122 in context 111 as "align" and "context chunks"; FIG. 5T shows chunks 122 in context 111 as "align", "context", and "chunks".

Alignment 123 seen is changed: FIG. 5S shows third text 110 word "text" unaligned and understood as "not busy"; FIG. 5T shows third text 110 word "text" and third context 111 word "chunks" in alignment 123.

ABC system 500 is seen controlled from either line: input 130 in either text 110 or context 111 line made; system 500 controls, including push controls 540 as described in conjunction with FIG. 5K and push controls as described in conjunction with FIG. 5J are understood as applicable within either text 110 or context 111 line.

FIG. 5U example shows push and merge controls applied to merge a chunk into the next pair.

Same contents in same textarea 100 from previous figure are seen: same text 110, context 111, bitext 112, ABC system 500 all shown; changes in index 121, spaces 102, chunks 122 and alignment 123 all seen.

Input 130 of one space 101 is seen: caret 105 seen before second context 111 word "context"; push 540 and merge 544 controls change pair 505 values, all seen; alignment 123 formed under aligner 555 shown.

Move-word 501 shown is understood as "busy", as described in conjunction with FIG. 5K flow: after caret 105, move-word 501 "context" is also seen as value "2:" in second pair 505; FIG. 5T shows same word and number understood as "busy" within pair 505 value "2:2".

Pair-word 502 shown is understood as "busy": push control 540 adds "+1" to pair-word 502 found; resulting pair-word 502 seen as text 110 word number ":3"; pair-word 502 value ":3" understood as "busy" in FIG. 5T within pair 505 value "3:3".

Merge control 544 is seen; strike-out appearing in pair 505 numbers "3:3" represent deletion; next pair 505 seen is deleted under merge control 542; move-word 501 value "2:" and pair-word 502 value ":3" are seen in pair 505 value "2:3".

Index 121 seen is changed: FIG. 5T index 121 shows pair 505 values "1:1 2:2 3:3"; FIG. 5*u* index 121 shows pair 505 values "1:1 2:3"; second context 111 word and third text 110 word are set to align.

Aligner 555 seen applies index 121: third text 110 word "text" and context 111 word "chunks" are set to align.

Spaces 102 seen are changed: FIG. 5T shows nine spaces 102 before second context 111 word "context"; FIG. 5U shows fifteen spaces 102 before same word "context"; FIG. 5T shows two spaces 102 before third text 110 word "text"; FIG. 5U shows one space 101 before same word "text".

Chunks 122 seen are changed: FIG. 5T shows chunks 122 in text 110 as "chunks", "in", and "text"; FIG. 5U shows chunks 122 in text 110 as "chunks in" and "text"; FIG. 5T shows chunks 122 in context 111 as "align", "context", and "chunks"; FIG. 5S shows chunks 122 in context 111 as "align context" and "chunks";

Alignment 123 seen is changed: FIG. 5T shows second context 111 word "context" and second text 110 word "in" in alignment 123; FIG. 5T shows third context 111 word "chunks" and third text 110 word "text" in alignment 123; FIG. 5U shows second context 111 word "context" and third text 110 word "text" in alignment 123.

Push control 540 and merge 544 control combination is understood: input 130 of space 101 before chunk 122 pushes chunk 122 to next word in other line; next word in other line understood as "busy" within next pair 505 of aligned chunks 122; move-word 501 takes pair-word 502 from next chunk 122; merge control 544 deletes next chunk 122; aligner 555 applies index 121 to form alignment 123.

FIG. 5V example shows word array applied while adding a word within a chunk; words are renumbered; numbers in pairs revised; alignment in next chunks constant.

FIG. 5V shows edit changes made to previous state seen in FIG. 5U: text 110, context 111, bitext 112 in textarea 100 controlled by ABC system 500, all shown; context 111 contents seen edited; changes to index 121, spaces 102, chunk 122, all seen; alignment 123 seen in contents is held constant.

Input 130 addition of one new word is seen; FIG. 5*u* shows first chunk 122 in context 111 as "align"; FIG. 5V shows first chunk 122 in context 111 as "line of"; one space 101 is added within first chunk 122 in context 111.

Context 111 word numbers change under word array 428 control: FIG. 5U shows three words in context 111; "align" is word number "1:", "context" is word number "2:", "chunks" is word number "3:"; FIG. 5V shows four words in context 111; "line" is word number "1:"; "of" is word number "2:"; "context" is word number "3:"; "chunks" is word number "4:".

Index 121 is changed accordingly; FIG. 5U shows index 121 values "1:1 2:3", FIG. 5V shows index 121 values "1:1 3:3"; context 111 word number within second pair 505 is changed from "2:" to "3:".

Aligner 555 seen applies index 121:third context 111 word and third text 110 word set to align.

Spaces 102 are changed; FIG. 5*u* shows "fifteen" spaces 102 before second context 111 word "context", FIG. 5V shows "thirteen" spaces 102 before same word "context".

A chunk 122 is changed; FIG. 5U shows first chunk 122 in context 111 as "align"; FIG. 5V shows first chunk 122 in context 111 as "line of"; chunks 122 in text 110 are unchanged.

Alignment 123 of chunk 122 contents is seen controlled in examples; FIG. 5*u* shows second context 111 word "context" and third text 110 word "text"; FIG. 5V shows third context 111 word "context" and third text 110 word "text"; after word added within chunk 122, same contents in next pair 505 remain in alignment 123.

Word array 428 is understood: input 130 of new word added within chunk 122 in either context 111 or text 110; subsequent words renumbered under word array 428 control; values within subsequent pairs 505 changed accordingly; index 121 applied by aligner 555 forms alignment 123.

FIG. 5W example shows word number control applied while removing a word within a chunk; words renumbered; numbers in pairs revised; alignment in next chunks constant.

FIG. 5W shows edit changes made to previous state seen in FIG. 5*u*: text 110, context 111, bitext 112 in textarea 100 controlled by ABC system 500, all shown; text 110 contents seen edited; changes to index 121, spaces 102, and one chunk 122 all seen; alignment 123 seen as constant in subsequent pairs of chunk 122 contents.

Input 130 removal of one word is seen: FIG. 5V shows first chunk 122 in text 110 as "chunks in"; FIG. 5W shows first chunk 122 in text 110 as "chunking"; one space 101 removed between words within first chunk 122 in text 110 seen.

Word array 428 is seen applied in text 110; FIG. 5V shows "three" words in text 110; "chunks" is word number ":1", "in" is word number ":2", "text" is word number ":3"; FIG. 5W shows two" words in text 110; "chunking" is word number ":1", "text" is word number ":2".

Index 121 is changed accordingly: FIG. 5V shows index 121 values "1:1 3:3"; FIG. 5W shows index 121 values "1:1 3:2"; text 110 word number within second pair 505 seen changed from ":3" to ":2".

Aligner 555 seen applies index 121: third context 111 word and second text 110 word set to align.

Spaces 102 are changed: FIG. 5V shows "thirteen" spaces 102 before third context 111 word "context"; FIG. 5W shows "eleven" spaces 102 before third context 111 word "context".

A chunk 122 is changed; FIG. 5V shows first chunk 122 in text 110 as "chunks in"; FIG. 5W shows first chunk 122 in text 110 as "chunking"; chunks 122 in context 111 are unchanged.

Alignment 123 is controlled: FIG. 5V shows third context 111 word "context" and third text 110 word "text" in alignment 123; FIG. 5W shows third context 111 word "context" and second text 110 word "text" in alignment 123; after word removed from chunk 122, same contents in next pair 505 remain in alignment 123.

Word array 428 control is understood: input 130 removal of word held within a chunk 122 from either context 111 or text 110 seen; subsequent words renumbered under word array 428 control; values within subsequent pairs 505 changed accordingly; index 121 applied by aligner 555 forms alignment 123.

FIG. 5X example shows a space-fill control to fill context with spaces, and an align caret control to align caret with any text word.

FIG. 5X shows ABC system 500 applied with space-fill 518 control and align caret 519 control, both seen: push 540 and pull 530 controls applied to control caret 105 in alignment 123 with text 110, all seen.

Textarea 100 is seen with contents in bitext 112 format: text 110 contents seen as "line full of empty spaces"; context 111 contents seen as filled with empty spaces 102 under space-fill control 518 shown; index 121 seen with pair 505 values “0:0”, (shown for description)

Aligner 555 is shown; ratio method 511, as described in conjunction with FIG. 5H is optionally applied; adapted span method 512, as described in conjunction with FIG. 5I is preferably applied.

Space-fill control 518 is seen: space-fill control 518 finds width 567 seen in total text 110 contents; space-fill control 518 controls number of spaces 102 in context 111; context 111 width 567 controlled with at least same width 567 as text 110.

Align caret control 519 is applied: caret 105 seen represented in five potential positions; each caret 105 position represented seen in alignment 123 with words in text 110; pointer 182 shown optionally places caret 105 anywhere within context 111; align caret control 519 is understood to reposition caret 105 to nearest alignment 123 position seen.

Push control 540 seen is understood as applicable; from any caret 105 position within context 111, under align caret control 519 seen, push control 540 is understood to reposition caret 105 into alignment 123 with next text 110 word.

Pull control 530 seen is understood as applicable; from any caret 105 position within context 111, under align caret control 519 seen, pull control 530 is understood to reposition caret 105 into alignment 123 with previous text 110 word.

Caret 105 is understood as controlled in alignment 123; caret 105 put anywhere in context 111 is moved into alignment 123 with nearest text 110 word; under align caret control 519, push control 540 moves caret 105 to next text 110 word, pull control 530 moves caret 105 to previous text 110 word.

Input 130 is understood to start from alignment 123:align caret control 519 selectively puts caret 105 into alignment 123 with text 110 words shown; ABC system 500 shown provides maximum control in alignment 123 with minimal input 130.

Index 121 with pair 505 value “0:0” seen represents no context 111 words yet set to align with text 110 words.

FIG. 5X also shows previous state before another control shown in FIG. 5Y is applied: space fill control 518 shown fills context 111 with spaces 102 to width 567 of text 110; align caret control 519 puts caret 105 in alignment 123 with any word in text 110.

FIG. 5Y example shows selective context contents added within space-filled context line; space-fill controls width of spaces equal to width of text line.

FIG. 5Y shows WYSIWYG 109 edit changes made to previous state seen in FIG. 5X: same ABC system 500, space-fill 518, align caret 519 controls in same textarea 100, all shown; same text 110 contents in same bitext 112 format, all seen.

Changes to context 111, index 121, spaces 102, chunks 122 are all seen; alignment 123 seen under aligner 555 is shown.

Align caret control 505 controls input 130 start position seen: pointer 182 seen positioned within context 111; closest start point of word in text 110 above seen as third word “of”; caret 105 understood moved to alignment 123 with nearest text 110 word, seen as third word “of”.

Input 130 is seen under WYSIWYG 109 edit control; context 111 contents seen added as “add context”.

Make control 542 is seen: move-word 501 seen in first context 111 word “add” seen as move-word 501 within pair 505 value “1:3” shown; third text 110 word “of” seen as pair-word 502 within pair 505 value “1:3” shown.

Index 121 seen is changed: FIG. 5X shows pair 505 values “0:0”; FIG. 5Y shows pair 505 values “0:1 1:3”.

Alignment 123 is seen: first context 111 word “add” and third text 110 word “of” seen in alignment 123.

Chunks 122 are seen: chunks 122 in text 110 are seen as “line full” and “of empty spaces”; chunk 122 in context 111 is seen as “add context”.

Blank chunk control 517 is seen: blank chunk 517 seen within spaces 102 before first chunk 122 in context 111; blank chunk 517 also seen within pair 505 value “0:1”; first text 110 chunk 122 seen controlled in pair with blank chunk 517 in context 111.

Spaces 102 seen are controlled: “twenty” spaces 102 seen before first context 111 word “add”; “nineteen” spaces 102 seen after chunk 122 in context 111.

Space-fill control 518 seen is applied: FIG. 5X shows “fifty” total spaces 102 in context 111; FIG. FY shows “twenty” spaces 102 before, and “nineteen” spaces 102 after context 111 chunk 122; string “add context” added in context 111 chunk 122 contains “eleven” characters (including space 101); “eleven” trailing spaces 102 understood deleted from end of context 111 line; text 110 and context 111 lines seen with equal width 567.

Align caret control 519 is seen: “two” spaces 102 seen as input 130 after context 111 chunk 122 “add context”; caret 105 seen in alignment with fifth text 110 word; push control 540 under align caret control 519 seen; caret 105 seen in alignment 123 with next and fifth text 110 word “spaces”; any further input 130 of contents would start from alignment 123 seen.

Space-fill control 518 is understood; should future input 130 add contents from caret 105 position seen, width 567 of said contents added would be found; same found width 567 would be measured in a number of spaces 102; number of spaces 102 found would be removed from end of content 111; context 111 thus never has less width 567 than text 110.

ABC system 500 applies comprehensive controls: space-fill control 518 provides spaces 102 within which selective context 111 is entered as input 130; caret align control 519 sets start point of said input 130 from alignment 123; aligner 555 applies index 121 of pairs 505 to form alignment 123; ABC system applies pull 530, delete 532, push 540, make 542, merge 544 controls in index 121.

FIG. 5Z example shows ABC system applied in non-space delineated writing systems.

FIG. 5Z example shows Chinese and English writing systems: source 550 seen put into textarea 100 shown; proportional font 114 and Unicode 113 characters seen; strong and weak styles 116, 118 seen in bitext 112 shown.

Index 121 seen with pair 505 values “1:1” and “4:4” shown; text 110 contents shown as “你想说什么?” context 111 contents shown as “you try say is what?”

Chunks 122 are seen: text 110 chunks 122 “你想说” and “什么?” shown; context 111 chunks 122 “you try say” and “is what?” shown.

Alignment 123 is seen: aligner 555 seen to apply span method 512 shown; first character “你” in text 110 and first word “you” in context 111 seen in alignment 123; fourth character “什” in text 110 and fourth word “is” in context 111 seen in alignment 123; bump control 525, as described in conjunction with FIG. 5R is understood as applicable.

Spaceless form 516 of alignment 123 is seen: no space 101 seen between chunks 122 in text 110; no space 101 seen between words in text 110; single space 101 word separation seen in context 111 is not required.

Word array 428 is seen: writing systems such as Chinese, Japanese, Thai don’t use space 101 between words; within scriptio continua 514 writing systems, two methods optionally apply word array 428.

Characters are optionally counted and indexed: as example for description purpose, "you try say is what" may be rendered in scriptio continua 514; "youtrysayiswhat" contains "fifteen" characters, "five" words, no space 101; word array 428 by "character" would represented in pair 505 value "10:" in index 121, where value "10:" represents tenth character in context 111, and first letter of word "is".

Single space 101 optionally separates words hidden in source 550: "你想说 什么 ?" source 505, as example, contains five characters, two compound "words", one space 101; index 121 control by "word" would be represented in pair 505 value ":2"; added space 101 optionally hidden while source 505 controlled in textarea 100 as bitext 112.

Combination is optionally applied, as in example: word array 428 for text 110 word ":4" in pair 505 seen is numbered by "character" count; word array 428 for context 111 word "4:" in pair 505 seen is numbered by "space" 101 separation in source 550.

Word array 428 is applied: whether found by single space 101 separation, character count, or combination thereof, word array 428 is optimized for specific writing systems used.

Pairs 505 of numbered words are controlled: one numbered word in context 111 per pair 505; one numbered word in text 110 per pair 505; all separate pairs 505 controlled in index 121.

Index 121 is applied by aligner 555: alignment 123 seen controlled in spaceless 516 form; alignment 123 understood controlled in other forms; other forms understood as wide form 522 seen in FIG. 5B or trim form 521 seen in FIG. 5C.

Scriptio continua 514 seen is controlled; alignment 123 seen controlled with no space 101 or spaces 102 between words or chunks 122; delineation 124 between chunks 122 seen in both text 110 and context 111.

Same ABC system 500 seen is applied: word array 428 applied in text 110 and context 111; words in text 110 and context 111 controlled in pairs 505 in index 121; aligner 555 of alignment 123 formed from index 121.

Minimal input 130 controls index 121:push control 540 and pull control 530 as described in conjunction with FIG. 5K-FIG. 5J flows understood applied.

Input 130 methods are optionally configured: keyboard 132 keystroke of space 101 and backspace 104 applied with space 101 delineated words; said space 101 and backspace 104 inputs 130 optionally applied in scriptio continua 588 systems, where input 130 applied in bitext 112 format controls space 101 and spaces 102 in source 550; other keyboard 132 keys, such as "F2" and "F4" arranged to apply ABC system 500 controls.

Minimal input 130 maximizes ABC system 500 control: as example, "F2" key optionally configured to apply push 540, make 542 and merge 544 controls; "F4" key optionally configured to apply pull 530 and delete 532 controls.

Input 130 via microphone 136 seen is optionally configured: from caret 105 position defined by pointer 182 shown, vocal command input 130 is optionally applied; as examples, a vocalized command understood as "push" optionally applies push 540 control; a vocalized command understood as "pull" optionally applies pull 530 control; same controls in ABC system 500 are applied from separately configured options of input 130.

FIG. 6A shows source needed to synchronize parts in context 111 with parts in timed text 110.

Tie control 600 source 650 seen in textarea 100 includes five resources: media link 148 seen included on first row; timings 220 context 111 seen included on second row; text 110 seen on third row; translation 192 context 111 seen on fourth row; tie links 620 seen on fifth row.

three context 111 forms are seen: above text 110, timings 220 context 111; below text 110, translation 192 context 111; below translation 192 tie links 620 context 111 (separately aligned with translation 192 context 111, as described below)

Chunk array 121 is seen: one single pair 505 of two chunks 122 shown; first chunk 122 understood in text 110; second chunk 122 understood in translation 192 context.

BSA control seen applies two separate 3D arrays 432;

first 3D array 432 controls separate timings 220 context 111 with text 110; second 3D array 432 controls separate tie link 620 context 111 with translation 128.

Segments 210 and words 128 are seen in text 110 and translation 192 context 111: 3D array 432, as described in conjunction with FIG. 4P, is understood to control coordinated segment array 202, word array 428, line array 404; words 128 and segments 210 within words are controlled in alignment 123 (not shown).

Nine timings 220 are seen: timings 220 values "0.11" "0.33" "0.77" "0.88" "1.11" "1.33" "1.55" "1.77" "1.99" "2.22" seen understood in seconds; each timing 220 seen in correspondence 456 with segment 210 in text 110.

Nine segments 210 in text 110 are seen: text 110 contents "llor-ó a vec-es la flor-ec-ita" seen; syllabification 301 (not shown) understood applied; nine segments 210 within five syllabified words 128 understood as seen.

Six segments 210 in translation 192 context 111 are seen: translation 192 context 111 contents "some-times the little flower cried" seen; segment marker 211 seen within word 128 "some-times" applied manually; each word 128 shown counted as one segment 210, unless further segmented; six total segments 210 in translation 192 context 111 seen.

Six tie maker 620 values "2 3 4 5b 5 1" are seen; each tie link 620 value understood to correspond with word 128 or segment 210 in translation 192 context 111.

Figure 6B:
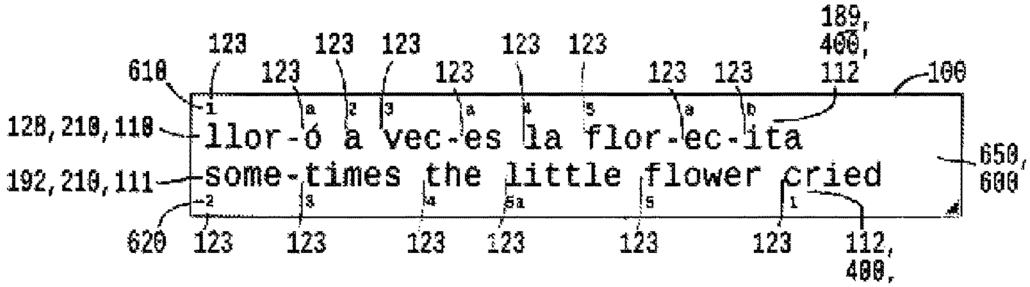
FIG. 6B shows tie index aligned with segments in text, and ties aligned with segments in context.

Source 650 is modified in edit interface seen in FIG. 6B under tie segments 600 control.

FIG. 6B shows tie index aligned with segments in text, and ties aligned with segments in context.

Same text 110, translation 192 context 111 and tie links 620 are seen in same textarea 100, under same controls shown in FIG. 6A, with additional bitext 112 control shown applied: second row shows same text 110 seen in third row within FIG. 6A; third row shows same translation 192 context 111 seen within fourth row FIG. 6A; fourth row shows same tie link 620 contents seen within fifth row in FIG. 6A; timings 220 and media link 148 (not seen) understood applied from hidden in tie source 650 shown.

Tie index 610 is seen in textarea 100; 3D array 432 seen represents words 128 as numbers, and segments 210 within words 128 as letters in optional notation; letters after numbers are understood as multiple segments 210 within words 128: "a" seen after number "1" is understood as "1a" and second segment 210 within "first" word 128; "b" seen after number "5" is understood as "5b" and third segment 210 within "fifth" word 128.

Tie index 610 is with correspondence 456; words 128 and segments 210 within text 110 are applied to mechanically generate tie index 610; a form of correspondence 456, similar to that described in conjunction with FIG. 4E-FIG. 4L, is applied; edits in text 110 are applied by program 150 (not shown) to generate aligned tie index 610 in real-time 189 shown.

BSA control 400 shown applies separate 3D arrays 432 in separate alignments 123 seen; tie index 610 and segments

210 in text 110 are controlled in separate alignments 123; tie links 620 and segments 210 in translation 192 context 111 are controlled in separate alignments 123; alignments 123 under BSA control 400 are understood applied in real-time 189 shown.

Separate 3d arrays 432 seen form separate alignments 123: as examples, third text 110 word 128 "vec-es" seen in separate alignment 123 with tie index 610 value "3"; third translation 192 context 111 segment 210 "the" seen in separate alignment 123 with tie link 620 value "4".

Tie link 620 values are optionally generated in conjunction with input 130 (not seen): input or selection 255 (not seen) via pointer 182 (not seen) within segment(s) 210 in text 110; click in conjunction with keyboard 130 (not seen) keystroke applied to translation 192 context 111 segment 210; tie link 620 value understood automatically generated by program 150 (not seen).

Tie index 610 guides edit controlled within tie link 620 row; alignment 123 of tie index 610 above text 110 provides reference to apply tie link 620 row below context 111; as example, second and third segments 210 "ec-" and "ita" within fifth text 110 word "florecita" are seen in alignment 123 with index 610 value "5a"; same segment 210 "ita" is seen represented in fourth tie link 620 value "5a".

Tie control 600 synchronizes segments 210 in context 111 with segments 210 in text 110, as shown below; edits in tie links 620 tie together segments 210 in translation 192.

context 111 with segments 210 in text 110; index 610 is applied as reference while editing tie links 620 in rows below translation 192 context 111.

Figure 6C:
FIG. 6C shows ties applied in tied playback of segments in text and translation context.

FIG. 6C shows ties applied in tied playback of segments in text and translation 192 context.

Same source 650 is seen in same textarea 100 from FIG. 6B, understood with same controls; first row shows same text 110 contents seen in FIG. 6B second row; second row shows same translation 192 context 111 contents seen in FIG. 6B third row; bitext 112 format seen; context 111 seen optionally centered under text 110; single pair 505 of chunks 122 (not shown), understood controlled as described in conjunction with FIG. 6A.

Big time 228 timing 220 of text 110 segment 210 is seen: timing 220 value "0.11" understood as start timing 220 for vocal text 388 performance of first segment 210 in text 110.

Figure 6D:
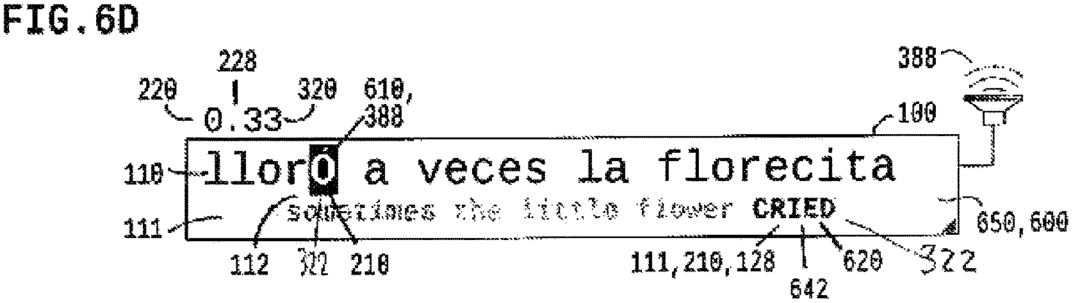
FIG. 6D shows same context segment in tied playback with next text segment.

Time span 320 shown is understood as "0.22" seconds: start timing 220 value seen in big time 228 is "0.11"; end timing 220 value applied from FIG. 6A source 650 and seen in FIG. 6D next start timing 220 value "0.33" seconds.

Vocal text 388 is seen text 110: first text 110 segment 210 "llor" seen in reversed case 322 for time span 320 value "0.22" seconds.

Tied playback 642 is seen in context 111: final segment 210 (also seen as word 128) in context 111 "cried" seen in reversed case 322 concurrently for same time span 320 value "0.22" seconds.

Tie control 600 is seen applied; FIG. 6B shows first segment 210 in text 110 "llor-" and first index 610 value "1" in alignment 123; FIG. 6B shows sixth segment 210 in translation 192 context 111 "cried" and sixth tie link 620 value "1" in alignment 123; segments 210 text 110 "llor-" and context 111 "cried" are seen controlled by index 610 and tie link 620; tie control 600 is shown applied in tied playback 642.

FIG. 6D shows same context segment in tied playback with next text segment.

Same source 650 is seen in same textarea 100 from FIG. 6C with same resources and controls: same bitext 112 control of text 110 and context 111 shown; same tie index 610, tie links 620 seen applied from FIG. 6A, FIG. 6B.

Vocal text 388 is seen proceeding through text 110: second text 110 segment 210 "ó" seen in reversed case 322.

Tied playback 642 is seen in context 111: sixth context 111 segment 210 "cried" seen in reversed case 322; segments 210 text 110 "ó" and context 111 "cried" seen to appear for same time span 320.

Figure 6E:
FIG. 6E shows a context segment in tied playback with full text word in vocal text.

Time span 320 shown is understood as "0.44" seconds: start timing 220 value seen in big time 228 is "0.33"; end timing 220 value understood as seen in FIG. 6E next start timing 220 value "0.77" seconds.

Tie control 600 is seen applied; FIG. 6B shows second tie index 610 value understood as "1a" and text 110 segment 210 "ó" in alignment 123; value "1a" is not seen applied as tie link 620; tie link 620 value "1" is applied until next tie link 620 in context 111 links to text 110 tie index 610; an optional control is seen below in FIG. 6N.

FIG. 6E shows a context segment in tied playback with full text word in vocal text.

Same source 650 is seen in same textarea 100 from FIG. 6D with same resources and controls: same bitext 112 control of text 110 and context 111 shown; same tie index 610, tie links 620 seen applied from FIG. 6A, FIG. 6B.

Vocal text 388 seen proceeds through text 110: third text 110 segment 210 "a" seen in reversed case 322 for time span 320 shown.

Tied playback 642 is seen in context 111: first context 111 segment 210 "some" seen in reversed case 322; segments 210 text 110 "a" and context 111 "some" seen to appear for same time span 320.

Figure 6F:
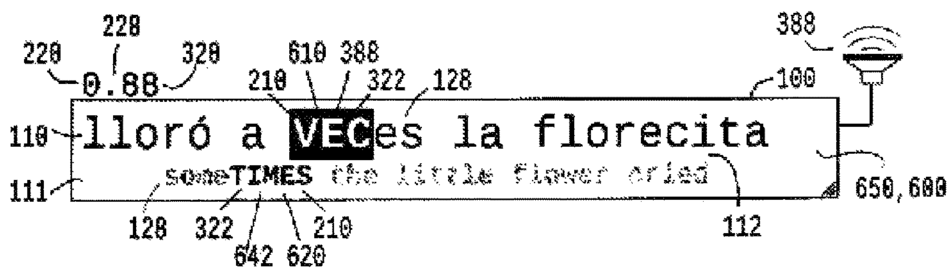
FIG. 6F shows context segment in tied playback with text segment in vocal text.

Time span 320 shown is understood as "0.11" seconds: start timing 220 value seen in big time 228 is "0.77"; end timing 220 value understood as seen in FIG. 6F next start timing 220 value "0.88" seconds.

Tie control 600 is seen applied: FIG. 6B shows index 610 value "2" above third text 110 segment 210 "a" in alignment 123; FIG. 6B shows tie link 620 value "2" below first context 111 segment 210 "some-" in alignment 123; same time span 320 applied in vocal text 388 is applied in tied playback 642, under tie index 610 and tie link 620 controls shown.

Segment 210 within context 111 word 128 is seen applied in tied playback 642: as understood in FIG. 6B, third segment 210 in text 110 "a" is complete word 128, undivided by segment marker 211; first segment 210 in context 111 "some-" show segment marker 211 within word 128 "sometimes"; segment 210 within word 128 in context 111 word is tied with complete text 110 word 128.

FIG. 6F shows context segment in tied playback with first segment in a vocal text word.

Same source 650 is seen in same textarea 100 from FIG. 6E with same resources and controls: same bitext 112 control of text 110 and context 111 all shown; same tie index 610, tie links 620 seen applied from FIG. 6A, FIG. 6B.

Vocal text 388 seen proceeds through text 110: fourth text 110 segment 210 "vec" seen in reversed case 322 for time span 320 shown.

Tied playback 642 is seen in context 111: second context 111 segment 210 "times" seen in reversed case 322; segments 210 text 110 "vec" and context 111 "times" seen to appear for same time span 320.

Figure 6G:
FIG. 6G shows same context segment in tied playback with next text segment in vocal text.

Time span 320 shown is understood as "0.23" seconds: start timing 220 value seen in big time 228 is "0.88"; end timing 220 value understood as seen in FIG. 6G next start timing 220 value "1.11" seconds.

Tie control 600 is seen applied: FIG. 6B shows index 610 value "3" above fourth text 110 segment 210 "vec-" in alignment 123; FIG. 6B shows tie link 620 value "3" below second context 111 segment 210 "times" in alignment 123; same time span 320 applied in vocal text 388 is applied in tied playback 642, under tie index 610 and tie link 620 controls shown.

Separate segments 210 within separate context 111 and text 110 words are seen in tied playback 642: first segment 210 "vec" within third text 110 word "veces" applied in vocal text 388; second segment 210 "times" within first context 111 word "sometimes" applied in tied playback 642; segments 210 within words 128 in both text 110 and context 111 are controlled by tie 600.

FIG. 6G shows context segment in tied playback with second segment in a vocal text word.

Same source 650 is seen in same textarea 100 from FIG. 6F with same resources and controls: same bitext 112 control of text 110 and context 111 shown; same tie index 610, tie links 620 seen applied from FIG. 6A, FIG. 6B.

Vocal text 388 seen proceeds through text 110: fifth text 110 segment 210 "es" seen in reversed case 322 for time span 320 shown.

Tied playback 642 is seen in context 111: second context 111 segment 210 "times" seen in reversed case 322; segments 210 text 110 "es" and context 111 "times" shown appearing for same time span 320.

Time span 320 shown is understood as "0.22" seconds: start timing 220 value seen in big time 228 is "1.11"; end timing 220 value understood seen in FIG. 6G next start timing 220 value "1.33" seconds.

Tie control 600 is seen applied: FIG. 6B shows index 610 value "3a" above fifth text 110 segment 210 "es", in alignment 123; value "3a" is not seen applied as tie link 620 separately aligned with context 111; tie link 620 value "3" is applied until next tie link 620 in context 111 is made to text 110 tie index 610; same time span 320 applied in vocal text 388 is applied in tied playback 642, under tie index 610 and tie link 620 controls shown.

Figure 6H:
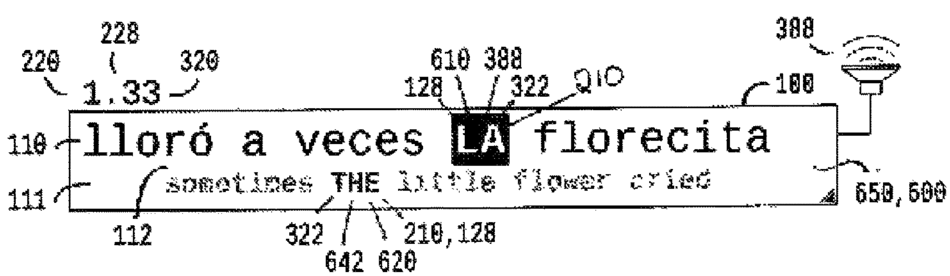
FIG. 6H shows a whole context word in tied playback with whole text word in vocal text.

FIG. 6H shows a whole context word in tied playback with whole text word in vocal text.

Same source 650 is seen in same textarea 100 from FIG. 6G with same resources and controls: same bitext 112 control of text 110 and context 111 shown; same tie index 610, tie links 620 seen applied from FIG. 6A, FIG. 6B.

Vocal text 388 seen proceeds through text 110: sixth text 110 segment 210 "la" seen in reversed case 322 for time span 320 shown; said segment 210 "la" also seen as whole word 128 "la".

Tied playback 642 is seen in context 111: third context 111 segment 210 "the" seen in reversed case 322; said segment 210 "the" also seen as whole word 128 "the"; words 128 in text 110 "la" and context 111 "the" appear for same time span 320.

Figure 6I:
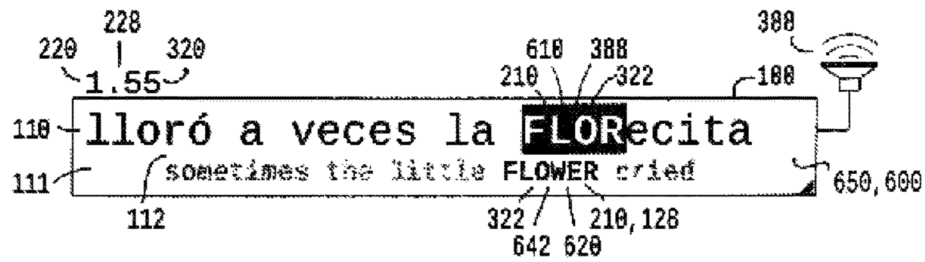
FIG. 6I shows whole context word in tied playback with vocal text in first segment of text word.

Time span 320 shown is understood as "0.22" seconds: start timing 220 value seen in big time 228 is "1.33"; end timing 220 value understood seen in FIG. 6I next start timing 220 value "1.55" seconds.

Tie control 600 is seen applied: FIG. 6B shows index 610 value "4" above sixth text 110 segment 210 "la", in index 610 alignment 123; FIG. 6B shows tie link 620 value "4" below second context 111 segment 210 "the" in tie link 620 alignment 123; same time span 320 applied in vocal text 388 is applied in tied playback 642, under tie index 610 and tie link 620 controls shown.

FIG. 6I shows whole context word in tied playback with vocal text in first segment of text word.

Same source 650 is seen in same textarea 100 from FIG. 6H with same resources and controls: same bitext 112 control of text 110 and context 111 shown; same tie index 610, tie links 620 seen applied from FIG. 6A, FIG. 6B.

Vocal text 388 seen proceeds through text 110: seventh text 110 segment 210 "flor" seen in reversed case 322 for time span 320 shown.

Tied playback 642 is seen in context 111: fifth context 111 segment 210 "flower" seen in reversed case 322; said segment 210 "flower" also seen as whole word 128 "flower"; segment 210 text 110 "flor" and word 128 in context 111 "flower" appear for same time span 320.

Figure 6J:
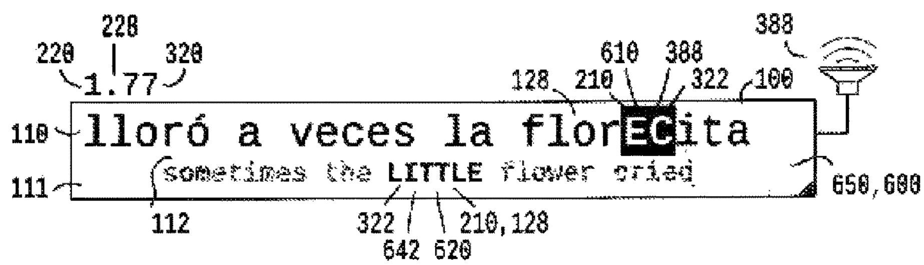
FIG. 6J shows whole context word in tied playback with vocal text in second segment of same text word.

Time span 320 shown is understood as "0.22" seconds: start timing 220 value seen in big time 228 is "1.55"; end timing 220 value understood seen in FIG. 6J next start timing 220 value "1.77" seconds.

Tie control 600 is seen applied: FIG. 6B shows index 610 value "5" above seventh text 110 segment 210 "flor-", in index 610 alignment 123; FIG. 6B shows tie link 620 value "5" below fifth context 111 segment 210 "flower" in tie link 620 alignment 123; segments 210 text 110 "flor-" and context 111 "flower" are tied between index 610 and tie link 620; tie control 600 is shown applied in tied playback 642.

FIG. 6J shows whole context word in tied playback with vocal text in second segment of same text word.

Same source 650 is seen in same textarea 100 from FIG. 6I with same resources and controls: same bitext 112 control of text 110 and context 111 shown; same tie index 610, tie links 620 seen applied from FIG. 6A, FIG. 6B.

Vocal text 388 seen proceeds through text 110: eighth text 110 segment 210 "ec" appears in reversed case 322 (not shown) for time span 320 shown.

Tied playback 642 is seen in context 111: fifth context 111 segment 210 "flower" appears in reversed case 322 (not shown); said segment 210 "flower" also seen as whole word 128 "flower"; segment 210 text 110 "ec" and word 128 in context 111 "flower" appear for same time span 320.

Time span 320 shown is understood as "0.22" seconds: start timing 220 value seen in big time 228 is "1.77"; end timing 220 value understood seen in FIG. 6J next start timing 220 value "1.99" seconds.

Tie control 600 is seen applied: FIG. 6B shows index 610 value "5a" above eighth text 110 segment 210 "ec-", in index 610 alignment 123; value "5a" is not seen applied as tie link 620 aligned with context 111; tie link 620 value "5" is applied until next tie link 620 with context 111 is made in tie index 610 to text 110; segments 210 text 110 "ed-" and context 111 "flower" are seen tied between index 610 and tie link 620; tie control 600 is shown applied in tied playback 642.

Figure 6K:
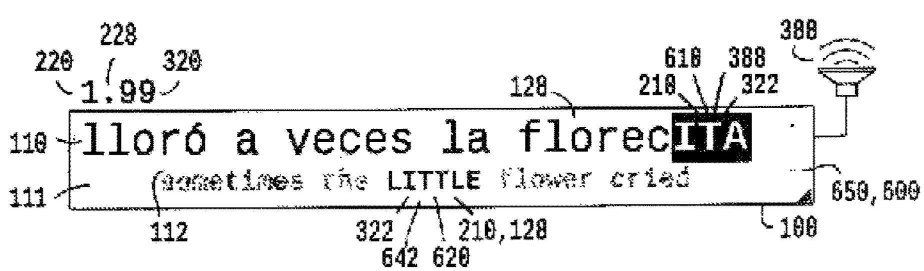
FIG. 6K shows different context word in tied playback with vocal text in third segment of same text word.

FIG. 6K shows different context word in tied playback with vocal text in third segment of same text word.

Same source 650 is seen in same textarea 100 from FIG. 6J with same resources and controls: same bitext 112 control of text 110 and context 111 shown; same tie index 610, tie links 620 seen applied from FIG. 6A, FIG. 6B.

Vocal text 388 seen proceeds through text 110: ninth text 110 segment 210 "ita" appears in reversed case 322 (not shown) for time span 320 shown.

Tied playback 642 is seen in context 111: fourth context 111 segment 210 "little" appears in reversed case 322 (not shown); said segment 210 "little" also seen as whole word 128 "little"; segment 210 text 110 "ita" and word 128 in context 111 "little" appear for same time span 320.

Time span 320 shown is understood as "0.23" seconds: start timing 220 value seen in big time 228 is "1.99"; end timing 220 value understood seen in FIG. 6A source as final timing "2.22" seconds.

Tie control 600 is seen applied: FIG. 6B shows index 610 value "5b" above ninth text 110 segment 210 "ita" under index 610 alignment 123; FIG. 6B shows tie link 620 value "5b" below fourth context 111 segment 210 "little" in tie link 620 alignment 123; segments 210 text 110 "ita" and context 111 "little" are seen tied between index 610 and tie link 620; tie control 600 is shown applied in tied playback 642.

Figure 6L:
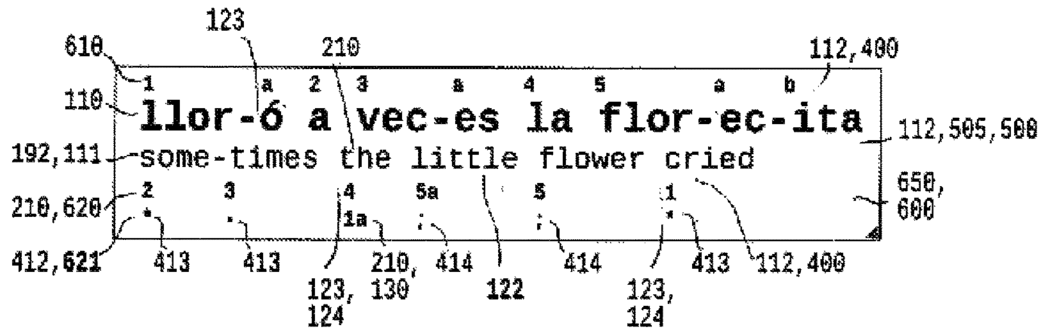
FIG. 6L shows a second row of ties applied in tie control between segments in context and text.
Figure 6M:
FIG. 6M shows copy of FIG. 6C with second tie link row applied in source: no difference is seen.

FIG. 6I-FIG. 6K show one text 110 word 128 in tie control 600 with two context 111 words; similar controls are expanded as described in conjunction with FIG. 6L-FIG. 60.

FIG. 6L shows a second row of ties applied in tie control between segments in context and text Same contents within similar edit interface as seen in FIG. 6B; same media link 148, timings 220 (not shown) understood supplied by source 650 shown; same tie index 610 on first row, (in bitext 112 with text 110 row below, under BSA 400 control); same text 110 row, (now in bitext 112 pair 505 with translation 192 context 111 row below, under ABC 500); same translation 192 context 111 row, (in bitext 112 with tie link 620 row below, under BSA control); all controls shown.

Second row tie links 621 is seen below first row tie links 620: FIG. 6B shows first row tie link 620 values "2" "3" "4" "5a" "5" "1", but no second tie link 621 row; FIG. 6L shows same first row tie link 620 values "2" "3" "4" "5a" "5" "1", above second tie link 621 row; FIG. 6L shows second row tie link 621 values "*", "-", "1a", ";", ";", "*" below first tie link 620 row;

Show empty context 412 seen is applied: second row tie links 621 understood generated via show empty context control as described in conjunction with FIG. 4N; empty segment markers 411 (not shown) and empty word markers 422 (not shown) seen applied as blank segments 413 and understood in alignment 123 with translation 192 context 111 under BSA control 400, all shown.

Input 130 shown applies second row tie link 621 to reference same tie index 610: segment 210 "1a" seen in second row tie link 621 in alignment 123 with third segment 210 "the" in translation 192 context 111; input 130 also understood to apply extender segments 414.

Figure 6N:
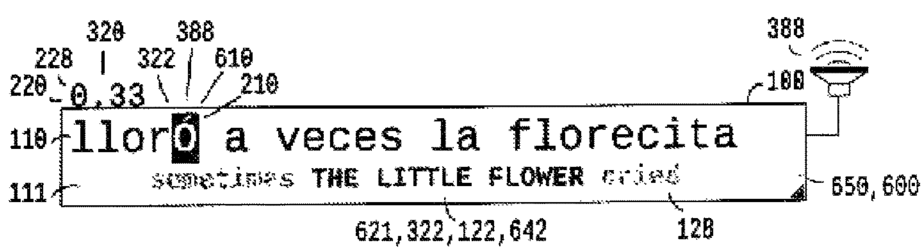
FIG. 6N shows both tie rows seen in FIG. 6L applied in vocal text with tied context.

Extender segments 414 are seen in second tie link 620 row: optionally represented in semi-colon ";", extender segment 414 mark tie link 620 positions in alignment 123 with segments 210 understood in translation 192 context 111; extender segments 414 are applied to define multiple segment 210 (chunk 122) links, as shown in FIG. 6N example.

Chunk delineation 124 seen is controlled by extender segments 414; "third" translation 192 context 111 segment 210 "the" seen in alignment 123 with "third" second row tie link 621 segment 210 "1a"; "sixth" translation 192 context 111 segment 210 "cried" seen in alignment 123 with "sixth" tie link 621 "*"; chunk delineation 124 shown understood to start with "third" translation 192 segment 210 "the", and end after "fifth" translation 192 segment 210 "flower".

Chunk 122 in translation 192 context 111 "the little flower" is linked by second row tie links 621 "1a", ";", ";" with segment 210 in text 110 "ó", as seen applied in FIG. 6N example.

Third row tie links 622 (not seen) are understood as applicable; multiple rows of tie links 620, 621, 623 allow multiple interpretations to define meaningful links between text 110 and context 111.

Empty context 412 control shown controls alignment 123 of chunks 121 under BSA 400 control; input 130 optionally applied with keyboard 132 (not shown) keystroke (;); repeated keystrokes (;)(;) understood to replace next "two" blank segments 413, all seen in alignment 123, controlled in real-time 189 (not shown) under BSA control 400 seen; extender segments 414 optionally hidden while applied; total keystroke input 130 understood as "1a;;"; minimal input 130 understood required to control alignment 123 of segments 210, words 128 (not shown) and chunks 122 in bitext 112.

FIG. 6M shows copy of FIG. 6C with second tie link 620 row applied in source: no difference is seen.

FIG. 6M applies second tie link 621 row shown added in FIG. 6L in same tied playback 642 seen in FIG. 6C; same vocal text 388 in same first text 110 segment 210 seen for same time span 220; same tied playback 642 seen in last context 111 segment 210 for same time span 220.

Source 650 shown applied is understood as changed: second row tie links 621 seen added in FIG. 6L edit interface; no changes made to other source 650 contents.

Tie control 600 is seen: index 610 shown applied while vocal text 388 appears for time span 320 tie link 620 shown applied while tied playback 642 appears for same time span 320.

No change is seen: second row tie links 321 shown in FIG. 6L do not contain value "1" link to index 610; FIG. 6M and FIG. 6C represent same time span 320 of same playback 642.

FIG. 6N shows both tie rows seen in FIG. 6L applied in vocal text with tied context.

Same source 650 is seen in same textarea 100 from FIG. 6M with same resources and controls: same bitext 112 control of text 110 and context 111 shown; same tie index 610, tie links 620 seen applied from FIG. 6L.

Vocal text 388 seen is same as FIG. 6D: second text 110 segment 210 "ó" seen in reversed case 322; same tie index 610 seen applied.

Tied playback 642 is seen changed; FIG. 6D shows tied playback 642 in "sixth" context 111 segment 210 "cried"; FIG. 6N shows tied playback 642 in "third", "fourth", "fifth" context segments 210 (not shown) "the little flower"; "the little flower" is seen controlled as single chunk 122 in tied playback 642.

Tie control 600 seen is understood; in FIG. 6B edit of source 650, value "1a" is not seen applied as tie link 620; no second tie link 621 row is seen; in FIG. 6L version of edited source 650, value "1a" is shown in second tie link 621 row; as described in conjunction with FIG. 6L, chunk delineation 124 is applied under BSA 400 control; chunk 122 controlled is presented in tied playback 642; it's understood that chunks 122 are optionally controlled in first tie link 620 row, or any number of tie link 620 rows.

Multiple rows of tie links 620 are shown applied; FIG. 6D shows limited tie 600 controls where tie index 610 is applied with one row of tie links 620; FIG. 6N shows enhanced tie 600 controls where index 610 is applied with second row of tie links 621; third tie link 622 row (not shown) and any number of tie link 620 rows are optionally applied.

Multiple tie link 620 rows are understood: Spanish language verb "llorar" conjugation "ó" refers to thing "la florecita" that sometimes did cry; third tie link 622 row could be applied with additional segmentation in context 111 word 128 "cr-ied", where second segment 210 could be applied via tie index 610 value "1a" and third tie link 622 row.

Figure 6O:
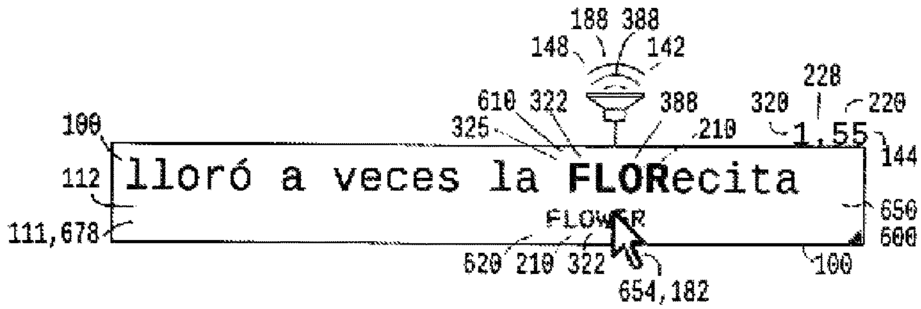
FIG. 6P shows pointer hover fourth context segment; ninth text segment is seen and heard in vocal text.
FIG. 6Q shows pointer hover over second text segment which is seen and heard in vocal text; tied context chunk fades.
FIG. 6R shows pointer hover over first text segment which is seen and heard in vocal text; tied context segment fades.

FIG. 6O shows pointer hover over fifth context segment; seventh text segment is seen and heard in vocal text.

Same tie source 650 from FIG. 6L shown is understood applied in same textarea 100; all previously specified controls are understood applied.

Hover context style 678 is seen applied in context 111: as option form of weak style 116 seen within bitext 112, context 111 understood shown in same color as background, and thus invisible; if selection 255 (not shown) applied within context 111 contents, selected contents understood as made visible; if pointer 182 is positioned at context 111 segment 210 coordinates, then context 111 segment 210 made visible under hover bitext 654 control as shown in FIG. 6O-FIG. 6R.

Hover bitext 654 control is seen: pointer 182 seen represented as hovering over "fifth" segment 210 in context 111 "flower"; "fifth" segment 210 in context 111 "flower" seen in reversed case 322 and in perceptible contrast to background; "seventh" segment 210 in text 110 "flor" seen simultaneously in reversed case 322.

Tie 600 control is seen applied; tie index 610 shown with text 110 segment 210 "flor"; tie link 621 shown with context 111 segment 210 "flower".

Vocal text 388 seen is heard: media link 148 seen applied in audible media playback 142 shown; big time 228 timing 220 value "1.55" seconds applied as cue 144, all shown; "seventh" segment 210 in text 110 "flor" understood applied in vocal text 388 for time span 320 "0.22" seconds; vocalization 188 seen corresponding seventh segment 210 in text 110 "flor" understood as heard.

Vocal text 388 heard is seen: "seventh" segment 210 in text 110 "flor" seen in reversed case 322, and understood incorporated within vocal text 388; alternation frequency 325 seen, as described in conjunction with FIG. 3E, is optionally applied.

Figure 6P:
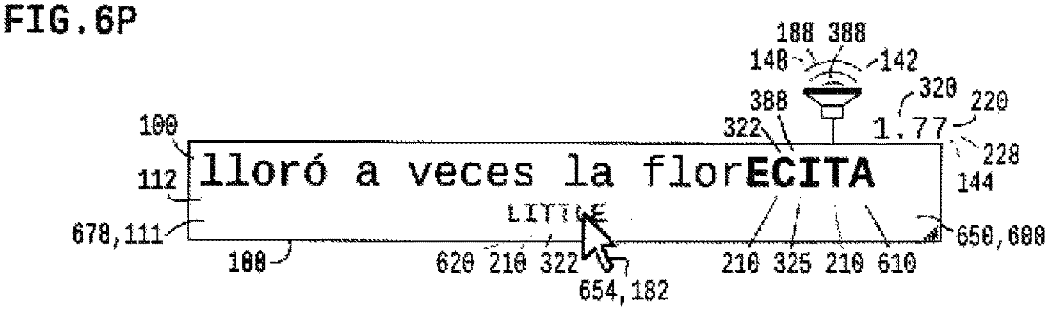

FIG. 6P shows pointer hover fourth context segment; ninth text segment is seen and heard in vocal text.

Same tie source 650 from FIG. 6L shown is understood applied in same textarea 100; all previously specified controls are understood as applied; hover style 678 control seen applied to context 111 within bitext 112, shown.

Hover bitext 654 control is shown: pointer 182 seen represented as hovering over "fourth" segment 210 in context 111 "little"; "fourth" segment 210 in context 111 "little" seen in reversed case 322 and perceptible contrast to background; "eighth", "ninth" segments 210 in text 110 understood as "ec-", "ita" seen simultaneously in reversed case 322.

Tie 600 control is seen applied; tie index 610 shown with text 110 segments 210 "ec-" and "ita"; tie link 621 shown with context 111 segment 210 "little".

Vocal text 388 seen is heard: media link 148 seen applied in audible media playback 142 shown; big time 228 timing 220 value "1.77" seconds applied as cue 144, all shown; "eighth" segment 210 "ec-" understood applied in audible playback 142 for time span 320 "0.22" seconds; "ninth" segment 210 "ita" understood applied in audible playback 142 for time span 320 "0.23" seconds; combined time span 320 seen understood as "0.22" seconds; vocalization 188 seen corresponding "seventh", "eighth" segments 210 in text 110 "ecita" understood as heard.

Vocal text 388 heard is seen: segments 210 in text 110 are preferably synchronously ¬ ¬ -animated, as described in conjunction with FIG. 3B, FIG. 3C; optionally, combined segments 210 appearing in reversed case 322 for combined time span 320, as shown; alternation frequency 325 shown optionally applied.

Figure 6Q:
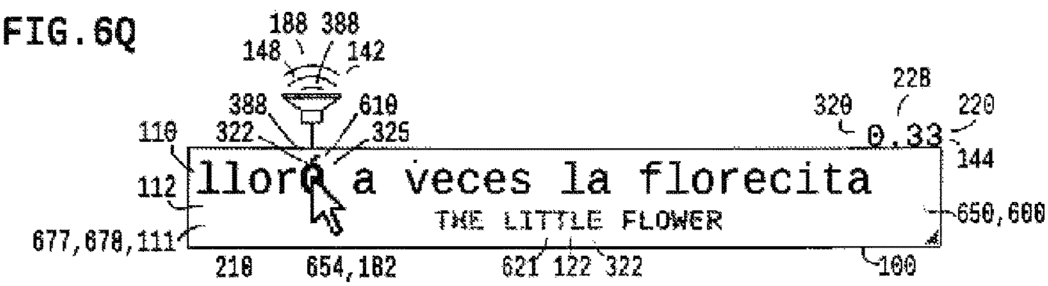

FIG. 6Q shows pointer hover over second text segment which is seen and heard in vocal text; tied context chunk fades.

Same tie source 650 from FIG. 6L shown is understood applied in same textarea 100; all previously specified controls are understood as applied; hover style 678 control seen applied to context 111 within bitext 112, all shown.

Hover bitext 654 control is shown: pointer 182 seen represented as hovering over "second" segment 210 in text 110 "ó"; "second" segment 210 in text 110 "ó" seen in reversed case 322; "second", "third", "fourth" segments 210 in context 111 "the little flower" seen simultaneously in reversed case 322 and in perceptible contrast to background.

Tie 600 control is seen applied; tie index 610 shown with text 110 segment 210 "ó"; second row tie link 621 shown with context 111 chunk 122 "the little flower".

Vocal text 388 seen is heard: media link 148 seen applied in audible media playback 142 shown; big time 228 timing 220 value "0.33" seconds applied as cue 144, all shown; "second" text 110 segment 210 "ó" understood applied in vocal text 388 for time span 320 "0.44" seconds; vocalization 188 seen corresponding to "second" segment 210 in text 110 "ó" understood as heard.

Vocal text 388 heard is seen: "second" segment 210 in text 110 "ó" seen in reversed case 322 while vocalization 188 heard for time span 320; alternation frequency 325 seen optionally applied.

Context fade 677 control is seen; should pointer 182 remain positioned over segment 210 in text 110 or context 111, context fade 677 control incrementally reduces toward invisibility.

FIG. 6R shows pointer hover over first text segment which is seen and heard in vocal text; tied context segment fades.

Same tie source 650 from FIG. 6L shown is understood applied in same textarea 100; all previously specified controls are understood as applied; hover style 678 control seen applied to context 111 within bitext 112, all shown.

Hover bitext 654 control is shown: pointer 182 seen represented as hovering over "first" segment 210 in text 110 "llor"; "first" segment 210 in text 110 "llor" seen in reversed case 322; "sixth" segment 210 in context 111 "cried" simultaneously seen in reversed case 322 and temporarily in perceptible contrast to background, under context fade 677 control shown.

Tie 600 control is seen applied; tie index 610 shown with text 110 segment 210 "llor"; tie link 621 shown with context 111 chunk 122 "cried".

Vocal text 388 seen is heard: media link 148 seen applied in audible media playback 142 shown; big time 228 timing 220 value "0.11" seconds applied as cue 144, all shown; "first" text 110 segment 210 "llor" understood applied in vocal text 388 for time span 320 "0.22" seconds; vocalization 188 seen corresponding to "first" segment 210 in text 110 "llor" understood as heard.

Vocal text 388 heard is seen: "first" segment 210 in text 110 "llor" seen in reversed case 322 while vocalization 188 heard for time span 320; alternation frequency 325 seen optionally applied.

FIG. 6O-FIG. 6R show hover bitext 654 control applied with vocal text 388; tie 600 control shown is applied to link select contents between context 111 and text 110; experience of context 111 contents is minimized via context fade 677 control; experience of text 110 contents is maximized, with alternation frequency 325 and synchronous vocal text 388 seen applied.

Under vocal text 388 control shown, vocalization 188 of select segment(s) 210 in text 110 are heard; no sound is experienced in association with contents in context 111; vocalization 188 is experienced in phonemes of the language of text 110.

Hide context 311 control is seen with bitext 112; it's understood that context 111 is optionally hidden entirely, while hover bitext 654 control produces vocalization 188 within vocal text 388 control of segments 210 in text 110.

FIG. 7A shows a timed text as example for switching to tag context.

Timed text 222 is seen within textarea 100; textarea 100 understood to optionally apply any or all of previous specified controls.

Context 110 contents are seen with words 128 shown understood as "Ask plain text questions. See structures in text? Do you understand her? Which parts go together?" segment markers 211 (not shown), pause markers 212 (not shown), timings 220 (not shown) understood incorporated within control of timed text 222, as previously described.

Bitext 112 is shown under BSA 400 control; alignment 123 shown understood as applied in bitext 112 contents, as described in conjunction with FIG. 4 series of drawings.

Figure 7B:
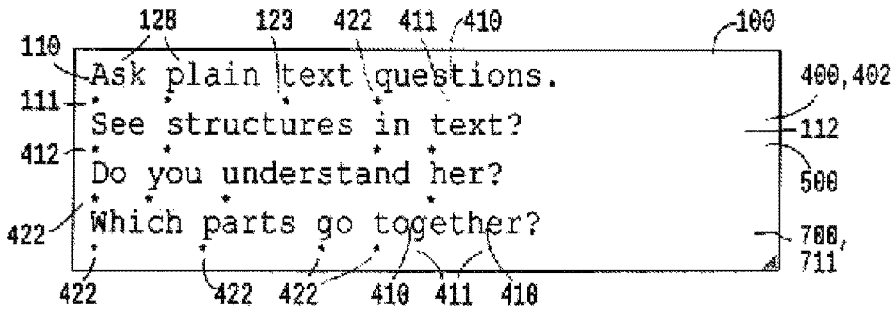
FIG. 7B shows empty context control applied to FIG. 7A example, with switch to tag context seen available.

TAG CONTROL 700 seen is applied in conjunction with alignment 123 controls as described in FIG. 7B-FIG. 7K; show empty context 412 control, as described in conjunction with FIG. 4N, is seen applied in FIG. 7B.

FIG. 7B shows empty context control applied to FIG. 7A example, with switch to tag context seen available.

Same textarea 100 from previous figure is seen; same controls understood as applied; same context 110 contents are seen; timed text 222 (not shown) is understood as hidden.

Show empty context 412 is seen applied: context 111 seen with empty word markers 422; empty word markers 422 seen in alignment 123 with words 128 shown in context 110.

Hide segments 410 control is applied; as described in conjunction with FIG. 4D, hide segments 410 control seen is applied to hide segment markers 211 (not seen) and pause markers 212 (not seen) in context 110; hide segments 410 control as shown is optionally applied in context 111; empty segment markers 411 shown are understood as hidden.

Alignment 123 in bitext 112 is seen in example:

"third" word 128 in context 110 "text" seen with "third" empty word marker 422 in context 111; alignment 123 understood applied with all words 128 in context 110 and empty word markers 422 in context 111; BSA 400 control shown optionally controls alignment 123 (optionally under word aligner 402 shown); ABC 500 control shown optionally controls alignment 123.

Show tags 711 control shown applies tag control 700 seen described in FIG. 7C-FIG. 7K.

Figure 7C:
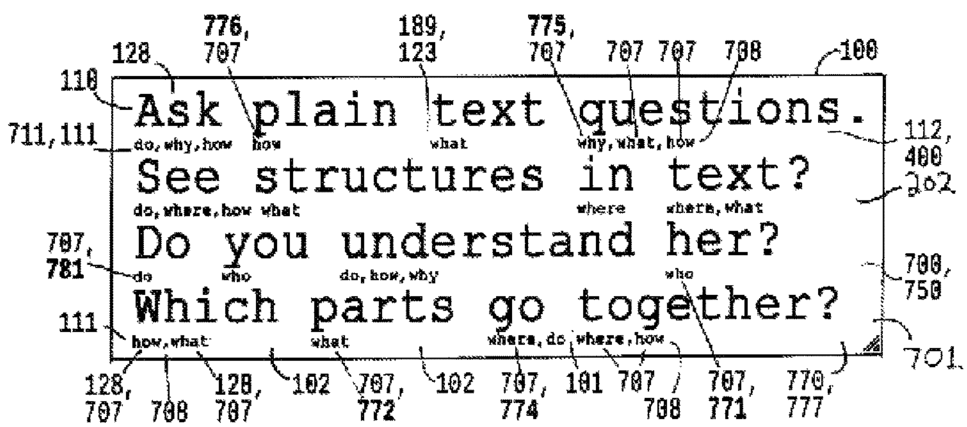
FIG. 7C show bitext alignment controlled edit tags in context applied with words in text.

FIG. 7C show bitext alignment controlled edit tags in context applied with words in text.

Same textarea 100 from previous figure is seen; same controls understood as applied; same context 110 contents are seen with same words 128, under same bitext 112 control.

Tag control 700 is seen applied in context 111; context 111 is seen with words 128; words 128 in context 111 are seen as tags 707; tags 707 are optionally applied to label information pertaining to linguistics, such phonetics, phonology, morphology, syntax, semantics, grammar; tags 707 are optionally applied to label references in context 110 under ASQ control of tags 707 shown.

Tags 707 seen are optionally ordered within single tag strings 708: single tags 707 in single words 128 seen as single tag strings 708; multiple tags 707 in multiple words 128 seen as single tag strings 708.

Single tag 707 tag strings 708 are seen: first context 111 line "fourth" tag 707 "how" 776 seen understood as within "second" tag string 708; first context 111 line "fifth" tag 707 "what" 772 seen understood as within "third" tag string 708.

Multiple tag 707 tag strings 708 are seen: first context 111 line "fourth" tag string 708 seen as "why, what, how" shown with "three" tags 707 "why" 775, "what" 772, "how" 776.

Space 101 or spaces 102 are seen between tag strings 708: "four" tag strings 708 in "fourth" context 111 line each seen separated space 101 or spaces 102; delineation 224 by space 101 (not shown) understood optionally applied; separate tags 707 within tag strings 708 seen separated by comma ","; no space 101 seen added between multiple tags 707 within tag strings 708.

Alignment 123 in real-time 189 is seen: BSA 400 control shown understood to optionally incorporate correspondence 456 (not shown), as described in conjunction with FIG. 4E-FIG. 4L; empty word markers 422 (not seen) understood optionally applied; ABC 500 control (not seen) understood optionally applied to control alignment 123, while allowing single tag 707 to contain multiple words 128 with single space 101 between; both options ABC 500 and BSA 400 controls understood as programs 150 (not shown) to control alignment 123 in real-time 189 as shown.

Word array 428 shown under BSA 400 control is applied: specific tags 707 in context 111 understood linked with specific words 128 in context 111; links understood applied to view specific words 128 in context 111 as shown below.

Tag database 701 seen is applied: tag 707 contents shown understood optionally generated from records in tag database 701; edits applied within textarea 100 understood optionally saved within tag database 701.

Tags 707 within tag strings 708 seen are applied as described in conjunction with FIG. 7D-FIG. 7K below; multiple tags 707 associated with single words 128 in context 111 are seen in examples FIG. 7F, FIG. 7H, and FIG. 7J below "ASQ" (Ask Some Questions) control of tags 707 seen is understood; context 110 understood optionally parsed into broad categories of meaning, primarily via questions 777 seen; questions 777 are applied specific tags 707 such as "who" 771, "what" 772, "where" 774, "how" 776, "why" 775, all shown; actions 780 (not shown) represented in "do" 781 tag 707 shown; (options "feel" 782, "have" 783, "want" 784, "go" 785, "be" 790, (not shown) and others understood as applicable); other tags 707 optionally applied such as "not" 792, "bad" 799, "good" 798 (not shown) understood as applicable.

Tag source 750 shown is understood; bitext 112 control of context 111 and tag 707 context 111 contents seen is understood as generated from plain text 120 (not seen) version of tag source 750 shown; tag source 750 seen is more efficiently edited within bitext 112 in alignment 123.

Figure 7D:
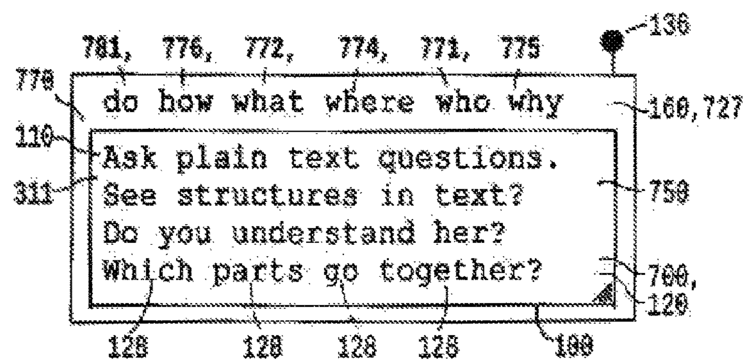
FIG. 7D shows FIG. 7C controlled source in ASQ "ask some questions" interface.

FIG. 7D shows tag source controlled in ASQ "ask some questions" interface.

Same textarea 100 from previous figure is seen; same controls understood as applied: same context 110 contents seen with same words 128 shown; same bitext 112 control (not seen) understood optionally applied.

Hide context 311 control seen applied; tag source 750 shown and tag strings 708 (not shown) understood hidden, but applied to view tagged context 110 as shown in FIG. 7E-FIG. 7K.

Tag system 700 is seen optionally applied with plain text 120; context 110 is optionally viewed with no style controls in plain text 120, as described in conjunction with FIG. 1A.

Microphone 136 seen is preferably provided; input 130 (not shown) via voice, in conjunction with speech to text 171 system seen applied to control tag links 727 described below.

Tag links 727 are seen above textarea 100 in optionally provided GUI 160 shown; tag links 727 apply tags 707 from context 111 seen in FIG. 7C; FIG. 7C shows tags 707 as "do" 781, "how" 776, "what" 772, "where" 774, "who" 771, "why" 775 in context 111; FIG. 7D shows tag links 727 "do" 781, "how" 776, "what" 772, "where" 774, "who" 771, "why" 775 in GUI 160.

ASQ 770 system seen applied is by example; any formal system such as grammar, semantics, morphology and such understood applicable; ASQ 770 system shown as example of experimental system based in questions 777 (not seen), described with FIG. 7C, and shown in FIG. 7E-FIG. 7P below.

Figure 7E:
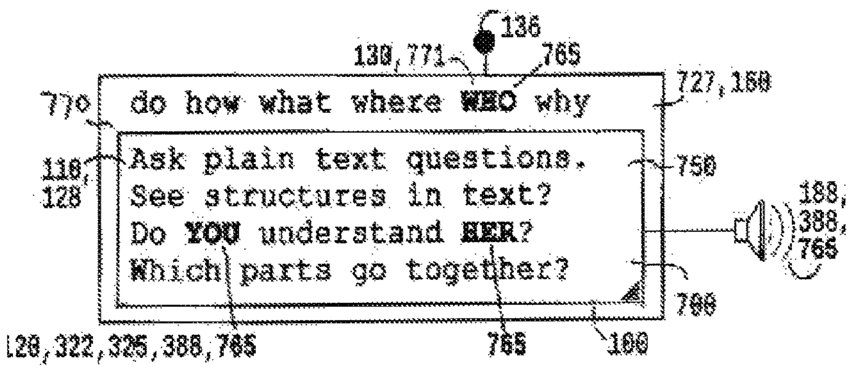
FIG. 7E shows ASQ control within tag system applied with "who" question.

FIG. 7E shows ASQ control within tag system applied with "who" question.

Same words 128 within same context 110 in same textarea 100 as previous figure are shown; same ASQ 770 system under tag system 700 control applying same tag source 750 from FIG. 7C are seen.

Input 130 seen is applied with tag link 727 shown as "who" 771, preferably via microphone 136 shown.

Tag source 750 is referenced; FIG. 7C shown word array 428 finds tag 707 "who" 771 in alignment 123 with "two" words 128 in context 110: "tenth" word 128 "you", and "twelfth" word 128 "her".

ASQ style 765 is shown selectively in context 110 and GUI 160: in context 110, "tenth" word 128 "you" and "twelfth" word 128 "her" seen in ASQ style 765; in GUI 160, tag link 727 who 771 seen optionally in ASQ style 765.

Reversed case 322 shown is optionally applied within ASQ style 765; as described in conjunction with FIG. 3B-FIG. 3C, reversed case 322 is optionally applied as element to synchronously animate context 110, Alternation frequency 325 seen is optionally applied within ASQ style 765; as described in conjunction with FIG. 3D-FIG. 3E, alternation frequency 325 switches select elements in context 110 between two states, such as normal and reversed case 322, at variable rates.

Vocalization 188 sees in optionally applied within ASQ style 765: media player 140 seen reproducing sequential vocalization 188 of words 128 applied under tag link 727.

Vocal text 388 shown in optionally applied: timed text 222 information shown in FIG. 7A is optionally applied under vocal text 388 control; as described in conjunction with FIG. 3B, FIG. 3C, vocal text 388 synchronously animates context 110 with vocalization 188. ASQ style 765 is optionally viewed in plain text 120 shown; no additional styling required; additional styling optionally applied, as described in conjunction with FIG. 7K; above described optional controls understood incorporated within ASQ style 765.

Figure 7F:
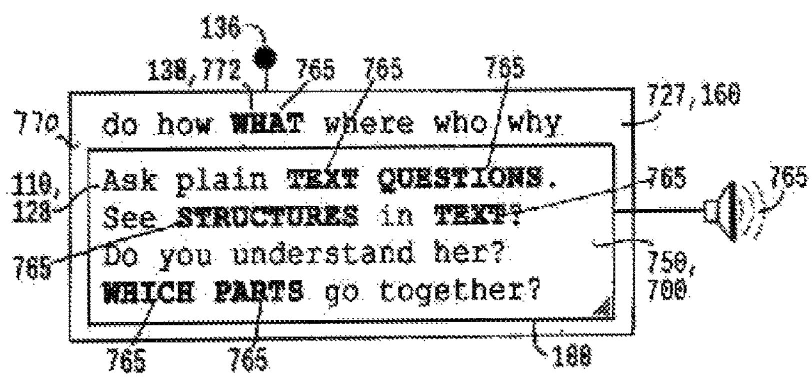
FIG. 7F shows ASQ control within tag system applied with "what" question.

FIG. 7F shows ASQ control within tag 707 system applied with "what" question.

Same words 128 within same context 110 in same textarea 100 as previous figure are all shown; same ASQ 770 system under tag system 700 control applying same tag source 750 from FIG. 7C are all seen.

Input 130 seen is applied tag link 727 shown as "what" 772, preferably via microphone 136 shown.

Tag source 750 is referenced; FIG. 7C shown word array 428 finds tag 707 "what" 772 in alignment 123 with "six" words 128 in context 110: third word 128 "text", "fourth" word 128 "questions", "sixth" word 128 "structures", "eighth" word 128 "text", "thirteenth" word 128 "which", and "fourteenth" word 128 "parts".

ASQ style 765 is seen applied in FIG. 7F: "third" word 128 "text", "fourth" word 128 "questions", "sixth" word 128 "structures", "eighth" word 128 "text", "thirteenth" word 128 "which", "fourteenth" word 128 "parts", and optionally tag link 727 "what" 772, all seen in ASQ style 765.

Plain text 120, vocalized text 388, vocalization 188, alternation frequency 325 (none shown) are optionally applied within ASQ style 765 shown.

Figure 7G:
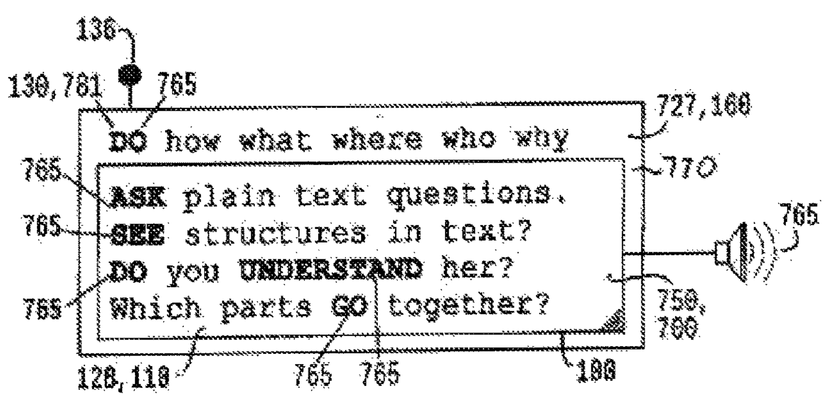
FIG. 7G shows ASQ control within tag system applied with "do" action.

FIG. 7G shows ASQ control within tag 707 system applied with "do" action.

Same words 128 within same context 110 in same textarea 100 as previous figure are all shown; same ASQ 770 system under tag system 700 control applying same tag source 750 from FIG. 7C are all seen.

Input 130 seen is applied tag link 727 shown as "do" 781, preferably via microphone 136 shown.

Tag source 750 seen is referenced; FIG. 7C shown word array 428 finds tag 707 "do" in alignment 123 with "six" words 128 in context 110: "first" word 128 "ask", "fifth" word 128 "see", "ninth" word 128 "do", "eleventh" word 128 "understand", "fifteenth" word 128 "go", and "sixteenth" word 128 "together".

ASQ style 765 is seen applied in FIG. 7G: "first" word 128 "ask", "fifth" word 128 "see", "ninth" word 128 "do", "eleventh" word 128 "understand", "fifteenth" word 128 "go", "sixteenth" word 128 "together", and optionally tag link 727 "do" 781, all seen in ASQ style 765.

Plain text 120, vocalized text 388, vocalization 188, alternation frequency 325 (none shown) are optionally applied within ASQ style 765 shown.

Figure 7H:
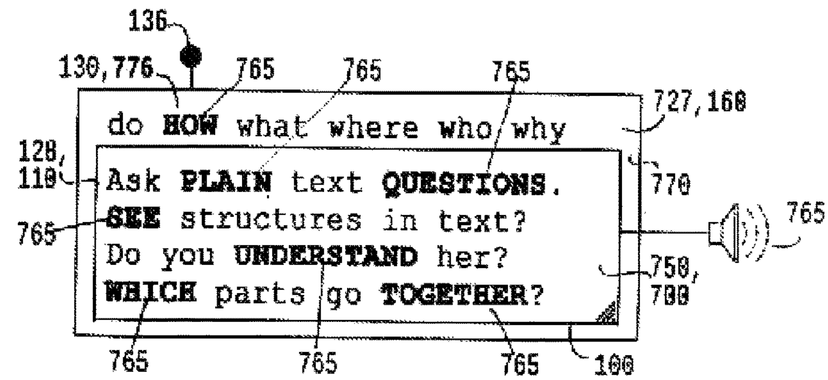
FIG. 7H shows ASQ control within tag system applied with "how" question.

FIG. 7H shows ASQ control within tag 707 system applied with "how" question.

Same words 128 within same context 110 in same textarea 100 as previous figure are all shown; same ASQ 770 system under tag system 700 control applying same tag source 750 from FIG. 7C are all seen.

Input 130 seen is applied tag link 727 shown as "how" 776, preferably via microphone 136 shown.

Tag source 750 seen is referenced; FIG. 7C shown word array 428 finds tag 707 "how" 776 in alignment 123 with "six" words 128 in context 110: "second" word "plain", "fourth" word "questions", "fifth" word "see", "eleventh" word "understand", "thirteenth" word "which", and "sixteenth" word "together".

ASQ style 765 is seen applied: "second" word "plain", "fourth" word "questions", "fifth" word "see", "eleventh" word "understand", "thirteenth" word "which", "sixteenth" word "together", and optionally tag link 727 "how" 776, all seen in ASQ style 765.

Plain text 120, vocalized text 388, vocalization 188, alternation frequency 325 (none shown) are optionally applied within ASQ style 765 shown.

Figure 7I:
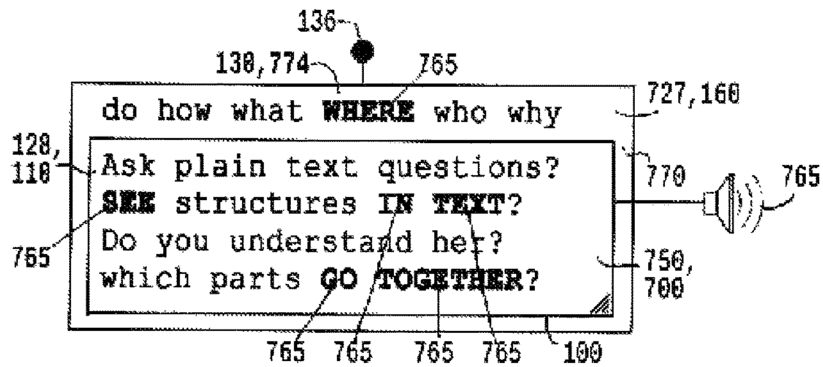
FIG. 7I shows ASQ control within tag system applied with "where" question.

FIG. 7I shows ASQ control within tag 707 system applied with "where" question.

Same words 128 within same context 110 in same textarea 100 as previous figure are all shown; same ASQ 770 system under tag system 700 control applying same tag source 750 from FIG. 7C are all seen.

Input 130 seen is applied tag link 727 shown as "where" 774, preferably via microphone 136 shown.

Tag source 750 is referenced; FIG. 7C shown word array 428 finds tag 707 "where" 774 in alignment 123 with "five"

words 128 in context 110: "fifth" word 128 "see", "seventh" word "in", "eighth" word "text", "fifteenth" word "go", and "sixteenth" word "together".

ASQ style 765 is seen applied: "fifth" word 128 "see", "seventh" word "in", "eighth" word "text", "fifteenth" word "go", "sixteenth" word "together", and optionally tag link 727 "where" 774, all seen in ASQ style 765.

Plain text 120, vocalized text 388, vocalization 188, alternation frequency 325 (none shown) are optionally applied within ASQ style 765 shown.

Figure 7J:
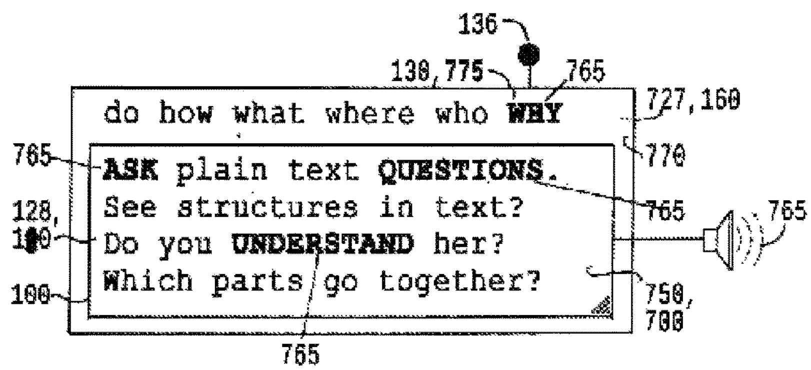
FIG. 7J shows ASQ control within tag system applied with "why" question.

FIG. 7J shows ASQ control within tag 707 system applied with "why" question.

Same words 128 within same context 110 in same textarea 100 as previous figure are all shown; same ASQ 770 system under tag system 700 control applying same tag source 750 from FIG. 7C are all seen.

Input 130 seen is applied tag link 727 shown as "why" 775, preferably via microphone 136 shown.

Tag source 750 is referenced; FIG. 7C shown word array 428 finds tag 707 "why" 775 in alignment 123 with "three" words 128 in context 110: "first" word 128 "ask", "fourth" word 128 "questions", and "eleventh" word 128 "understand".

ASQ style 765 is seen applied: "first" word 128 "ask", "fourth" word 128 "questions", "eleventh" word 128 "understand", and optionally tag link 727 "why" 775, all seen in ASQ style 765.

Plain text 120, vocalized text 388, vocalization 188, alternation frequency 325 (none shown) are optionally applied within ASQ style 765 shown.

Figure 7K:
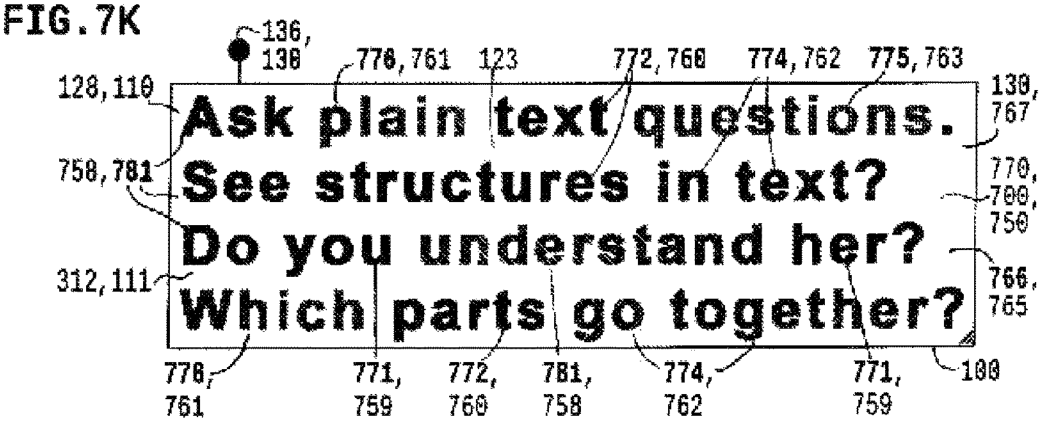
FIG. 7K represents separate colors applied to separate tags aligned in FIG. 7C edit of FIG. 7B source.

FIG. 7K represents separate colors applied to separate tags 707 aligned in FIG. 7C edit of FIG. 7B source.

Same words 128 within same context 110 in same textarea 100 as previous figure are all shown; same ASQ 770 system under tag system 700 control applying same tag source 750 from FIG. 7C are all seen; GUI 160 (not seen) is optionally excluded; input 130 is preferably made via microphone 136 shown.

Color 766 seen in context 110 is optionally applied within ASQ style 765; colors 766 shown applied are by example; any of millions of colors are optionally applied.

Color 776 seen is represented by standard patterns; as understood in reference to above described example of tag control 700, "green" 758 color 776 is seen applied with "do" 781 tags 707; "blue" 759 color 776 is seen applied to "who" 771 tags 707; "red" 760 color 776 is seen applied to "what" 772 tags 707; "purple" 761 color 776 is seen applied "how" 776 tags 707; "brown" 762 color 776 is seen applied to "where" 774 tags 707; "grey" 763 color 776 is seen applied to "why" 775 tags 707; "orange" 764 color 776 is seen applied to punctuation.¬ ¬

Input 130 is seen to increase or decrease color 766 intensity 767; coloration default is understood as barely perceptible dark greys with color 766 tints; input 130 of specific ASQ control, such as why 775, temporarily increases color 766 intensity 767.

Words 128 classified with multiple tags 707 are controlled: colorization optionally applied from first tag 707 within tag string 708, as described in conjunction with FIG. 7B; colorization optionally applied dynamically, changing for example once per second.

Figure 8A:
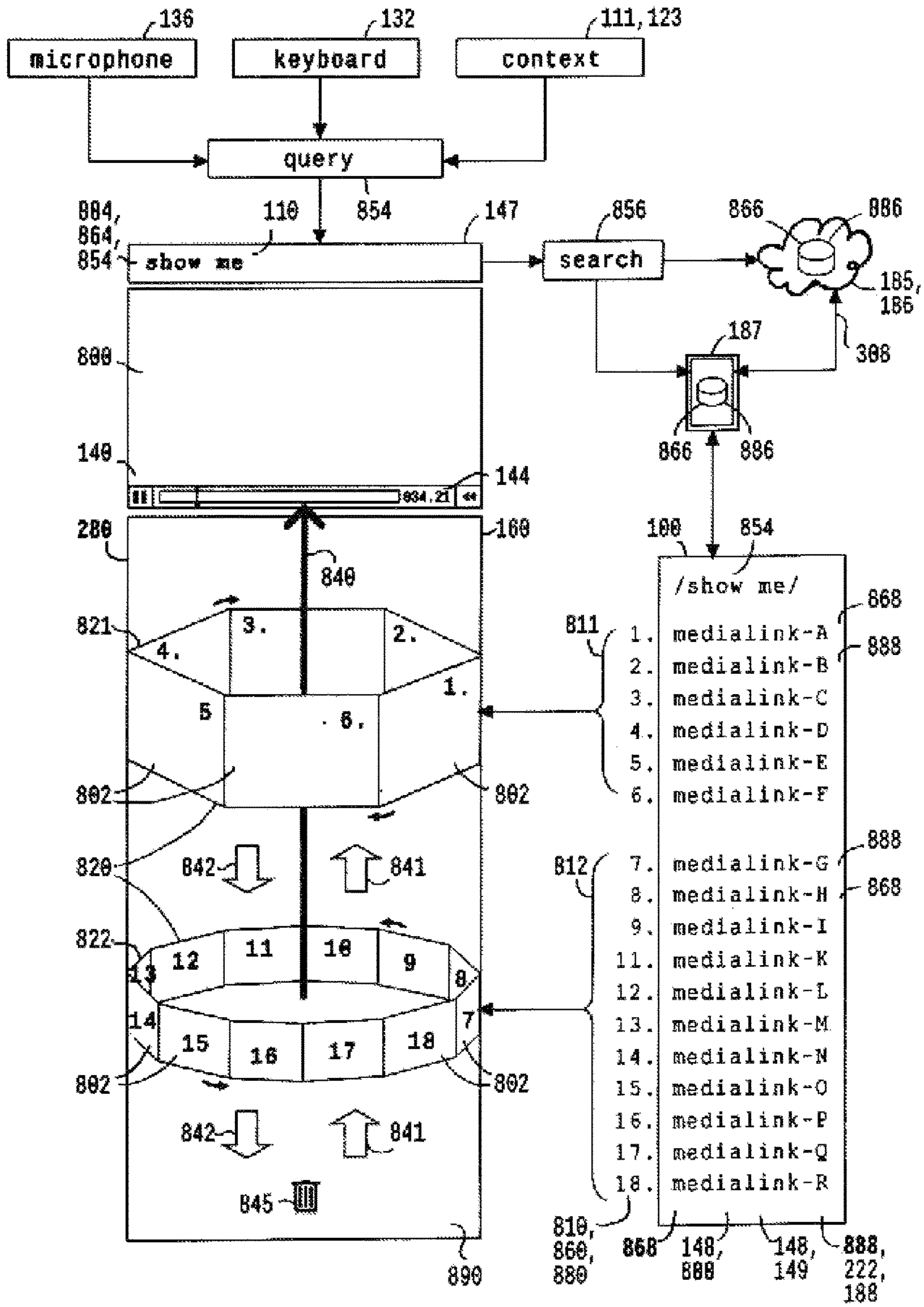
FIG. 8A represents a picture sorter applied to depict text with multiple pictures.
Figure 8B:
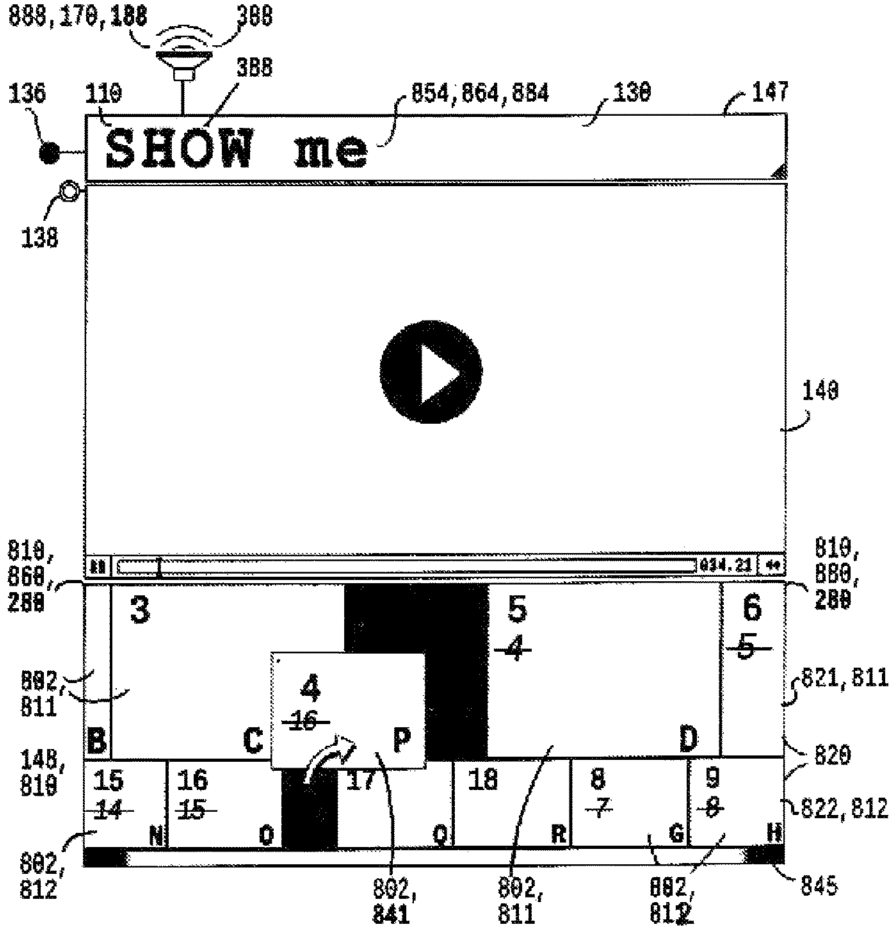
FIG. 8B example shows sort up control applied within picture sorter.
Figure 8C:
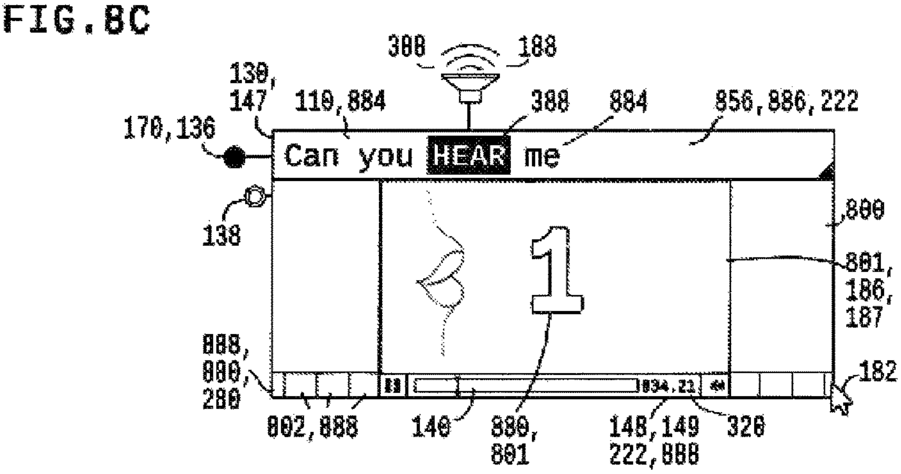
FIG. 8C shows vocalization query applied in media player above picture sorter.
Figure 8D:
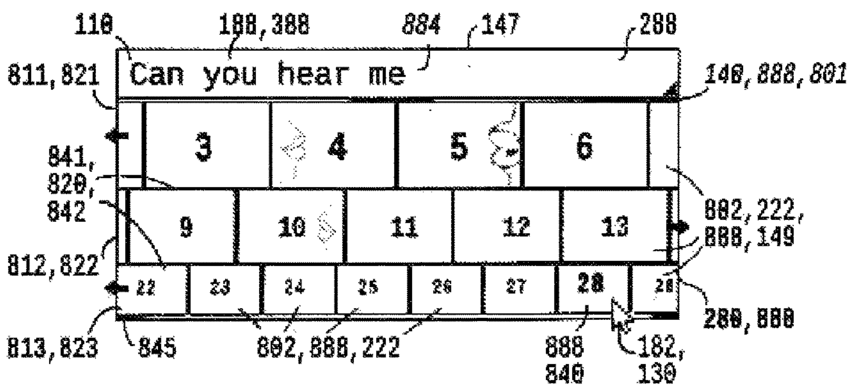
FIG. 8D shows picture sorter applied to sort vocalizations found via vocalization query.
Figure 8E:
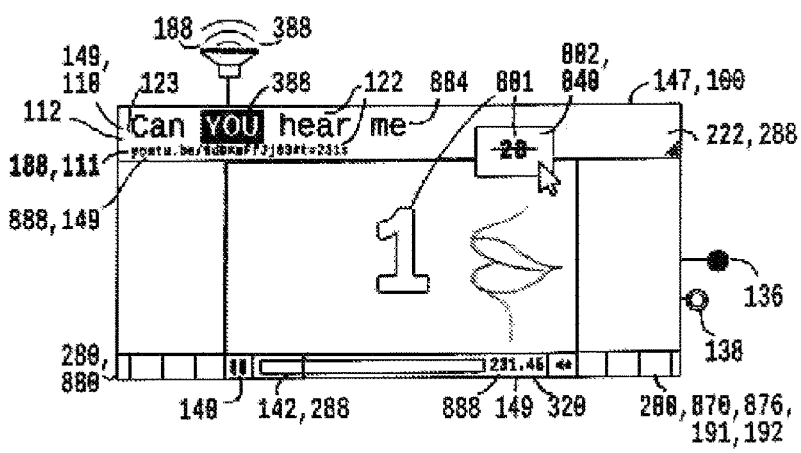
FIG. 8E show selected thumbnail in big picture while vocal text plays.
Figure 8F:
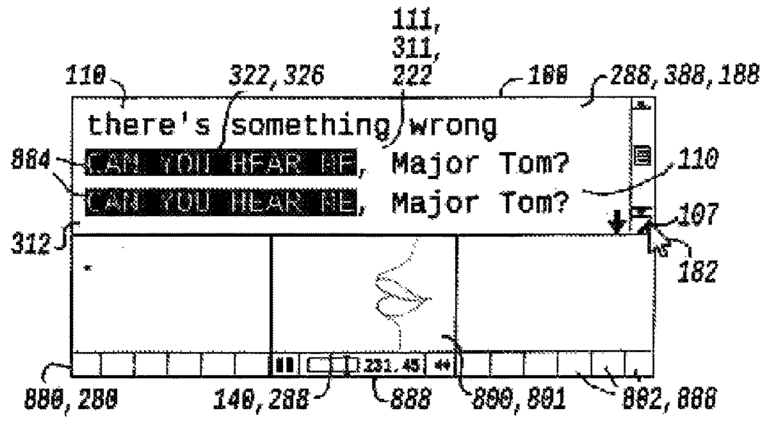
FIG. 8F shows vocal text in play above media player and condensed picture sorter.
Figure 8G:
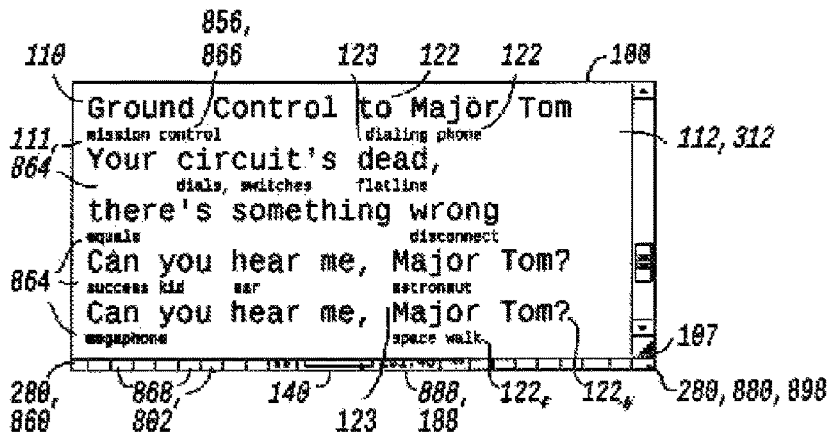
FIG. 8G shows depiction in context aligned with text within textarea resized over media player.
Figure 8H:
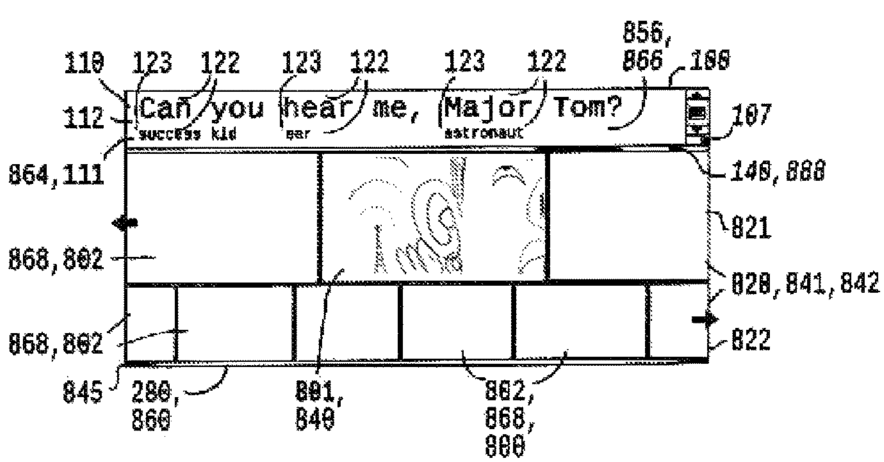
FIG. 8H shows depiction context and text applied in picture sorter.

Show context 312 is optionally applied:edit of tags 707 in alignment 123 within bitext 112 shown in FIG. 7C understood optionally applied; multiple forms of context 111 in alignment 123 shown understood applied; picture 800 form of context 111 understood optionally applied, as described in conjunction with FIG. 8H.

Figure 7L:
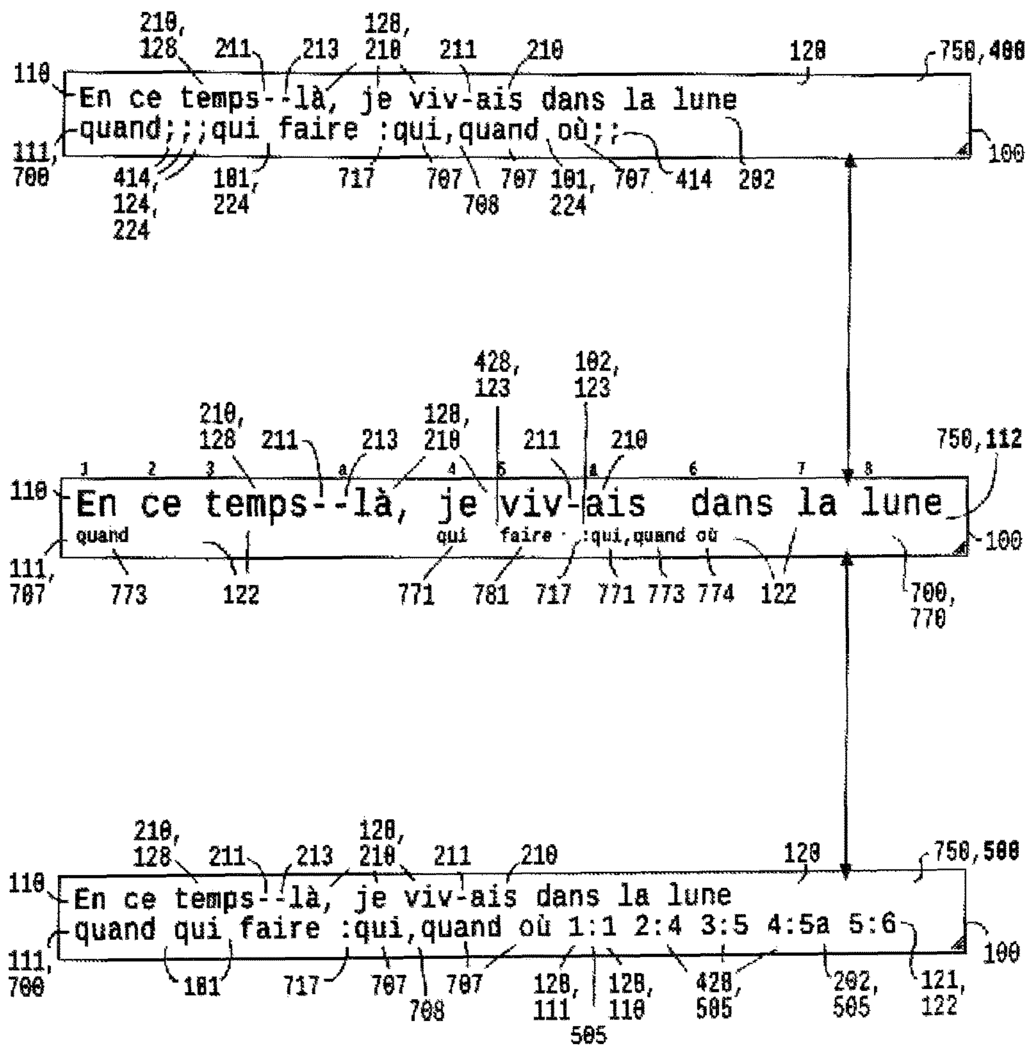
FIG. 7L shows ABC or BSA system optionally applied to align bitext by word, chunk, or segment.

FIG. 7L shows either ABC system or BSA system control alignment chunks, words and segments.

Same textarea 100 is seen with same tag control 700 information controlled in three views; top view textarea 100 shows tag source 750 under BSA 400 control of same text 110 and same context 111 tags 707, all seen;

middle view textarea 100 shows either form of same information under bitext 112 control shown; bottom view textarea 100 shows tag source 750 under ABC 500 control of same text 110 and same context 111 tags 707, all seen; arrows shown connecting the three views represent interchangeability of identical information.

Text 110 in all views is seen as "En ce temps—là où, je viv-ais dans la lune", understood in French language: translation 192 context 111 (not seen) understood optionally applied as "in those times, I lived on the moon".

Segments 210 are seen in text 110 in all views: segment markers 211 seen applied within "third" word 128 "temps—là" and "fifth" word 128 "viv-ais"; hyphenation 213 control seen applied in "third" word 128, second segment 210 "-là".

Context 111 in all views is understood as "quand que faire:qui,quand où": BSA 400 controlled context 111 seen as "quand;;qui faire:qui,quand où;;"; ABC 500 controlled context 111 seen as "quand qui faire:qui,quand où", (chunks 122 controlled in index 121 of pairs 505 "1:1 2:4 3:5 4:5a 5:6" seen appending context 111 under ABC 500 control).

Word array 428 and segment array 202 are seen applied in ABC 500 control: numbered words 128 seen represented in pairs 505 within index 121 of chunks 122; segment array 202 represented in "fourth" pair within index 121 of chunks 122 "4:5a"; word array 428 understood controlled as described in conjunction with FIG. 5A-FIG. 5Z.

Segment array 202 is seen applied in BSA 400 control; "ten" total segments 210 understood shown in text 110; "ten" total segments 210 (same as tag strings 708) understood controlled in context 111.

Extender markers 414 are seen applied under BSA 400 control: single extender marker 414 understood to apply segment delineation 224 shown; multiple extender markers 414 understood to apply chunk delineation 124 shown; extender markers 414 not shown in middle bitext 112 view understood applied while hidden.

Tag control 700 and tags 707 are seen in all context 111 views: qui 773 in French language understood same as who 773 in English language; faire 781 in French language understood same as do 781 in English language; où 774 in French language understood same as where 774 in English language; quand 773 in French language understood same as when 773 in English language; same markings thusly applied.

Tag string 708 control is seen applied within all context 111 views: "fourth" tag string 708 shown controlling "two" tags 707 "qui 773" and "quand 773"; total count of tag strings 708 understood as "five".

Figure 7M:
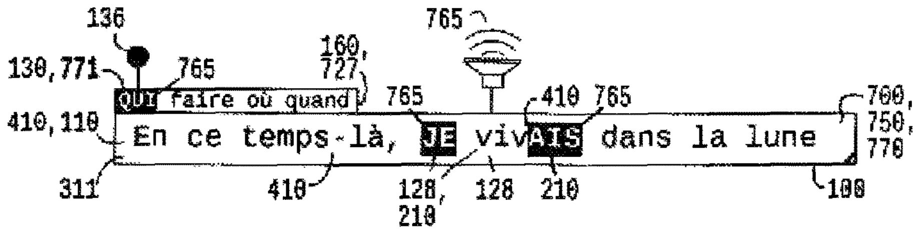
FIG. 7M shows ASQ system concurrently apply ASQ style in a one-segment word and also one segment within a multi-segment word.
Figure 7N:
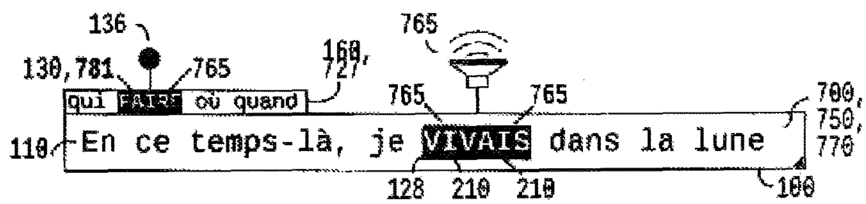
FIG. 7N shows tag repeater control applied; a tag is shown applied in the next segment.
Figure 7O:
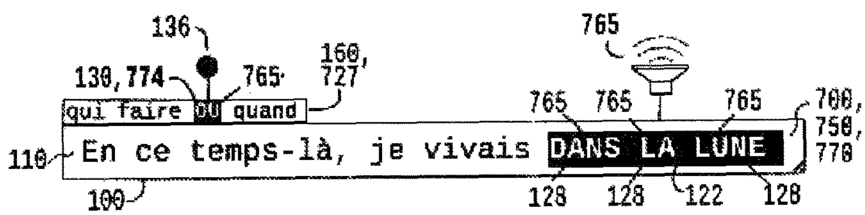
FIG. 7O shows ASQ style applied in a three-word chunk of text.
Figure 7P:
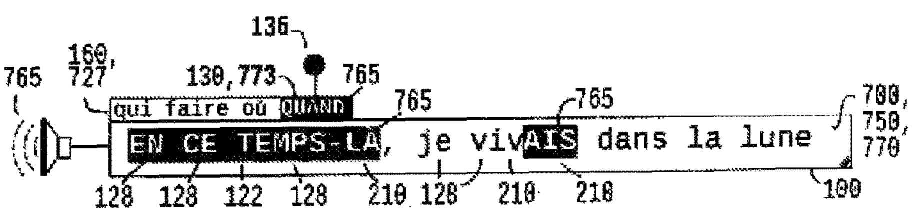
FIG. 7P shows tag control applying ASQ style concurrently in a three-word chunk and also a segment within another word.

Tag repeat 717 control is seen applied within all context 111 views: optionally represented as colon ":", tag repeat 717 is applied to continue previous tag 707 into next segment 210, as described in conjunction with FIG. 7M, FIG. 7N, FIG. 7P.

Alignment 123 control in bitext 112 is shown in middle view:"fifth" word 128 "vivais" in text 110 seen in alignment 123 with tag string 708 containing tag 707 "faire 781"; "second" segment 210 within "fifth" word 128 in text 110 "ais" seen in alignment 123 with tag string 708 containing tags 707 "qui 773" and "où" 774; words 128 and segments 210 within words 128 seen controlled in alignment 123, optionally via BSA 400 or ABC 500 controls shown.

Tag source 750 is shown controlled in easily edited alignment 123; application of controlled tag source 750 is shown as described in conjunction with FIG. 7M-FIG. 7P understood as tag control 700.

FIG. 7M shows tag system concurrently apply ASQ style in a one-segment word and also one segment within a multi-segment word.

Same textarea 100, text 110 and tag source 750 contents edited in FIG. 7M, all seen; context 111 (not seen) understood accessed via show context 312 control seen; hide segments 410 control shown also understood applied in FIG. 7N-FIG. 7P; ASQ system tags 707 seen applied in FIG. 7L example shown applied in optional GUI 160 as tag links 727; tag links 727 seen as qui 773 faire 781 où 774 quand 773, understood same as who 773 do 781 where 774 when 773.

Input 130 is shown applied to qui 773 tag link 727, preferably via microphone 136 shown.

Tag source 750 is referenced: FIG. 7L bitext 112 view of tag source 750 shows tag 707 qui 773 in alignment 123 with "two" segments 210 in text 110 fourth word 128 in text 110 "je", and second segment 210 within fifth word 128 in text 110 "ais".

ASQ style 765 is seen applied: fourth word 128 in text 110 "je", second segment 210 within fifth word 128 in text 110 "ais", and tag link 727 QUE within GUI 160 all seen in ASQ style 765.

One word 128 and one segment 210 within another word 128 pertaining to question who 773 are seen in text 110, under tag control 700 and ASQ control 770.

FIG. 7N shows tag repeater control applied; a tag is shown applied in the next segment.

Same ASQ controls, tag links 727, textarea 100, text 110 from previous figure are seen; same tag source 750 shown from FIG. 7L example understood applied.

Input 130 is shown applied to faire 781 tag link 727, preferably via microphone 136 shown.

Tag source 750 is referenced: FIG. 7M bitext 112 view of tag source 750 shows faire 781 in alignment 123 with text 110 fifth word 128 "viv-ais" first segment 210 "viv-"; tag repeat 717 ":" is applied in next segment 210 (second segment 210 "ais" within same fifth word 128 "viv-ais").

ASQ style 765 is seen in applied: first and second segments 210 in fifth word 128 "viv-ais", and tag link 727 faire 781 within GUI 160 all seen in ASQ style 765.

One word 128 made of multiple segments 210 pertaining to action do 781 is seen in text 110, under tag control 700 and ASQ control 770.

FIG. 7O shows ASQ style applied in a three-word chunk of text.

Same ASQ controls, tag links 727, textarea 100, text 110 from previous figure are seen; same tag source 750 shown from FIG. 7L example understood applied.

Input 130 is shown applied to où 774 tag link 727, preferably via microphone 136 shown.

Tag source 750 is referenced; FIG. 7L bitext 112 control of tag source 750 shows tag 707 où 774 in alignment 123 with a multi-word chunk 122 seen in text 110, sixth, seventh, eighth words 128 "dans la lune".

ASQ style 765 is seen applied: sixth, seventh and eighth words 128 comprising chunk 122 "dans la lune" in text 110 and tag link 727 où 774 within GUI 160 all seen in ASQ style 765.

A chunk 122 made of multiple words 128 pertaining to question where 774 is styled in text 110, under ASQ control.

FIG. 7P shows tag control apply asq style concurrently in a three-word chunk and also a segment within another word.

Same ASQ controls, tag links 727, textarea 100, text 110 from previous figure are seen; same tag source 750 shown from FIG. 7L example understood applied.

Input 130 is shown applied to quand 773 tag link 727, preferably via microphone 136 shown.

Tag source 750 is referenced: FIG. 7L bitext 112 control of tag source 750 shows tag 707 quand 773 in alignment 123 with first chunk 122 seen in text 110 (comprised of first, second, third words 128 "En ce temps-là"); second tag 707 quand 773 within fourth tag string 708 seen as "qui,quand" also understood as in alignment 123 with second segment 210 "ais" in fifth word 128 "vivais".

ASQ style 765 is seen applied: first, second, third words 128 making chunk 122 "en ce temps-la", second segment 210 "ais" within fifth word 128 "vivais" and tag link 727 quand 773 within GUI 160 all seen in ASQ style 765.

A multi-word chunk 122 and also a segment 210 within a separate word 128 all pertaining to question when 773 are seen in ASQ style under ASQ control 770 and tag control 700.

FIG. 7L-FIG. 7P show an example of tag control 700 applied; context 111 with tag strings 708 containing tags 707 are controlled in alignment 123 with chunks 122, words 128 and segments 210 in text 110; alignment 123 shown controlled in chunk array 121, word array 428 and segment array 202.

In the example, multiple tags 707 are seen applied with single segment 210 "ais"; ASQ control 770 applied with tag control 700 seen is applied to label multiple meanings communicated by segment 210 "ais", which is controlled by qui 773 (same as who 773), faire 781, (same as do 781) and quand 773 (same as when 773) tags 707 under ASQ control 770.

FIG. 8A represents a picture sorter applied to depict text with multiple pictures.

Picture 800 aka big picture 800 is seen in media player 140; big picture 800 understood as still picture 800 or motion picture 800 encoded in common formats such as JPG, PNG, GIF, animated GIF, MP4, FLV, WMV, and the like.

Picture sorter 280 is shown represented below media player 140; picture sorter 280 consists of three parts: a numbered media link index 810 which is seen loaded into tiered carousels 820 shown above garbage 845 control; tiered carousels 820 are seen represented by big carousel 821 and small carousel 822; picture sorter 280 controls are applied to sort media links 148 shown.

Media links 148 are controlled in two separate forms: depiction link 868 form seen with encoded picture 800 as described above, and vocalization link 888 form seen, understood to incorporate audible vocalization 188; vocalization 188 understood encoded within media link 148 at specific cue 149 position; timed text 222 shown understood to incorporate said media link 148 and multiple cues 149; vocalization link 888 understood to optionally include picture 800.

Figure 8I:
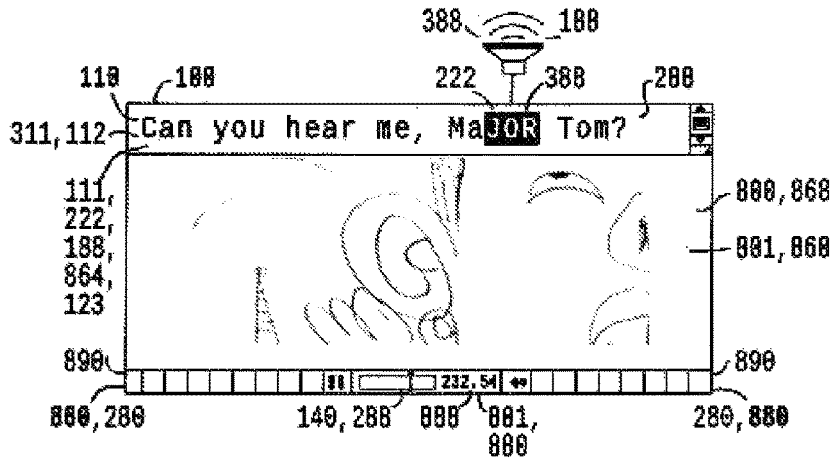
FIG. 8I shows chosen one from depiction index applied as big picture depicting text, while chosen one from vocalization index is applied in to vocalize text.

Media link index 810 seen is controlled in two separate forms: vocalization index 880 seen understood with vocalization links 888 applied as described in conjunction with FIG. 8C-FIG. 8F; depiction index 860 seen understood with depiction links 868 applied as described in conjunction with FIG. 8G-FIG. 8I; vocalization links 888 or depiction links 868 optionally shown in textarea 100 provided.

Good set 811 and OK set 812 are seen controlled within media link index 810; "6" total good set 811 media links 148 seen loaded into big carousel 821; "12" total OK set 812 media links 148 shown loaded into small carousel 822; "18" total media links 148 seen applied within media link index 810 as example.

Big carousel 821 is seen located below media player 140; width represented optionally same as media player 140 width; big carousel 821 as represented spins on axis centered directly below media player 140; spin of big carousel 821 is represented in either or both directions; big carousel 821 is shown comprised of a framework which contains a number of slots.

Small carousel 822 is seen below big carousel 821; similar slot framework, width, central axis and independent spin as big carousel 821 are understood; big carousel 821 as shown has twice the height of small carousel 822.

Garbage 845 control is seen located below small carousel 822; garbage 845 control, small carousel 822 and big carousel 821 altogether form GUI 160 shown of picture sorter 280; picture sorter 280 GUI 160 is applied to sort pictures 800 and vocalizations 188 associated with text 110 strings, as described in detail below; pictures 800 in big carousel 821 and small carousel 822 represented as thumbnails 802.

Thumbnails 802 are represented in both small carousel 822 and big carousel 821; thumbnails 802 in big carousel 821 are represented in large size, in comparison to thumbnails 802 seen in small carousel 822, which are relatively small sized; As shown, thumbnails 802 in small carousel 822 appear at roughly 25% the size of thumbnails 802 seen in big carousel 821.

Media link index 810 numbers are optionally superimposed over thumbnails 802: big carousel 821 seen with six thumbnails 802, numbered as 1 through 6, each numbered thumbnail 802 shown associated with a media link 148 and controlled in good set 811; small carousel 822 shown with twelve thumbnails 802, numbered as 7 through 18, each numbered thumbnail 802 shown associated with a media link 148 and controlled in OK set 812.

Sort down 842 control is shown between big carousel 821 and small carousel 822; same sort down 842 control is seen between small carousel 822 and garbage 845 control; sort down 842 control is applied within picture sorter 280 to move a thumbnail 802 from good set 811 to OK set 812, or from OK set 812 to garbage 845 control.

Sort down 842 control is understood to modify media link index 810 contents; within the example, if sort down 842 control is applied to small carousel 822 thumbnail 802 associated with media link 148 in OK set 812 with media link index 810 number "18", then "medialink-R" is moved into garbage 845 control, and deleted from media link index 810 and removed from the view in small carousel 822; in example described, "eleven" media links 148 would remain in small carousel 822.

Sort up 841 control seen is described in FIG. 8B; it's understood that thumbnails 802 within small carousel 822 are easily moved into larger views within big carousel 821; sort up 841 control is also seen from garbage 845 control, which optionally hides a list of media links 148 before final deletion.

Put 840 control is seen applied from picture sorter 280 to media player 140; select thumbnail 802 within either big carousel 821 or small carousel 822 is optionally put into big picture 800 view in media player 140 via put 840 control shown.

Query 854 seen is applied as text 110 string in query field 147 shown: query 854 string "show me" applied via microphone 136, keyboard 132 or context 111 in alignment 123 shown; same query 854 string "show me" shown with media link index 810; it's understood that every text 110 string applied has dedicated media link index 810 in both vocalization index 880 and depiction index 860 forms shown.

Search 856 seen is applied optionally in network 186 and/or client 187; query 854 shown optionally applied as depiction query 864 or vocalization query 884, both shown.

Depiction query 864 applies search 856 to depiction database 866 shown: results shown loaded into depiction index 860 shown as depiction links 868; depiction links 868 associated with depiction query 864 applied as thumbnails 802 within tiered carousels 820.

Vocalization query 884 applies search 856 to vocalization database 886 shown: results shown loaded into vocalization index 880 shown as vocalization links 888; vocalization links 888 associated with vocalization query 884 applied as thumbnails 802 within tiered carousels 820.

Examples of depiction query 864 and vocalization query 884 controls are shown: depiction query 864 control shown applied as described in conjunction with FIG. 8G-FIG. 8I; vocalization query 884 control shown applied as described in conjunction with FIG. 8C-FIG. 8E.

Figure 8J:
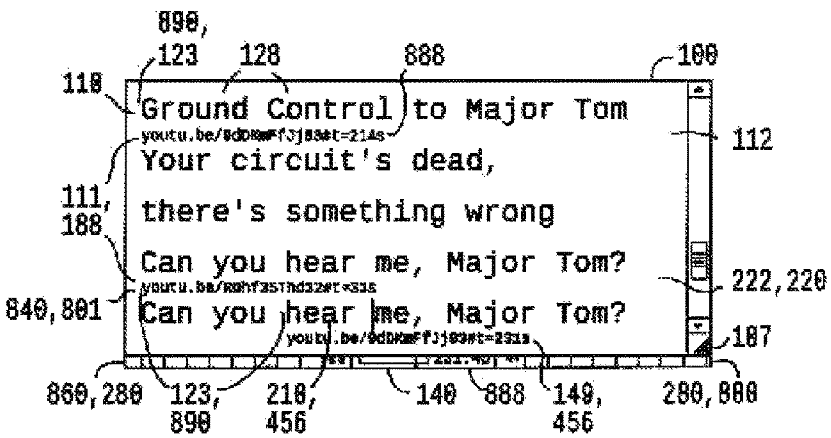
FIG. 8J shows source of vocalization context in sequential edit control applied.
Figure 8K:
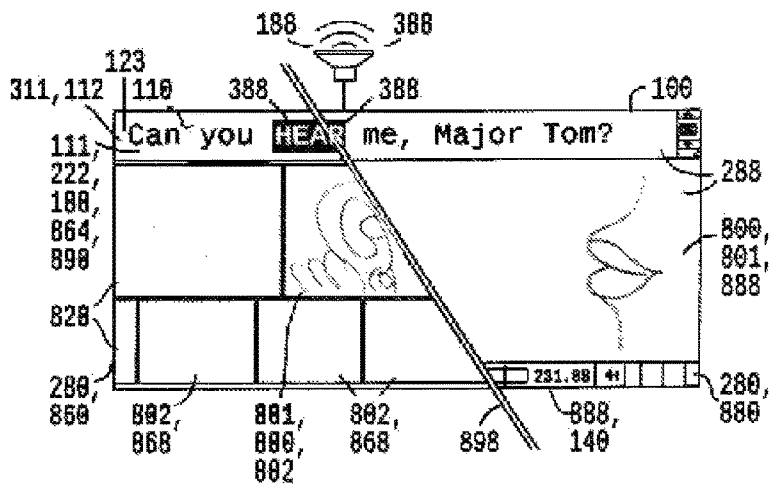
FIG. 8K shows vocal text in playback while switch between picture sorter and media player is made.

Same picture sorter 280 shown is applied to sort vocalization index 880 and depiction index 860 separated; pictures 800 of text 110 strings applied in query 854 controlled in depiction index 860; vocalizations 188 of text 110 strings applied in query 854 controlled in vocalization index 880; picture sorter 280 applies both vocalization index 880 and depiction index 860 under sequential edit 890 control as described in conjunction with FIG. 8J, FIG. 8K.

Valid data 308 seen is generated under picture sorter 280 control; sort up 841, sort down 842 and garbage 845 controls are applied to define preferred pictures 800 and vocalizations 188 associated with query 854 string; valid data 308 is shown optionally sent from client 187 to depiction database 866 and/or vocalization database 886 seen on SERVER via network 186 shown.

FIG. 8B example shows sort up control applied within picture sorter.

Same media player 140 as FIG. 8A is seen with same picture sorter 280 with same tiered carousels 820 big carousel 821 and small carousel 822 controlling same good set 811 and OK set 812 within same media link index 810 shown; (media link index 810 seen optionally applied with same vocalization index 880 and same depiction index 860); same garbage 845 control seen applied.

Microphone 136 is seen provided; same depiction query 864, vocalization query 884 controls from FIG. 8A shown optionally generated via voice input 130 to microphone 136; camera 138 shown provided optionally applied while making vocalization 188, and sharing vocalization 188 as described in conjunction with FIG. 12A-12Q.

Media link index 810 shown represents both vocalization index 880 and depiction index 860; it's understood that before sort up 841 control shown is applied, as described in conjunction with FIG. 8A, "six" thumbnails 802 representing good set 811 in media link index 810 are put in big carousel 821; "twelve" thumbnails 802 representing OK set 812 in media link index 810 are put in small carousel 822.

Same big carousel 821 contents from FIG. 8A are represented; for example, "medialink-C" from FIG. 8A media link index 810 is seen as thumbnail 802 "C" in big carousel 821; thumbnail 802 "C" is numbered "3", representing third place in list within media link index 810.

Same small carousel 822 contents from FIG. 8A are represented; for example, "medialink-Q" from FIG. 8A media link index 810 is seen as thumbnail 802 "Q" in small carousel 822; thumbnail 802 "Q" is numbered "17" to represent seventeenth place within media link index 810.

Sort up 841 control is seen applied; thumbnail 802 "P", representing media link 148 "medialink-P", is represented as moving upward; strike out seen in number "16" represents previous place in media link index 810 as number "sixteen" and within OK set 812; new place within media link index 810 is understood as number "four", seen as number "4"; thumbnail 802 "P" is moved from sixteenth to fourth place, and within good set 811.

Good set 811 represented in big carousel 821 is changed; for example, thumbnail 802 "D" is seen with two numbers; strike out seen in number "4" represents previous "fourth" place in media link index 810; new number "5" represents thumbnail 802 "D" now in "fifth" place in media link index 810:

OK set 812 represented in small carousel 822 is changed; for example, thumbnail 802 "N" is seen with two numbers; strike out seen in number "14" represents previous "fourteenth" place in media link index 810; new number "15" represents "N" thumbnail 802 now in "fifteenth" place in media link index 810.

Media link index 810 is understood modified; total "seven" media links 148 now understood in big carousel 821 and good set 811; total "eleven" media links 148 now understood in small carousel 822 and OK set 812; good set 811 medialink-order in media link index 810 now "ABCP-DEF"; OK set 812 medialink-order in media link index 810 now "GHIJKLMNOQR"; "medialink-P" understood moved from OK set 812 to good set 811.

Depiction query 864 seen is optionally applied in query field 147; text 110 string "show me" shown optionally with vocalized text 388 applied while sort up 841 control is applied; vocalization 188 seen is heard while thumbnail 802 representing depiction query 864 is sorted upward; vocalization 188 heard is optionally generated via TTS 170 shown or vocalization link 888 shown; query 854 is optionally applied from context 111 (not shown), as described in conjunction with FIG. 8E, FIG. 8H.

Vocalization query 884 seen is optionally applied in query field 147; vocalization 188 records of query 854 string understood found as described in FIG. 8C below, and optionally applied as vocalized text 388 shown under sort up 841 control.

Multiple tiered carousels 820 are understood as applicable; the example includes big carousel 821 and small carousel 822 for description; additional carousel(s) are optionally applied, as described in conjunction with FIG. 8D.

FIG. 8C shows vocalization query applied in media player above picture sorter.

Same media player 140 as FIG. 8B is seen; same picture sorter 280 seen is minimized below; microphone 136 seen optionally provided to apply text 110 as input 130 in query field 147 under STT 171 control, all shown; text 110 "can you hear me" seen as vocalization query 884; camera 138 seen provided to optionally record video accompanying vocalization 188 of said input 130.

Vocalization query 884 is made via search 856 shown; timed texts 222 seen in vocalization database 886 are searched for vocalization query 884 string "can you hear me"; vocalization links 888 are found containing vocalization query 884 "can you hear me".

Vocalization links 888 found in search 856 are applied within vocalization index 880 and picture sorter 280; vocalization index 880 shown is loaded with vocalization links 888 seen; vocalization links 888 are seen to incorporate timed texts 222, media links 148, cues 149 applied synchronously with vocalization 188.

Picture sorter 280 seen is loaded with thumbnails 802 of vocalization links 888 shown; full picture sorter 280 control in order of vocalization links 888 within vocalization index 880 seen in FIG. 8D.

Big picture 800 is seen in media player 140: vocalization link 888 applied in big picture 800 presents video, if any, synchronized with vocalization 188; meta-data such as "author", "title" optionally applied if no picture 800 data available; in either case, vocalization index 880 number is optionally superimposed over big picture 800, as shown.

Chosen one 801 is seen in big picture 800: chosen one 801 understood as number "1" in vocalization index 880; selection of chosen one 801 optionally made via network 186 average or client 187 preference, both shown.

Vocalized text 388 is seen applied within vocalization query 884 in text 110; media player 140 shown applies big picture 800 vocalization link 888 for time spans 320 shown; text 110 query 854 is experienced in vocalization 188 seen and heard; various vocalizations 188 of same applied in vocalization query 884 accessed via maximized picture sorter 280.

Picture sorter 280 is accessed; pointer 182 shown as optional example understood to click within minimized picture sorter 280; maximized picture sorter 280 control of multiple vocalizations 188 of same vocalization query 884 "can you hear me" seen accessed in FIG. 8D.

FIG. 8D shows picture sorter applied to sort vocalizations found via vocalization query.

Same vocalization query 884 "can you hear me" as FIG. 8C is seen in same query field 147; same media player 140 and vocalization link 888 applied as chosen one 801 shown are minimized behind picture sorter 280; same picture sorter 280 now seen maximized.

Picture sorter 280 seen fills 90% of frame with tiered carousels 820; big carousel 821 seen with thumbnails 802 at 40% height, representing good set 811 shown; small carousel 822 seen with thumbnails 802 at 30% height, representing OK set 812 shown; tiny carousel 823 seen with thumbnails 802 at 20% height, representing maybe set 813 shown; garbage 845 control seen below at 1% height.

Vocalization index 880 is seen applied in picture sorter 280: at least "twenty-nine" vocalization links 888 seen in picture sorter 280; vocalization index 880 numbers optionally superimposed over thumbnails 802 as shown; tiered carousels 820 represented applied to view thumbnails 802 of vocalization links 888.

Vocalization links 888 are represented in thumbnails 802; vocalization links 888 as shown incorporate media links 148, cues 149, timed text 222 resources all seen; each vocalization link 888 understood to optionally apply separate cues 149, understood incorporated in timed texts 222; synchronous players 288 shown understood to apply vocalization links 888 to reproduce vocalization 188 of vocalization query 884.

Picture sorter 280 is applied to sort vocalizations 188: garbage 845 control shown applied to remove unwanted vocalizations 188; sort down 842 and sort up 841 controls shown between tiered carousels 820; preferred vocalizations 188 easily arranged in larger view; unique vocalizations 188 understood represented in thumbnails 802.

Sort up 841 control seen is optionally coordinated with vocalized text 388 control shown; text 110 shown in query 854 and audio at cue 149 within media link 148 applied in synchronous players 288 shown.

Put 840 control is seen applied to select thumbnail 802: pointer 182 shown as example with click input 130 seen applied; vocalization link 888 number "28" is represented as selected; selected vocalization 188 seen applied in big picture 800 as shown in FIG. 8E.

Picture sorter 280 control of vocalization index 880 is understood; vocalization query 884 is applied with specific text 110 string; timed text 222 containing vocalization query 884 string are found; cues 149 within controlled media links 148 are applied; vocalizations 188 of same vocalization query 884 are easily compared; multiple vocalizations 188 of single vocalization query 884 are experienced and sorted.

FIG. 8E show selected thumbnail in big picture while vocal text plays.

Same vocalization query 884 "can you hear me" is seen in same query field 147 from FIG. 8C; same query field 147 now shown integrated with textarea 100; bitext 112 seen applied; same microphone 136 and camera 138 shown; same picture sorter 280 applied with same vocalization index 880 now seen minimized; same media player 140 shown maximized filling 90% of frame; same vocalization link 888 seen selected in FIG. 8D is shown applied.

Put 840 control is seen: strike-out seen in vocalization index 880 of vocalization link 888 number "28"; put 840 control optionally applied to move selected vocalization link 888 to number "1" position within vocalization index 880 as shown; selected vocalization link 888 seen optionally applied as chosen one 801 associated with vocalization query 884 "can you hear me".

Timed text 222 is seen applied; timed text 222 values understood accessed within separate context 111 form as described in conjunction with FIG. 9A-FIG. 9E; timed text 222 understood applied within vocalization link 888 and cue 149 shown to provide synchronous vocalization 188 of vocalization query 884 in synchronous players 288 shown.

Vocalized text 388 performance is shown; vocalization link 888 cue 149 value "231.45" seconds shown synchronized with start of vocalization query 884 text 110; media player 140 applied in playback 142 for timespans 320; vocalized text 388 performance seen (and heard) understood applied with vocalization query 884 "can you hear me".

Vocalization 188 is seen in context 111: vocalization link 888 "youtu.be/9dDKmFfJj83" with cue 149 value "231" seconds seen as chunk 122 in alignment 123 with chunk 122 in text 110 "can you hear me"; vocalization link 888 and cue 149 value seen in context 111 understood applied in reproduction of vocalization 188; context 111 in form of vocalization 188 understood.

Alignment 123 control shown is understood; alignment 123 seen in bitext 112 shown in this and all future figures understood to optionally apply BSA 400 control (not shown) or ABC 500 control (not shown), as described in conjunction with FIG. 7L.

Shared meaning database 870 is shown; shared meaning database 870 understood to optionally apply restatement 191 context 111, as described in conjunction with FIG. 9F-FIG. 9H, to associate similar strings that convey similar messages and share meaning; various translation 192 contexts 111, as described in conjunction with FIG. 9S-FIG. 9V and FIG. 9X are also understood applied in shared meaning database 870; variable ways to say similar things are understood as stored in separate shared meaning index 876 controlled with same picture sorter 280.

Text 110 surrounding query 854 "can you hear me" is optionally accessed; synchronous players 288 shown are applied to control playback 242 from variable cue 149 positions within media link 148; textarea 100 seen is applied to view surrounding text 110, as shown in FIG. 8F below.

FIG. 8F shows vocal text in play above media player and condensed picture sorter.

Same vocalization query 884 "can you hear me" is seen in same textarea 100 as FIG. 8E; same picture sorter 280 control of same vocalization index 880 now seen minimized; same media player 140, same vocalization link 888 seen as chosen one 801 all shown below textarea 100.

Resize 107 control is seen applied under pointer 182 control shown: media player 140 optionally made smaller as shown; textarea 100 optionally superimposing over big picture 800 view shown in previous Figure.

Text 110 surrounding vocalization query 884 "can you hear me" is seen; vocalization query 884 string is seen optionally in reversed case 322 and highlight 326; surrounding text 110 contents are seen as "there's something wrong, can you hear me, Major Tom? Can you hear me, Major Tom?".

Synchronous players 288 shown are optionally applied to experience surrounding vocalization 188 in conjunction with vocalized text 388 shown; timed text 222 shown applied while hide context 311 control seen; (variable context 111 forms understood accessed as described in conjunction with FIG. 9A-FIG. 9E).

Surrounding text 110 is applied to see various examples of same vocalization query 884 in use; as example, text 110 surrounding same vocalization query 884 "can you hear me" seen in FIG. 8C is understood as separate "can you hear me knocking on your door"; each vocalization link 888 represented in FIG. 8D thumbnails 802 understood to optionally contain varying contents in surrounding text 110; separate surrounding TEXTS understood easily accessed under picture sorter 280 control of vocalization index 880 shown.

Vocalization query 884 control shown is applied to access multiple vocalizations 188 of same text 110 string; separate vocalizations 188 and surrounding texts 110 are accessed via picture sorter 280 control in order of vocalization links 888 within vocalization index 880 as shown. show context 312 control is seen provided to show more uses for picture sorter 280 as described in conjunction with FIG. 8G-FIG. 8K.

FIG. 8G shows depiction in context aligned with text within textarea resized over media player.

Same text 110 from FIG. 8F is seen in same textarea 100 shown with resize 107 control applied; same selected vocalization link 888 in media player 140 and same picture sorter 280 are all seen; picture sorter 280 is seen applied with separate depiction index 860.

Depiction queries 864 are seen in context 111 in alignment 123 with text 110; bitext 112 control is seen applied with show context 312 control shown; chunks 122 are seen controlled in text 110 and context 111; alignment 123 seen (understood controlled as described in conjunction with FIG. 7L) in examples: second context 111 chunk 122 "dialing phone" and second text 110 chunk 122 "to Major Tom"; final context 111 chunk 122 "space walk" and final text 110 chunk 122 "Major Tom".

"Depiction 864" form in context 111 is understood as depiction queries 864 applied to depict text 110; depiction 864 context 111 is applied to visually depict chunks 122 of text 110; depictions understood to include motion or non-motion pictures 800; depiction 864 context 111 understood as separate from vocalization links 888 seen applied as vocalization 188 form of context 111 as described in conjunction with FIG. 8E.

Depiction queries 864 are seen applied in search 856 with depiction database 866; depiction links 868 seen in thumbnails 802 within depiction index 860 are seen applied in picture sorter 280 maximized picture sorter 280 presentation of depiction link 868 thumbnails 802 seen in FIG. 8H.

Depiction 864 context 111 and text 110 are optionally applied in search 856 of depiction database 866; as example, text 110 "ground control" results do not illustrate meaning in text 110; context 111 "mission control" results more aptly depict meaning in text 110; better results in search 856 are achieved with applied depiction 864 context 111.

Depiction index 860 is optionally configured: variable strings in text 110 and context 111 understood each controlled in separate depiction index 860; combined strings optionally applied as described in conjunction with FIG. 8H below.

Picture sorter 280 shown optionally controls depiction index 860 of depiction links 868; separate depiction index 860 and vocalization index 880 application within same picture sorter 280 controlled via vocal/picture switch 898 seen, as described in conjunction with FIG. 8K; maximized picture sorter 280 is applied with depiction 864 context 111 as described in conjunction with FIG. 8H.

FIG. 8H shows depiction context and text applied in picture sorter.

Same text 110 from FIG. 8G is seen in same textarea 100 shown with resize 107 control applied; same selected vocalization link 888 in media player 140 both seen minimized; same picture sorter 280 applying same depiction index 860 seen maximized; same bitext 112 control in text 110 and context 111 seen applied.

Textarea 100 is seen with one line in bitext 112: text 110 seen as "can you hear me, Major Tom?"; depiction 864 context 111 seen as "success kid ear astronaut"; alignment 123 seen between first context 111 chunk 122 "success kid" and first text 110 chunk 122 "can you"; alignment 123 seen between second context 111 chunk 122 "ear" and second text 110 chunk 122 "hear me"; alignment 123 seen between third context 111 chunk 122 "astronaut" and third text 110 chunk 122 "Major Tom".

Chunks 122 are seen controlled separately with depiction index 860; each chunk 122 understood to optionally access separate set of depiction links 868 to aptly depict chunk 122; same depiction links 868 in different order are optionally applied for separate chunks 122.

Text 110 and depiction 864 context 111 both are seen applied in search 856 of depiction database 866; combined contents are optionally applied simultaneously to illustrate complete text 110 line depiction 864 context 111 is optionally applied in search 856 first, with purpose to order depiction links 868 within depiction index 860 to depict text 110.

Depiction links 868 are seen applied in depiction index 860 within picture sorter 280; specific order of depiction links 868 within depiction index 860 is optionally modified in conjunction with vocalization link 888 applied; for example, one collection of depiction links 868 are optionally applied with first vocalization link 888 seen in FIG. 8C, while another collection of depiction links 868 are optionally applied with second vocalization link 888 (shown); further, depiction 864 context 111 is understood to vary by preference, as described in conjunction with FIG. 9P-FIG. 9R; unique sets of pictures 800 are ordered with variable instances of same text 110.

Thumbnails 802 of depiction links 868 are sorted in picture sorter 280: garbage 845 control seen provided to delete unwanted pictures 800; big carousel 821 and small carousel 822 both shown; sort up 841 and sort down 842 controls seen applied with tiered carousels 820.

Chosen one 801 in depiction index 860 is seen applied with one select thumbnail 802: put 840 control shown applied as described in conjunction with FIG. 8I.

FIG. 8I shows chosen one from depiction index applied as big picture depicting text, while chosen one from vocalization index is applied in vocalization of text.

Same text 110 from FIG. 8G is seen in same textarea 100; same selected vocalization link 888 seen minimized; same media player 140 shown applying vocalization link 888 in synchronous players 288, while also showing depiction link 868 in big picture 800; same picture sorter 280 seen minimized with left half controlling depiction index 860 and right half controlling vocalization index 880.

Bitext 112 control is seen in text 110 "Can you hear me, Major Tom?"; hide context 311 control is shown applied; context 111 shown (hidden) is understood to apply separate forms seen: timed text 222 shown in context 111 is applied in synchronous players 288 shown; vocalization 188 shown in context 111 is understood applied with vocalization link 888 seen in media player 140; depiction 864 shown in context 111 is applied in big picture 800 seen.

Alignment 123 is seen with context 111; alignment 123 shown is optionally applied to change depiction link 868 or vocalization link 888 contents controlled in context 111, in coordination with timed text 222; depiction links 868 contents are optionally changed at every line, as described in conjunction with FIG. 8H; vocalization link 888 contents in vocalization 188 context 111 are optionally controlled as described in conjunction with FIG. 8J.

Vocalization 188 context 111 is applied in vocalized text 388 seen and heard; text 110 "jor" within line "Can you hear me, MaJOR Tom" seen in VOCAL text 110 performance; vocalization 188 seen and heard understood as synchronous with text 110 "jor"; synchronous playback 288 shown applied vocalization link 888 with timed text 222 shown; vocalization 188 heard is understood applied from chosen one 801 number "1" media link 148 within vocalization index 880, as described in conjunction with FIG. 8E.

Depiction 864 context 111 is applied in big picture 800 seen; chosen one 801 in depiction link 868 seen selected in FIG. 8G presents visual content from number "1" depiction link 868 selected in depiction index 860, while separate vocalization link 888 is applied in vocalization 188 shown.

Picture sorter 280 is shown controlling vocalization 188 context 111: vocalization 188 context 111 seen placed into alignment 123 with text 110 under put 840 control as described in conjunction with 8D-FIG. 8E; sequential edit 890 control in vocalization 188 shown applied as described in conjunction with FIG. 8J.

Picture sorter 280 is shown controlling depiction 864 context 111: depiction 864 context 111 understood optionally modified within bitext 112 in textarea 100 shown in FIG. 8H and controlled in alignment 123 as described in conjunction with FIG. 8G-FIG. 8I.

Sequential edit 890 seen is controlled via picture sorter 280: text 110 seen found in vocalization query 884 shown in FIG. 8C; vocalization 188 seen selected as chosen one 801 from vocalization links 888 in vocalization index 880 selected in FIG. 8E; big picture 800 seen selected as chosen one 801 from depiction links 868 in depiction index 860 selected in FIG. 8H-FIG. 8I.

Same sequential edit 890 control understood optionally applied with any timed text 222, where multiple contexts 111 are each controlled in independent alignment 123, and picture sorter 280 is applied to select chosen one 801 in both vocalization 188 and depiction 864.

FIG. 8J shows source of vocalization context in sequential edit control applied.

Same text 110 from FIG. 8I is seen in same textarea 100, now expanded under resize 107 control shown; same selected vocalization link 888 and media player 140 seen minimized; same minimized picture sorter 280 with link to maximize depiction index 860 on left and link to maximize vocalization index 880 on right.

Bitext 112 control seen applied with expanded text 110 contents; same visible text 110 contents as seen in FIG. 8G; FIG. 8G shows depiction 864 context 111 in independent alignment 123 with same text 110; FIG. 8J shows vocalization 188 context 111 in independent alignment 123 with same text 110.

Vocalization 188 context 111 is seen in alignment 123 examples: vocalization link 888 "youtu.be/9dDKmFfJj83#214s" with first visible word 128 in text 110 "Ground"; vocalization link 888 "youtu.be/RGhf35Thd32#t=33s" with twelfth visible word 128 in text 110 "Can"; vocalization link 888 "youtu.be/9dDKmFfJj83#t=213s" with twentieth visible word 128 in text 110 "hear".

Alignment 123 seen is applied as sequential edit 890 control shown: separate vocalization links 888 understood synchronized with vocalization 188 of text 110; media player 140 shown understood to apply separate vocalization links 888; timings 220 seen within timed texts 222 shown understood converted.

ABC 500 control shown applied: juxtaposition of context 111 chunks 122 with text 110 chunks 122 shown controlled with correspondence 456 seen between cue 149 values seen in vocalization links 888 and segments 210 seen in text 110 controlled.

Put 840 control is seen applied with vocalization 188 context 111: picture sorter 280 shown controlling vocalization index 880 understood applied to sample vocalizations 188 of text 110 and apply chosen one 801 seen via put 840 control, as described in conjunction with FIG. 8C-FIG. 8E.

FIG. 8K shows vocal text in playback while switch between picture sorter and media player is made.

Same text 110 from FIG. 8J is seen in same textarea 100; same bitext 112 control of same context 111 hidden under hide context 311 control shown; same timed text 222, vocalization 188, and depiction 864 contexts 111 applied with same sequential edit 890 control all shown; same vocalization link 888 seen applied by same media player 140; vocalized text 388 shown proceeds through text 110 while heard from media player 140; synchronous players 288 shown applied while vocal/picture switch 898 is represented.

Vocal/picture switch 898 is seen applied; graphic slash overlaying textarea 100 represents vocal/picture switch 898: to left, depiction 864 context 111 seen applied within picture sorter 280; to right, vocalization 188 context 111 seen applied within big picture 800 provided by vocalization link 888.

Thumbnail 802 pictures 800 shown are optionally viewed while vocalized text 388 proceeds: multiple pictures 800 optionally viewed in picture sorter 280 as shown, as shown in FIG. 8H; chosen one 801 seen optionally applied in big picture 800, as shown in FIG. 8I; it's understood that before vocal/picture switch 898 seen is applied, entire frame is filled either with chosen one 801 in big picture 800 from depiction index 860; or multiple thumbnails 802 within picture sorter 280 as shown; example text 110 line "Can you hear me, Major Tom?" is seen controlled with pictures 800.

Vocalization 188 is optionally viewed in big picture 800 as shown; right of vocal/picture switch 898, video picture 800 of vocalization 188 is optionally experienced synchronously with vocalized text 388; it's understood that after vocal/picture switch 898 seen is applied, entire frame is filled chosen one 801 in big picture 800 from vocalization index 880; multiple vocalizations 188 of same text 110 example "Can you hear me, Major Tom?" understood as accessed via picture sorter 280 shown optionally controlling vocalization index 880.

Vocal/picture switch 898 shown is understood as optionally applied textarea 100 is maximized; full view of depiction 864 context 111 in alignment 123 with text 110, as shown in FIG. 8G, and full view of vocalization 188 context 111 in independent alignment 123 with text 110, as shown in FIG. 8J, are understood as optionally alternated under same vocal/picture switch 898 control.

Picture sorter 280 is applied to experience same text 110 in depiction 864 and vocalization 188; multiple vocalizations 188 of same text 110 are optionally experienced; multiple pictures 800 of same text 110 are optionally experienced; context 111 seen in alignment 123 is applied to amply define text 110, as described in conjunction with FIG. 9A-FIG. 9Z; any text 110 in any language understood optionally applied with picture sorter 280 controls shown.

FIG. 9A shows context form example before toggle control changes context form.

Toggle 999 and versions 900 control are seen applied in textarea 100; textarea 100 is same textarea 100 seen in all previous Figures with all previously specified controls, including but not limited to WYSIWYG 109 edit, vocal text 388, media player 140, synchronous players 288, tap 333, tap game 360, TTS 170, and picture sorter 280 controls, all shown, are understood applied.

Text 110 is seen as constant in FIG. 9A-FIG. 9V examples; text 110 example same as FIG. 8F is understood applied; contents visible within the example are same "There's some-thing wrong! Can you hear me Ma-jor Tom?"; any text 110 example is understood applied in actual practice.

Bitext 112 control is seen applied; as described in conjunction with FIG. 1B, smaller-sized context 111 in weak style 116 is juxtaposed with larger-sized text 110 seen in strong style 118; weak style 116 and strong style 118 controls are detailed in FIG. 11A-FIG. 11H.

Alignment 123 controls are shown applied: segments 210, words 128, chunks 122 are all shown in text 110 and context 111 controlled in bitext 112; as described in conjunction with FIG. 7L, either BSA control described in FIG. 4A-FIG. 4Y or ABC control described in FIG. 5A-FIG. 5Z are understood as applied in real-time 189 alignments 123 and independent alignments 923 shown throughout the disclosure.

Independent alignment 923 control is seen; alignment 123 in IPA transcription 382 context 111 form 920 is controlled separately from other context 111 forms 920 seen in FIG. 9B-FIG. 9D; each version 900 within each form 920 of context 111 is controlled in independent alignment 923 with text 110; independent alignment 923 and alignment 123 are understood as same; independent alignment 923 is marked to emphasize separate alignment 123 within forms 920 and versions 900 shown.

Word aligner 402 under BSA control is shown as example: IPA transcription 382 in context 111 is seen controlled in alignment 123 by the word 128; FIG. 9C in comparison applies segment aligner 401 (not shown); each context 111 form 920 and version 900 is shown controlled in independent alignment 923 with text 110.

Alignment 123 is seen in examples: second word 128 "səm-θɪŋ" in context 111 with second word 128 "something" in text 110; fifth word 128 "ju" in context 111 with fifth word 128 "you" in text 110.

IPA transcription 382 form 920 of context 111 is seen within FIG. 9A example; context 111 contents are seen as "ðɛrz səm-θɪŋ rɒŋ ! kæn ju hɪr mi med-ʒər tɑm ?"; as described in conjunction with FIG. 3Q, IPA TRANSCRIPTION 382 in context 111 is optionally switched with text 110; as described in conjunction with FIG. 4O-FIG. 4P, additional controls are applied with IPA transcription 382 in context 111.

Type 940 within form 920 of context 111 is shown applied: IPA transcription 382 understood as one type 940 of phonetic transcription form 920; another type 940 of phonetic transcription form 920 such as "Shavian" optionally applied.

Toggle 999 control is seen applied to form 920 in context 111; as example, IPA transcription 382 form 920 of context 111 is toggled to another context 111 form 920 seen in FIG. 9B.

FIG. 9B shows separate vocalization context aligned with same text.

Same text 110 contents are seen in same textarea 100 under same controls as described in conjunction with FIG. 9A; bitext 112 control shown applied.

Vocalization 188 form 920 of context 111 is seen; vocalization links 888 seen, as described in alignment 123 and controlled as described in conjunction with FIG. 8J.

Alignment 123 seen is different than IPA transcription 382 example seen in FIG. 9A: FIG. 9A shows no aligned context 111 with third segment 210 "thing" in text 110; FIG. 9B shows first vocalization link 888 "dkHdHfj32hf#t=66s" in context 111 seen with third segment 210 "thing" in text 110.

Independent alignment 923 control is seen; vocalization 188 context 111 form 920 alignment 123 is controlled separately from other context 111 forms 920 and versions 900; vocalization 188 context 111 is seen in independent alignment 923 with text 110.

Toggle 999 control shown changes form 920 in context 111; as example, vocalization 188 form 920 of context 111 is toggled to another context 111 form 920 seen in FIG. 9C.

FIG. 9C shows aligned timing context applied with vocalization links seen in FIG. 9B.

Same text 110 contents are seen in same textarea 100 under same controls as described in conjunction with FIG. 9A; same bitext 112 control now shown applied with timed text 222.

Timings 220 form 920 is seen in context 111: first context 111 line timing 220 values seen as "174.81 175.21 175.44 175.73 176.12"; second context 111 line timing 220 values seen "176.26 176.53 176.64 176.98 177.34 177.68 177.90 178.36"; control of timing 220 corresponding with segments 210 and pause marker 212 seen in text 110 understood as described in conjunction with FIG. 2A-FIG. 4L; timings 220 understood as factored within new media link 148 shown under sequential edit 890 control.

Versions 900 control in timings 220 context 111 form 920 is seen; as described in conjunction with FIG. 3O, FIG. 3P, various versions 900 of timings 220 are controlled; versions 900 within context 111 form 920 understood optionally viewed as described in conjunction with FIG. 9F-FIG. 9I.

Alignment 123 of context 111 with text 110 is different than previous Figures; FIG. 9B shows no content specifically aligned with segment 210 "Ma-" in text 110; FIG. 9C shows timing 220 value "177.34" in alignment 123 with segment 210 "Ma-" in text 110; segment 210 aligner 401 is seen applied: FIG. 9A shows word aligner 402 applied; FIG. 9C shows each timing 220 in alignment 123 with each segment 210 in text 110.

Independent alignment 923 control is seen; timing 220 context 111 form 920 alignment 123 is controlled separately from other context 111 forms 920 and versions 900; timing 220 context 111 is seen in independent alignment 923 with text 110.

Toggle 999 control shown changes form 920 in context 111; as example, timings 220 form 920 of context 111 is toggled to another context 111 form 920 seen in FIG. 9C.

FIG. 9D shows ASQ tags aligned with same FIG. 9A text.

Same text 110 contents are seen in same textarea 100 under same controls as described in conjunction with FIG. 9A; bitext 112 control shown.

Tag control 700 form 920 of context 111 is seen: tag 707 values "what do what how" seen on first context 111 line; tag 707 values "have who do who who how who" seen on second context 111 line.

Type 940 is seen within tag 700 form 920 in context 111; ASQ 770 system seen applied with tags 707 as type 940 within form 920 of tags 707; other types 940 of tags 707 such as grammar tags 707 are optionally applied.

Versions 900 within type 940 of tag 700 control form 920 are seen in context 111; as described in conjunction with FIG. 7C-FIG. 7P, ASQ 770 type 940 of tags 707 is interpretive; separate versions 900 within a type 940 or form 920 of context 111 are controlled.

Alignment 123 of context 111 with text 110 is different than previous Figures; FIG. 9C shows timing 220 value "175.44" in alignment 123 with third text 110 segment 210 "thing"; FIG. 9D shows no tag 707 aligned with same text 110 segment 210 "thing".

Independent alignment 923 control is seen; tag 700 context 111 form 920 alignment 123 is controlled separately from other context 111 forms 920 and versions 900; tag 700 context 111 is seen in independent alignment 923 with text 110.

Forms 920 in context 111 are seen in FIG. 9A-FIG. 9D as examples: it's understood that multiple other forms 920 are optionally applied; independent alignment 923 shown is understood applied in all alignments 123 seen, with versions 900 control now specified.

Toggle 999 control in FIG. 9A-FIG. 9D context 111 forms 920 is represented in FIG. 9E.

FIG. 9E represents toggle applied to change forms of context between same text example.¬

Same text 110 contents are seen in same textarea 100 under same controls as described in conjunction with FIG. 9A; bitext 112 control shown; graphic slashes overlaying textarea 100 are seen as toggle 999 controls applied; context 111 forms 920 are shown change by toggle 999 control; each form 920 seen in independent alignment 923 with text 110.

Forms 920 in context 111 are seen toggled under toggle 999 control: IPA transcription 382 form 920 in context 111 from FIG. 9A seen first; vocalization 188 form 920 in context 111 from FIG. 9B seen second; timings 220 form 920 in context 111 from FIG. 9C seen third; tag 700 form 920 in context 111 from FIG. 9D seen fourth; IPA transcription 382 context 111 from FIG. 9A seen again fifth.

Loop 969 control shown is applied with toggle 999 control; after third toggle 999 control, fourth context 111 form 920 is seen; after fourth execution of toggle 999 control of form 920, first context 111 form 920 is seen again.

Reverse direction 987 seen with toggle 999 control of form 920 optionally applied; within the example, if timings 220 form 920 in context 111 is viewed and toggle 999 control of form 920 is applied in reverse direction, then timings 220 form 920 would be replaced by vocalization 188 form 920 of context 111.

Text 110 position is understood as constant; no change in text 110 contents or position is made while multiple contexts 111 are toggled between the lines of same text 110.

Contexts 111 in multiple forms 920 are seen: IPA transcription 382, vocalization 188, timings 220 and tags 707 seen by example; each context 111 form 920 shown controlled in independent alignment 923; additional forms 920 seen in FIG. 9F, FIG. 9J and FIG. 9O are also shown as example; it's understood that multiple context 111 forms 920 are controlled.

Types 940 within forms 920 are shown optionally applied; within each context 111 form 920, toggle 999 control is optionally applied to change type 940 shown.

Versions 900 seen within forms 920 and types 940 shown are optionally applied; within each context 111 form 920 and/or type 940, separate versions 900 are optionally viewed, as shown in FIG. 9F-FIG. 9X.

FIG. 9F shows a same-language restatement context aligned with same FIG. 9A text.

Same text 110 contents are seen in same textarea 100 under same conditions and controls as described in conjunction with FIG. 9A; bitext 112 control shown applied; hide segments 410 control shown applied in text 110.

Context 111 is seen in form 920 of restatement 191; same-language restatement 191 is understood applied for various purposes, optionally reference to see similar ways to phrase similar messages, commentary, re-write options for shared document version controls.

Version 900 control is seen applied: first text 110 line "There's something wrong," seen with context 111 "something is not working"; second text 110 line "Can you hear me, Major Tom?" seen with context 111 "do you read me? roger?"; both context 111 lines seen as first version 901.

Alignment 123 between context 111 and text 110 is seen in examples: second chunk 122 in text 110 "wrong" with second chunk 122 in context 111 "not working"; fourth chunk 122 in text 110 "hear me" with fourth chunk 122 in context 111 "read me?".

Caret 105 is seen: caret 105 seen at end of first context 111 line, immediately prior to edit of context 111 contents as shown in FIG. 9G.

FIG. 9G shows a second line of context added in independent alignment with first line of text.

Same text 110 contents are seen in same textarea 100 under same conditions and controls as described in conjunction with FIG. 9A; bitext 112 control shown applied; same restatement 191 form 920 of context 111 and contents are seen as in FIG. 9F; additional context 111 contents are seen added.

Second version 902 of context 111 is seen added in independent alignment 923 with first line of same text 110; second version 902 contents seen as "there is a problem"; caret 105 position is shown after input 130 is applied.

Show version 912 control is seen; input 130 of a new context 111 line is seen to add a multiple interpretation within a form 920; addition of a multiple interpretation within a form 920 is controlled as context 111 version 900; show versions 912 control is applied automatically at start of input 130 of new version 900; hide versions 911 control shown hides versions 900 in context 111 as described in conjunction with FIG. 9I.

Independent alignment 923 is seen in second version 902: FIG. 9F shows second context 111 chunk 122 "not working" in alignment 123 with second text 110 chunk 122 "wrong,"; FIG. 9G shows second version 902 context 111 chunk 122 "a problem" in independent alignment 923 with separately controlled second text 110 chunk 122 "something wrong,".

Second version 902 in context 111 seen is optionally added selectively; first text 110 line is seen with multiple context 111 versions 900 in independent alignment 923 with text 110; second text 110 line is seen with a single context 111 version 900 in independent alignment 923 with text 110.

Toggle 999 control shown is optionally applied with versions 900; if applied, then versions 900 of context 111 aligned with first text 110 line would change, while single version of context 111 aligned with second text 110 line would remain same.

Caret 105 is seen positioned after current context 111 edit and immediately prior to edit of context 111 contents seen in FIG. 9H.

FIG. 9H shows multiple context lines independently aligned with the text.

Same text 110 contents are seen in same textarea 100 under same conditions and controls as described in conjunction with FIG. 9A; same bitext 112 control shown applied; same restatement 191 form 920 of context 111 and contents are seen as in FIG. 9G; same show version 912 control is seen applied; additional context 111 contents are seen added under versions 900 control.

Third version 903 of context 111 are seen added in independent alignment 923 with same text 110; all versions 900 of context 111 are seen as same form 920 of restatement 191 context 111; caret 105 position is shown after input 130 seen is applied.

First text 110 line now seen with three versions 900 of restatement 191 context 111: same first text 110 line seen as "There's something wrong"; same first version 901 in context 111 line seen as "something is not working"; same second version 902 in context 111 line seen as "there is a problem"; new third version 903 in context 111 line seen as "houston, we have a problem".

Second text 110 line now seen with three versions 900 of restatement 191 context 111: same second text 110 line context 111 "Can you hear me, Major Tom?"; same first version 901 in context 111 line seen as "do you read me? roger?"; new second version 902 in context 111 line seen as "hello? hello? are you there?"; new third version 903 in context 111 line seen as "is anyone home? spaceman?".

Independent alignment 923 is seen in all context 111 versions 900 with first line of text 110: first version 901 second context 111 chunk 122 "not working" with second text 110 chunk 122 "wrong"; second version 902 second context 111 chunk 122 "a problem" with second text 110 chunk 122 "something wrong,"; third version 903 first context 111 chunk 122 "houston, we have a problem" with first text 110 chunk 122 "There's something wrong,".

Independent alignment 923 is seen within context 111 versions 900 with second line of text 110: first version 901 second context 111 chunk 122 "read me?" with second text 110 chunk 122 "hear me,"; second version 902 second context 111 chunk 122 "are you there?" with second text 110 chunk 122 "me, Major Tom?".

Hide versions 911 control is shown: if applied, first version 901 shown would appear exactly as seen in restatement 191 form 920 of context 111 in alignment 123 with text 110 as shown in FIG. 9F; added versions 900 shown in FIG. 9G, FIG. 9H would be hidden from view.

Toggle 999 control in versions 900 control shown is applied as described in conjunction with FIG. 9I below; hide versions 911 control is preferably applied automatically if toggle 999 control of versions 900 is applied.

FIG. 9I represents toggle control applied to multiple restatement contexts aligned with text.

Same text 110 contents are seen in same textarea 100 under same conditions and controls as described in conjunction with FIG. 9A; same restatement 191 form 920 of context 111 and contents shown in FIG. 9G are understood as applied; hide versions 911 control shown is applied; one version 900 at a time is seen between lines of text 110; additional versions 900 of context 111 in restatement 191 form 920 are accessed under toggle 999 control of versions 900 control; restatement 191 form 920 of context 111 is seen in all versions 900.

Toggle 999 control of versions 900 shown is applied in representation; toggle 999 control of versions 900 represented as graphic slash over same textarea 100; same text 110 contents are represented as constant, without change; contexts 111 in versions 900 within form 920 as shown in FIG. 9F-FIG. 9H.

Toggle 999 control of versions 900 shown is repeatedly applied; text 110 contents "There's something wrong, Can you hear me Major Tom" show no change; contexts 111 in multiple versions 900 within same form 920 of restatement 191 are seen; each version 900 of context 111 shown is controlled in independent alignment 923.

First version 901 in context 111 is seen first: full first version 901 context 111 from FIG. 9H understood visible before toggle 999 control of versions 900 applied; first version 901 first line "something is not working" with first text 110 line "There's something wrong"; first version 901 second line "do you read me roger?" with second text 110 line "Can you hear me, Major Tom?"; independent alignments 923 seen understood applied as shown in FIG. 9H.

Second version 902 in context 111 is seen second: full second version 902 context 111 from FIG. 9H understood visible before toggle 999 control of versions 900 again applied; second version 902 first line "there is a problem" with first text 110 line "There's something wrong"; second version 902 second line "hello? hello? are you there?" with second text 110 line "Can you hear me, Major Tom?"; independent alignments 923 seen understood applied as shown in FIG. 9H.

Third version 903 in context 111 is seen third: full third version 903 context 111 from FIG. 9H understood visible before toggle 999 control of versions 900 again applied; third version 903 first line "houston, we have a problem" with first text 110 line "There's something wrong"; third version 903 second line "is anyone home? spaceman?" with second text 110 "Can you hear me, Major Tom"; independent alignments 923 seen understood applied as shown in FIG. 9H.

Loop 969 control is shown with toggle 999 control of versions 900; after second execution of toggle 999 control of versions 900, third version 903 within restatement 191 form 920 of context 111 seen after third execution of toggle 999 control of versions 900, first version 901 within same restatement 191 form 920 of context 111 is again seen, exactly as shown in FIG. 9F, with same alignment 123 and independent alignment 923 controls shown applied.

Reverse direction 987 seen with toggle 999 control of versions 900 is optionally applied; within the example, applied reversed direction 987 would show third version 903 after first version 901, second version 902 after third version 903 and so on.

Versions 900 of context 111 seen are accessed fast; within the example, toggle 999 control of versions 900 is applied in either direction to access multiple versions 900 within same restatement 191 form 920 of context 111; multiple versions 900 of context 111 are quickly accessed and controlled within textarea 100 shown.

Text 110 position is represented as constant; independent alignment 923 control shown applied in contexts 111 does not affect position of text 110.

FIG. 9J shows one version within translation form of context aligned with second line of same text seen in FIG. 9A.

Same text 110 contents are seen in same textarea 100 under same conditions and controls as described in conjunction with FIG. 9A; bitext 112 control shown; second line of same text 110 "Can you hear me, Major Tom?" is visible within the example.

Toggle 999 control seen applied with form 920 shown changed; forms 920 shown in FIG. 9A-FIG. 9I are understood as hidden.

Translation 192 form 920 of context 111 is seen; type 940 seen in translation 192 form 920 is understood as "Spanish" translation 192, as example; other types 940 in translation 192 form 920, such as "Chinese", "Russian" and such understood applied under toggle 999 control shown; machine translation 193 seen optionally applied.

Hide versions 911 control is seen: first version 901 seen of translation 192 context 111 shown as "te estoy hablando campeón"; no other versions 900 in translation 192 context 111 are seen.

Independent alignment 923 control is seen in example: second context 111 chunk 122 "campeón" with second text 110 chunk 122 "Major Tom"; alignment 123 also shown; it's understood that all alignments 123,923 seen in the disclosure are controlled within versions 900, with each context 111 in independent alignment 123,923 with text 110.

Show version 912 control is applied by input 130 shown; preconfigured input 130 as described in conjunction with FIG. 1A applied with show version 912 control presents multiple versions 900 within same "Spanish" type 940 within same "translation 192" form 920 of context 111; if new line 103 seen is applied with caret 105 shown, then show version 912 control displays existing versions 900 as shown in FIG. 9K.

FIG. 9K shows multiple context versions included with single context version seen in FIG. 9J.

Same text 110 contents are seen in same textarea 100 under same conditions and controls as described in conjunction with FIG. 9J; same bitext 112 control shown applied.

Show versions 912 in context 111 is seen: FIG. 9J shows only one first version 901 in context 111 while hide versions 911 control is applied; FIG. 9K shows multiple versions 900 under show version 912 control applied.

Multiple versions 900 in context 111 are seen: first version 901 seen as "te estoy hablando, campeón" is same as FIG. 9J; second version 902 seen as "puedes tú oirme comandate tomás"; third version 903 seen as "es que me oyes? tom?"; fourth version 904 seen as "me escuchas? astronauta"; fifth version 905 seen as "¿bueno? ¿donde andas?"; sixth version 906 seen as "¿me entiendes, mendez?""; seventh version 907 seen as "¿estás capáz de oirme comandante?"; eighth version 908 in context 111 line seen as "me captas a mí m'hijo".

Independent alignment 923 is seen in multiple examples: first version 901 second context 111 chunk 122 "campeón" with fifth text 110 word 128 "Major?"; second version 902 second context 111 chunk 122 "tú" second text 110 word 128 "you"; third version 903 second context 111 chunk 122 "me oyes?" with third text 110 word 128 "hear"; fifth version 905 second context 111 chunk 122 "¿ dónde andas? with fourth text 110 word 128 "me"; seventh version 907 second context 111 chunk 122 "de oirme" with third text 110 word 128 "hear"; eighth version 908 second context 111 chunk 122 "a mí" with fourth text 110 word 128 "me"; and so on.

Chunks 122 in text 110 seen are multiple: "Can", "you", "hear me". "Major Tom?", "you hear me", "me, Major Tom?", "Can you hear me," each understood a separate chunks 122 in text 110 as defined by independent alignments 923 shown in versions 900 of context 111.

FIG. 9L shows FIG. 9K contexts edited and reorganized; a version exclusion control is applied.

Same text 110 contents are seen in same textarea 100 under same conditions and controls as described in conjunction with FIG. 9K; same bitext 112 control shown applied; versions 900 seen in same "Spanish" type 940 of translation 192 form 920 in context 111 are seen rearranged in order, edited and supplemented.

Ninth version 909 is seen added: FIG. 9K shows total "8" versions 900 of context 111 in Spanish; FIG. 9L shows total "9" versions 900 of context 111 in Spanish; ninth version 909 in context 111 seen as "agarras la onda? maestro.

Versions 900 in context 111 are seen rearranged: as examples, FIG. 9K shows first version 901 in context 111 as "te estoy hablando, campeón"; FIG. 9L shows first version 901 in context 111 as "puedes tú oirme comandante tomás"; FIG. 9K shows eighth version 908 in context 111 as "me captas a mí m'hijo"; FIG. 9L shows eighth version 908 in context 111 as "te estoy hablando, campeón".

Same versions 900 in context 111 are seen re-ordered under toggle sequence 910 control: as examples, FIG. 9K shows fourth version 904 in context 111 as "me escuchas astronauta"; FIG. 9L shows second version 902 in context 111 as "me escuchas astronauta"; FIG. 9K shows fifth version 905 in context 111 as "¿ bueno? ¿ dónde andas?"; FIG. 9L shows fourth version 904 in context 111 as " ¿ bueno? ¿ dónde andas?".

WYSIWYG 109 edit control is shown applied in example: FIG. 9K shows eighth version 908 in context 111 as "me captas a mí m'hijo"; FIG. 9L shows seventh version 907 in context 111 as "¿ me captas? jefe".

Toggle sequence 910 control is shown; chosen one 801 is seen with first version 901 "puedes tú oirme comandante tomás"; first version 901 is understood as preferred version shown before toggle 999 control in versions 900 is applied; rearrangement of version 900 order is applied as toggle sequence 910 control.

Toggle sequence 910 control applies same control used in popular "Notepad++" program where entire line or multiple lines are easily moved up/down; an additional control is added where selected line(s) are sorted across boundary of version exclusion 913 control.

Version exclusion 413 control seen is understood; empty line 103 seen below fourth version 904 in context 111 and above fifth version 905 in context 111 is shown as version exclusion control 913; as seen below in FIG. 9M, fifth version 905, sixth version 906, seventh version 907, eighth version 908, and ninth version 909 are excluded from toggle sequence 910 under toggle 999 control of versions 900; first version 901, second version 902, third version 903 and fourth version 904 in context 111 are seen included.

Independent alignment 923 control is shown in examples: context 111 second version 902 first chunk 122 "me escuchas?" with second text 110 word 128 "you"; context 111 third version 903 second chunk 122 "¿ me oyes? with third text 110 word 128 "hear"; context 111 fourth version 904 second chunk 122 "¿ donde andas? with fourth text 110 word 128 "me".

Hide versions 911 control shown is understood applied: chosen one 801 in context 111 "puedes tú oirme comandante tomás" understood as seen in full within textarea 100 shown in FIG. 9M before toggle 999 control with versions 900 is applied.

FIG. 9M shows versions toggle control applied with versions controlled in FIG. 9L.

Same text 110 contents are seen in same textarea 100 under same conditions and controls as described in conjunction with FIG. 9L; same bitext 112 control shown applied; text 110 contents "Can you hear me, Major Tom?" seen unchanged and unmoved while multiple versions 900 of context 111 in "Spanish" type 940 of translation 192 form 920 are seen under toggle 999 control is applied with versions 900.

Same hide versions 911 control is shown applied; entire first version 901 context 111 contents are understood as "puedes tú oirme comandante tomás" before toggle 999 control is applied with versions 900.

Toggle 999 control applied with versions 900 is represented as graphic slash over same textarea 100; same text 110 contents are represented as constant, without change; contexts 111 in versions 900 within form 920 as shown controlled in FIG. 9L.

Four versions 900 in context 111 seen are represented as toggle 999 is applied; entire contents of each version 900 in context 111 above version exclusion 913 control as seen in FIG. 9L are represented in FIG. 9M while toggle 999 control is applied with versions 900.

First version 901 in context 111 entire contents "puedes tú oirme comandante tomás" are understood as seen first, before first toggle 999 is applied; independent alignments 923 seen understood applied as described in conjunction with FIG. 9L.

Second version 902 in context 111 entire contents "¿ me escuchas? astronauta" are understood as seen second, after first toggle 999 is applied; independent alignments 923 seen understood applied as described in conjunction with FIG. 9L.

Third version 903 in context 111 entire contents "es que ¿ me oyes? tom?" are understood as seen third, after second toggle 999 is applied; independent alignments 923 seen understood applied as described in conjunction with FIG. 9L.

Fourth version 904 in context 111 entire contents " ¿ bueno? ¿ donde andas?" understood as seen fourth, after third toggle 999 is applied; independent alignments 923 seen understood applied as described in conjunction with FIG. 9L.

Loop 969 control is shown in toggle 999 control of versions 900: after third toggle 999 control of versions 900 applied, fourth version 904 in context 111 seen; after fourth toggle 999 control of versions 900 applied, first version 901 in context 111 seen.

Reverse direction 987 is shown in toggle 999 control of versions 900; within the example, applied reversed direction 987 would show fourth version 904 after first version 901, third version 903 after fourth version 904 and so on.

Versions 900 of context 111 seen are accessed fast: within the example, toggle 999 control of versions 900 is applied in either direction to access multiple versions 900 within same "Spanish" type 940 of translation 192 form 920 in context 111; multiple versions 900 of context 111 are quickly accessed and controlled within textarea 100 shown.

Text 110 position is represented as constant; independent alignment 923 control shown applied in contexts 111 does not affect position of text 110.

Chosen one 801 seen with third version 903 is applied as described in conjunction with FIG. 9N.

FIG. 9N shows third version in context from FIG. 9N sorted up to first version in context while hide versions control is applied.

Same text 110 contents are seen in same textarea 100 under same conditions and controls as described in conjunction with FIG. 9L; same bitext 112 control shown applied; same translation 192 seen in context 111; hide versions 911 control seen remains applied.

Chosen one 801 selected in FIG. 9P is seen applied; FIG. 9L shows chosen one 801 in context 111 as "puedes tú oirme comandante tomás"; FIG. 9M shows chosen one 801 in context 111 as "es que ¿ me oyes? tom?"; FIG. 9P shows view of entire chosen one 801 contents "es que ¿ me oyes? tom?" in full view after toggle 999 control in versions 900 control is applied as described in conjunction with FIG. 9M.

Show version 912 control seen is optionally applied; if applied, context 111 versions 900 as shown in FIG. 9L would be seen, while third version 903 in FIG. 9L would now be seen as first version 901 "es que ¿ me oyes? tom?", second version 902 would now be seen as "puedes tú oirme comandante tomás"; third version 903 would now be seen as "me escuchas? astronauta"; same fourth version 904 would be seen as same "¿ bueno? ¿ dónde andas?.

Toggle sequence 910 control shown is understood applied: sequential order of versions 900 in context 111 is optionally controlled while hide versions 911 control is applied; toggle 999 control of versions 900 is applied until chosen one 801 is selected.

Context 111 toggle 999 seen is applied with form 920 as shown in FIG. 9O below.

FIG. 9O show toggle control of form applied to view depiction context aligned with text.

Same text 110 contents are seen in same textarea 100 under same conditions and controls as described in conjunction with FIG. 9N; same bitext 112 control shown applied; toggle 999 control shown applied to view depiction 864 context 111 form 920.

Depiction 864 form 920 of context 111 is seen; same text 110 contents "Can you hear me, Major Tom?" are seen above; depiction 864 context 111 contents seen as "mission control tune in dial space walker"; as described in conjunction with FIG. 8G, FIG. 8H, depiction 864 context 111 is applied with picture sorter 280 shown to find pictures 800 seen to depict text 110; versions 900 of depiction 864 context 111 are seen controlled.

Alignment 123 and independent alignment 923 is seen in examples: second context 111 chunk 122 "tune in dial" with second text 110 chunk 122 "hear me,"; third context 111 chunk 122 "space walker" with third text 110 chunk 122 "Major Tom?".

First version 901 is shown in context 111: other versions 900 of same context 111 form 920 shown controlled in independent alignment 923, as seen in FIG. 9P.

Hide versions 911 control is shown applied; show version 912 control seen is applied to see multiple versions 900 in depiction 864 context 111 seen in FIG. 9P FIG. 9P shows versions in context of depiction context seen in FIG. 9O.

Same text 110 contents are seen in same textarea 100 under same conditions and controls as described in conjunction with FIG. 9O; same bitext 112 control shown applied; show version 912 control seen is applied.

Versions 900 of context 111 in depiction 864 form 920 are seen in multiple languages: first version 901 in context 111 seen as "mission control tune in dial space walker" in English language; second version 902 in context 111 seen as "success kid cat ears bad luck Brian" in English language; third version 903 in context 111 seen as "porte-voix moi la lune" in French language; fourth version 904 in context 111 seen as "roketi uzinduzi nafasi-mtu" in Swahili language; fifth version 905 in context 111 seen as "电话耳朵宇航 员" in Chinese language.

Version exclusion 913 control is applied; it's understood that an unlimited number of versions 900 are optionally applied; "five" versions 900 seen above version exclusion 913 control shown.

Independent alignment 923 with text 110 in separate context 111 versions 900 is seen in examples: third version 903 second chunk 122 "moi" with fourth text 110 word 128 "me"; fourth version 904 second chunk 122 "uzinduzi" with second text 110 word 128 "you"; fifth version 905 second chunk 122 " " with third text 110 word 128 "hear".

Chunks 122 in text 110 seen are understood defined by context 111 in independent alignment 923: text 110 chunks 122 "Can you" "hear me," "Major Tom?" defined by first version 901 and second version 902 contexts 111; text 110 chunks 122 "Can you hear" "me," "Major Tom?" defined by third version 903 context 111; text 110 chunks 122 "Can" "you hear me," "Major Tom?" defined by fourth version 904 context 111; same text 110 chunk 122 "Major Tom" seen in alignment 123 with all versions 900.

Client 187 authors of depiction 864 context 111 versions 900 are shown: first version 901 seen with client 187 "mona", second version 902 seen with client 187 "leo", third version 903 seen with client 187 "ra", fourth version 904 seen with client 187 "aish", fifth version 905 seen with client 187 "li"; it's understood that an unlimited number of clients 187 optionally apply versions 900, and that same client 187 optionally applies multiple versions 900.

Depiction 864 context 111 versions 900 seen are unique to each client 187; depiction 864 context 111 is understood applied as described in conjunction with FIG. 8G-FIG. 8I, client 187 versions 900 in depiction 864 context 111 are applied in picture sorter 280 seen in full view in FIG. 9Q.

FIG. 9Q shows client version of depiction context applied in picture sorter.

Same text 110 contents are seen in same textarea 100 under same conditions and controls as described in conjunction with FIG. 9O; hide context 311 control seen is applied while show version 912 control seen is applied in picture sorter 280

Picture sorter 280 is seen in full view; all picture sorter 280 controls as described in conjunction with FIG. 8A-FIG. 8K understood applied; vocalization index 880 shown is understood as optionally applied; depiction index 860 seen is understood applied in the example.

Depiction 864 context 111 from FIG. 9P is seen in applied picture sorter 280; thumbnails 802 shown in tiered carousels 820 are found and in conjunction with depiction 864 context 111; pictures 800 seen in thumbnails 802 shown are applied to depict contents in text 110.

Client 187 versions 900 of depiction 864 context 111 are shown applied; GUI 160 shown below picture sorter 280 seen with links to client 187 versions 900 shown controlled in FIG. 9P; it's understood: first version 901 shown optionally shows separate set of pictures 800; second version 902 shown optionally shows separate set of pictures 800; third version 903 shown optionally shows separate set of pictures 800; fourth version 904 shown optionally shows separate set of pictures 800.

Fifth version 905 is seen applied within the example; thumbnails 802 pictures 800 seen understood sorted by client 187 author shown as "LI"; individual preference in thumbnails 802 pictures 800 is shown applied, under control of separate client 187 version 900 of depiction 864 context 111.

Same thumbnail 802 picture 800 are optionally seen in separate client 187 versions 900; for example, chosen one 801 seen in fifth version 905 shown is seen same as chosen one 801 in network 186 version 900 control shown in FIG. 9R.

FIG. 9R shows network version of picture context applied in picture sorter.

Same text 110 contents are seen in same textarea 100 under same conditions and controls as described in conjunction with FIG. 9O; same hide context 311 control seen is applied in depiction 864 context 111 seen while show version 912 control seen is applied in picture sorter 280 shown in full view.

Client 187 versions 900 are seen; GUI 160 links below picture sorter 280 are applied to see thumbnail 802 pictures 800 chosen by separate clients 187; for example, fifth link "Ii" links to depiction index 860 of depiction links 864 controlled by client 187 "Ii"; and seen represented as fifth version 905 in FIG. 9Q example.

Network 186 version 900 is seen in applied depiction 864 context 111 shown: pictures 800 seen as thumbnails 802 within tiered carousels 820 in picture sorter 280; depiction links 864 seen applied are defined by most preferred chosen ones 801 shown within clients 187 seen.

Chosen one 801 is seen within network 186 version 900; within the example, chosen one 801 seen in network 186 version 900 is same as chosen one 801 seen in fifth version 905 shown in FIG. 9Q; other thumbnail 802 pictures 800 seen in FIG. 9Q example of separate client 187 version 900 are understood as different from network 186 version 900 seen in FIG. 9R.

Network 186 version 900 and client 187 version 900 examples are understood as extensively applied; as described in conjunction with FIG. 30, FIG. 3R, data created on multiple separate clients 187 is applied in an "average" 350 or network 186 version 900; as described in conjunction with FIG. 8C, all context 111 contents preferably apply both network 186 and client 187 versions 900.

Depiction 864 context 111 in FIG. 9P example is seen in multiple versions 900; separate versions 900 are seen associated with separate authors or clients 187; separate languages are seen applied within same form 920 depiction 864 context 111; separate languages also are applied in a separate context 111 form 920, as described in conjunction with FIG. 9S-FIG. 9V.

FIG. 9S shows real-time head tracking applied with toggle controls to change languages and pictures: computer seen from high angle.

Computer 180 seen is handheld mobile device with multiple systems, as described in conjunction with FIG. 1; within computer 180, same text 110 in same textarea 100 as FIG. 9R is seen with same conditions, controls understood applied; same bitext 112 control shown; picture sorter 280 and media player 140 seen applied.

Versions 900 control seen understood applied in two context 111 forms 920 shown: translation 192 context 111 "你能听到我，主要汤姆？" seen applied in "Chinese" form 920; depiction 864 context 111 seen applied in big picture 800 showing cartoon drawing of spaceman walking with boombox.

Independent alignment 923 is seen in example fourth chunk 122 in context 111 "到我" with fourth word 128 in text 110 "me".

Head tracking 950 in real-time 189 seen is applied with video camera 138 camera shown; headtrackr javascript library for real-time head tracking 950 is optionally applied to track head position via webRTC/getUserMedia standard.

High view angle 952 shown is detected by head tracking 950: toggle 999 controls seen understood applied while high view angle 952 detected.

Toggle 999 control is seen applied under head tracking 950 control; type 940 within translation 192 form 920 of context 111 is changed, and big picture 800 within depiction 864 form 920 of context 111 is changed as shown in FIG. 9T FIG. 9T shows head tracking applied with toggle control of translation language and depiction context: computer seen from left angle.

Same computer 180, camera 138, text 110, textarea 100, media player 140, picture sorter 280 are seen as in FIG. 9S; same controls understood applied; same toggle 999 control of translation 192 context 111 type 940 and version 900 in depiction 864 context 111 form 920 applied in conjunction with same head tracking 950 control, all shown.

Left view angle 954 seen is detected by head tracking 950 control; left side of computer 180 represented appears larger than right side; head tracking 950 control is applied with toggle 999 control.

Big picture 800 seen in media player 140 is changed: FIG. 9S picture 800 seen as spaceman walking with boombox; FIG. 9T picture 800 seen as woman plugging her ears; version 900 in depiction 864 context 111 shown (hidden) is understood changed.

Type 940 within context 111 translation 192 form 920 is seen changed: FIG. 9S type 940 in translation 192 form 920 of context 111 understood as "Chinese"; FIG. 9T type 940 in translation 192 form 920 of context 111 understood as "Thai"

Context 111 contents visible in textarea 100 are seen changed: FIG. 9S context 111 contents seen as "你能听到我，主要汤姆？"; FIG. 9T context 111 contents seen as "คุณสามารถ ได้ยินเสียงฉัน Major Tom?".

Independent alignment 923 is seen between separate version 900 in context 111 and same text 110 in example second context 111 chunk 122 " ได้ยินเสียงฉัน " with third text 110 word 128 "hear"

FIG. 9U shows head tracking applied with toggle control of translation language and depiction context: computer seen from right angle.

Same computer 180, camera 138, text 110, textarea 100, media player 140, picture sorter 280 are seen as in FIG. 9T; same controls understood applied; same toggle 999 control of translation 192 context 111 type 940 and version 900 in depiction 864 context 111 form 920 applied in conjunction with same head tracking 950 control, all shown.

Right view angle 956 seen is detected by head tracking 950 control; right side of computer 180 represented appears larger than left side; head tracking 950 control is applied with toggle 999 control.

Big picture 800 seen in media player 140 is changed: FIG. 9T picture 800 seen as woman plugging her ears; FIG. 9U picture 800 seen as astronaut spacewalk above earth; version 900 in depiction 864 context 111 shown (hidden) is understood as changed.

Type 940 within context 111 translation 192 form 920 is seen changed: FIG. 9T type 940 within translation 192 form 920 of context 111 understood as "Thai"; FIG. 9U type 940 within translation 192 form 920 of context 111 understood as "Russian".

Context 111 contents visible in textarea 100 are seen changed: FIG. 9T context 111 contents seen as " คุณสามารถ ได้ยินเสียงฉัน Major Tom?"; FIG. 9U context 111 contents seen as "Вы слышите меня , майор Том?"

Independent alignment 923 is seen between separate version 900 in context 111 and same text 110 in example: third context 111 chunk 122 "Том?" with sixth text 110 word 128 "Tom".

FIG. 9V shows head tracking applied with toggle control of translation language and depiction context: computer seen from low angle.

Same computer 180, camera 138, text 110, textarea 100, media player 140, picture sorter 280 are seen as in FIG. 9U; same controls understood applied; same toggle 999 control of translation 192 context 111 type 940 and version 900 in depiction 864 context 111 form 920 applied in conjunction with same head tracking 950 control, all shown.

High view angle 952 seen is detected by head tracking 950 control; right side of computer 180 represented appears larger than left side; head tracking 950 control is applied with toggle 999 control.

Big picture 800 seen in media player 140 is changed: FIG. 9U picture 800 seen as astronaut spacewalk above earth; FIG. 9V picture 800 seen as spacecamp mission control; version 900 in depiction 864 context 111 shown (hidden) is understood as changed.

Type 940 within context 111 translation 192 form 920 is seen changed: FIG. 9U type 940 within translation 192 form 920 of context 111 understood as "Russian"; FIG. 9V type 940 within translation 192 form 920 of context 111 understood as "Italian".

Context 111 contents visible in textarea 100 are seen changed: FIG. 9U context 111 contents seen as " Вы слышите меня , майор Том"; FIG. 9V context 111 contents seen as "Riesci a sentirmi Major Tom?".

Independent alignment 923 is seen between separate version 900 in context 111 and same text 110 in example third context 111 chunk 122 "Major Tome" with fifth text 110 word 128 "Major".

Toggle 999 control is shown in one example configuration applied with forms 920 and versions 900 under head tracking 950 control; front view angle 955 (not shown) is understood as optionally applied; it's understood that multiple configurations area possible to view multiple contexts 111 applied in independent alignment 923 with same text 110.

FIG. 9W shows vocal text play while translation language type is toggled.

Same textarea 100 seen is same as all previous textareas 100 with all previously specified controls understood as optionally applied; a new example in text 110 contents seen is understood in English language as example; any language text 110 is understood as optionally applied.

Text 110 contents are seen as "Toggle context 111 in play or tap time, for example change context 111 language or change translation 192 versions".

Vocalized text 388 is seen applied with synchronous players 288 shown; media player 140 seen is applied in vocalization 188 seen and heard from vocalization link 888 shown applied; timed text 222 seen is applied in vocalized text 388, as described in conjunction with FIG. 3B-FIG. 3C; vocalized text 388 is represented as actively proceeding through fourth segment 210 shown in text 110.

Toggle 999 control to change context 111 form 920 seen is represented by graphic slash overlaying textarea 100; toggle 999 control seen applied while vocalized text 388 proceeds in synchronous playback 288; same bitext 112 control shown applied before and after toggle 999 is applied.

Context 111 contents shown are changed in real-time 189 seen; left of toggle 999, same-language restatement 191 form 920 is seen in context 111; right of toggle 999, separate translation 192 form 920 is seen in "Spanish" type 940 shown; it's understood that the change is instantly made while vocalized text 388 proceeds.

Independent alignment 923 is represented in both contexts 111 shown in examples: chunk 122 "toggle various" in restatement 191 context 111 seen left, and fourteenth text 110 word 128 "change"; "mientras que sigue el juego" in translation 192 context 111 seen right, and eleventh text 110 word 128 "context 111".

Version 900 control is seen in both restatement 191 form 920 and translation 192 form 920 in context 111 shown: first version 901 seen in restatement 191 context 111; version 900 control in restatement 191 context 111 understood applied as described in conjunction with FIG. 9F-FIG. 9I; first version 901 seen in translation 192 context 111; version 900 control in translation 192 context 111 understood applied as described in conjunction with FIG. 9J-FIG. 9N; version 900 control applied while vocalized text 388 proceeds understood as described in conjunction with FIG. 9X.

FIG. 9X shows vocal text play while translation language version is toggled.

Same textarea 100, text 110 contents, vocalization link 888, timed text 222, media player 140, and toggle 999 control, all shown, are seen as in FIG. 9W; bitext 112 control shown applied.

Vocalized text 388 seen proceeds through seventh segment 210 "or" in text 110; vocalization 188 shown is understood to be heard as "or" within synchronous players 288 shown.

Toggle 999 control in version 900 is seen applied: seen represented in graphic slash over textarea 100: to left, before toggle 999 is applied; first version 901 of translation 192 context 111 seen to right, after toggle 999 is applied; second version 902 in translation 192 context 111 seen same bitext 112 control shown applied before and after toggle 999 is applied.

First version 901 shown is understood same as first version 901 seen in FIG. 9W; same second context 111 chunk 122 "mientras que sigue el juego" seen partially in view before toggle 999 is applied.

Context 111 contents shown are changed in real-time 189 seen; toggle 999 represented as applied while vocalized text 388 proceeds through seventh segment 210 "or"; change from first version 901 to second version 902 understood applied instantly.

Independent alignment 923 is represented in both contexts 111 shown in examples: chunk 122 "toggle various" in restatement 191 context 111 seen left, and fourteenth text 110 word 128 "change"; "mientras que sigue el juego" in translation 192 context 111 seen right, and third text 110 word 128 "in".

FIG. 10A shows wide context chunks aligned with a text example; spaces appear between text words.

Textarea 100 is shown under ABC 500 control with bitext 112 format shown applied; all previously specified controls are understood as applicable, as are controls specified in FIG. 11A-FIG. 11E and FIG. 12A-FIG. 12Q.

Text 110 contents seen are "Más vale fracasar en el intento que no intentar por terror al fracaso." context 111 contents seen are "it's better to make a mistake by trying something than it is not to try it for fear of making a mistake".

Alignment 123 of chunks 122 is seen in examples: in first bitext 112 line, seventh context 111 word 128 "by" with fourth text 110 word 128 "en"; in second bitext 112 line, eighth context 111 word 128 "for" and fourth text 110 word 128 "por".

Independent alignment 923 is seen; hidden versions 900 in context 111 under toggle 999 control shown are understood to optionally align separately with any other text 110 word 128 or segment 210; if toggle 999 is applied, text 110 positions shift, due to spaces 102 seen before chunks 122 in text 110.

Unwanted spaces 102 in text 110 are controlled: truncation 1010 control shown in FIG. 10B removes spaces 102 in text 110; context size 1020 control shown in FIG. 10C removes spaces 102 in text 110.

FIG. 10B shows truncation control applied to remove spaces between text words.

Same example from FIG. 10B is seen with all same controls understood applied; same bitext 112 in alignment 123 seen before same words in text 110; same independent alignment 923 seen with versions 900 in context 111 understood as hidden.

Truncation 1010 controls is seen: FIG. 10A shows first chunk 122 in context 111 seen as "it's better to make a mistake"; FIG. 10B shows first chunk 122 in context 111 seen as "it's better to make ~"; FIG. 10A shows third chunk 122 in context 111 seen as "than it is not to try something"; FIG. 10B shows third chunk 122 in context 111 seen as "than it is not to t~"; wide portions within context 111 chunks 122 understood hidden; full contents seen under context size 1020 control shown in FIG. 10C.

Text 110 positions are understood to remain constant if toggle 999 control shown is applied; single space 101 seen between words 128 in text 110; spaces 102 seen only before chunks 122 in context 111.

FIG. 10C shows context sized control to remove spaces between text words.

Same example from FIG. 10A-FIG. 10B is seen with all same controls understood applied;

same bitext 112 in alignment 123 seen before same words in text 110; same independent alignment 923 seen with versions 900 in context 111 understood as hidden.

Context size 1020 control is seen: weak style 116 seen in context 111 is reduced in size; full contents of context 111 chunks 122 are seen; single space 101 seen between words 128 in text 110; spaces 102 seen only before chunks 122 in context 111.

Text 110 positions are understood to remain constant if toggle 999 control shown is applied; additional controls in strong style 118 and weak style 116 in bitext 112 format shown are specified in FIG. 11A-FIG. 11H.

FIG. 11A shows a text within display viewed from angle where context is invisible Textarea 100 is seen bitext 112 control; text 110 contents understood in Spanish language as "cambiar ángulo de vista, o iluminar la pantalla para ver contexts alineados."

Strong style 118 is seen in text 110: large sized "black" text 110 seen against "white" background 1100 in "100%" contrast 1110; horizontal scale 117 shown understood as 100%.

Context 111 in weak style 116 shown is not visible: context 111 contents are slightly visible in front view angle 955 seen in FIG. 11B; and increasingly visible in high view angle 952 seen in FIG. 11C.

Low view angle 958 is seen to text 110 within monitor 181: perspective of view to text 110 is seen from below.

FIG. 11B shows same text and display viewed from angle where context is slightly visible Front view angle 955 is seen to same example from FIG. 11A; all same contents and controls understood applied.

Context 111 shown is detected with contents "change angle of view or brighten the screen for see contexts aligned".

Weak style 116 in context 111 shows characters with same height as strong style 118 in text 110; horizontal scale 117 is understood as 80% relative to strong style 118; "narrow" font applied if horizontal scale 117 control not available; contrast 1110 to background 1100 is within "1-10%" range.

Alignment 123 is seen in examples: text 110 chunk 122 "ángulo" with context 111 chunk 122 "angle"; text 110 chunk 122 "alineados" with context 111 chunk 122 "aligned".

Span 512 as described in conjunction with FIG. 5F, FIG. 5I is seen applied; WYSIWYG 109 edit control shown, if applied, is understood to increase contrast 1110 in weak style 116 until edit is committed.

FIG. 11C shows same text and display viewed from angle where context is more visible Same example from FIG. 11A; all same contents and controls understood applied; alignments 123 seen are understood as same.

High view angle 952 is shown and context 111 contents seen are more visible: in FIG. 11A perspective from low view angle 958, context 111 is invisible; in FIG. 11B perspective from front view angle 955, context 111 is slightly visible; in FIG. 11C perspective from high view angle 952, context 111 is more visible.

FIG. 11D shows low contrast narrow context aligned with high contrast text in light background 1100

Same example from FIG. 11A-FIG. 11C is seen with same contents, controls and alignments 123 in bitext 112 understood applied.

Background 1100 color is changed to "off-white"; weak style 116 in context 111 seen is changed; weak style 116 color now appears as "white"; contrast 1110 of weak style 116 to background 1100 is within "1-10%" range; strong style 118 in text 110 is seen in same "100%" contrast 1110 to background 1100.

Picture 800 seen is optionally applied in background 1100 color; low contrast 1110 in weak style 116 and high context 111 in strong style 118 are understood to modulate relative to background 1100 color.

FIG. 11E shows low contrast narrow context aligned with high contrast text on dark background 1100

Same example from FIG. 11A-FIG. 11D is seen with same contents, controls and alignments 123 in bitext 112 understood applied.

Background 1100 color is changed to "very dark"; weak style 116 in context 111 seen is changed; weak style 116 color now appears as "black"; contrast 1110 of weak style 116 to background 1100 is within "1-10%" range; strong style 118 in text 110 is seen in same "100%" contrast 1110 to background 1100.

Picture 800 seen is optionally applied in background 1100 color; low contrast 1110 in weak style 116 and high context 111 in strong style 118 are understood to modulate relative to background 1100 color.

FIG. 11F represents same text printed on paper viewed in bright light view angle Text 110 and context 111 seen are represented as printed on paper 1120 shown; same strong style 118 seen in text 110, weak style 116 in context 111 as shown in FIG. 11A-FIG. 11C.

Text 110 contents seen as "Bajo luz del sol se pueden ver contextos alineados. con poca luz, se ye nada."; context 111 contents sees as "under sunlight they can be seen aligned contexts with little light nothing seen".

Alignment 123 is bitext 112 is seen in examples: text 110 "se pueden" with context 111 "they can be"; text 110 "se ye nada" with context 111 "nothing seen".

Bright light view 1130 is seen: paper 1120 is positioned to reflect bright light, such as direct sunlight or bright daylight; context 111 contents are easily seen; insufficient light reduces context 111 visibility, as shown in FIG. 11G, FIG. 11H.

Picture 800 seen is optionally applied in background 1100 COLOR; low contrast 1110 in weak style 116 and high context 111 in strong style 118 are understood to modulate relative to background 1100 color.

FIG. 11G represents same text printed on same paper viewed in average light view angle Same paper 1120 print example from FIG. 11F is represented; same contents, bitext 112 format and same alignments 123 shown.

Average light view 1131 is seen; paper 1120 is positioned to reflect medium intensity light, such as within deep shade daylight or ambient artificial room light; context 111 contents are barely seen: FIG. 11F shows visible context 111 contents in bright light view 1130; FIG. 11H shows invisible context 111 contents in low light view 1132; text 110 contents easily read in all FIG. 11F-FIG. 11H examples.

FIG. 11H represents same text printed on same paper viewed in low light view angle Same paper 1120 print example from FIG. 11F is represented; same contents, bitext 112 format and same alignments 123 shown.

Low light view 1132 is seen: paper 1120 is positioned to reflect low intensity light, such as outdoor dusk or indirect room light; context 111 contents are invisible while text 110 contents are easily read.

FIG. 12A shows flowchart of vocalized text chat and face combination system incorporated into a "Language Identity Face Exchange" or LIFE system.

Step 1200 in flow represents "Language Identity Face Exchange" or LIFE 1200 system; all previously specified controls understood applied in LIFE 1200 system; controls represented in computers 180 understood as clients 187 exchanging learning on network 186.

LIFE 1200 system applies the disclosed controls in social environments; language 1220 used is supported by multiple context 111 forms 920 and versions 900 in independent alignment 923; identity 1222 is understood as formed by language 1220 and expressions in face 1234; face 1234 is applied with combination with other faces 1234; exchange 1218 is provided, optionally in real-time 189 video-conference and chat.

Language 1220 is understood as applied in the system; vocalized text 388 is applied to synchronously experience vocalization 188 with text 110; tap tap 333 process, optionally in tap game 360, enhances synchronous experience of vocalized text 388; contexts 111 in independent alignment 923 optionally include restatement 191, translation 192, tag control 700, ASQ system 770, tie control 600; picture sorter 280 provides multiple pictures 800 to depict text 110 and experience multiple vocalizations 188 of text 110.

Identity 1222 is represented by face 1234 and language 1220; a core problem in language learning is bad feelings, such as embarrassment, shyness and such; a learner by nature seeks to avoid damage to their own identity 1222; attachment to identity 1222 is an obstacle to effective learning of language 1220.

Faces 1234 controlled in combination 1210 process lowers identity 1222 obstacles while learning language 1220; face one 1231 creates a vocalized text 388 message with vocalization link 888, as described below; face two 1232 experiences parts of their own identity 1222 with same vocalized text 388 message and vocalization link 888.

Exchange 1218 is controlled within LIFE 1200 system; client 187 face 1234 optionally applies combination 1210 with pre-recorded vocalization link 888 at low risk to client 187 identity 1222; real-time 189 combination 1210 of faces 1234 exchanging vocalized text 388 messages are controlled within language 1220 exchange 1218 as described in flow below.

Step 1202 in LIFE 1200 system flow is same as basic face detection 1202 control; camera 138 within computer 180 is applied to capture motion picture 800 of face one 1231, as described in conjunction with FIG. 12B, making a new vocalization link 888 or listening to a previously recorded vocalization link 888; sophisticated 3-D facial motion capture systems and complex tracking of expressions is not required; as described in conjunction with in FIG. 12B-FIG. 12E, simple positions for mouth 1236, left eye 1239 and right eye 1238 are detected from within real-time 189 video pictures 800, then applied as described in step 1204 and step 1206.

Step 1204 in LIFE 1200 system is same as image stabilization 1204 control; real-time 189 digital image stabilization 1204 shifts electronic image from frame to frame within vocalization link 888, enough to counteract the motion; pixels outside the border of the visible frame to provide a buffer for motion; close-up of face 1234 is controlled as shown in FIG. 12D-FIG. 12E, within face placement 1206 parameters defined in step 1206.

Step 1206 in LIFE 1200 system is face placement 1206 control; face 1234 detected in face detection 1202 and controlled in image stabilization 1204 is positioned within parameters under face placement 1206 control; face detection 1202 defined positions for mouth 1236, left eye 1239 and right eye 1238 are applied as shown in FIG. 12C and FIG. 12N; once face one 1231 is positioned under face placement 1206 control, a select face two 1232 is selected under pair face 1208 control described in step 1208.

Step 1208 in LIFE 1200 system flow represents pair face 1208 control to select pictures 800 of faces 1234 controlled in face detection 1202, image stabilization 1204 and face placement 1206 processes; face one 1231 and face two 1232, as described in conjunction with FIG. 12B, is optionally connected via network 186 as represented; it's understood that pair face 1208 control is optionally applied within client 187 and previously recorded vocalization links 888, to minimize any threat to face one 1231 identity 1222; pair face 1208 control selects which faces 1234 are applied in combination 1210 control described step 1210.

Step 1210 in LIFE 1200 system flow represents face 1234 combination 1210 control, as described in conjunction with FIG. 12F-FIG. 12M; face detection 1202, image stabilization 1204, face placement 1206 and pair face 1208 controls are applied in combination 1210 control; motion pictures 800 of selected faces 1234 are combined in any number of configurations, including the spin 1280 controls described in conjunction with FIG. 12I and represented in FIG. 12F-FIG. 12M; face 1234 combination 1210 is preferably applied in conjunction with vocalized text 388 generated in flow step 1212.

Step 1212 in LIFE 1200 system flow represents a vocalization 188 being applied with robot time 300; as described in conjunction with FIG. 3A, computer 180 microphone 136 is applied with Speech-To-Text 171 system to generate text 110 from vocalization 188; timed text 222 generated in robot time 300 process is applied in vocalized text 388 presented in synchronous players 288; accuracy in Speech-To-Text 171 generated text 110 of robot time 300 generated timed text 222 is optionally controlled in flow step 1216; select contexts 111 are optionally included in flow step 1214.

Step 1214 in LIFE 1200 system flow represents optional generation of mechanical contexts 1214; text 110 encoding of vocalization 188 controlled in step 1212 is optionally applied in machine translation 193 process; same-language restatements 191 are optionally generated and applied; IPA transcription 382 is optionally generated from IPA database 383; tie control 600 is optionally applied with translation 192; tag control 700 are optionally applied, for example under ASQ 770 control; depiction 864 context 111 and sortable sets of depiction links 868 controlled in picture sorter 280 are optionally generated via depiction query 864; vocalization links 888 matching parts or whole vocalization 188 encoded in text 110 are optionally found via vocalization query 884; toggle 999 controls in forms 920, types 940 and versions 900 of context 111 are applied; inclusion of one or more mechanical contexts 1214 is represented within the flow as optional; multiple separate datasets are optionally applied with text 110 to generate mechanical contexts 1214; human corrections 1216 and modifications applied as described in flow step 1216.

Step 1216 in LIFE 1200 system flow represents human correction 1216 control of mechanically generated contexts 111; robot time 300 generated timed text 222 and a number mechanical contexts 1214 are optionally corrected; accuracy of robot time 300 generated timed text 222 is checked; timer 244 as described in conjunction with FIG. 3G is applied to efficiently correct errors; WYSIWYG 109 edit control within textarea 100 is applied to correct text 110 errors in Speech-To-Text 171 system results; textarea 100 is also applied with detailed ABC 500 system and bitext 112 controls to reposition chunks 122 in alignment 123; adapted BSA 400 system also understood applicable as shown in FIG. 7L; independent alignment 923 in multiple versions 900 with forms 920 and types 940 of context 111 is controlled; sequential order 910 of context 111 versions 900 is applied within toggle 999 control; preferred pictures 800 and associated vocalizations 188T are ranked in picture sorter 280; a plurality of specified methods provided facilitate human correction and modification of mechanical contexts 1214; valid data 308 produced is applied in STT 171, robot time 300 and mechanical contexts 1214 generation systems; context 111 enriched messaged are exchanged by humans in exchange 1218 control described in flow step 18.

Step 1218 in LIFE 1200 flow represents exchange 1218 of vocalized text 388 messages; exchange 1218 is made optionally in real-time 189 or asynchronously via vocalization link 888; any two computers 180 applied in specified LIFE 1200 system optionally engage in exchange 1218; minimal exchange 1218 within LIFE 1200 flow optionally excludes above described picture 800 controls, while simply sending and receiving vocalized text 388 messages; preferably, within the scope of language learning, faces 1234 are applied with language 1220 and identity 1222 in exchange 1218.

FIG. 12B shows conventional split screen video web conference between first and second face.

Vocalized text 388 is seen in chat message in textarea 100: vocalization 188 seen understood created by either face one 1231 or face two 1232; STT and robot time 300 applied as described in step 1212; tap tap 333 process shown provides robot time 300 error correction described in step 1216.

Camera 138 capture of motion pictures 800 is represented in two client 187 computers 180; exchange 1218 is shown within conventional video-conferencing real-time 189; split-screen video represented understood same on both clients 187; separate frames 1240 seen in each picture 800.

Faces 1234 are seen within in split-screen video-conference; to left, face one 1231 is shown; to right, face two 1232 is seen; face one 1231 captured in real-time 189 by camera 138 understood as on first client 187; face two 1232 shown captured in real-time 189 by camera 138 understood on second client 187.

Face one 1231 appears from slightly greater distance; full head and shoulders are in view; face one 1231 fills approximately 15% of pixels in frame to left of split-screen.

Face two 1232 appears slightly closer; neck and head are in view, no shoulders visible; face two 1232 occupies approximately 20% of pixels to right of split-screen.

Tilt 1298 seen in faces 1234 face one 1231 and face two 1232 is different; face one 1231 is seen in approximately "6" degree tilt 1298 toward right; face two 1232 is seen at approximately "17" degree tilt 1298 toward left.

Each face 1234 are seen with one left eye 1239, one right eye 1238 and one mouth 1236; face detection 1202 is shown controlled with both cameras 138, LIFE 1200 system seen applies face detection 1202 and image stabilization 1204; described in FIG. 12A with face placement 1206 control shown in FIG. 12C.

FIG. 12C shows face placement control set coordinates for face placement.

LIFE 1200 system shown applies face detection 1202 and image stabilization 1204 with video camera 138 capture represented in FIG. 12B; frame 1240 shown is same as camera 138 capture size; widescreen capture represented as example to describe optional ear crop 1245 control below; single frame 1240 seen split into axes.

Horizontal center axis 1241 seen horizontally positioned and centered in frame 1240; vertical center axis 1242 seen vertically positioned and centered in frame 1240; eyes axis 1243 seen horizontally positioned at approximately 15% below top of frame 1240; mouth axis 1244 seen horizontally positioned at approximately 15% above bottom of frame 1240.

Face placement 1206 controlled coordinates of three key features in faces 1234 are defined: mouth 1236 seen on mouth axis 1244 centered on vertical center axis 1242; left eye 1239 seen on eyes axis 1243 left of vertical center axis 1242; right eye 1238 seen on eyes axis 1243 right of vertical center axis 1242; left eye 1239, right eye 1238 coordinates understood controlled in equidistance from vertical center axis 1242.

Tilt 1298 is corrected: FIG. 12B example described shows faces 1234 at various tilts understood to change in time; FIG. 12C shows face detection 1202 and image stabilization 1204 controls understood applied under face placement 1206 control to correct tilt 1298 in real-time 189 shown.

Ear crop 1245 control is seen; widescreen capture represented is preferably controlled by ear crop 1245; to minimize extraneous information; horizontal center axis 1241 is applied in combination 1210 controls described in FIG. 12I-FIG. 12M Face placement 1206 coordinates face detection 1202 and image stabilization 1204 controls: FIG. 12B represents face one 1231 and face two 1232 in uncontrolled positions; FIG. 12C shows face placement 1206 control coordinates applied as described in conjunction with FIG. 12D-FIG. 12E FIG. 12D shows face placement applied to "face one" from FIG. 12B.

Picture 800 shown is understood same video as face one 1231 seen in FIG. 12B; face detection 1202 and image stabilization 1204 controls are shown applied.

Face placement 1206 control coordinates are seen: 15% below frame 1240 top, horizontal eyes axis 1243 seen; 15% above frame 1240 bottom, horizontal mouth axis 1244 seen; centered in middle, vertical center axis 1242 seen.

Face one 1231 appears to fill frame 1240: in FIG. 12B, face one 1231 appears as described to fill 15% of frame 1240 left in split-screen; in FIG. 12D, face one 1231 appears to fill 95% of frame 1240.

Left eye 1239 and right eye 1238 are seen with controlled positions: both eyes on eyes axis 1243; each equidistant from vertical center axis 1242; mouth 1236 is shown with controlled position: centered on vertical center axis 1242 and mouth axis 1244; ear crop 1245 control shown is applied within widescreen frame 1240.

Tilt 1298 is seen corrected: FIG. 12B shows face one 1231 with tilt 1298 understood to vary in time with camera 138 capture; FIG. 12D shows face one 1231 with tilt 1298 corrected under face detection 1202, image stabilization 1204 and face placement 1206 controls; horizontal center axis 1241 and vertical center axis 1242 are shown for description purpose.

FIG. 12E shows face placement applied to "face two" from FIG. 12B.

Picture 800 shown is understood same video of face two 1232 seen in FIG. 12B; face detection 1202, image stabilization 1204 AND face placement 1206 controls are shown applied.

Same face placement 1206 coordinates are seen: 15% below frame 1240 top, horizontal eyes axis 1243 seen; 15% above frame 1240 bottom, horizontal mouth axis 1244 seen; centered in middle, vertical center axis 1242 seen.

Face two 1232 appears to fill frame 1240: in FIG. 12B, face two 1232 appears to fill 20% of frame 1240 in right half of split-screen; in FIG. 12D, face two 1232 appears to fill 95% of frame 1240; (ear crop 1245 control shown understood applied within widescreen frame 1240).

Left eye 1239 and right eye 1238 are seen with controlled positions: both eyes on eyes axis 1243; each equidistant from vertical center axis 1242; mouth 1236 is shown with controlled position centered on vertical center axis 1242 and mouth axis 1244.

Tilt 1298 is seen corrected: FIG. 12B shows face one 1231 with tilt 1298 understood to vary in time with camera 138 capture; FIG. 12D shows face one 1231 with tilt 1298 corrected under face detection 1202, image stabilization 1204 and face placement 1206 controls Face placement 1206 controls are understood superimposed in FIG. 12D-FIG. 12E for description; the controls are optionally applied while hidden as shown in FIG. 12F-FIG. 12M FIG. 12F shows combination 1210 of face two 1232 and face one 1231 in one frame 1240.

Pictures 800 seen are same video of face one 1231 and face two 1232 from FIG. 12B; LIFE 1200 system shown; face detection 1202, image stabilization 1204 and face placement 1206 controls seen applied in combination 1210 control are understood applied in remaining FIG. 12E-FIG. 12Q.

Faces 1234 are shown in one frame 1240 seen split on vertical center axis 1242: in right half, right half of face one 1231 from FIG. 12D seen; in left half, left half of face two 1232 from FIG. 12E seen; vertical center axis 1242 optionally blurred to blend faces 1234.

Combination 1210 in understood at "0 seconds" or "0 s" position: (position value understood applied in analogy to clock position), optional spin 1280 control shown represented by arrow outside upper left part of frame 1240, previously seen combination 1210 shown in FIG. 12I; next combination 1210 under spin 1280 is seen in FIG. 12G.

FIG. 12G shows horizontal split screen view, top half second face, bottom half first face.

Pictures 800 seen are same video of face one 1231 and face two 1232 from FIG. 12B; LIFE 1200 system processes seen applied in combination 1210.

Faces 1234 are shown in one frame 1240 seen split on horizontal center axis 1241; in top half, top half of face one 1231 from FIG. 12E seen; in bottom half, bottom half of face two 1232 from FIG. 12D seen; horizontal center axis 1241 optionally blurred to blend faces 1234.

Combination 1210 in understood at "15 s" position; optional spin 1280 control shown represented by arrow; previously seen combination 1210 shown in FIG. 12F; next combination 1210 under spin 1280 is seen in FIG. 12H.

FIG. 12H shows vertical split screen view, left half first face, right half second face.

Pictures 800 seen are same video of face one 1231 and face two 1232 from FIG. 12B; LIFE 1200 system processes seen applied in combination 1210.

Faces 1234 are shown in one frame 1240 seen split on vertical center axis 1242: in left half, left half of face one 1231 from FIG. 12D seen; in right half, right half of face two 1232 from FIG. 12E seen; vertical center axis 1242 optionally blurred to blend faces 1234

Combination 1210 in understood at "30 s" position; optional spin 1280 control shown represented by arrow; previously seen combination 1210 shown in FIG. 12G; next combination 1210 under spin 1280 is seen in FIG. 12I.

FIG. 12I shows horizontal split screen view, top half first face, bottom half second face.

Pictures 800 seen are same video of face one 1231 and face two 1232 from FIG. 12B; LIFE 1200 system processes seen applied in combination 1210.

Faces 1234 are shown in one frame 1240 seen split on horizontal center axis 1241: in top half, top half of face one 1231 from FIG. 12D seen; in bottom half, bottom half of face two 1232 from FIG. 12E seen; horizontal center axis 1241 optionally blurred to blend faces 1234.

Combination 1210 in understood at "45 s" position; optional spin 1280 control shown represented by arrow; previously seen combination 1210 shown in FIG. 12H; next combination 1210 under spin 1280 is seen in FIG. 12F.

Positions described as "15 s", "30 s", "45 s", "00 s" are representative for smooth flow, precise positions such as "59 s" are optionally applied.

Spin rate 1288 control is shown; clock speed optionally applied, for example one position per second or minute; picture 800 is optionally applied, for example on position per frame; spin rate 1288 "0" or "stop" optionally controlled stop at one position.

Vocalization 188 segments 210 seen optionally control spin rate 1288; time spans 320 shown applied to incrementally advance positions; direction optionally reversed upon sending or receiving vocalized text 388 messages, as described in conjunction with FIG. 12J-FIG. 12M below.

FIG. 12J shows FIG. 12F view under synchronous playback, translation context and superimposition controls.

FIG. 12J show multiple controls synchronously applied; pictures 800 seen are same video of face one 1231 and face two 1232 from FIG. 12B; LIFE 1200 system processes seen applied in combination 1210; combination 1210 position shown is same position as described in conjunction with FIG. 12F; camera 138 and microphone 136 shown optionally applied to make vocalization link 888 seen.

Vocalization 188 under robot time 300 as described in step 1212 if FIG. 12A flow seen; all mechanical contexts 1214 described understood as included (hidden); machine translation 193 as described in conjunction with FIG. 1B shown visibly applied; correction 1216 controls described in FIG. 12A flow shown provided; exchange 1218 of vocalized text 388 messages within LIFE 1200 system is shown.

Bitext 112 control is seen; text 110 contents seen as "mi vedo parlare"; context 111 contents seen as "i see myself speak"; alignment 123 shown in third text 110 word "parlare" with fourth context 111 word "speak".

Vocalized text 388 is seen and heard with text 110 word "mi", with synchronous playback 288 shown; tied playback 688 seen in third context 111 word "myself"; TAP controls included in correction 1216 controls optionally applied with vocalized text 388; superimposition 344 control shown optionally configured with horizontal center axis 1241.

Toggle 999 and versions 900 controls seen are applied as described in conjunction with FIG. 9A-FIG. 9W; textarea 100 shown applied for edit control; toggle 999 control of form 920 optionally applied to view restatement 191 context 111; versions 900 shown within restatement 191; all separate context 111 seen controlled in independent alignment 923; sequential order 910 in restatement 191 context 111 versions 900 "mi vedo parlare", "vedi the parlo", "sto parlando sai?" and "c'e la faccio io" optionally applied as spin 1280 control in combination 1210 is applied as shown in FIG. 12K-FIG. 12M.

Synchronous players 288 shown allow vocalized text 388 message to be reviewed word 128 by word 128.

FIG. 12K shows vocal text play next segment after FIG. 12J example, while spin control is applied in face combination.

Same LIFE 1200 system shown in FIG. 12J is seen; same contents shown understood controlled under all same controls applied; same camera 138 and microphone 136 shown optionally applied to make vocalization links 888 seen.

Vocalized text 388 is seen and heard with second text 110 segment 210 "ye": tied playback 688 seen in second context 111 word "see"; combination 1210 of face one 1231 and face two 1232 seen same as FIG. 12G; spin rate 1288 seen optionally controlled by vocalization 188 shown.

FIG. 12L shows continuation of spin control applied with face combination control; vocal text plays next segment.

Same LIFE 1200 system shown in FIG. 12K is seen; same contents shown understood controlled under all same controls applied; same camera 138 and microphone 136 shown optionally applied to make vocalization links 888 seen.

Vocalized text 388 is seen and heard with third text 110 segment 210 "do"; tied playback 688 seen in first and second context 111 words "i see"; combination 1210 of face one 1231 and face two 1232 seen same as FIG. 12H; spin rate 1288 seen optionally controlled by vocalization 188 shown FIG. 12M shows next vocal text segment play while spin control is applied with face combination.

Same LIFE 1200 system shown in FIG. 12L is seen; same contents shown understood controlled under all same controls applied; same camera 138 and microphone 136 shown optionally applied to make vocalization links 888 seen.

Vocalized text 388 is seen and heard with fourth text 110 segment 210 "par"; tied playback 688 seen in first and second context 111 words "i see"; combination 1210 of face one 1231 and face two 1232 seen same as FIG. 12I; spin rate 1288 seen optionally controlled by vocalization 188 shown.

Exchange 1218 in LIFE 1200 system shown is represented: both face one 1231 and face two 1232 optionally send and receive vocalized text 388 messages; exchange 1218 is optionally simple fast, without mechanical contexts 1214, vocalized text 388 only; exchange 1218 is optionally delayed due to correction 1216 of mechanical contexts 1214; face 1234 combination 1210 is preferably applied as shown.

FIG. 12N shows an alternative larger scale face feature placement guide to FIG. 12C example.

Baby face placement 1248 control is similar to face placement 1206 seen in FIG. 12C; same axes horizontal center axis 1241, vertical center axis 1242, eyes axis 1243, mouth axis 1244 shown; configuration of eyes axis 1243 and mouth axis 1244 changed: FIG. 12C shows eyes axis 1243 at 15% below frame 1240 top, mouth axis 1244 at 15% above frame 1240 bottom; FIG. 12N shows eyes axis 1243 at 20% below frame 1240 top, mouth 1236 AXIS at 20% below frame 1240 bottom.

Face 1234 features appear in larger scale: FIG. 12C face placement 1206 applied in FIG. 12D-FIG. 12M show smaller face 1234 features in combination 1210; FIG. 12N baby face placement 1248 applied in FIG. 12O-FIG. 12P show larger face 1234 features; ear crop 1245 control shown is not applied: ear crop 1245 understood and not required within widescreen shown in example, but optionally applied as shown.

FIG. 12O shows baby face placement applied in combination; face one eyes seen above face two mouth.

Same LIFE 1200 system shown in FIG. 12J is seen; same camera 138 and microphone 136 shown optionally applied to make vocalization links 888 seen; all same controls understood applied, with one exception: baby face placement 1248 control is applied.

Faces 1234 are shown in one frame 1240 seen split on horizontal center axis 1241: in top half, top half of face one 1231 shown; in bottom half, bottom half of face two 1232 shown; same "15 s" combination 1210 position seen in FIG. 12G is applied.

Vocalized text 388 is seen in textarea 100: text 110 message seen as "ciao bella come stai?" with vocalized text 388 in fourth segment 210 "co"; restatement 191 context 111 seen as "amore come va?"; alignment 123 shown in second text 110 chunk 122 "come stai?" with second context 111 chunk 122 "come va?"; message understood as sent by face two 1232, received by face one 1231.

Spin 1280 control seen is applied minimally as example: spin rate 1288 set to alternate upon sending/receiving vocalized text 388 message, as shown in FIG. 12P.

FIG. 12P shows baby combination reversed: first mouth below second eyes.

Same LIFE 1200 system shown in FIG. 120 is seen; same camera 138 and microphone 136 shown optionally applied to make vocalization links 888 seen; same baby face placement 1248 control is applied.

Faces 1234 are shown in one frame 1240 seen split on horizontal center axis 1241: in top half, top half of face two 1232 shown; in bottom half, bottom half of face one 1231 shown; same "45 s" combination 1210 position seen in FIG. 12I is applied.

Vocalized text 388 is seen in textarea 100: text 110 message seen as "non c'è male" with vocalized text 388 in third segment 210 "ma"; restatement 191 context 111 seen as "tutto a posto"; message understood as sent by face one 1231, received by face two 1232.

Spin 1280 control seen is applied minimally as example: spin rate 1288 set to alternate upon sending/receiving vocalized text 388 message, as shown in FIG. 12P.

Identity 1222 seen is understood controlled with reduced risk; baby face placement 1248 minimizes face 1234 features; combination 1210 control is applied to share language 1220 identity 1222; exchange 1218 seen makes conversation supplemented by multiple contexts 111; one context 111 seen applied in FIG. 12Q example.

FIG. 12Q shows picture sorter applied with vocal text and LIFE system.

Same LIFE 1200 system shown in FIG. 120 is seen; same camera 138 and microphone 136 shown optionally applied to make vocalization links 888 seen; same baby face placement 1248 control is applied.

Vocalized text 388 is seen optionally applied with plaintext 120 shown: text 110 contents seen as "vedi quello the dico?"; vocalized text 388 shown third segment 210 "lo"; hide context 311 control seen applied; show context 312 control optionally applied to view contexts 111 as described in conjunction with FIG. 12A, FIG. 12J.

Face two 1232 seen in bottom half of frame 1240 below horizontal center axis 1241: same "15 s" combination 1210 position understood applied face one 1231 seen is hidden under picture sorter 280.

Picture sorter 280 is seen above horizontal center axis 1241: depiction index 860 shown is optionally applied access depiction 800 of text 110 "vedi quello che dico"; vocalization index 880 seen is represented as active within picture sorter 280 as shown; vocalization links 888 seen in thumbnails 802 understood cued with same text 110 "vedi quello che dico"; multiple vocalization 188 of same text 110 understood optionally accessed, as described in conjunction with FIG. 8D.

LIFE 1200 system shown is applied in above examples; it's understood that the examples are representative; multiple configurations are understood as optionally applied; multiple contexts 111 controlled in independent alignment 923 understood accessed; exchange 1218 is made in social interaction; faces 1234 are processed under combination 1210 control; identity 1222 obstacle in learning process is seen minimized; language 1220 is experienced and learned.

What is claimed is:

1. A system to synchronize vocalization with text, the system comprising:

a computing system including a processor configured to perform the following;

reproducing audio vocalization by a media player;

transcribing text of the vocalization;

segmenting the transcribed text into a number of text segments to delineate at least one of words, phonemes or syllables;

defining a timing for each of the text segments, wherein value of the timing is same in both the text segment and a corresponding part in the vocalization;

defining a time span for each text segment, said time span value found by subtracting the timing value of the text segment from the timing value of the next text segment;

applying a reverse case transformation of the text segments for transforming at least lowercase characters to uppercase characters for the time span while the corresponding part in the vocalization is performed;

providing a set of sequential copies of the transcribed text, where each sequential copy applies the reversed case transformation to the next text segment for the duration of the time span;

performing a vocalized text with the text segments in the reversed case transformation while the corresponding parts in the vocalization are synchronously performed.

2. The system as claimed in claim 1, wherein a pause in the vocalization is synchronized between the text segments when no reversed case transformation is applied for the time span of the pause.

3. The system as claimed in claim 1, wherein a conversion control converts the text segment and timing information between different captioning formats.

4. The system as claimed in claim 1, wherein a tap process applied by multiple fingers writes the timings to synchronize the vocalized text.

5. The system as claimed in claim 4, wherein handling synchronization timing of the vocalized text is performed by using one or more keys of a keyboard that enable the tapping, wherein at least one of the keys is applied as any or a combination of stop/go key, tap sync key, untap key, go back key, go slower key, insert pause key, and join key.

6. The system as claimed in claim 1, wherein the vocalized text is combined with a contextual text in an aligned bitext that is editable within a single text area.

7. The system as claimed in claim 6, wherein the contextual text is selected from any or a combination of one of a timing, a translation, a tag, and a link.

8. The system as claimed in claim 6, wherein chunks of at least one or more words within the aligned bitext are aligned in an array of chunk pairs, with alignment controlled in one of centered, flush right or flush left juxtaposition.

9. The system as claimed in claim 8, where a chunk delineation in the array of chunk pairs is controlled using any or a combination of a push chunk control, a pull chunk control, a new chunk control, and a merge chunk control.

10. The system as claimed in claim 6, where the reversed case transformation is applied in the contextual text and synchronously performed with the reversed case transformation in the vocalized text.

11. The system as claimed in claim 6, wherein the aligned bitext is displayed in a editable text area and comprises any or a combination of a number, a mathematical symbol, and an alphabet character.

* * * * *